(12) United States Patent
Debosch et al.

(10) Patent No.: US 12,508,306 B2
(45) Date of Patent: Dec. 30, 2025

(54) COMPOSITIONS AND METHODS OF USE THEREOF FOR TREATMENT OF METABOLIC DISEASES AND RELATED DISORDERS

(71) Applicant: Washington University, St. Louis, MO (US)

(72) Inventors: Brian J. Debosch, St. Louis, MO (US); Cassandra Higgins, St. Louis, MO (US); Yiming Zhang, St. Louis, MO (US); Allyson Mayer, St. Louis, MO (US)

(73) Assignee: Washington University, St. Louis, MO (US)

( * ) Notice: Subject to any disclaimer, the term of this patent is extended or adjusted under 35 U.S.C. 154(b) by 1175 days.

(21) Appl. No.: 17/050,318

(22) PCT Filed: Apr. 25, 2019

(86) PCT No.: PCT/US2019/029205
§ 371 (c)(1),
(2) Date: Oct. 23, 2020

(87) PCT Pub. No.: WO2020/009740
PCT Pub. Date: Jan. 9, 2020

(65) Prior Publication Data
US 2021/0077598 A1 Mar. 18, 2021

Related U.S. Application Data

(60) Provisional application No. 62/662,564, filed on Apr. 25, 2018.

(51) Int. Cl.
| | | |
|---|---|---|
| *A61K 38/50* | (2006.01) | |
| *A61K 35/761* | (2015.01) | |
| *A61K 47/34* | (2017.01) | |
| *A61K 47/64* | (2017.01) | |
| *A61K 47/68* | (2017.01) | |
| *A61P 3/00* | (2006.01) | |
| *A61P 3/04* | (2006.01) | |
| *A61P 3/10* | (2006.01) | |

(52) U.S. Cl.
CPC ............ *A61K 38/50* (2013.01); *A61K 35/761* (2013.01); *A61K 47/34* (2013.01); *A61K 47/64* (2017.08); *A61K 47/6815* (2017.08); *A61P 3/04* (2018.01); *A61P 3/10* (2018.01)

(58) Field of Classification Search
None
See application file for complete search history.

(56) References Cited

U.S. PATENT DOCUMENTS

| | | | |
|---|---|---|---|
| 4,241,046 A | 12/1980 | Papahadjopoulos et al. | |
| 4,394,448 A | 7/1983 | Szoka, Jr. et al. | |
| 4,529,561 A | 7/1985 | Hunt et al. | |
| 4,554,101 A | 11/1985 | Hopp | |
| 4,755,388 A | 7/1988 | Heath et al. | |
| 4,797,368 A | 1/1989 | Carter et al. | |
| 4,828,837 A | 5/1989 | Uster et al. | |
| 4,868,116 A | 9/1989 | Morgan et al. | |
| 4,897,355 A | 1/1990 | Eppstein et al. | |
| 4,925,661 A | 5/1990 | Huang | |
| 4,954,345 A | 9/1990 | Muller | |
| 4,957,735 A | 9/1990 | Huang | |
| 4,980,286 A | 12/1990 | Morgan et al. | |
| 5,043,164 A | 8/1991 | Huang et al. | |
| 5,064,655 A | 11/1991 | Uster et al. | |
| 5,077,211 A | 12/1991 | Yarosh | |
| 5,196,195 A * | 3/1993 | Griffith ................ | A61K 38/50 424/94.1 |
| 5,264,618 A | 11/1993 | Felgner et al. | |
| 6,342,390 B1 | 1/2002 | Wiener et al. | |
| 6,723,551 B2 | 4/2004 | Kotin et al. | |
| 6,821,511 B2 | 11/2004 | Kotin et al. | |
| 7,319,011 B2 | 1/2008 | Riggins et al. | |
| 9,255,262 B2 | 2/2016 | Wong et al. | |
| 9,333,268 B2 | 5/2016 | Bomalaski et al. | |
| 2003/0017146 A1 | 1/2003 | Slobodan et al. | |
| 2017/0000862 A1 | 1/2017 | Wu et al. | |
| 2018/0154008 A1 | 6/2018 | Bomalaski et al. | |
| 2018/0251748 A1 | 9/2018 | Zhang et al. | |
| 2018/0296652 A1 | 10/2018 | Wu et al. | |

FOREIGN PATENT DOCUMENTS

| | | |
|---|---|---|
| WO | 1989007136 A2 | 8/1989 |
| WO | 1990002806 A1 | 3/1990 |
| WO | 2006114691 A1 | 11/2006 |
| WO | 2010051533 A2 | 5/2010 |

(Continued)

OTHER PUBLICATIONS

Hu et al., Am. Soc. Gene Cell Ther., 22(10):1792-1802 (2014) (Year: 2014).*
Hu et al., Curr. Protein Peptide Sci., 18:599-608 (2017) (Year: 2017).*
Johnson et al., Obesity, 23(2):383-390 (2015) (Year: 2015).*
Spolarics et al., Arch. Biochem. Biophys., 274(2):426-433 (1989) (Year: 1989).*
Wu et al., (Amino Acids, 37:153-168 (2009) (Year: 2009).*
Accession No. A0A024R6A0_HUMAN (2014) (Year: 2014).*
Gonzalez-Muniesa, P. et al., "Obesity," Nat. Rev. Dis. Primers, Jun. 2017, pp. 1-18, vol. 3, Article No. 17034.

(Continued)

*Primary Examiner* — Michelle F. Paguio Frising
(74) *Attorney, Agent, or Firm* — Polsinelli PC

(57) ABSTRACT

The present disclosure relates to compositions and methods of using the same for the treatment of various metabolic diseases and related disorders (e.g. diabetes mellitus, NAFLD, obesity, metabolic syndrome). The compositions and methods of the disclosure relate to the administration of an arginine-degrading enzyme.

11 Claims, 67 Drawing Sheets
(66 of 67 Drawing Sheet(s) Filed in Color)
Specification includes a Sequence Listing.

(56) References Cited

FOREIGN PATENT DOCUMENTS

| WO | 2012061015 A2 | 5/2010 |
|---|---|---|
| WO | 2014089212 A1 | 6/2014 |
| WO | 2017109706 A1 | 6/2017 |
| WO | 2018032020 A1 | 2/2018 |
| WO | 2018085551 A2 | 5/2018 |
| WO | 2019228510 A1 | 12/2019 |
| WO | 2020009740 A2 | 1/2020 |

OTHER PUBLICATIONS

Helene, C. et al., "Control of Gene Expression by Triple Helix-Forming Oligonucleotides. The Antigene Strategy," Ann. N.Y. Acad. Sci., Oct. 1992, pp. 27-36, vol. 660, No. 1.

Higgins, C. et al., "Hepatocyte ALOXE3 is induced during adaptive fasting and enhances insulin sensitivity by activating hepatic PPARgamma," JCI Insight, 2018, pp. 1-18, vol. 3, No. 16, e120794.

Honka, M-J. et al., "Insulin-stimulated glucose uptake in skeletal muscle, adipose tissue and liver: a positron emission tomography study," Eur. J. Endocrinol., 2018, pp. 523-531, vol. 178, No. 5.

Huang, J. et al., "Feeding and fasting controls liver expression of a regulator of G protein signaling (Rgs16) in periportal hepatocytes," Comp. Hepatol., 2006, pp. 1-11, vol. 5, No. 8.

Im, D-S. et al., "The AAV Origin Binding Protein Rep68 Is an ATP-Dependent Site-Specific Endonuclease with DNA Helicase Activity," Cell, May 1990, pp. 447-457, vol. 61, No. 3.

Inagaki, T. et al., "Endocrine Regulation of the Fasting Response by PPARalpha-Mediated Induction of Fibroblast Growth Factor 21," Cell Metab., Jun. 2007, pp. 415-425, vol. 5, No. 6.

International Search Report and Written Opinion dated Mar. 24, 2020 from related Patent Application No. PCT/US2019/029205; 16 pgs.

Irabarren, C. et al., "Metabolic Syndrome and Early-Onset Coronary Artery Disease" Is the Whole Greater Than Its Parts?, J. Am. Coll. Cardiol., Nov. 2006, pp. 1800-1807, vol. 48, No. 9.

Kang, H. et al., "Early- and Late-onset Complications of the Ketogenic Diet for Intractable Epilepsy," Epilepsia, 2004, pp. 1116-1123, vol. 45, No. 9.

Karlin, S. et al., "Methods for assessing the statistical significance of molecular sequence features by using general scoring schemes," PNAS, Mar. 1990, 2264-2268, vol. 87.

Klonoff, D. et al., "Drugs in the Pipeline for the Obesity Market," J. Diabetes. Sci. Technol., Sep. 2008, pp. 913-918, vol. 2, No. 5.

Kosinski, C. et al., "Effects of Ketogenic Diets on Cardiovascular Risk Factors: Evidence from Animal and Human Studies," Nutrients, 2017, pp. 1-16, vol. 9, No. 517.

Kremer, J. et al., "Arginine Deprivation Inhibits the Warburg Effect and Upregulates Glutamine Anaplerosis and Serine Biosynthesis in ASS1-Deficient Cancers," Cell Reports, Jan. 2017, pp. 991-1004, vol. 18.

Kyte, J. et al., "A Simple Method for Displaying the Hydropathic Character of a Protein," J. Mol. Biol., 1982, pp. 105-132, vol. 157.

Lee, J. et al., "Aptamer therapeutics advance," Curr. Opin. Chem. Biol., Jun. 2006, pp. 282-289, vol. 10, No. 3.

Lee, E. et al., "Long-term Survival of the Juvenile Lethal Arginase-deficient Mouse With AAV Gene Therapy," Mol. Ther., Oct. 2012, pp. 1844-1851, vol. 20, No. 10.

Link, A. et al., "Beyond toothpicks: new methods for isolating mutant bacteria," Nat. Rev. Microbiol., Sep. 2007, pp. 680-688, vol. 5, No. 9.

Liu, C et al., "Targeting arginase-II protects mice from high-fat-diet-induced hepatic steatosis through suppression of macrophage inflammation," Sci. Rep., 2016, pp. 1-13, vol. 6, No. 20405.

Longo, V. et al., "Fasting: Molecular Mechanisms and Clinical Applications," Cell Metab., Feb. 2014, pp. 181-192, vol. 19, No. 2.

Lozzo, P. et al., "Insulin-Mediated Hepatic Glucose Uptake Is Impaired in Type 2 Diabetes: Evidence for a Relationship with Glycemic Control," J. Clin. Endocrinol. Metab., May 2003, pp. 2055-2060, vol. 88, No. 5.

Maher, L., "DNA Triple-Helix Formation: An Approach to Artificial Gene Repressors?," BioEssays, Dec. 1992, pp. 807-815, vol. 14, No. 12.

Malik, S. et al., "Impact of the Metabolic Syndrome on Mortality From Coronary Artery Disease, Cardiovascular Disease, and All Causes in United States Adults," Circulation, 2004, pp. 1245-1250, vol. 110.

Mao, Y. et al., "Persistent Suppression of Ocular Neovascularization with Intravitreal Administration of AAVrh. 10 Coding for Bevacizumab," Hum. Gene Therapy, Dec. 2011, pp. 1525-1535, vol. 22.

Mardones, P. et al., "Mystery solved: Trehalose kickstarts autophagy by blocking glucose transport," Sci. Signal., Feb. 2016, pp. 1-3, vol. 9, No. 416, fs2.

Markan, K. et al., "Circulating FGF21 Is Liver Derived and Enhances Glucose Uptake During Refeeding and Overfeeding," Diabetes, Dec. 2014, pp. 4057-4063, vol. 63, No. 12.

Martin, B. et al., "Caloric restriction and intermittent fasting: Two potential diets for successful brain aging," NIH Public Access Author Manuscript, Jan. 2009, pp. 1-21, published in final form as: Ageing Res. Rev., Aug. 2006, pp. 332-353, vol. 5, No. 3.

Masri, S. et al., "Partitioning Circadian Transcription by SIRT6 Leads to Segregated Control of Cellular Metabolism," Cell, Jul. 2014, pp. 659-672, vol. 158, No. 3.

Mattson, M. et al., "Beneficial effects of intermittent fasting and caloric restriction on the cardiovascular and cerebrovascular systems," J. Nutr. Biochem., 2005, pp. 129-137, vol. 16.

Mauldin, J. et al., "Recombinant Human Arginase Toxicity in Mice Is Reduced by Citrulline Supplementation," Translat. Oncol., Feb. 2012, pp. 26-31, vol. 5, No. 1.

Mayer, A. et al., "SLC2A8 (GLUT8) is a mammalian trehalose transporter required for trehalose-induced autophagy," Sci. Rep., 2016, pp. 1-15, vol. 6, No. 38586.

Mayer, A. et al., "Enhanced Hepatic PPARalpha Activity Links GLUT8 Deficiency to Augmented Peripheral Fasting Responses in Male Mice," Endocrinology, May 2018, pp. 2110-2126, vol. 159, No. 5.

Mcauley, K. et al., "Intensive Lifestyle Changes Are Necessary to Improve Insulin Sensitivity," Diabetes Care, Mar. 2002, pp. 445-452, vol. 25, No. 3.

Mehta, S. et al., "Non-invasive means of measuring hepatic fat content," World J. Gastroenterol., Jun. 2008, pp. 3476-3483, vol. 14, No. 22.

Ming, X-F. et al., "Arginase II Promotes Macrophage Inflammatory Responses Through Mitochondrial Reactive Oxygen Species, Contributing to Insulin Resistance and Atherogenesis," Am. Heart J., Jul. 2012, pp. 1-18, vol. 1, No. 4.

Moon, J. et al., "Arginase Inhibition Ameliorates Hepatic Metabolic Abnormalities in Obese Mice," Plos One, Jul. 2014, pp. 1-10, vol. 9, No. 7.

Morris, S. et al., "Human type II arginase: sequence analysis and tissue-specific expression," Gene, 1997, pp. 157-161, vol. 193.

Morris, S., "Enzymes of Arginine Metabolism," J. Nutr., Oct. 2004, pp. 2743S-2747S, vol. 134, No. 10.

Morris, S., "Arginine Metabolism: Boundaries of Our Knowledge," J. Nutr., Jun. 2007, pp. 1602S-1609S, vol. 137, No. 6.

Morris, S., "Arginine Metabolism Revisited," J. Nutr., Dec. 2016, pp. 2579S-2586S, vol. 146, No. 12.

Mulligan, R., "The Basic Science of Gene Therapy," Sci., May 1993, pp. 926-932, vol. 260, No. 5110.

Nakamura, M. et al., "Regulation of energy metabolism by long-chain fatty acids," Prog. Lipid. Res., 2014, pp. 124-144, vol. 53.

Navarro, L. et al., "Arginase 2 Deficiency Results in Spontaneous Steatohepatitis: A Novel Link Between Innate Immune Activation and Hepatic De Novo Lipogenesis," HHS Public Access Author Manuscript, Feb. 2016, pp. 1-21, published in final edited form as: J. Hepatol., Feb. 2015, pp. 412-420, vol. 62, No. 2.

O'Neill, M. et al., "Tailoring Trehalose for Biomedical and Biotechnological Applications," HHS Public Access Author Manuscript, Dec. 2017, pp. 1-42, published in final edited form as: Pure Appl. Chem., Sep. 2017, pp. 1223-1249, vol. 89, No. 9.

Park, Y. et al., "Pharmacology of *Escherichia coli*-L-Asparaginase Polyethylene Glycol Adduct," Anticancer Res., 1981, pp. 373-376, vol. 1.

(56) References Cited

OTHER PUBLICATIONS

Pashkov, V. et al., "Regulator of G Protein Signaling (RGS16) Inhibits Hepatic Fatty Acid Oxidation in a Carbohydrate Response Element-binding Protein (ChREBP)-dependent Manner," J. Biol. Chem., Apr. 2011, pp. 15116-15125, vol. 286, No. 17.
Pastore, N. et al., "TFE3 regulates whole-body energy metabolism in cooperation with TFEB," EMBO Mol. Med., 2017, pp. 605-621, vol. 9, No. 5.
Patterson, R. et al., "Intermittent Fasting and Human Metabolic Health," HHS Public Access Author Manuscript, Aug. 2016, pp. 1-19, published in final edited form as: J. Acad. Nutr. Diet., Aug. 2015, pp. 1203-1212, vol. 115, No. 8.
Pereira, D. et al., "The Adeno-Associated Virus (AAV) Rep Protein Acts as both a Repressor and an Activator to Regulate AAV Transcription during a Productive Infection," J. Virol., Feb. 1997, pp. 1079-1088, vol. 71, No. 2.
Pernow, J. et al., "Arginase as a potential target in the treatment of cardiovascular disease: reversal of arginine steal?," Cardiovasc. Res., Jun. 2013, pp. 334-343, vol. 98, No. 3.
Yang, Z. et al., "Functions of arginase isoforms in macrophage inflammatory responses: impact on cardiovascular diseases and metabolic disorders," Front. Immunol., Oct. 2014, pp. 1-10, vol. 5, No. 533.
Zhang, Y. et al., "TFEB-dependent induction of thermogenesis by the hepatocyte SLC2A inhibitor trehalose," Autophagy, 2018, pp. 1959-1975, vol. 14, No. 11.
Zhang, Y. et al., "Hepatic Arginase 2 (Arg2) is sufficient to convey the therapeutic metabolic effects of fasting," Nat. Commun., 2019, pp. 1-16, vol. 10, No. 1587.
Dillon, C. et al., "Rnai as an Experimental and Therapeutic Tool to Study and Regulate Physiological and Disease Processes," Annu. Rev. Physiol., 2005, pp. 147-173, vol. 67.
Perozich, J. et al., "Roles of conserved residues in the arginase family," Biochim. Biophys. Acta., 1998, pp. 23-37, vol. 1382.
Potthoff, M. et al., "Endocrine fibroblast growth factors 15/19 and 21: from feast to famine," Genes Dev., 2012, pp. 312-324, vol. 26.
Potthoff, M. et al., "Head Over Hepatocytes for FGF21," Diabetes, Dec. 2014, pp. 4013-4015, vol. 63.
Potthoff, M., "FGF21 and Metabolic Disease in 2016: A new frontier in FGF21 biology," Nat. Rev. Endocrinol., 2017, pp. 74-76, vol. 13.
Prinsen, H. et al., "Rapid quantification of underivatized amino acids in plasma by hydrophilic interaction liquid chromatography (HILIC) coupled with tandem mass-spectrometry," J. Inherit. Metab. Dis., 2016, pp. 651-660, vol. 39.
Pushparaj, P. et al., "Short Intefering RNA (SiRNA) as a Novel Therapeutic," Clin. Exp. Pharmacol. Physiol., 2006, pp. 504-510, vol. 33.
Reynolds, A. et al., "Rational siRNA design for RNA interference," Nat. Biotechnol., Mar. 2004, pp. 326-330, vol. 22, No. 3, Nature Publishing Group.
Rutledge, E. et al., "Infectious Clones and Vectors Derived from Adeno-Associated Virus (AAV) Serotypes Other Than AAV Type 2," J. Virol., Jan. 1998, pp. 309-319, vol. 72, No. 1.
Sagner, G. et al., "Rapid filter assay for the detection of DNA polymerase activity: direct identification of the gene for the DNA polymerase from Thermus aquaticus," Gene, 1991, pp. 119-123, vol. 97, No. 1.
Sands, M, "AAV-Mediated Liver-Directed Gene Therapy," Methods Mol. Biol., 2011, pp. 141-157, vol. 807, Chapter 6.
Srivastava, A. et al., "Nucleotide Sequence and Organization of the Adeno-Associated Virus 2 Genome," J. Virol., Feb. 1983, pp. 555-564, vol. 45, No. 2.
Steriade, C. et al., "Mitochondrial Encephalopathy With Lactic Acidosis and Stroke-like Episodes (MELAS) May Respond to Adjunctive Ketogenic Diet," Pediatr. Neurol., 2014, pp. 498-502, vol. 50.
Stim, K. et al., "Nucleotide Sequence of the adi Gene, Which Encodes the Biodegradative Acid-Induced Arginine Decarboxylase of *Escherichi coli*," J. Bacteriol., Mar. 1993, pp. 1221-1234, vol. 175, No. 5.
Studier, W., "Protein production by auto-induction in high-density cultures," Protein Expr. Purif., 2005, pp. 207-234, vol. 41.
Sutherland, J. et al., "The Metabolic Syndrome and Inflammation," Metabol. Syndrome Related Dis., 2004, pp. 32-104, vol. 2, No. 2.
Turner, R. et al., "Glycemic Control With Diet, Sulfonylurea, Metformin, or Insulin Patients With Type 2 Diabetes Mellitus," JAMA, 1999, pp. 2005-2012, vol. 281.
UniParc UPI0003C84481 (UniProtKB A0A6I9I2I0), *Vicugna pacos* (Alpaca) (Lama pacos), Oct. 7, 2020; 7 pgs.
UniProtKB O08691, Arginase-2, mitochondrial, mouse, Nov. 1, 1997; 10 pgs.
UniProtKB O08701, Arginase-2 mitochondrial, rat, Jul. 15, 1998; 10 pgs.
UniProtKB A0A2R9CNG5, Arginase, *Pan paniscus* (Pygmy chimpanzee) (Bonobo), Jun. 20, 2018; 7 pgs.
UniProtKB A0A2U3W017, Arginase, *Odobenus rosmarus* divergens (Pacific walrus), Jul. 18, 2018; 5 pgs.
UniProtKB A0A2U3Y4M4, Arginase, *Leptonychotes weddellii* (Weddell seal) (Otaria weddellii), Jul. 18, 2018; 5 pgs.
UniProtKB A0A3Q7PYX4, Arginase, *Callorhinus ursinus* (Northern fur seal), Apr. 10, 2019; 5 pgs.
UniProtKB F1P658, *Canis lupus familiaris* (Dog) (Canis familiaris), May 3, 2011; 7 pgs.
UniProtKB F1SA26, *Sus scrofa* (Pig), May 3, 2011; 7 pgs.
UniProtKB F6Y7C7, *Monodelphis domestica* (Gray short-tailed opossum), Jul. 27, 2011; 7 pgs.
UniProtKB G1LUN3, *Ailuropoda melanoleuca* (Giant panda), Oct. 19, 2011; 7 pgs.
UniProtKB G1QJ08, *Nomascus leucogenys* (Northern white-cheeked gibbon) (Hylobates leucogenys), Oct. 19, 2011; 7 pgs.
UniProtKB G3MWN1, *Bos taurus* (Bovine), Apr. 10, 2019; 7 pgs.
UniProtKB G3QS73, Gorilla gorilla gorilla (Western lowland gorilla), Nov. 16, 2011; 7 pgs.
UniProtKB G3RRLO, Gorilla gorilla gorilla (Western lowland gorilla), Nov. 16, 2011.
UniProtKB G3SNF5, *Loxodonta africana* (African elephant), Nov. 16, 2011; 7 pgs.
UniProtKB H0XAI3, *Otolemur garnettii* (Small-eared galago) (Garnett's greater bushbaby), Feb. 22, 2012; 6 pgs.
UniProtKB H2Q8H7, *Pan troglodytes* (Chimpanzee), Mar. 21, 2012; 7 pgs.
UniProtKB H2QTR0, *Pan troglodytes* (Chimpanzee), Mar. 21, 2012; 7 pgs.
UniProtKB K9KFW6, *Equus caballus* (Horse), Mar. 6, 2013; 5 pgs.
UniProtKB L5JMT6, *Pteropus alecto* (Black flying fox), Mar. 6, 2013; 5 pgs.
UniProtKB L5KEB5, *Pteropus alecto* (Black flying fox), Mar. 6, 2013; 5 pgs.
UniProtKB P05089, *Homo sapiens* (Human), Aug. 13, 1987; 19 pgs.
UniProtKB P07824, *Rattus norvegicus* (Rat), Aug. 1, 1988; 14 pgs.
UniProtKB P78540, *Homo sapiens* (Human), Nov. 1, 1997; 14 pgs.
UniProtKB Q61176, *Mus musculus* (Mouse), Nov. 1, 1997; 11 pgs.
UniProtKB R0JPH7, *Anas platyrhynchos* (Mallard) (Anas boschas), Jun. 26, 2013; 5 pgs.
Verma, I., "Retroviral Vectors for Gene Transfer," In Microbiology, Amer. Soc. for Microbiology, 1985, pp. 229-232.
Walmagh, M. et al., "Trehalose Analogues: Latest Insights in Properties and Biocatalytic Production," Int. J. Mol. Sci., 2015, pp. 13729-13745, vol. 16.
Watanabe, M. et al., "AAVrh. 10-mediated genetic delivery of bevacizumab to the pleura to provide local anti-VEGF to suppress growth of metastatic lung tumors," Gene Ther., 2010, pp. 1042-1051, vol. 17.
Wolff, J. et al., "Direct Gene Transfer into Mouse Muscle in Vivo," Sci., Mar. 1990, pp. 1465-1468, vol. 247, No. 1949.

(56) References Cited

OTHER PUBLICATIONS

Wu, P. et al., "Mutational Analysis of the Adeno-Associated Virus Type 2 (AAV2) Capsid Gene and Construction of AAV2 Vectors with Altered Tropism," J. Virol., Sep. 2000, pp. 8635-8647, vol. 74, No. 18.
Wu, Z. et al., "Adeno-associated Virus Serotypes: Vector Toolkit for Human Gene Therapy," Mol. Ther., Sep. 2006, pp. 316-327, vol. 14, No. 3.
Xiong, Y. et al., "ARG2 impairs endothelial autophagy through regulation of MTOR and PRKAA/AMPK signaling in advanced atherosclerosis," Autophagy, Dec. 2014, pp. 2223-2238, vol. 10, No. 12.
Acsadi, G. et al., "Human dystrophin expression in mdx mice after intramuscular injection of DNA constructs," Nature, Aug. 1991, pp. 815-818, vol. 352.
Ahmet, I. et al., "Cardioprotection by Intermittent Fasting in Rats," Circulation, Nov. 2005, pp. 3115-3121, vol. 112.
Aleman, G. et al., "Increase in FGF21 Stimulates Browning Markers in White Adipose Tissue in Rats Fed a Low Protein High Carbohydrate Diet During Acute Cold Exposure," FASEB J., Apr. 2017, p. 652.12, vol. 31, No. S1.
Altschul, S. et al., "Basic Local Alignment Search Tool," J. Mo. Biol., 1990, pp. 403-410, vol. 215.
Altschul, S. et al., "Gapped BLAST and PSI-BLAST: a new generation of protein database search programs," Nucl. Acid Res., 1997, pp. 3389-3402, vol. 25, No. 17.
Angulo, P. et al., "Non-alcoholic fatty liver disease," J. Gastroenterol. Hepatol., 2002, pp. S186-S190, vol. 17.
Badman, M. et al., "Hepatic Fibroblast Growth Factor 21 Is Regulated by PPARalpha and Is a Key Mediator of Hepatic Lipid Metabolism in Ketotic States," Cell Metab., Jun. 2007, pp. 426-437, vol. 5.
Bailey, C. et al., "The UK Prospective Diabetes Study," UK Prospective Diabetes Study (UKPDS) Group, Lancet, Dec. 1998, p. 1932, vol. 352.
Bantel-Schaal, U. et al., "Human Adeno-Associated Virus Type 5 Is Only Distantly Related to Other Known Primate Helper-Dependent Parvoviruses," J. Virol., 1999, pp. 939-947, vol. 73, No. 2.
Barba, et al., WHO Expert Consultation, "Appropriate body-mass index for Asian populations and its implications for policy and intervention strategies," The Lancet, Jan. 2004, pp. 157-162, vol. 363, No. 9403.
Barnosky, A. et al., "Intermittent fasting vs daily calorie restriction for type 2 diabetes prevention: a review of human findings," Transl. Res., Oct. 2014, pp. 302-311, vol. 164, No. 4.
Bassily, R. et al., "An improved synthesis of 4-azido-4-deoxy- and 4-amino-4-deoxy-alpha, alpha-trehalose and their epimers," Carbohydr. Res., Feb. 1993, pp. 197-207, vol. 239.
Bays, H., "Current and Investigational Antiobesity Agents and Obesity Therapeutic Treatment Targets," Obes. Res., Aug. 2004, pp. 1197-1211, vol. 12, No. 8.
Blethen, S. et al., "Arginine Decarboxylase from *Escherichia coli*," J. Biol. Chem., Apr. 1968, pp. 1671-1677, vol. 243, No. 8.
Boeker, E. et al., "Arginine Decarboxylase from *Escherichia coli*," J. Biol. Chem., Apr. 1968, pp. 1678-1684, vol. 243, No. 8.
Bonora, E. et al., "Increased risk of cardiovascular disease and chronic kidney disease in NAFLD," Nat. Rev. Gastroenterol. Hepatol., 2012, pp. 372-381, vol. 9.
Bordone, L. et al., "SIRT1 transgenic mice show phenotypes resembling calorie restriction," Aging Cell, 2007, pp. 759-767, vol. 6.
Brigham, K. et al., "Expression of a Prokaryotic Gene in Cultured Lung Endothelial Cells after Lipofection with a Plasmid Vector," Am. J. Respir. Cell. Mol. Biol., 1989, pp. 95-100, vol. 1, No. 2.
Caldwell, R. et al., "Arginase: an old enzyme with new tricks," HHS Public Access Author Manuscript, Jun. 2016, pp. 1-26, published in final edited form as: Trends Pharmacol. Sci., Jun. 2015, pp. 395-405, vol. 36, No. 6.
Caldwell, R. et al., "Arginase: a Multifaceted Enzyme Important in Health and Disease," Physiol. Rev., Feb. 2018, pp. 641-665, vol. 98.

Carter, B., "Adeno-Associated Virus Vectors in Clinical Trials," Hum. Gene Ther., May 2005, pp. 541-550, vol. 16.
Cearley, C. et al., "Transduction Characteristics of Adeno-associated Virus Vectors Expressing Cap Serotypes 7, 8, 9, and Rh10 in the Mouse Brain," Mol. Ther., Mar. 2006, pp. 528-537, vol. 13, No. 3.
Cederbaum, S. et al., "Arginases I and II: do their functions overlap?," Mol. Genet. Metab., 2004, pp. S38-S44, vol. 81.
Chalasani, N. et al., "The Diagnosis and Management of Nonalcoholic Fatty Liver Disease: Practice Guideline by the American Gastroenterological Association, American Association for the Study of Liver Diseases, American College of Gastroenterology," Gastroenterol., 2012, pp. 1592-1609, vol. 142.
Charlton, M. et al., "Frequency and Outcomes of Liver Transplantation for Nonalcoholic Steatohepatitis in the United States," Gastroenterol., 2011, pp. 1249-1253, vol. 141.
Chiorini, J. et al., "Cloning of Adeno-Associated Virus Type 4 (AAV4) and Generation of Recombinant AAV4 Particles," J. Virol., Sep. 1997, pp. 6823-6833, vol. 71, No. 9.
Chiorini, J. et al., "Cloning and Characterization of Adeno-Associated Virus Type 5," J. Virol., Feb. 1999, pp. 1309-1319, vol. 73, No. 2.
Chung, H. et al., "Time-restricted feeding improves insulin resistance and hepatic steatosis in a mouse model of postmenopausal obesity," Metabolism, 2016, pp. 1743-1754, vol. 65.
Colak, Y. et al., "SIRT1 as a potential therapeutic target for treatment of nonalcoholic fatty liver disease," Med. Sci. Monit., 2011, pp. HY5-HY9, vol. 17, No. 5.
Crombez, E. et al., "Hyperargininemia due to liver arginase deficiency," Mol. Genet. Metab., Mar. 2005, pp. 243-251, vol. 84, No. 3.
De, B. et al., "High Levels of Persistent Expression of alpha1-Antityrpsin Mediated by the Nonhuman Primate Serotype rh.10 Adeno-associated Virus Despite Preexisting Immunity to Common Human Adeno-associated Viruses," Mol. Ther., Jan. 2006, pp. 67-76, vol. 13, No. 1.
Debosch, B. et al., "Glucose Transporter-8 (GLUT8) Mediates Glucose Intolerance and Dyslipidemia in High-Fructose Diet-Fed Male Mice," Mol. Endocrinol., 2013, pp. 1887-1896, vol. 27.
Debosch, B. et al., "Glucose Transporter 8 (GLUT8) Mediates Fructose-Induced de Novo Lipogenesis and Macrosteatosis," J. Biol. Chem., Apr. 2014, pp. 10989-10998, vol. 289, No. 16.
Debosch, B. et al., "Trehalose inhibits solute carrier 2A (SLC2A) proteins to induce autophagy and prevent hepatic steatosis," Sci. Signal., Feb. 2016, pp. 1-13, vol. 9, No. 416, ra21.
Dykxhoorn, D. et al., "The Silent Revolution: Rna Interference as Basic Biology, Research Tool, and Therapeutic," Annu. Rev. Med., 2005, pp. 401-423, vol. 56.
Elhai, J. et al., "Conjugal Transfer of DNA to Cyanobacteria," Methods in Enzymology, 1988, pp. 747-754, vol. 167.
Esposito, K. et al., "The metabolic syndrome and inflammation: association or causation?," Nutr. Metab. Cardiovasc. Dis., Oct. 2004, pp. 228-232, vol. 14, No. 5.
Felgner, P. et al., "Lipofection: A highly efficient, lipid-mediated DNA-transfection procedure," PNAS, Nov. 1987, pp. 7413-7417, vol. 84.
Flotte, T., "New AAV Serotypes May Broaden the Therapeutic Pipeline to Human Gene Therapy," Mol. Ther., Jan. 2006, pp. 1-2, vol. 13, No. 1.
Fracanzani, A. et al., "Carotid Artery Intima-media Thickness in Nonalcoholic Fatty Liver Disease," Am. J. Med., Jan. 2008, pp. 72-78, vol. 121, No. 1.
Gaich, G. et al., "The Effects of LY2405319, an FGF21 Analog, in Obese Human Subjects with Type 2 Diabetes," Cell Metab., Sep. 2013, pp. 333-340, vol. 18.
Gao, G-P. et al., "Novel adeno-associated viruses from rhwsus monkeys as vectors for human gene therapy," PNAS, Sep. 2002, pp. 11854-11859, vol. 99, No. 18.
Gao, G. et al., "Clades of Adeno-Associated Viruses Are Widely Disseminated in Human Tissues," J. Virol., Jun. 2004, pp. 6381-6388, vol. 78, No. 12.

(56) References Cited

OTHER PUBLICATIONS

Gao, G. et al., "Biology of AAV Serotype Vectors in Liver-Directed Gene Transfer to Nonhuman Primates," Mol. Ther., Jan. 2006, pp. 77-87, vol. 13, No. 1.
GenBank Accession AF043303, "Adeno-associated virus 2," complete genome, May 20, 2010; 6 pgs.
GenBank Accession AF085716, "Adeno-associated virus 5 DNA binding trs helicase (Rep22) and capsid protein (VP1) genes," complete cds, Feb. 9, 1999; 5 pgs.
GenBank Accession J01901, "Adeno-associated virus 2," complete genome, Apr. 27, 1993; 6 pgs.
GenBank Accession U89790, "Adeno-associated virus 4," complete genome, Aug. 21, 1997; 5 pgs.
Ghadessy, F. et al., "Directed evolution of polymerase function by compartmentalized self-replication," PNAS, Apr. 10, 2001, pp. 4552-4557, vol. 98, No. 8.

\* cited by examiner

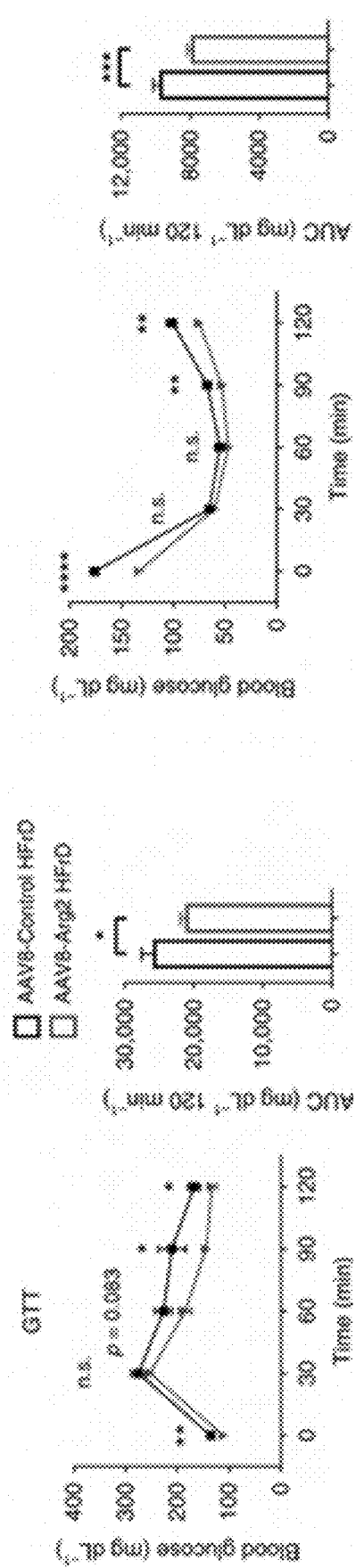
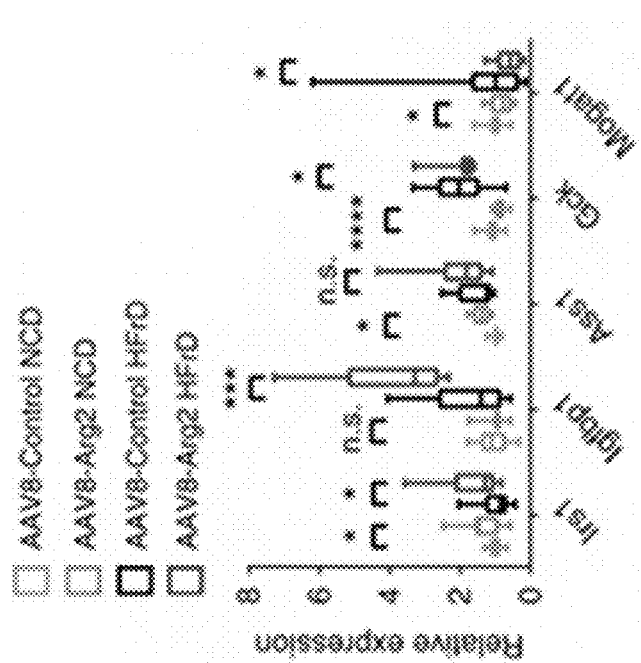
FIG. 2F
FIG. 2G

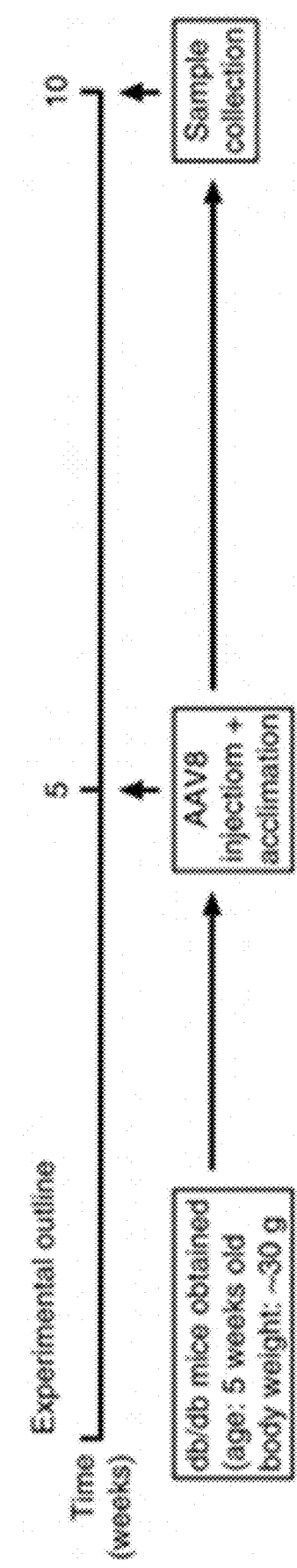
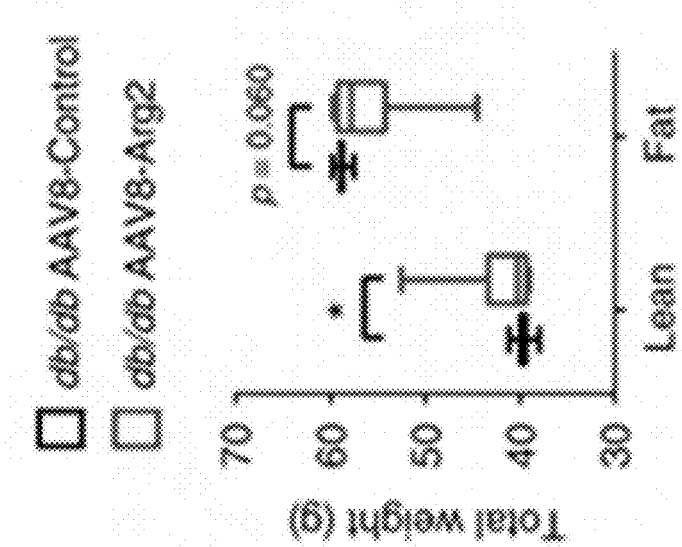
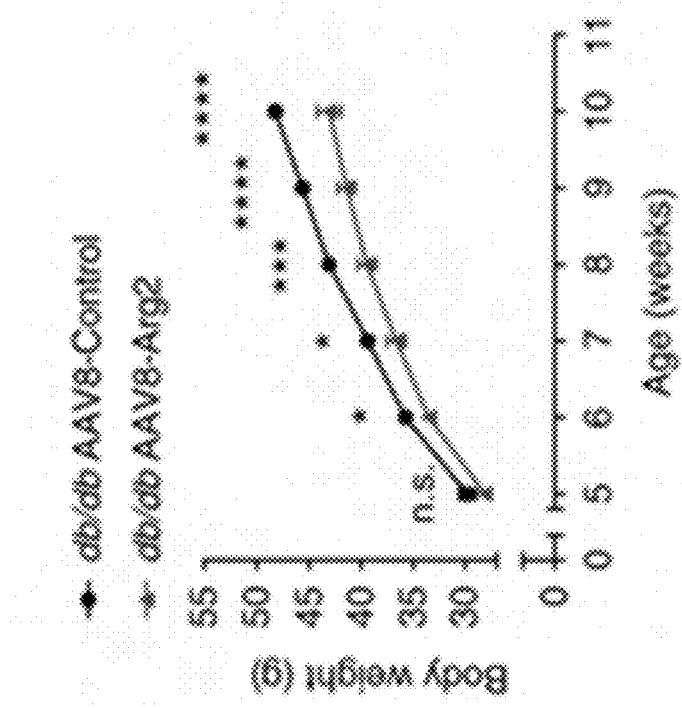
FIG. 4A
FIG. 4B
FIG. 4C

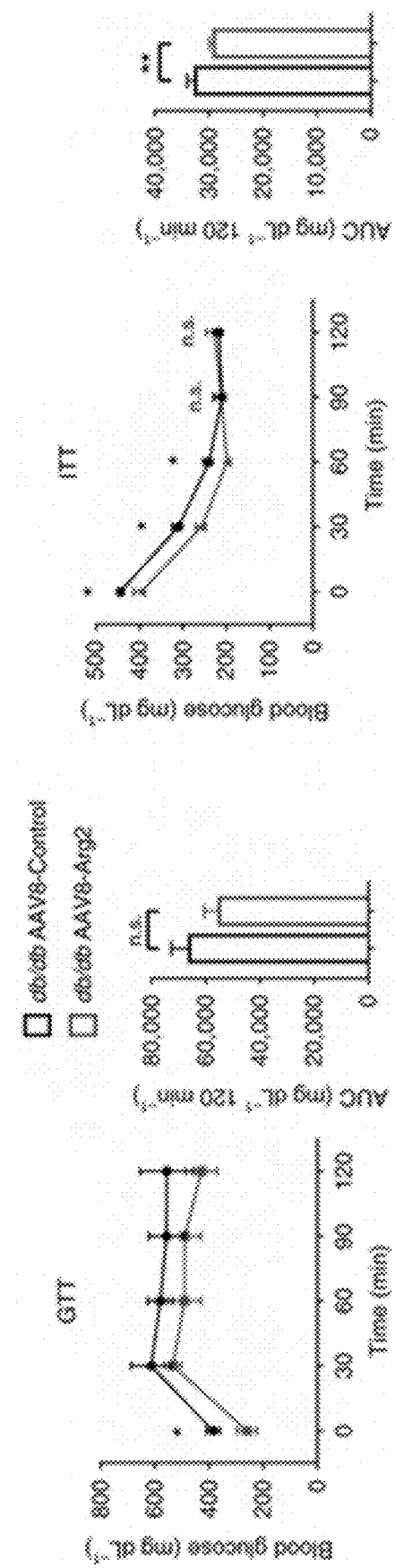
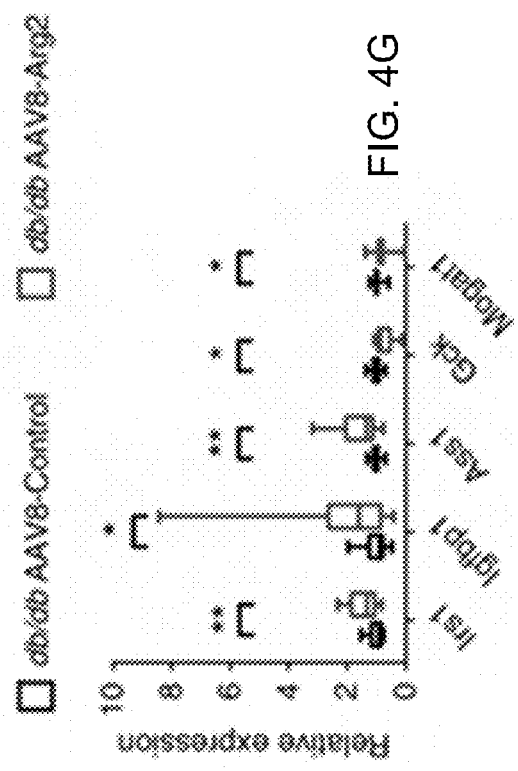
FIG. 4F
FIG. 4G

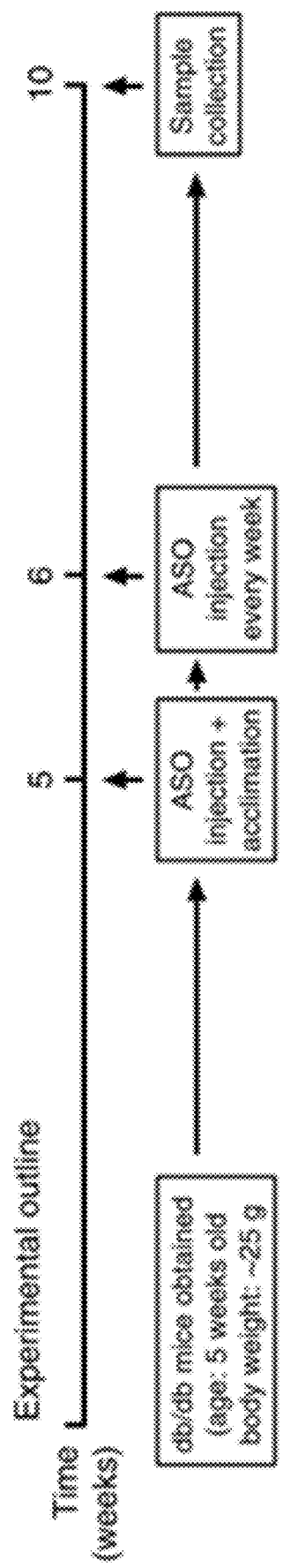
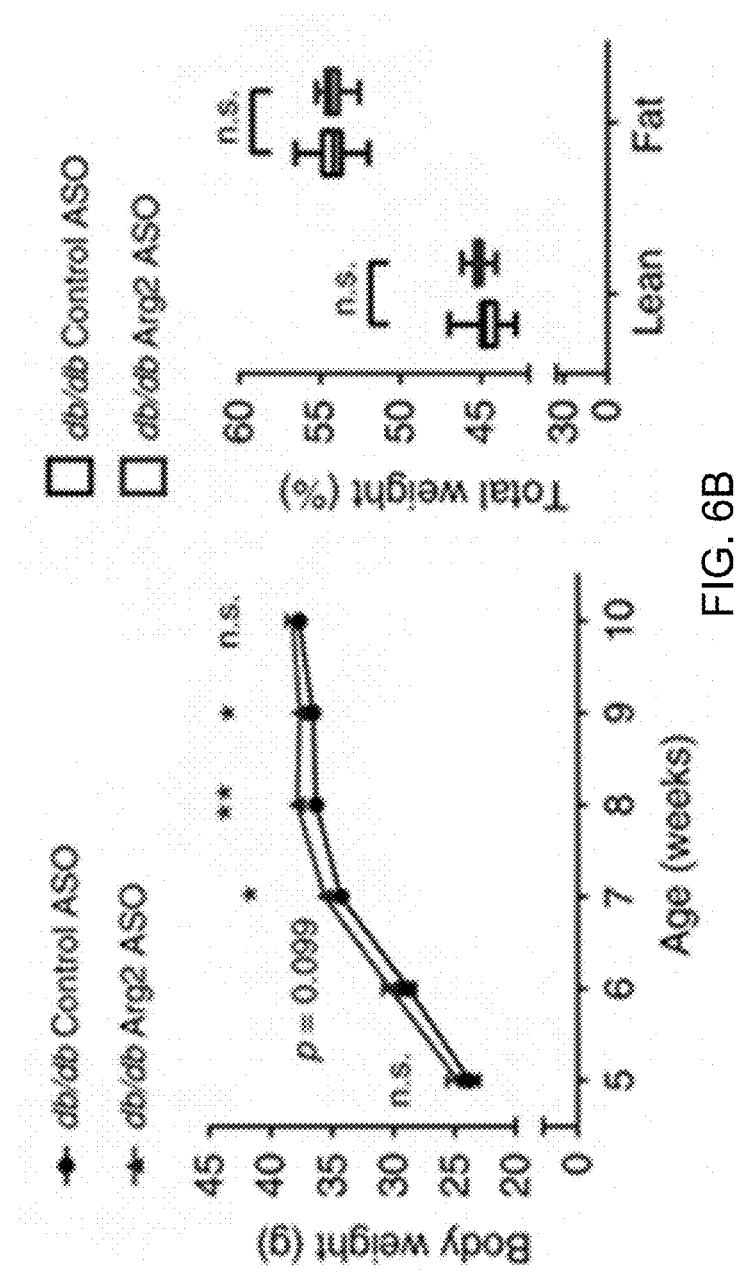
FIG. 6A
FIG. 6B

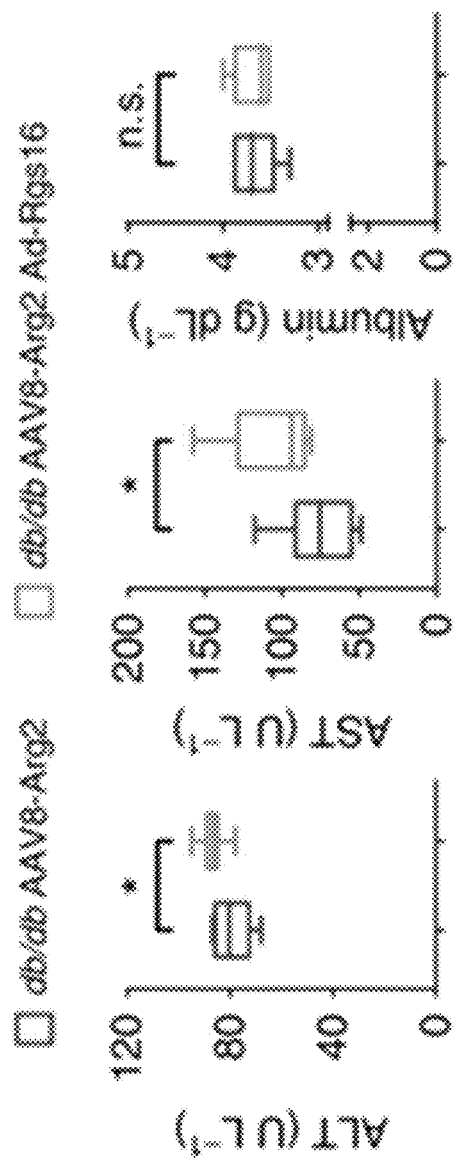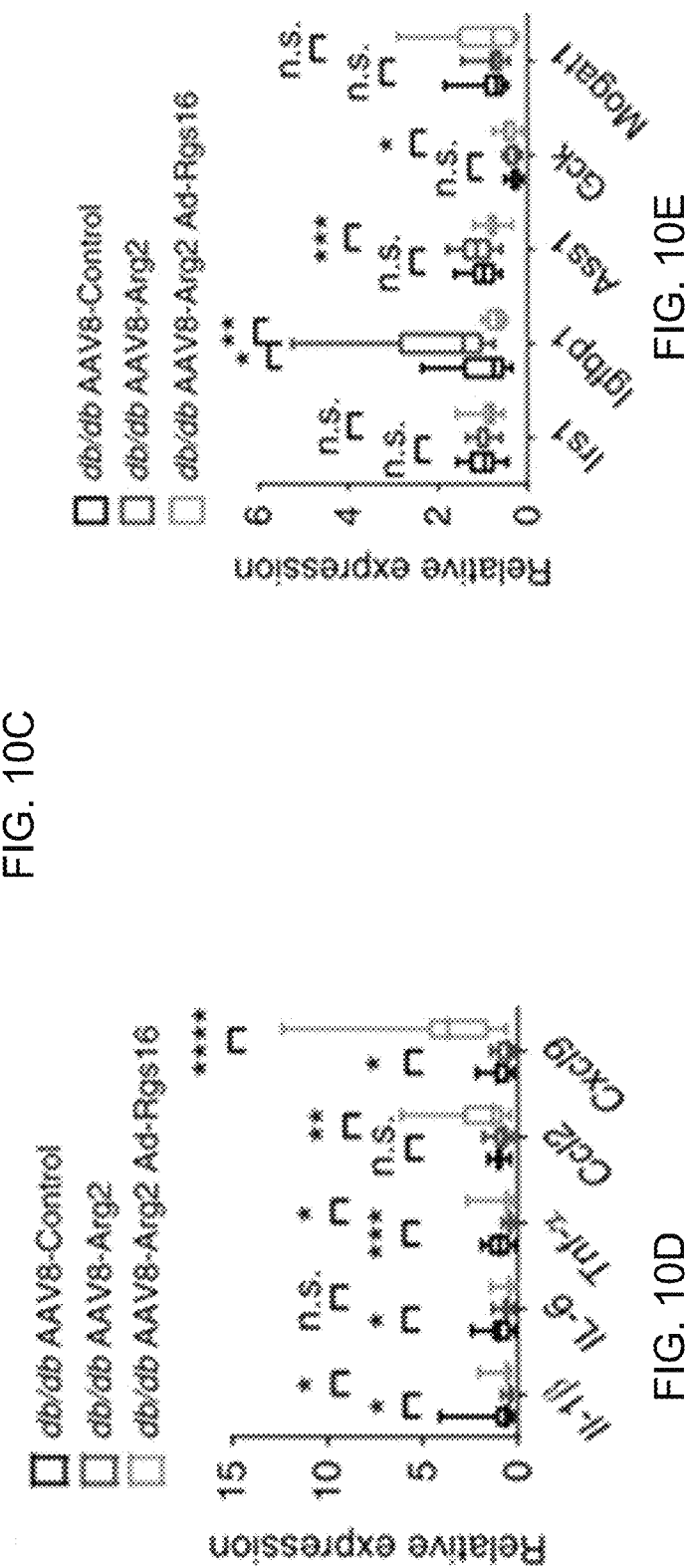
FIG. 10C
FIG. 10E
FIG. 10D

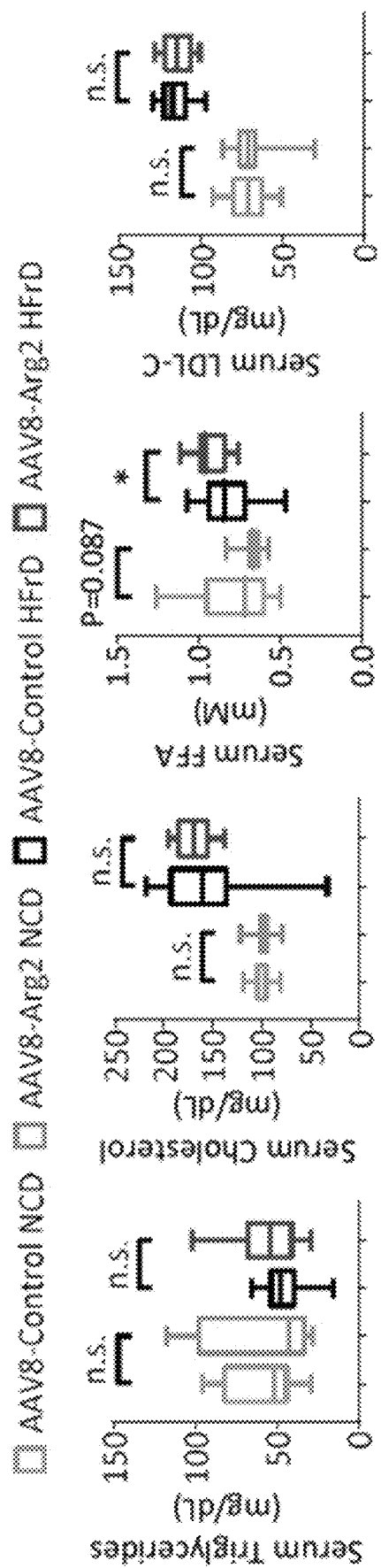
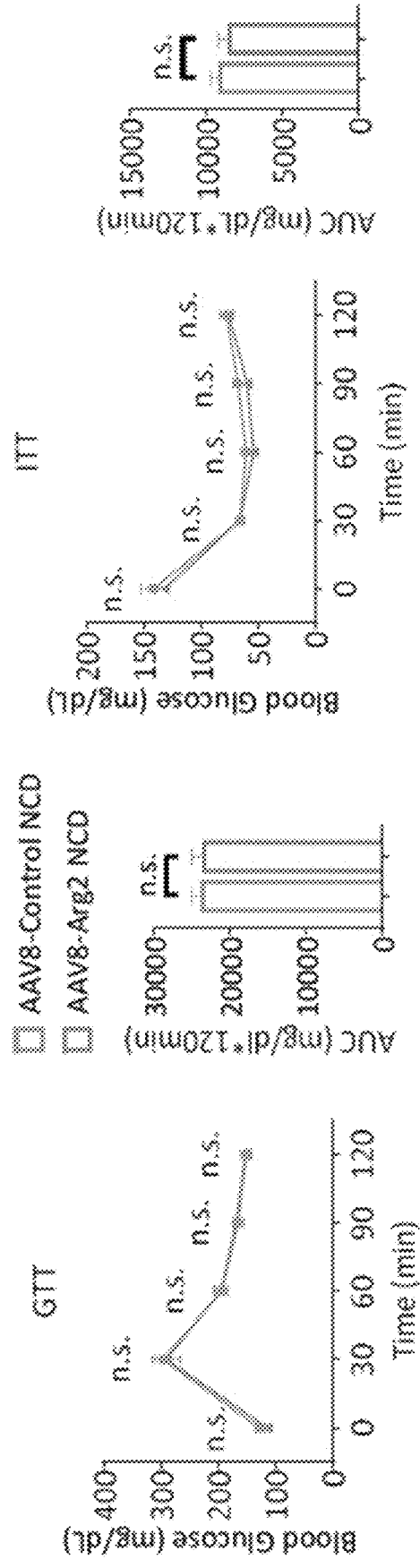
FIG. 11D
FIG. 11E

SEQUENCE LISTING

<160> NUMBER OF SEQ ID NOS: 3

<210> SEQ ID NO 1
<211> LENGTH: 322
<212> TYPE: PRT
<213> ORGANISM: Homo sapiens

<400> SEQUENCE: 1

```
Met Ser Ala Lys Ser Arg Thr Ile Gly Ile Ile Gly Ala Pro Phe Ser
1               5                   10                  15

Lys Gly Gln Pro Arg Gly Gly Val Glu Glu Gly Pro Thr Val Leu Arg
            20                  25                  30

Lys Ala Gly Leu Leu Glu Lys Leu Lys Glu Gln Glu Cys Asp Val Lys
        35                  40                  45

Asp Tyr Gly Asp Leu Pro Phe Ala Asp Ile Pro Asn Asp Ser Pro Phe
    50                  55                  60

Gln Ile Val Lys Asn Pro Arg Ser Val Gly Lys Ala Ser Glu Gln Leu
65                  70                  75                  80

Ala Gly Lys Val Ala Glu Val Lys Lys Asn Gly Arg Ile Ser Leu Val
                85                  90                  95

Leu Gly Gly Asp His Ser Leu Ala Ile Gly Ser Ile Ser Gly His Ala
            100                 105                 110

Arg Val His Pro Asp Leu Gly Val Ile Trp Val Asp Ala His Thr Asp
        115                 120                 125

Ile Asn Thr Pro Leu Thr Thr Thr Ser Gly Asn Leu His Gly Gln Pro
    130                 135                 140

Val Ser Phe Leu Leu Lys Glu Leu Lys Gly Lys Ile Pro Asp Val Pro
145                 150                 155                 160

Gly Phe Ser Trp Val Thr Pro Cys Ile Ser Ala Lys Asp Ile Val Tyr
                165                 170                 175

Ile Gly Leu Arg Asp Val Asp Pro Gly Glu His Tyr Ile Leu Lys Thr
            180                 185                 190

Leu Gly Ile Lys Tyr Phe Ser Met Thr Glu Val Asp Arg Leu Gly Ile
        195                 200                 205

Gly Lys Val Met Glu Glu Thr Leu Ser Tyr Leu Leu Gly Arg Lys Lys
    210                 215                 220

Arg Pro Ile His Leu Ser Phe Asp Val Asp Gly Leu Asp Pro Ser Phe
225                 230                 235                 240

Thr Pro Ala Thr Gly Thr Pro Val Val Gly Gly Leu Thr Tyr Arg Glu
                245                 250                 255

Gly Leu Tyr Ile Thr Glu Glu Ile Tyr Lys Thr Gly Leu Leu Ser Gly
            260                 265                 270

Leu Asp Ile Met Glu Val Asn Pro Ser Leu Gly Lys Thr Pro Glu Glu
        275                 280                 285

Val Thr Arg Thr Val Asn Thr Ala Val Ala Ile Thr Leu Ala Cys Phe
    290                 295                 300

Gly Leu Ala Arg Glu Gly Asn His Lys Pro Ile Asp Tyr Leu Asn Pro
305                 310                 315                 320

Pro Lys
```

<210> SEQ ID NO 2
<211> LENGTH: 354
<212> TYPE: PRT
<213> ORGANISM: Homo sapiens

<400> SEQUENCE: 2

```
Met Ser Leu Arg Gly Ser Leu Ser Arg Leu Leu Gln Thr Arg Val His
1               5                   10                  15

Ser Ile Leu Lys Lys Ser Val His Ser Val Ala Val Ile Gly Ala Pro
            20                  25                  30

Phe Ser Gln Gly Gln Lys Arg Lys Gly Val Glu His Gly Pro Ala Ala
        35                  40                  45

Ile Arg Glu Ala Gly Leu Met Lys Arg Leu Ser Ser Leu Gly Cys His
    50                  55                  60

Leu Lys Asp Phe Gly Asp Leu Ser Phe Thr Pro Val Pro Lys Asp Asp
65                  70                  75                  80

Leu Tyr Asn Asn Leu Ile Val Asn Pro Arg Ser Val Gly Leu Ala Asn
                85                  90                  95

Gln Glu Leu Ala Glu Val Val Ser Arg Ala Val Ser Asp Gly Tyr Ser
            100                 105                 110

Cys Val Thr Leu Gly Gly Asp His Ser Leu Ala Ile Gly Thr Ile Ser
        115                 120                 125

Gly His Ala Arg His Cys Pro Asp Leu Cys Val Val Trp Val Asp Ala
    130                 135                 140

His Ala Asp Ile Asn Thr Pro Leu Thr Thr Ser Ser Gly Asn Leu His
145                 150                 155                 160

Gly Gln Pro Val Ser Phe Leu Leu Arg Glu Leu Gln Asp Lys Val Pro
                165                 170                 175

Gln Leu Pro Gly Phe Ser Trp Ile Lys Pro Cys Ile Ser Ser Ala Ser
            180                 185                 190

Ile Val Tyr Ile Gly Leu Arg Asp Val Asp Pro Pro Glu His Phe Ile
        195                 200                 205

Leu Lys Asn Tyr Asp Ile Gln Tyr Phe Ser Met Arg Asp Ile Asp Arg
    210                 215                 220

Leu Gly Ile Gln Lys Val Met Glu Arg Thr Phe Asp Leu Leu Ile Gly
225                 230                 235                 240

Lys Arg Gln Arg Pro Ile His Leu Ser Phe Asp Ile Asp Ala Phe Asp
                245                 250                 255

Pro Thr Leu Ala Pro Ala Thr Gly Thr Pro Val Val Gly Gly Leu Thr
            260                 265                 270

Tyr Arg Glu Gly Met Tyr Ile Ala Glu Ile His Asn Thr Gly Leu
        275                 280                 285

Leu Ser Ala Leu Asp Leu Val Glu Val Asn Pro Gln Leu Ala Thr Ser
    290                 295                 300

Glu Glu Ala Lys Thr Thr Ala Asn Leu Ala Val Asp Val Ile Ala
305                 310                 315                 320

Ser Ser Phe Gly Gln Thr Arg Glu Gly Gly His Ile Val Tyr Asp Gln
                325                 330                 335

Leu Pro Thr Pro Ser Ser Pro Asp Glu Ser Glu Asn Gln Ala Arg Val
            340                 345                 350

Arg Ile

<210> SEQ ID NO 3
<211> LENGTH: 409
<212> TYPE: PRT
<213> ORGANISM: Mycoplasma hominis

<400> SEQUENCE: 3

Met Ser Val Phe Asp Ser Lys Phe Asn Gly Ile His Val Tyr Ser Glu
1               5                   10                  15
```

```
Ile Gly Glu Leu Glu Thr Val Leu Val His Glu Pro Gly Arg Glu Ile
             20                  25                  30

Asp Tyr Ile Thr Pro Ala Arg Leu Asp Glu Leu Leu Phe Ser Ala Ile
             35                  40                  45

Leu Glu Ser His Asp Ala Arg Lys Glu His Gln Ser Phe Val Lys Ile
 50                      55                  60

Met Lys Asp Arg Gly Ile Asn Val Val Glu Leu Thr Asp Leu Val Ala
 65                  70                  75                  80

Glu Thr Tyr Asp Leu Ala Ser Lys Ala Ala Lys Glu Phe Ile Glu
                 85                  90                  95

Thr Phe Leu Glu Glu Thr Val Pro Val Leu Thr Glu Ala Asn Lys Lys
             100                 105                 110

Ala Val Arg Ala Phe Leu Leu Ser Lys Pro Thr His Glu Met Val Glu
             115                 120                 125

Phe Met Met Ser Gly Ile Thr Lys Tyr Glu Leu Gly Val Glu Ser Glu
 130                     135                 140

Asn Glu Leu Ile Val Asp Pro Met Pro Asn Leu Tyr Phe Thr Arg Asp
 145                 150                 155                 160

Pro Phe Ala Ser Val Gly Asn Gly Val Thr Ile His Phe Met Arg Tyr
                 165                 170                 175

Ile Val Arg Arg Arg Glu Thr Leu Phe Ala Arg Phe Val Phe Arg Asn
             180                 185                 190

His Pro Lys Leu Val Lys Thr Pro Trp Tyr Tyr Asp Pro Ala Met Lys
                 195                 200                 205

Met Pro Ile Glu Gly Gly Asp Val Phe Ile Tyr Asn Asn Glu Thr Leu
 210                 215                 220

Val Val Gly Val Ser Glu Arg Thr Asp Leu Asp Thr Ile Thr Leu Leu
 225                 230                 235                 240

Ala Lys Asn Ile Lys Ala Asn Lys Glu Val Glu Phe Lys Arg Ile Val
             245                 250                 255

Ala Ile Asn Val Pro Lys Trp Thr Asn Leu Met His Leu Asp Thr Trp
             260                 265                 270

Leu Thr Met Leu Asp Lys Asn Lys Phe Leu Tyr Ser Pro Ile Ala Asn
     275                 280                 285

Asp Val Phe Lys Phe Trp Asp Tyr Asp Leu Val Asn Gly Gly Ala Glu
 290                 295                 300

Pro Gln Pro Gln Leu Asn Gly Leu Pro Leu Asp Lys Leu Leu Ala Ser
 305                 310                 315                 320

Ile Ile Asn Lys Glu Pro Val Leu Ile Pro Ile Gly Gly Ala Gly Ala
             325                 330                 335

Thr Glu Met Glu Ile Ala Arg Glu Thr Asn Phe Asp Gly Thr Asn Tyr
             340                 345                 350

Leu Ala Ile Lys Pro Gly Leu Val Ile Gly Tyr Asp Arg Asn Glu Lys
             355                 360                 365

Thr Asn Ala Ala Leu Lys Ala Ala Gly Ile Thr Val Leu Pro Phe His
             370                 375                 380

Gly Asn Gln Leu Ser Leu Gly Met Gly Asn Ala Arg Cys Met Ser Met
 385                 390                 395                 400

Pro Leu Ser Arg Lys Asp Val Lys Trp
             405
```

COMPOSITIONS AND METHODS OF USE THEREOF FOR TREATMENT OF METABOLIC DISEASES AND RELATED DISORDERS

CROSS REFERENCE TO RELATED APPLICATIONS

This application claims the benefit of International Patent Application number PCT/US2019/29205, filed Apr. 25, 2019 which claims the benefit of U.S. Provisional Application No. 62/662,564, filed Apr. 25, 2018 the disclosures of which are herein incorporated by reference in their entirety.

GOVERNMENTAL RIGHTS

This invention was made with government support under HD076224 awarded by National Institutes of Health. The government has certain rights in the invention.

INCORPORATION OF SEQUENCE LISTING

The present application contains a Sequence Listing which has been submitted in ASCII format via EFS-Web and is hereby incorporated herein by reference in its entirety. Said Sequence Listing was created on Apr. 25, 2018 named 'Sequence listing' and is 480,000 bytes in size.

FIELD OF THE TECHNOLOGY

The present disclosure relates to compositions and methods of using the same for the treatment of various metabolic diseases and related disorders (e.g. diabetes mellitus, NAFLD, obesity, metabolic syndrome).

BACKGROUND

Obesity, which often associates with other metabolic disorders, has become a global threat to human health. In the United States, over two-thirds of adults are overweight and one-third is obese. The most serious and frequent major complications of obesity are atherosclerosis and "heart attack". Clinically, intensive lifestyle management remains the primary means of treating obesity and its comorbidities, including insulin resistance, non-alcoholic fatty liver disease (NAFLD), and thermic depression. Intensive lifestyle management encompasses a wide range of interventions, such as increased locomotion, selective macronutrient elimination (e.g., ketogenic diets), intermittent fasting (IF), and caloric restriction (CR). Although lifestyle measures effectively treat obesity, insulin resistance and NAFLD, caloric restriction, fasting and extreme dietary alterations are often unsustainable, unpalatable, and are in some cases associated with clinical complications.

NAFLD is a clinical syndrome characterized by the accumulation of excess fat in the liver. It spans a spectrum of disease from pathological accumulation of triglyceride (TG)—steatosis to an inflammatory response—non-alcoholic steatohepatitis (NASH) (Chalasani N, Younossi Z, Lavine J E et al: The diagnosis and management of non-alcoholic fatty liver disease: practice guideline by the American Association for the Study of Liver Diseases, American College of Gastroenterology, and the American Gastroenterological Association, Hepatology 55:2005-2023, 2012). NASH may progress to cirrhosis, cirrhosis complications, liver failure and an increased risk of liver cancer. NAFLD is the third cause of liver transplantation in the United States (Charlton M R, Burns J M, Pedersen R A, Watt K D, Heimbach J K, Dierkhising R A: Frequency and outcomes of liver transplantation for non-alcoholic steatohepatitis in the United States, Gastroenterology 141:1249-1253, 2011). NAFLD is becoming a major health issue worldwide not only for its prevalence but also for its metabolic complications. The underlying insulin resistance is associated with hypertension, hyperlipidaemia, cardiovascular disease, type 2 diabetes mellitus (T2DM), chronic kidney disease and recently with carotid atherosclerosis (Bonora E, Targher G: Increased risk of cardiovascular disease and chronic kidney disease in NAFLD, Nat Rev Gastroenterol Hepatol 9:372-381, 2012; Angulo P: Nonalcoholic fatty liver disease, N Engl J Med 346:1221-31, 2002), Fracanzani A L, Burdick L, Raselli S, Pedotti P, Grigore L, Santorelli G, Valenti L, Maraschi A, Catapano A, Fargion S: Carotid artery intima-media thickness in non-alcoholic fatty liver disease, Am J Med: 121(l):72-8, 2008). Therapeutic options are limited, there is no pharmacological therapy and managing NAFLD focuses on the treatment of risk factors.

Metabolic syndrome (Sutherland, et al., Metabolic Syndrome and Related Disorders 2:82-104 (2004); Esposito, et al., Nutr. Metab. Cardiovasc. Dis. 14:228-232 (2004)), relates to obesity and is characterized by a group of metabolic risk factors including: 1) abdominal obesity (excessive fat tissue in and around the abdomen); 2) atherogenic dyslipidemia (high triglycerides; low HDL cholesterol and high LDL cholesterol); 3) elevated blood pressure; 4) insulin resistance or glucose intolerance; 5) a prothrombotic state (e.g., high fibrinogen or plasminogen activator inhibitor-1 in the blood); and 6) a proinflammatory state (e.g., elevated CRP in the blood). Metabolic syndrome has become increasingly common in developed countries and is closely associated with risk of coronary heart disease (Malik, et al., Circulation 110:1245-1250 (2004); Irabarren, et al., J. Am. Coll. Cardiol. 48:1800-1807 (2006)).

Diabetes mellitus is a debilitating metabolic disease caused by absent insulin production (type 1) or insulin resistance or insufficient insulin production (type 2) from pancreatic β-cells. β-cells are specialized endocrine cells that manufacture and store insulin for release following a meal. Insulin is a hormone that facilitates the transfer of glucose from the blood into tissues where it is needed. Patients with diabetes must frequently monitor blood glucose levels and many require multiple daily insulin injections to survive. However, such patients rarely attain ideal glucose levels by insulin injection (Turner, R. C. et al. JAMA 4 281:2005(1999)). Furthermore, prolonged elevation of insulin levels can result in detrimental side effects such as hypoglycemic shock and desensitization of the body's response to insulin. Consequently, diabetic patients still develop long-term complications, such as cardiovascular diseases, kidney disease, blindness, nerve damage and wound healing disorders (UK Prospective Diabetes Study (UKPDS) Group, Lancet 352:837 (1998)).

Therefore a need exists in the art for a safe and effective therapeutics for metabolic diseases and related disorders and has a significant impact on improving the lives of individuals inflicted with the same.

SUMMARY

One aspect of the present disclosure encompasses a method for treating a metabolic disease or related disorder in a subject in need thereof comprising administering to the subject a composition comprising a therapeutically effective amount of an arginine deprivation agent. The method comprises administering an effective amount of one or more of arginine-degrading enzymes (e.g., an arginase, an arginine deiminase or an arginine decarboxylase).

In one aspect the disclosure provides a pharmaceutical composition comprising a viral vector comprising a nucleic acid sequence encoding an arginine deprivation agent selected from an arginase, an arginine deiminase or an arginine decarboxylase. In some embodiments, the disclosure provides an isolated viral particle having a genome comprising open reading frames that encode an arginase, an arginine deiminase or an arginine decarboxylase. In one aspect, the isolated viral particle is an adeno-associated virus virion and expression of the arginase, an arginine deiminase or an arginine decarboxylase is driven by a liver-specific promoter.

In another aspect, the disclosure provides a pharmaceutical composition comprising an arginine-degrading enzyme polypeptide. In some embodiments, the arginine-degrading enzyme is modified by coupling with proteins or peptides, wherein one or more proteins or peptides are directly or indirectly linked to the arginine-degrading enzyme. In other embodiments, the arginine-degrading enzyme polypeptide is modified by covalent attachment with PEG.

The present disclosure provides at least one of the following methods: preventing, slowing the progression of, delaying or treating a metabolic disorder or disease, such as e.g. type 1 diabetes mellitus, type 2 diabetes mellitus, impaired glucose tolerance (IGT), impaired fasting blood glucose (IFG), hyperglycemia, postprandial hyperglycemia, postabsorptive hyperglycemia, overweight, obesity, dyslipidemia, hyperlipidemia, hypercholesterolemia, hypertension, atherosclerosis, endothelial dysfunction, osteoporosis, chronic systemic inflammation, non alcoholic fatty liver disease (NAFLD), retinopathy, neuropathy, nephropathy, polycystic ovarian syndrome, and/or metabolic syndrome; improving and/or maintaining glycemic control and/or for reducing of fasting plasma glucose, of postprandial plasma glucose, of postabsorptive plasma glucose and/or of glycosylated hemoglobin HbA1c; preventing, slowing, delaying or reversing progression from pre-diabetes, impaired glucose tolerance (IGT), impaired fasting blood glucose (IFG), insulin resistance and/or from metabolic syndrome to type 2 diabetes mellitus; preventing, reducing the risk of, slowing the progression of, delaying or treating of complications of diabetes mellitus such as micro- and macrovascular diseases, such as nephropathy, micro- or macroalbuminuria, proteinuria, retinopathy, cataracts, neuropathy, learning or memory impairment, neurodegenerative or cognitive disorders, cardio- or cerebrovascular diseases, tissue ischaemia, diabetic foot or ulcus, atherosclerosis, hypertension, endothelial dysfunction, myocardial infarction, acute coronary syndrome, unstable angina pectoris, stable angina pectoris, peripheral arterial occlusive disease, cardiomyopathy, heart failure, heart rhythm disorders, vascular restenosis, and/or stroke; reducing body weight and/or body fat and/or liver fat and/or intra-myocellular fat or preventing an increase in body weight and/or body fat and/or liver fat and/or intra-myocellular fat or facilitating a reduction in body weight and/or body fat and/or liver fat and/or intra-myocellular fat; preventing, slowing, delaying or treating the degeneration of pancreatic beta cells and/or the decline of the functionality of pancreatic beta cells and/or for improving, preserving and/or restoring the functionality of pancreatic beta cells and/or stimulating and/or restoring or protecting the functionality of pancreatic insulin secretion; preventing, slowing, delaying or treating nonalcoholic fatty liver disease (NAFLD) including hepatic steatosis, non-alcoholic steatohepatitis (NASH) and/or liver fibrosis (such as e.g. preventing, slowing the progression, delaying, attenuating, treating or reversing hepatic steatosis, (hepatic) inflammation and/or an abnormal accumulation of liver fat); preventing, slowing the progression of, delaying or treating type 2 diabetes with failure to conventional antidiabetic mono- or combination therapy; achieving a reduction in the dose of conventional antidiabetic medication required for adequate therapeutic effect; reducing the risk for adverse effects associated with conventional antidiabetic medication (e.g. hypoglycemia or weight gain); and/or maintaining and/or improving the insulin sensitivity and/or for treating or preventing hyperinsulinemia and/or insulin resistance; in a subject in need thereof said method comprising administration of a arginine-degrading enzyme as defined herein.

While multiple embodiments are disclosed, still other embodiments of the present invention will become apparent to those skilled in the art from the following detailed description, which shows and describes illustrative embodiments of the invention.

BRIEF DESCRIPTION OF THE FIGURES

Those of skill in the art will understand that the drawings, described below, are for illustrative purposes only. The drawings are not intended to limit the scope of the present teachings in any way.

The application file contains at least one drawing executed in color. Copies of this patent application publication with color drawing(s) will be provided by the Office upon request and paymnt of the necessary fee.

FIG. 1A shows Arg2 gene expression by qPCR analysis of cultured primary hepatocytes treated with 1-100 mM trehalose (n=6 cultures per group, derived from three mice). FIG. 1B shows Arg2 gene expression in response to 100 mM trehalose in the presence or absence of energetic reconstitution with pyruvate in primary hepatocytes (n=6 hepatocyte cultures per group, derived from three mice). FIG. 1C shows Arg2 gene expression by qPCR analysis of cultured primary hepatocytes treated with trehalose, or the trehalase-resistant analog, lactotrehalose (n=6 cultures per group, derived from three mice). FIG. 1D shows hepatic Arg2 expression by qPCR (top) and immunoblot (bottom) analysis of crude liver lysates from mice subjected to trehalose feeding (3% water ad libitum, 5 days) (n=5 mice per group). FIG. 1E shows Arg2 expression by qPCR and immunoblot analysis of crude liver lysates from mice subjected to fasting (n=5 mice per group). FIG. 1F shows Arg2 expression by qPCR analysis of primary hepatocytes subjected to low glucose and low serum treatment (24 h). FIG. 1G shows left panels: in vitro enzymatic-colorimetric triglyceride accumulation assay and Right: Arg2 gene expression in response to BSA-conjugated fatty acids with or without 1 nM lipopolysaccharide (LPS) and with or without adenoviral Arg2 overexpression in primary hepatocytes. Below: Inflammatory gene marker expression in parallel hepatocyte cultures analyzed above (n=6 cultures per group, derived from three mice). FIG. 1H shows immunoblot analysis of AKT phosphorylation in AML12 hepatocytes treated with or without 10 nM insulin following overnight serum deprivation (n=6 cultures per group). FIG. 1I shows Arg2 gene expression in primary hepatocyte cultures following 24 h treatment with 10 mM fructose, or in crude liver lysates from db/+mice or db/db diabetic mice (n=4 mice per group). For box plots, the midline represents the median, boxes represent the interquartile range and whiskers show the full range of values. *P<0.05, P<0.01, *P<0.001, ****P<0.0001 relative to bracketed control, by two-tailed Student's t-test FIG. 2A-FIG. 2G depict Hepatic Arg2 improves whole-body metabolism and insulin sensitivity. FIG. 2A shows experimental design to test the role of Arg2 in protection from HFrD feeding. FIG. 2B and FIG. 2C show body weight (b) and echoMRI analysis of body composition (c) of AAV8-Control or AAV8-Arg2 WT mice fed NCD (n=6-7 mice per group) or HFrD (n=8 mice per group). FIG. 2D shows indirect calorimetric quantification of VO2, VCO2, RER, and energy expenditure during light and dark cycles in AAV8-control and –Arg2 mice fed the indicated diet (n=6 mice for NCD groups and n=8 mice for HFrD groups). FIG. 2E shows serum insulin (left), serum glucose (middle), and HOMA2 IR (right) in AAV8-control and-Arg2 mice fed NCD or HFrD. FIG. 2F shows intraperitoneal glucose tolerance test (GTT) and insulin tolerance test (ITT) (n=5 mice per group). FIG. 2G shows hepatic mRNA expression of insulin-responsive genes. For box plots, the midline represents the median, boxes represent the interquartile range and whiskers show the full range of values. For bar graphs, data represent mean+s.e.m. *P<0.05, P<0.01, *P<0.005, ****P<0.0001 relative to vehicle treatment, by two-tailed Student's t-test FIG. 3A shows representative hematoxylin and eosin (H&E)-stained (top) and Oil Red O-stained (bottom) liver sections from AAV8-Control (left) and AAV8-Arg2 (right) mice that were fed NCD or HFrD for 5 weeks. Scale bar, 100 μm. FIG. 3B shows triglyceride, cholesterol, non-esterified fatty acid, and LDL-C contents in liver of AAV8-Control or AAV8-Arg2 injected WT mice that fed NCD (n=6 to 7 mice per group) or HFrD (n=8 mice per group). FIG. 3C shows hepatic expression of genes involved in cytokine and chemokine inflammatory responses. Gene expression was normalized to 3684 mRNA levels. For box plots, the midline represents the median, boxes represent the interquartile range, and whiskers show the full range of values. *P<0.05, P<0.01, *P<0.005, ****P<0.0001 relative to vehicle treatment, by two-tailed Student's t-test FIG. 4A-FIG. 4H depict hepatic Arg2 increases thermogenesis and insulin sensitivity in db/db mice. FIG. 4A shows experiment schematic used to test the role of AAV8-mediated mouse Arg2 overexpression in db/db mice. FIG. 4B and FIG. 4C show body weight (b) and body composition (c) of AAV8-Control or AAV8-Arg2 injected db/db mice (n=8 mice per group). FIG. 4D shows VO2, VCO$_2$, energy expenditure, and RER during light and dark cycles in AAV8-injected db/db mice (n=8 mice per group). FIG. 4E shows serum insulin (left), glucose (middle), and HOMA2 IR (right) (n=8 per group). FIG. 4F shows intraperitoneal glucose tolerance test (GTT) (above) and insulin tolerance test (ITT) (below) (n=5 per group). FIG. 4G shows hepatic mRNA expression of insulin-responsive genes in liver samples from db/db AAV8-Control or AAV8-Arg2 mice (n=8 mice per group). Gene expression was normalized to 3664 mRNA levels. FIG. 4H shows western blot analysis of total and phosphorylated AKT in liver samples from db/db AAV8-Control and AAV8-Arg2 mice (n=4 mice per group). β-actin was probed as a loading control. For box plots, the midline represents the median, boxes represent the interquartile range and whiskers show the full range of values. For bar graphs, data represent mean+s.e.m. *P<0.05, P<0.01, *P<0.005, ****P<0.0001; n.s., not significant; relative to control treatment, by two-tailed Student's t-test FIG. 5A shows representative hematoxylin and eosin (H&E)-stained (top) and Oil Red 0-stained (bottom) liver sections from AAV8-Control (left) and AAV8-Arg2 (right) db/db mice at 10 weeks of age. Scale bar, 100 μm. FIG. 5B shows triglyceride, cholesterol, non-esterified fatty acid, and LDL-C contents in liver of AAV8-Control and AAV8-Arg2 injected db/db mice (n=8 mice per group). FIG. 5C shows serum ALT (left), AST (middle), and albumin (right) in db/db AAV8-Control and AAV8-Arg2 mice (n=7 mice per group). FIG. 5D and FIG. 5E show Hepatic mRNA expression of the indicated genes involved in de novo lipogenesis (d), and fatty acid uptake and export (e) in db/db AAV8-Control and AAV8-Arg2 mice (n=8 mice per group). Gene expression was normalized to 36B4 mRNA levels. FIG. 5F shows inflammatory mediator mRNA expression by qPCR in liver from db/db AAV8-Control and AAV8-Arg2 mice (n=8 mice per group). For box plots, the midline represents the median, boxes represent the interquartile range and whiskers show the full range of values. *P<0.05, P<0.01, *P<0.005, ****P<0.0001; n.s., not significant; relative to control treatment, by two-tailed Student's t-test FIG. 6A-FIG. 6E depict hepatic Arg2 deficiency exacerbates hyperinsulinemia in db/db mice. FIG. 6A shows experiment schematic used to test the role of hepatic Arg2 knockdown in db/db mice. FIG. 6B shows body weight and body composition of Control ASO or Arg2 ASO-treated db/db mice (n=8 mice per group). FIG. 6C shows rectal temperature in db/db Control ASO or Arg2 ASO mice (n=8 mice per group). FIG. 6D shows serum insulin (left), glucose (middle), and HOMA2 IR (right) in Control ASO or Arg2 ASO-treated db/db mice (n=8 mice per group). FIG. 6E shows intraperitoneal glucose tolerance test (GTT) and insulin tolerance test (ITT) (n=5 mice per group). For box plots, the midline represents the median, boxes represent the interquartile range and whiskers show the full range of values. For bar graphs, data represent mean+s.e.m. *P<0.05, P<0.01, *P<0.005, ****P<0.0001; n.s., not significant; relative to control treatment, by two-tailed Student's t-test FIG. 7A shows representative hematoxylin and eosin (H&E)-stained (top) and Oil Red O-stained (bottom) liver sections from Control ASO and Arg2 ASO db/db mice at 10 weeks of age. Scale bar, 100 μm. FIG. 7B shows liver weight and liver weight-to-body weight ratio in Control ASO and Arg2 ASO db/db mice. FIG. 7C shows triglyceride, cholesterol, non-esterified fatty acid, and LDL-C contents in liver of AAV8-Control and AAV8-Arg2 injected db/db mice (n=8 mice per group). FIG. 7D shows serum ALT (left), AST (middle), and albumin (right) in db/db AAV8-Control and AAV8-Arg2 mice (n=7 mice per group). FIG. 7E shows hepatic mRNA expression of the indicated genes involved in hepatic inflammation in db/db Control and Arg2 ASO mice (n=8 mice per group). For box plots, the midline represents the median, boxes represent the interquartile range and whiskers show the full range of values. *P<0.05, P<0.01, *P<0.005, ****P<0.0001; n.s., not significant; relative to control treatment, by two-tailed Student's t-test FIG. 8A shows principal component analysis of transcriptomic data from db/db AAV8-Control and AAV8-Arg2 livers. FIG. 8B shows heat map demonstrating gene-level regulation in db/db AAV8-Control and AAV8-Arg2 livers. FIG. 8C shows KEGG pathway analysis demonstrating top up- and down-regulated gene pathways in db/db AAV8-Arg2 livers. FIG. 8D shows volcano plot demonstrating significantly altered genes by expression level and P-value. RGS16 and Arg2 are highlighted as highly regulated genes identified within the dataset. FIG. 8E shows linear regression analysis demonstrating inverse Arg2 and RGS16 correlation in (left to right:) db/+versus db/db livers, in HFrD-fed AAV8-control and AAV8-Arg2 mice, and in db/db AAV8-control and AAV8-Arg2 mice. FIG. 8F and FIG. 8G show RGS16 gene expression and protein abundance in HFrD-fed (f) and db/db (g) AAV8-control and AAV8-Arg2 mouse livers. For box plots, the midline represents the median, boxes represent the interquartile range and whiskers show the full range of values. $*P<0.05$, $P<0.01$, $*P<0.005$, $****P<0.0001$; n.s., not significant; relative to control treatment, by two-tailed Student's t-test FIG. 9A shows experimental schematic used to test the role of AAV8-mediated mouse Arg2 and Ad-RGS16 overexpression in db/db mice. FIG. 9B shows body weight and FIG. 9C shows body composition of AAV8-Control or AAV8-Arg2 db/db mice expressing Ad-Control or Ad-RGS16 (n=8 per group). FIG. 9D shows VO2, VCO2, energy expenditure, and RER during light and dark cycles in AAV8-Control or AAV8-Arg2 db/db mice expressing Ad-Control or Ad-RGS16 (n=8 per group). FIG. 9E shows serum insulin (left), glucose (middle), and HOMA2 IR (right) in AAV8-Control or AAV8-Arg2 db/db mice expressing Ad-Control or Ad-RGS16 (n=8 per group). FIG. 9F shows intraperitoneal GTT and ITT (n=5 mice per group). FIG. 9G shows western blot analysis of total and phosphorylated AKT in liver samples from db/db AAV8-Control and AAV8-Arg2 mice (n=4 mice per group). For box plots, the midline represents the median, boxes represent the interquartile range and whiskers show the full range of values. For bar graphs, data represent mean+s.e.m. $*P<0.05$, $P<0.01$, $*P<0.005$, $****P<0.0001$; n.s., not significant; relative to control treatment, by two-tailed Student's t-test FIG. 10A-FIG. 10E depict hepatic RGS16 reconstitution reverses Arg2-mediated improvements in hepatic fat accumulation. FIG. 10A shows H&E and Oil Red O-stained liver sections from db/db AAV8-Control and AAV8-Arg2 mice treated with Ad-GFP or Ad-RGS16. Scale bar, 100 μm. FIG. 10B shows hepatic triglycerides, cholesterol, non-esterified fatty acids and LDL-C in livers from db/db AAV8-Control and AAV8-Arg2 mice treated with Ad-GFP or Ad-RGS16. FIG. 10C shows Serum ALT, AST and albumin in db/db AAV8-Arg2 mice expressing Ad-GFP or Ad-RGS16. FIG. 10D shows hepatic inflammatory gene marker mRNA by qPCR. FIG. 10E shows mRNA expression of insulin-responsive genes by qPCR (n=8 mice per group). For box plots, the midline represents the median, boxes represent the interquartile range and whiskers show the full range of values. $*P<0.05$, $P<0.01$, $*P<0.005$, $****P<0.0001$; n.s., not significant; relative to control treatment, by two-tailed Student's t-test FIG. 11A-FIG. 11K depict improved energy metabolism in HFrD-fed mice overexpressing hepatocyte Arg2. FIG. 11A shows upper panel: hepatic, interscapular brown adipose tissue (iBAT) and skeletal muscle (SKM) mRNA in AAV8-Control and AAV8-Arg2 mice; Middle panel: hepatic Arg2 protein and densitometric quantification in AAV8-Control and AAV8-Arg2 mice; Lower panel: Hepatic Arg1 and Arg2 expression in AAV8-Control and AAV8-Arg2 mice. FIG. 11B shows Food intake in NCD and HFrD-fed mice treated with AAV8-control or AAV8-Arg2 virus. FIG. 11C shows light-and dark-cycle movement. FIG. 11D shows serum triglyceride, cholesterol, non-esterified fatty acid, and LDL-C content in NCD and HFrD-fed mice treated with AAV8-control or AAV8-Arg2 virus. FIG. 11E shows intraperitoneal glucose tolerance test (GTT) and insulin tolerance test (ITT) (n=5 mice per group). FIG. 11F shows liver weight and liver weight-to-body weight ratios in NCD and HFrD-fed mice treated with AAV8-control or AAV8-Arg2 virus (n=6-8 mice). FIG. 11G shows serum alanine aminotransferase (ALT), aspartate aminotransferase (AST) and albumin in chow and HFrD-fed AAV8-Control and AAV8-Arg2 mice. FIG. 11H shows hepatic mRNA expression of gluconeogenic genes. FIG. 11I shows hepatic mRNA expression of genes related in fatty acid synthesis. FIG. 11J shows hepatic mRNA expression of genes related in fatty acid intake and export. FIG. 11K shows hepatic mRNA expression of genes related in fatty acid β-oxidation. (n=6-8 mice per group). For bar graphs, data represent mean+s.e.m. For box plots, the midline represents the median, boxes represent the interquartile range and whiskers show the full range of values. $*P<0.05$, $P<0.01$, $*P<0.005$, $****P<0.0001$ relative to vehicle treatment, by two-tailed Student's I-test.

FIG. 12A shows left, Hepatic and extrahepatic Arg2 mRNA expression in db/db AAV8-Control and AAV8-Arg2 mice; Right, Hepatic Arg1 and Arg2 mRNA expression in db/db AAV8-Control and AAV8-Arg2 mice (n=8 mice per group). FIG. 12B shows Arg2 immunoblot analysis and densitometric quantification of immunoblots in livers of db/db AAV8-Control and AAV8-Arg2 mice (n=4 per group). β-actin was probed as a loading control. FIG. 12C shows food consumption in db/db AAV8-Control and AAV8-Arg2 mice. FIG. 12D shows light and dark cycle locomotion in db/db AAV8-control and Arg2 mice (n=8 mice per group). FIG. 12E shows serum triglyceride, cholesterol, non-esterified fatty acid, and LDL-C in db/db AAV8-Control and AAV8-Arg2 mice (n=8 mice per group). FIG. 12F shows phosphorylated Akt immunoblot and quantification of immunoblot band density in BAT, SKM and WAT from db/db AAV8-Control or AAV8-Arg2 mice. FIG. 12G shows hepatic gluconeogenic and oxidative gene mRNA expression by qPCR in db/db AAV8-Control and AAV8-Arg2 mice (n=8 mice per group). For boxes represent the interquartile range and whiskers show the full range of values. $*P<0.05$, $P<0.01$, $*P<0.005$, $****P<0.0001$; n.s., not significant between groups, by two-tailed Student's t-test.

FIG. 13A shows left, Hepatic and extrahepatic Arg2 mRNA expression in db/db Control and Arg2 ASO mice. Right, Arg1 expression in db/db Control and Arg2 ASO mice. FIG. 13B shows food consumption in db/db Control and Arg2 ASO mice. FIG. 13C shows serum triglyceride, cholesterol, non-esterified fatty acid, and LDL-C in db/db Control ASO and Arg2 ASO mice. FIG. 13D shows hepatic gluconeogenic, lipid import/efflux and oxidative bar graphs, data represent mean+s.e.m. For box plots, the midline represents the median, gene mRNA expression by qPCR in db/db Control ASO and Arg2 ASO mice (n=8 mice per group). For boxes represent the interquartile range and whiskers show the full range of values. $*P<0.05$, $****P<0.0001$; n.s., not significant between groups, by two-tailed Student's t-test.

FIG. 15A shows Arg2 and FIG. 15B shows RGS16 mRNA expression in db/db AAV8-Control or AAV8-Arg2 mice overexpressing control vector or RGS16. FIG. 15C shows light and dark cycle locomotion FIG. 15D shows food consumption in db/db AAV8-Control or AAV8-Arg2 mice overexpressing control vector or RGS16. FIG. 15E shows serum triglycerides, cholesterol, non-esterified fatty acids and LDL-C in db/db AAV8-Control or AAV8-Arg2 mice overexpressing control vector or RGS16. FIG. 15A shows hepatic mRNA gene expression of genes involved in de novo lipogenesis, lipid import/efflux and fatty acid oxidation in db/db AAV8-Control or AAV8-Arg2 mice overexpressing control vector or RGS16. For box plots, the midline represents the median, boxes represent the interquartile range and whiskers show the full range of values. *P<0.05, P<0.01, *P<0.005, ****P<0.0001; n.s., not significant between groups, by two-tailed Student's t-test.

FIG. 16A No difference baseline before drug treatment in fat or lean body composition as measured by echoMRI body scanning. FIG. 16B shows decreased % body fat composition in once-weekly (5 Units per mouse per treatment, labeled "ADI-1") or twice weekly (5 Units per mouse per treatment, labeled "ADI-2") intraperitoneal ADI-PEG 20-treated mice versus vehicle treated mice, (labeled "Control"). FIG. 16C shows increased % lean mass composition in once-(5 Units per mouse per treatment, labeled "ADI-1") or twice weekly (5 Units per mouse per treatment, labeled "ADI-2") ADI-PEG 20-treated mice versus vehicle treated mice, (labeled "Control") FIGS. 16D and E show increased % body lean mass and decreased % body fat mass in once-weekly and twice weekly (5 Units per mouse per treatment, labeled "ADI-2") intraperitoneal ADI-PEG 20-treated mice versus vehicle treated mice plotted on the same axis. FIG. 16E shows mean weight change for each day measured from prior, in grams. FIG. 16F shows mean change in absolute weight vs. treatment day 0 in once-and twice-weekly ADI-PEG treated mice.

FIG. 17A shows initial rectal temperature in Control and mice treated once or twice weekly with intraperitoneal ADI-PEG 20 (5 Units per dose) FIG. 17B shows rectal temperature over time, demonstrated in hours post-food withdrawal, in Control and mice treated once or twice weekly with intraperitoneal ADI-PEG 20 (5 Units per dose). Measurements were taken mid-way through the drug treatment course. FIG. 17C shows rectal temperature over time, demonstrated in hours post-food withdrawal, in Control and mice treated once weekly with intraperitoneal ADI-PEG 20 (5 Units per dose). Measurements were taken mid-way at the end the drug treatment course. The data show relative increases in heat generation in ADI-PEG-treated mice. FIG. 17D shows mean light (time 06:01-18:00) and dark cycle (time 18:01-06:00) core body temperatures. This shows light cycle hyperthermia. This amounts to increased resting period thermogenesis, because mice are nocturnal, and thus they rest during the light cycle.

FIG. 18A shows dose-dependent food consumption in mice treated once or twice weekly with intraperitoneal ADI-PEG 20 (5 Units per dose) versus Control.

FIG. 18B shows changes in food consumption on each day of treatment in Control and mice treated once weekly with intraperitoneal ADI-PEG 20 (5 Units per dose). FIG. 18C shows improved insulin tolerance in mice treated once weekly with intraperitoneal ADI-PEG 20 (5 Units per dose) versus control. Glucose-time graph is plotted at left. Area under the curve (AUC) is shown at right. FIG. 18D shows mortality due to weight loss in mice treated with high-dose (twice-weekly) intraperitoneal ADI-PEG 20 (5 Units per dose).

DETAILED DESCRIPTION

Figure 1A:
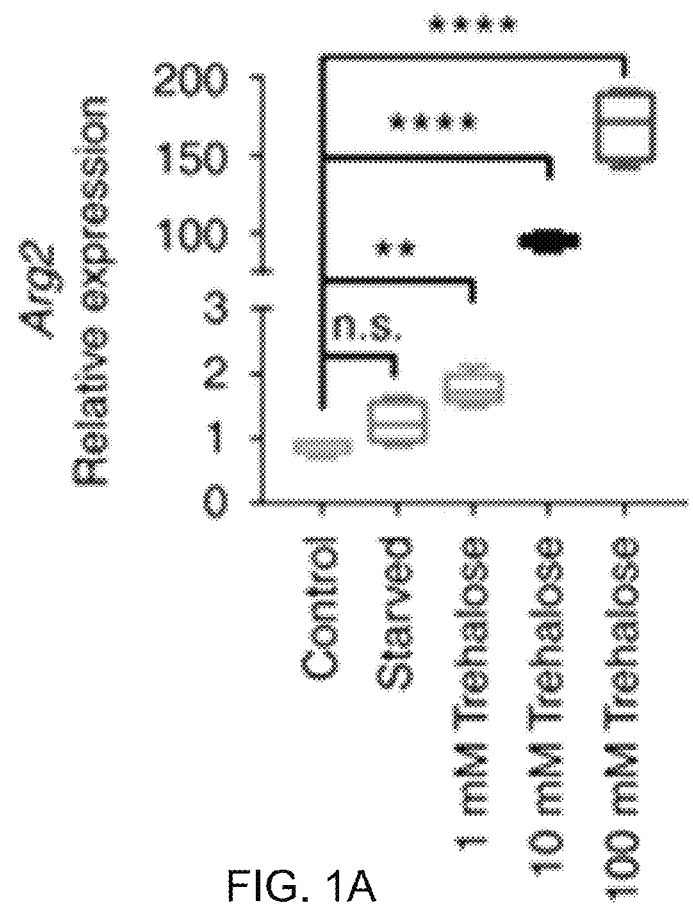
FIG. 1A-FIG. 1I depict Arg2 is upregulated during fasting and trehalose treatment.

The present disclosure is based, at least in part, on the discovery that targeted depletion of arginine can protect against metabolic diseases and related disorders. As such, the present disclosure provides compositions, uses, and techniques for treating metabolic diseases and related disorders, such as, diabetes mellitus, NAFLD, obesity, metabolic syndrome. These compositions and methods can be used to enhance whole-body energy homeostasis. In particular, the compositions and methods are useful to increase arginine deprivation and thereby protect against hepatic and peripheral fat accumulation, hepatic inflammatory response, and insulin and glucose intolerance in a cell or subject in need thereof.

Disclosed are components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules of the compound are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

Various aspects of the invention are described in further detail in the following sections.

(I) Compositions

One aspect of the present disclosure encompasses an arginine deprivation agent or a derivative thereof. A derivative of an arginine deprivation agent may be modified to improve potency, bioavailability, solubility, stability, handling properties, or a combination thereof, as compared to an unmodified version. Moreover, in some embodiments, a derivative of an arginine deprivation agent may be modified to increase the specificity for arginine and/or efficiency for depleting arginine, as compared to an unmodified version. Thus, in another aspect, a composition of the invention comprises a modified arginine deprivation agent. In still another aspect, a composition of the invention comprises a prodrug of an arginine deprivation agent, or prodrug of a derivative of an arginine deprivation agent.

A composition of the invention may optionally comprise one or more additional drug or therapeutically active agent in addition to the arginine deprivation agent or derivate thereof. A composition of the invention may further comprise a pharmaceutically acceptable excipient, carrier, or diluent. Further, a composition of the invention may contain preserving agents, solubilizing agents, stabilizing agents, wetting agents, emulsifiers, sweeteners, colorants, odorants, salts (substances of the present invention may themselves be provided in the form of a pharmaceutically acceptable salt), buffers, coating agents, or antioxidants.

Other aspects of the invention are described in further detail below.

a) Arginine Deprivation Agent

Arginine is a semi-essential amino acid for humans and other mammals. Arginine is synthesized from citrulline in two steps: First, argininosuccinate synthetase 1 (ASS1) catalyzes the conversion of L-citrulline and aspartic acid to argininosuccinate, which is then further converted to arginine and fumaric acid by argininosuccinate lyase (ASL). Arginine can be metabolized to ornithine by the enzyme arginase. Arginase degrades arginine to L-ornithine and urea. L-ornithine is converted back to L-citrulline by ornithine transcarbamylase (OTC) and finally recycled back to arginine by ASS1/ASL. OTC is primarily found in the liver, whereby it is epigenetically silenced via hypermethylation in other tissues. Several other enzymes are also involved in arginine metabolism. These include nitric oxide synthase (NOS) to produce NO from arginine. The glycine amidinotransferase catalyzes the synthesis of ornithine from glycine and arginine and the arginine decarboxylase (ADC) decarboxylates arginine to agmantine and $CO_2$. Normal cells do not typically require an exogenous supply of arginine for growth because of the abundant catalytic activity of ASS and ASL. Extracellular arginine sources for humans originate from plant and animal proteins. In most cells, extracellular arginine crosses the plasma membrane via solute carrier proteins (system y+family).

In some embodiments, the compositions comprising an arginine deprivation agent as detailed herein include an arginine-degrading enzyme. The amino acid and sequence information for the various arginine-degrading enzymes as described herein can be found using, for example, UniProt. The arginine-degrading enzymes according to the disclosure including include any arginine depleting enzyme including engineered or derivatized enzymes. In one aspect, an arginine-degrading enzyme includes an arginase. Arginase (Arg) (also known as arginine amidinase, canavanase, L-arginase, arginine transamidinase, (EC 3.5.3.1)) is a manganese-containing enzyme which catalyzes the reaction: arginine+$H_2O \rightarrow$ornithine+urea. Arginase belongs to the ureohydrolase family of enzymes. Arginase catalyzes the fifth and final step in the urea cycle, a series of biochemical reactions in mammals during which the body disposes of harmful ammonia. Specifically, arginase converts L-arginine into L-ornithine and urea. Mammalian arginase is active as a homotrimeric enzyme with an α/β fold of a parallel eight-stranded β-sheet surrounded by several helices, but some bacterial arginases are hexameric. The enzyme requires a two-molecule metal cluster of manganese in order to maintain proper function. These $Mn^{2+}$ ions coordinate with water, orienting and stabilizing the molecule and allowing water to act as a nucleophile and attack L-arginine, hydrolyzing it into ornithine and urea.

In most mammals, two isozymes of this enzyme exist; the first, Arginase I, functions in the urea cycle, and is located primarily in the cytoplasm of hepatocytes (liver cells). The second isozyme, Arginase II, has been implicated in the regulation of intracellular arginine/ornithine levels. As shown herein, Arginase II is highly upregulated in hepatocytes during fasting and pseudo-fasting states. Examples of Arginase I ploypeptides include without being limited to human ArgI (UniProt P05089), rat ArgI (UniProt P07824), mouse ArgI (UniProt Q61176), seal ArgI (UniProt AOA3Q7PYX4), panda ArgI (UniProt G1LUN3), dog ArgI (UniProt F1P658), chimpanzee ArgI (UniProt H2QTRO), gorilla ArgI (UniProt G3RRLO), walrus ArgI (UniProt AOA2U3W017), bushbaby ArgI (UniProt HOXA13), fox ArgI (UniProt L5JMT6), sealion ArgI (UniProt UPI00OF807E7F), and alpaca ArgI (UniProt UP10003C84481). In certain embodiments, an arginase I of the disclosure comprises the sequence set forth in SEQ ID NO: 1.

Examples of suitable Arginase II polypeptide include without being limited to human ArgII (UniProt P78540), rat ArgII (UniProt 008701), mouse ArgII (UniProt 008691), bovine ArgII (UniProt G3MWN1), bonobo ArgII (UniProt AOA2R9CNG5), horse ArgII (UniProt K9KFW6), chimpanzee ArgII (UniProt H2Q8H7), gorilla ArgII (UniProt G3QS73), opossum ArgII (UniProt F6Y7C7), gibbon ArgII (UniProt G1QJ08), Mallard ArgII (UniProt ROJPH7), fox ArgII (UniProt L5KEB5), seal ArgII (UniProt AOA2U3Y4M4), pig ArgII (UniProt F1SA26), and elephant ArgII (UniProt G3SNF5). In certain embodiments, an arginase II of the disclosure comprises the sequence set forth in SEQ ID NO: 2.

Additional examples of an arginase suitable for use in the present disclosure and methods of making the same include those described in WO2018/032020 A1, WO2012/061015 A2, WO2010/051533, and US 2007673601, each of which are specifically incorporated by reference.

In one aspect, an arginine-degrading enzyme includes an arginine deiminase. Arginine deiminase (ADI) (EC 3.5.3.6) is an enzyme that catalyzes the chemical reaction: L-arginine+$H_2O \rightleftharpoons$ L-citrulline+$NH_3$. Thus, the two substrates of this enzyme are L-arginine and $H_2O$, whereas its two products are L-citrulline and $NH_3$. This enzyme belongs to the family of hydrolases, those acting on carbon-nitrogen bonds other than peptide bonds, specifically in linear amidines. The systematic name of this enzyme class is L-arginine iminohydrolase. Other names in common use include arginine dihydrolase, citrulline iminase, and L-arginine deiminase. This enzyme participates in arginine and proline metabolism. This enzyme is widely expressed in bacteria, including *streptococcus* and *actinomyces*.

The first ADI enzyme was isolated from *Bacillus pyocyaneus*. Subsequently, ADI was identified in the species of numerous genera, e.g. *Pseudomonas, Bacillus, Enterococcus, Lactobacillus, Streptococcus,* and *Mycoplasma*. Numerous bacterial ADI have relatively low affinities to arginine or unfavorable pH or temperature optima for application in humans. However, the reaction optima of ADIs from some species fit well with the conditions in humans. Among those are ADI from *Streptococcus pyogenes, Pseudomonas plecoglossicida* or *Mycoplasma* species, having their temperature optimum at around 37° C. and their pH optimum in the neutral to slightly acidic range. Due to the high affinity to arginine, ADI derived from *Mycoplasma* species are by far best investigated and are the most frequently applied enzymes in experimental and clinical studies. E.g., *Mycoplasma hominis* ADI has an ~1,000-fold higher affinity for arginine (Km ~30 µM) than human arginase 1 (Km ~45 mM). As ADIs are bacterial enzymes, they are highly immunogenic in humans and exhibit a short half-life (rapidly cleared from circulation within 30 min via glomerular filtration). For clinical applications, ADI is being conjugated with around 16 polyethylene glycol molecules of ~20 kDa (ADI-PEG20, Polaris, Inc (Phoenix Pharmacologics)). This modification reduces antigenicity while greatly enhancing its pharmacokinetic circulatory half-life of approximately 4 hours in serum; it also displays optimal activity at a physiological pH.

In the present disclosure, the ADI polypeptide encoding nucleic acids may be derived, cloned or produced from any source, including, for example, microorganisms, recombinant biotechnology or any combination thereof. Non-limiting examples of suitable ADI polypeptide include those which can be derived from, for example, *M. hominis, M. arginini, M. arthritidis, M. phocicerebrale, M. gateae, M. phocidae, M. columbinum, M. iowae, M. crocodyli, M. alligatoris, H. orenii,* or *M. bovis*. In some embodiments, the ADI polypeptide is from *Mycoplasma salivarium, Mycoplasma spumans, Mycoplasma canadense, Mycoplasma auris, Mycoplasma hyosynoviae, Mycoplasma cloacale, Mycoplasma anseris, Mycoplasma alkalescens, Mycoplasma orale, Mycoplasma finers, Mycoplasma meleagridis, Mycoplasma alvi, Mycoplasma penetrans, Mycoplasma gallinarum, Mycoplasma pirum, Mycoplasma primatum, Mycoplasma fermentans, Mycoplasma hpofaciens, Mycoplasma felifancium, Mycoplasma imitans, Mycoplasma opalescens, Mycoplasma moatsii, Mycoplasma elephantis, Mycoplasma pneumoniae, Mycoplasma testudinis, Mycoplasma* sp. CAG:877, or *Mycoplasma* sp. CAG:472. In certain embodiments, an ADI of the disclosure comprises the sequence set forth in SEQ ID NO: 3.

Additional examples of an ADI suitable for use in the present disclosure and methods of making the same include those described in WO2018/085551A2, US2017/0000862 A1, US2018/0154008 A1, US2018/0251748 A1, U.S. Pat. Nos. 9,255,262, 9,333,268 B2 and US2018/0296652 A1, each of which are specifically incorporated by reference.

In one aspect, an arginine-degrading enzyme includes an arginine decarboxylase (EC 4.1.1.19). Arginine decarboxylase, is an enzyme responsible for catalyzing the conversion of L-arginine into agmantine and carbon dioxide. The process consumes a proton in the decarboxylation and employs a pyridoxal-5'-phosphate (PLP) cofactor, similar to other enzymes involved in amino acid metabolism, such as ornithine decarboxylase and glutamine decarboxylase. It is found in bacteria and virus, though most research has so far focused on forms of the enzyme in bacteria. During the AdiA catalyzed decarboxylation of arginine, the necessary proton is consumed from the cell cytoplasm which helps to prevent the over-accumulation of protons inside the cell and serves to increase the intracellular pH. Arginine decarboxylase is part of an enzymatic system in *Escherichia coli (E. Coli), Salmonella typhimurium*, and methane-producing bacteria *Methanococcus jannaschii* that makes these organisms acid resistant and allows them to survive under highly acidic medium.

Arginine decarboxylase has been purified and characterized from a number of different sources: avocado fruit, oat seedlings, rice seedlings, *Pseudomonas, Escherichia coli*. Its activity has also been demonstrated in mammalian brain and kidneys. The inducible arginine decarboxylase of *E. coli* was purified by Blethen, Boeker and Snell (Blethen, S. L., Boeker, E. A., and Snell, E. E., Arginine Decarboxylase from *Escherichia coli* I. Purification and specificity of substrates and coenzyme, J. of Biol. Chem., Vol. 243, No. 8, pp. 1671-1677, 1968, which is hereby incorporated by reference) and fully characterized by Boeker and Snell (Boeker, E. A., Snell, E. E., Arginine Decarboxylase from *Escherichia coli*-II. Dissociation and reassociation of subunits, J. of Biol. Chem., Vol. 243, No. 8, pp; 1678-1684, 1968, which is hereby incorporated by reference). It has a molecular weight of 850,000 and can be reversibly dissociated into five units of identical size (165,000) which lack enzymatic activity. This enzyme is induced by low pH and has the maximum activity at pH 5.2-catalytic activity vanishes at physiological pH of 7.4. It has been purified to activity of approximately 400 units/mg. In *E. coli*, inducible arginine decarboxylase, also called biodegradative arginine decarboxylase (dADC), is presumed to play a protective role in highly acidic environments. The gene for dADC was sequenced by Stim and Bennett (Stim, K. P., Bennett, G. N., Nucleotide Sequence of the adi Gene, Which Encodes the Biodegradative Acid-Induced Arginine Decarboxylase of *Escherichi coli*, J. Bacteriology, Vol. 175, No. 5, pp. 1221-1234, 1993, which is hereby incorporated by reference) and has been commercially available from Sigma Chemical Co., St. Louis, from two sources and in two purities (200400 units/mg and 5-15 units/mg).

Non-limiting examples of suitable arginine decarboxylase and method of making the same include those described in US2003/0017146 A1 which is hereby incorporated by reference.

In some embodiments, the arginine-degrading enzyme may be a variant of an agrinase, an arginine deiminase, or an arginine decarboxylase as described above. A "variant" sequence refers to a polypeptide or polynucleotide sequence that differs from a reference sequence by one or more substitutions, deletions (e.g., truncations), additions, and/or insertions. Certain variants thus include functional fragments of arginine-depleting enzymes described herein. Variant polypeptides are biologically active, that is, they continue to possess the enzymatic or binding activity of a reference polypeptide. Such variants may result from, for example, genetic polymorphism and/or from human manipulation.

In certain embodiments, an arginine-degrading enzyme of the disclosure comprises the sequence set forth in SEQ ID NO:1, 2 or 3. In other embodiments, an arginine-degrading enzyme of the disclosure may have about 80% identity to SEQ ID NO: 1. For example, an arginine-degrading enzyme of the disclosure may have about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% identity to SEQ ID NO: 1, 2 or 3. In particular, "percent identity" of two polypeptides or two nucleic acid sequences is determined using the algorithm of Karlin and Altschul (Proc. Natl. Acad. Sci. USA 87:2264-2268, 1993). Such an algorithm is incorporated into the BLASTN and BLASTX programs of Altschul et al. (J. Mol. Biol. 215:403-410, 1990). BLAST nucleotide searches may be performed with the BLASTN program to obtain nucleotide sequences homologous to a nucleic acid molecule of the invention. Equally, BLAST protein searches may be performed with the BLASTX program to obtain amino acid sequences that are homologous to a polypeptide of the invention. To obtain gapped alignments for comparison purposes, Gapped BLAST is utilized as described in Altschul et al. (Nucleic Acids Res. 25:3389-3402, 1997). When utilizing BLAST and Gapped BLAST programs, the default parameters of the respective programs (e.g., BLASTX and BLASTN) are employed.

In many instances, a biologically active variant will contain one or more conservative substitutions. A "conservative substitution" is one in which an amino acid is substituted for another amino acid that has similar properties, such that one skilled in the art of peptide chemistry would expect the secondary structure and hydropathic nature of the polypeptide to be substantially unchanged. As described above, modifications may be made in the structure of the polynucleotides and polypeptides of the present disclosure and still obtain a functional molecule that encodes a variant or derivative polypeptide with desirable characteristics. When it is desired to alter the amino acid sequence of a polypeptide to create an equivalent, or even an improved, variant or portion of a polypeptide described herein, one skilled in the art will typically change one or more of the codons of the encoding DNA sequence.

For example, certain amino acids may be substituted for other amino acids in a protein structure without appreciable loss of interactive binding capacity with structures such as, for example, antigen-binding regions of antibodies or binding sites on substrate molecules. Since it is the interactive capacity and nature of a protein that defines that protein's biological functional activity, certain amino acid sequence substitutions can be made in a protein sequence, and, of course, its underlying DNA coding sequence, and nevertheless obtain a protein with like properties. It is thus contemplated that various changes may be made in the peptide sequences of the disclosed compositions, or corresponding DNA sequences which encode said peptides without appreciable loss of their utility.

In making such changes, the hydropathic index of amino acids may be considered. The importance of the hydropathic amino acid index in conferring interactive biologic function on a protein is generally understood in the art (Kyte & Doolittle, 1982, incorporated herein by reference). It is accepted that the relative hydropathic character of the amino acid contributes to the secondary structure of the resultant protein, which in turn defines the interaction of the protein with other molecules, for example, enzymes, substrates, receptors, DNA, antibodies, antigens, and the like. Each amino acid has been assigned a hydropathic index on the basis of its hydrophobicity and charge characteristics (Kyte & Doolittle, 1982). These values are: isoleucine (+4.5); valine (+4.2); leucine (+3.8); phenylalanine (+2.8); cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5). It is known in the art that certain amino acids may be substituted by other amino acids having a similar hydropathic index or score and still result in a protein with similar biological activity, i.e., still obtain a biological functionally equivalent protein. In making such changes, the substitution of amino acids whose hydropathic indices are within ±2 is preferred, those within ±1 are particularly preferred, and those within ±0.5 are even more particularly preferred.

It is also understood in the art that the substitution of like amino acids can be made effectively on the basis of hydrophilicity. U.S. Pat. No. 4,554,101 (specifically incorporated herein by reference in its entirety), states that the greatest local average hydrophilicity of a protein, as governed by the hydrophilicity of its adjacent amino acids, correlates with a biological property of the protein. As detailed in U.S. Pat. No. 4,554,101, the following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, and in particular, an immunologically equivalent protein. In such changes, the substitution of amino acids whose hydrophilicity values are within ±2 is preferred, those within ±1 are particularly preferred, and those within ±0.5 are even more particularly preferred.

As outlined above, amino acid substitutions are generally therefore based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include: arginine and lysine; glutamate and aspartate; serine and threonine; glutamine and asparagine; and valine, leucine and isoleucine.

Amino acid substitutions may further be made on the basis of similarity in polarity, charge, solubility, hydrophobicity, hydrophilicity and/or the amphipathic nature of the residues. For example, negatively charged amino acids include aspartic acid and glutamic acid; positively charged amino acids include lysine and arginine; and amino acids with uncharged polar head groups having similar hydrophilicity values include leucine, isoleucine and valine; glycine and alanine; asparagine and glutamine; and serine, threonine, phenylalanine and tyrosine. Other groups of amino acids that may represent conservative changes include: (1) ala, pro, gly, glu, asp, gin, asn, ser, thr; (2) cys, ser, tyr, thr; (3) val, ile, leu, met, ala, phe; (4) lys, arg, his; and (5) phe, tyr, trp, his.

A variant may also, or alternatively, contain non-conservative changes. In a preferred embodiment, variant polypeptides differ from a native or reference sequence by substitution, deletion or addition of fewer than about 10, 9, 8, 7, 6, 5, 4, 3, 2 amino acids, or even 1 amino acid. Variants may also (or alternatively) be modified by, for example, the deletion or addition of amino acids that have minimal influence on the immunogenicity, secondary structure, enzymatic activity, and/or hydropathic nature of the polypeptide.

In one specific embodiment of the present invention, the arginine-degrading enzyme is modified by coupling with proteins or peptides, wherein one or more proteins or peptides are directly or indirectly linked to the arginine-degrading enzyme. The proteins can either be naturally existing proteins or their fragments, including but not limited to naturally existing human serum proteins or their fragments, such as thyroxine-binding protein, transthyretin, al-acid glycoprotein, transferrin, fibrinogen, immunoglobulin, Ig Fc reguis, albumin, and fragments thereof. By "fragment" is meant any portion of a protein that is smaller than the whole protein but which retains the desired function of the protein. The arginine-degrading enzyme may be directly or indirectly linked to a protein via a covalent bond. Direct linking means that one amino acid of the arginine-degrading enzyme is directly linked to one amino acid of the modifying protein, via a peptide bond or a disulfide bridge. Indirect linking refers to the linkages between the arginine-degrading enzyme and a modifying protein, via originally existing chemical groups there between or specific chemical groups added through biological or chemical means, or the combination of the above-mentioned linkages.

In one particular embodiment, the arginine-degrading enzyme is modified by covalent attachment with PEG. The arginine-degrading enzyme covalently modified with PEG (with or without a linking group). When compared to native arginine-degrading enzyme, the arginine-degrading enzyme-PEG retains most of its enzymatic activity, is far less antigenic, has a greatly extended circulating half-life, and is much more efficacious in the prolonged depletion of arginine.

"Polyethylene glycol" or "PEG" refers to mixtures of condensation polymers of ethylene oxide and water, in a branched or straight chain, represented by the general formula $H(OCH_2CH_2)nOH$, wherein n is at least 4. "Polyethylene glycol" or "PEG" is used in combination with a numeric suffix to indicate the approximate weight average molecular weight thereof. For example, PEG5,000 refers to PEG having a total weight average molecular weight of about 5,000; PEG12,000 refers to PEG having a total weight average molecular weight of about 12,000; and PEG20,000 refers to PEG having a total weight average molecular weight of about 20,000.

In one embodiment of the present invention, the PEG has a total weight average molecular weight of about 1,000 to about 50,000; in one embodiment from about 3,000 to about 40,000, and in another embodiment from about 5,000 to about 30,000; in certain embodiments from about 8,000 to about 30,000; in other embodiments from about 11,000 to about 30,000; in additional embodiments, from about 12,000 to about 28,000; in still other embodiments, from about 16,000 to about 24,000; and in other embodiments, about 18,000 to about 22,000; in another embodiment, from 19,000 to about 21,000, and in one embodiment, the PEG has a total weight average molecular weight of about 20,000. Generally, PEG with a molecular weight of 30,000 or more is difficult to dissolve, and yields of the formulated product are greatly reduced. The PEG may be a branched or straight chain, or in certain embodiments, a straight chain. Generally, increasing the molecular weight of the PEG decreases the immunogenicity of the arginine-degrading enzyme.

In another embodiment of the present invention, the PEG has a total weight average molecular weight of about 1,000 to about 50,000; in certain embodiments about 3,000 to about 30,000; in other embodiments from about 3,000 to about 20,000; in one embodiment from about 4,000 to about 12,000; in still other embodiments from about 4,000 to about 10,000; in additional embodiments from about 4,000 to about 8,000; still further embodiments from about 4,000 to about 6,000; and about 5,000 in another embodiment. The PEG may be a branched or straight chain, and in certain embodiments is a straight chain.

While the arginine-degrading enzyme-PEG is the illustrative modified arginine-degrading enzyme described herein, as would be recognized by the skilled person the arginine-degrading enzyme may be modified with other polymers or appropriate molecules for the desired effect, in particular reducing immunogenicity and increasing serum half-life.

The linking group used to covalently attach the arginine-degrading enzyme to a modifying agent, e.g. PEG, may be any biocompatible linking group. As discussed above, "biocompatible" indicates that the compound or group is non-toxic and may be utilized in vitro or in vivo without causing injury, sickness, disease or death. A modifying agent, such as PEG, can be bonded to the linking group, for example, via an ether bond, an ester bond, a thiol bond or an amide bond. Suitable biocompatible linking groups include, for example, an ester group, an amide group, an imide group, a carbamate group, a carboxyl group, a hydroxyl group, a carbohydrate, a succinimide group (including, for example, succinimidyl succinate (SS), succinimidyl propionate (SPA), succinimidyl carboxymethylate (SCM), succinimidyl succinamide (SSA) or N-hydroxy succinimide (NHS)), an epoxide group, an oxycarbonylimidazole group (including, for example, carbonyldimidazole (ODD), a nitro phenyl group (including, for example, nitrophenyl carbonate (NPC) or trichlorophenyl carbonate (TPC)), a trysylate group, an aldehyde group, an isocyanate group, a vinylsulfone group, a tyrosine group, a cysteine group, a histidine group or a primary amine. In one embodiment, the biocompatible linking group is an ester group and/or a succinimide group. In another embodiment, the linking group is SS, SPA, SCM, SSA or NHS; in certain embodiments, SS, SPA or NHS are more preferred, and in other embodiments, SS or SPA being most preferred.

Alternatively, the arginine-degrading enzyme may be coupled directly to a modifying agent, such as PEG (i.e., without a linking group) through an amino group, a sulfhydral group, a hydroxyl group or a carboxyl group.

The arginine-degrading enzyme may be covalently bonded to PEG, via a biocompatible linking group, using methods known in the art, as described, for example, by Park et al, Anticancer Res., 1:373-376 (1981); and Zaplipsky and Lee, Polyethylene Glycol Chemistry: Biotechnical and Biomedical Applications, J. M. Harris, ed., Plenum Press, NY, Chapter 21 (1992), the disclosures of which are hereby incorporated by reference herein in their entirety.

The arginine-degrading enzyme polypeptide may optionally comprise further functional domains such that they increase the availability or targeting of the dominant negative molecule to a cell (e.g., cell-penetrating) or at least one tag. In some embodiments, the dominant negative protein further comprises at least one additional domain. In one embodiment, the cell-penetrating domain can be a cell-penetrating peptide sequence derived from the HIV-1 TAT protein. In non-limiting examples the at least one tag is a StrepTag, a polyhistidine tag, an antibody epitope (e.g., derived from myc), and the like or a combination thereof. The additional domain or at least one tag can be located at the N-terminus, the C-terminus, or in an internal location of the protein. The additional domain or tag maybe attached to the arginine-degrading enzyme by a linker domain, where the linker domain optionally comprises an enzymatic cleavage site for the release of the cell-penetrating domain from the arginine-degrading enzyme upon entry into a cell. Preferably, the cleavage enzyme is an enzyme enriched in hepatocytes.

Another aspect of the present disclosure provides nucleic acids encoding any of the arginine-degrading enzymes described above. The nucleic acid can be DNA or RNA. In one embodiment the DNA can be present in a vector. The nucleic acid sequences which encode the dominant negative molecule of the invention can be operatively linked to expression control sequences. "Operatively linked" refers to a juxtaposition wherein the components so described are in a relationship permitting them to function in their intended manner. An expression control sequence operatively linked to a coding sequence is achieved under conditions compatible with the expression control sequences. As used herein, the expression control sequences refers to nucleic acid sequences that regulate the expression of a nucleic acid sequence to which it is operatively linked. Expression control sequences are operatively linked to a nucleic acid sequence when the expression control sequences control and regulate the transcription and, as appropriate, translation of the nucleic acid sequence. Thus, expression control sequences can include appropriate promoters, enhancers, transcription terminators, a start codon (i.e., ATG) in front of a protein-encoding gene, splicing signals for introns, and maintenance of the correct reading frame of that gene to permit proper translation of the mRNA, and stop codons. The term "control sequences" is intended to include, at a minimum, components whose presence can influence expression, and can also include additional components whose presence is advantageous, for example, leader sequences and fusion partner sequences. Expression control sequences can include a promoter.

In one aspect, the present disclosure provides for a vector comprising a nucleic acid sequence encoding for an arginine-degrading enzyme polypeptide. In one aspect, the present disclosure is predicated, at least in part, on the ability of adeno-associated virus (AAV) vectors to be safely administered to humans and to provide persistent expression of a therapeutic transgene. The invention provides an adeno-associated virus (AAV) vector which comprises, consists essentially of, or consists of a nucleic acid sequence encoding an arginine-degrading enzyme polypeptide. When the AAV vector consists essentially of a nucleic acid sequence encoding an arginine-degrading enzyme polypeptide, additional components can be included that do not materially affect the AAV vector (e.g., genetic elements such as poly(A) sequences or restriction enzyme sites that facilitate manipulation of the vector in vitro). When the AAV vector consists of a nucleic acid sequence encoding an arginine-degrading enzyme polypeptide, the AAV vector does not comprise any additional components (i.e., components that are not endogenous to AAV and are not required to effect expression of the nucleic acid sequence to thereby provide the arginine-degrading enzyme).

Adeno-associated virus is a member of the Parvoviridae family and comprises a linear, single-stranded DNA genome of less than about 5,000 nucleotides. AAV requires co-infection with a helper virus (i.e., an adenovirus or a herpes virus), or expression of helper genes, for efficient replication. AAV vectors used for administration of therapeutic nucleic acids typically have approximately 96% of the parental genome deleted, such that only the terminal repeats (ITRs), which contain recognition signals for DNA replication and packaging, remain. This eliminates immunologic or toxic side effects due to expression of viral genes. In addition, delivering specific AAV proteins to producing cells enables integration of the AAV vector comprising AAV ITRs into a specific region of the cellular genome, if desired (see, e.g., U.S. Pat. Nos. 6,342,390 and 6,821,511). Host cells comprising an integrated AAV genome show no change in cell growth or morphology (see, for example, U.S. Pat. No. 4,797,368).

The AAV ITRs flank the unique coding nucleotide sequences for the non-structural replication (Rep) proteins and the structural capsid (Cap) proteins (also known as virion proteins (VPs)). The terminal 145 nucleotides are self-complementary and are organized so that an energetically stable intramolecular duplex forming a T-shaped hairpin may be formed. These hairpin structures function as an origin for viral DNA replication by serving as primers for the cellular DNA polymerase complex. The Rep genes encode the Rep proteins Rep78, Rep68, Rep52, and Rep40. Rep78 and Rep68 are transcribed from the p5 promoter, and Rep 52 and Rep40 are transcribed from the p19 promoter. The Rep78 and Rep68 proteins are multifunctional DNA binding proteins that perform helicase and nickase functions during productive replication to allow for the resolution of AAV termini (see, e.g., Im et al., Cell, 61: 447-57 (1990)). These proteins also regulate transcription from endogenous AAV promoters and promoters within helper viruses (see, e.g., Pereira et al., J. Virol., 71: 1079-1088 (1997)). The other Rep proteins modify the function of Rep78 and Rep68. The cap genes encode the capsid proteins VP1, VP2, and VP3. The cap genes are transcribed from the p40 promoter. In a particular embodiment, the AAV contains a pair of inverted terminal repeats (ITRs) which flank at least one cassette containing a promoter which directs cell-specific expression (e.g. hepatocytes) operably linked to a heterologous gene. Heterologous in this context refers to any nucleotide sequence or gene which is not native to the AAV or B19 parvovirus (e.g. an arginine-degrading enzyme). Typically the AAV and B19 coding regions have been deleted, resulting in a safe, noncytotoxic vector. The AAV ITRs, or modifications thereof, confer infectivity and site-specific integration, but not cytotoxicity, and the promoter directs cell-specific expression. U.S. Pat. No. 6,261,834 is herein incorporated by reference in its entirety for material related to the AAV vector. In some embodiments, the promoter directs cell-specific expression in the liver. Non-limiting examples include the al-antitrypsin (AT) promoter, thyroxine binding globulin promoter, human albumin promoter, liver-specific (LSP) promoter consisting of the 475 bp thyroid hormone binding globulin promoter and 2 copies of the 96 bp bikunin/al-microglobulin enhancer, the DC190 promoter (728 bp) containing a 520 bp human albumin promoter and 2 copies of the 99 bp prothrombin enhancer or the DC172 promoter (1.272 kb) consisting of a 890 bp human (al-antitrypsin promoter and 2 copies of the 160 bp a al-microglobulin enhancer. In an exemplary embodiment, the cell-specific promoter is a liver-specific thyroxine binding globulin (TBG) promoter.

As used herein, the term "AAV vector" means a vector derived from an adeno-associated virus serotype. In non-limitation examples AAV vectors include, AAV1, AAV2, AAV3, AAV4, AAV5, AAV6, AAV7, AAV8, AAV9, and mutated forms thereof. AAV vectors can have one or more of the AAV wild-type genes deleted in whole or part, preferably the rep and/or cap genes, but retain functional flanking ITR sequences. Despite the high degree of homology, the different serotypes have tropisms for different tissues. In an exemplary embodiment, the AAV vector is AAV9.

An AAV vector, as disclosed herein, can be generated using any AAV serotype known in the art. Several AAV serotypes and over 100 AAV variants have been isolated from adenovirus stocks or from human or nonhuman primate tissues (reviewed in, e.g., Wu et al., Molecular Therapy, 14(3): 316-327 (2006)). Generally, the AAV serotypes have genomic sequences of significant homology at the nucleic acid sequence and amino acid sequence levels, such that different serotypes have an identical set of genetic functions, produce virions which are essentially physically and functionally equivalent, and replicate and assemble by practically identical mechanisms. AAV serotypes 1-6 and 7-9 are defined as "true" serotypes, in that they do not efficiently cross-react with neutralizing sera specific for all other existing and characterized serotypes. In contrast, AAV serotypes 6, 10 (also referred to as Rh10), and 11 are considered "variant" serotypes as they do not adhere to the definition of a "true" serotype. AAV serotype 2 (AAV2) has been used extensively for gene therapy applications due to its lack of pathogenicity, wide range of infectivity, and ability to establish long-term transgene expression (see, e.g., Carter, B. J., Hum. Gene Ther., 16: 541-550 (2005); and Wu et al., supra). Genome sequences of various AAV serotypes and comparisons thereof are disclosed in, for example, GenBank Accession numbers U89790, J01901, AF043303, and AF085716; Chiorini et al., J. Virol., 71: 6823-33 (1997); Srivastava et al., J. Virol., 45: 555-64 (1983); Chiorini et al., J. Virol., 73: 1309-1319 (1999); Rutledge et al., J. Virol., 72: 309-319 (1998); and Wu et al., J. Virol., 74: 8635-47 (2000)).

AAV rep and ITR sequences are particularly conserved across most AAV serotypes. For example, the Rep78 proteins of AAV2, AAV3A, AAV3B, AAV4, and AAV6 are reportedly about 89-93% identical (see Bantel-Schaal et al., J. Virol., 73(2): 939-947 (1999)). It has been reported that AAV serotypes 2, 3A, 3B, and 6 share about 82% total nucleotide sequence identity at the genome level (Bantel-Schaal et al., supra). Moreover, the rep sequences and ITRs of many AAV serotypes are known to efficiently cross-complement (i.e., functionally substitute) corresponding sequences from other serotypes during production of AAV particles in mammalian cells.

Generally, the cap proteins, which determine the cellular tropicity of the AAV particle, and related cap protein-encoding sequences, are significantly less conserved than Rep genes across different AAV serotypes. In view of the ability Rep and ITR sequences to cross-complement corresponding sequences of other serotypes, the AAV vector can comprise a mixture of serotypes and thereby be a "chimeric" or "pseudotyped" AAV vector. A chimeric AAV vector typically comprises AAV capsid proteins derived from two or more (e.g., 2, 3, 4, etc.) different AAV serotypes. In contrast, a pseudotyped AAV vector comprises one or more ITRs of one AAV serotype packaged into a capsid of another AAV serotype. Chimeric and pseudotyped AAV vectors are further described in, for example, U.S. Pat. No. 6,723,551; Flotte, Mol. Ther., 13(1): 1-2 (2006); Gao et al., J. Virol., 78: 6381-6388 (2004); Gao et al., Proc. Natl. Acad. Sci. USA, 99: 11854-11859 (2002); De et al., Mol. Ther., 13: 67-76 (2006); and Gao et al., Mol. Ther., 13: 77-87 (2006).

In one embodiment, the AAV vector is generated using an AAV that infects humans (e.g., AAV2). Alternatively, the AAV vector is generated using an AAV that infects non-human primates, such as, for example, the great apes (e.g., chimpanzees), Old World monkeys (e.g., macaques), and New World monkeys (e.g., marmosets). Preferably, the AAV vector is generated using an AAV that infects a non-human primate pseudotyped with an AAV that infects humans. Examples of such pseudotyped AAV vectors are disclosed in, e.g., Cearley et al., Molecular Therapy, 13: 528-537 (2006). In one embodiment, an AAV vector can be generated which comprises a capsid protein from an AAV that infects rhesus macaques pseudotyped with AAV2 inverted terminal repeats (ITRs). In a particularly preferred embodiment, the inventive AAV vector comprises a capsid protein from AAV10 (also referred to as "AAVrh.10"), which infects rhesus macaques pseudotyped with AAV2 ITRs (see, e.g., Watanabe et al., Gene Ther., 17(8): 1042-1051 (2010); and Mao et al., Hum. Gene Therapy, 22: 1525-1535 (2011)).

An AAV vector, as disclosed herein, comprises a nucleic acid sequence encoding an arginine-degrading enzyme polypeptide. "Nucleic acid sequence" is intended to encompass a polymer of DNA or RNA, i.e., a polynucleotide, which can be single-stranded or double-stranded and which can contain non-natural or altered nucleotides. The terms "nucleic acid" and "polynucleotide" as used herein refer to a polymeric form of nucleotides of any length, either ribonucleotides (RNA) or deoxyribonucleotides (DNA). These terms refer to the primary structure of the molecule, and thus include double- and single-stranded DNA, and double- and single-stranded RNA. The terms include, as equivalents, analogs of either RNA or DNA made from nucleotide analogs and modified polynucleotides such as, though not limited to, methylated and/or capped polynucleotides.

In some embodiments, a vector comprising a nucleic acid sequence encoding an arginine-degrading enzyme can be a plasmid, cosmid, yeast artificial chromosome (YAC), bacterial artificial chromosome (BAC), viral vector or bacteriophage. The vectors can provide for replication of arginine-degrading enzyme nucleic acids, expression of arginine-degrading enzyme polypeptides or integration of arginine-degrading enzyme nucleic acids into the chromosome of a host cell. The choice of vector is dependent on the desired purpose. Certain cloning vectors are useful for cloning, mutation and manipulation of the arginine-degrading enzyme nucleic acid. Other vectors are useful for expression of the arginine-degrading enzyme polypeptide, being able to express the polypeptide in large amounts for purification purposes or to express the arginine-degrading enzyme polypeptide in a temporal or tissue specific manner, for example, expression of arginine-degrading enzyme only in hepatocytes. The vector can also be chosen on the basis of the host cell, e.g., to facilitate expression in bacteria, mammalian cells, insect cells, fish cell (e.g., zebrafish) and/or amphibian cells. The choice of matching vector to host cell is apparent to one of skill in the art, and the types of host cells are discussed below. Many vectors or vector systems are available commercially, for example, the pET bacterial expression system (Invitrogen™, Carlsbad Calif.).

The vectors disclosed herein can be viral or non-viral vectors. For example, as discussed above the disclosed vectors can be viral vectors. There are a number of compositions and methods which can be used to deliver nucleic acids to cells, either in vitro or in vivo. These methods and compositions can largely be broken down into two classes: viral based delivery systems and non-viral based delivery systems. For example, the nucleic acids can be delivered through a number of direct delivery systems such as, electroporation, lipofection, calcium phosphate precipitation, plasmids, viral vectors, viral nucleic acids, phage nucleic acids, phages, cosmids, or via transfer of genetic material in cells or carriers such as cationic liposomes. Appropriate means for transfection, including viral vectors, chemical transfectants, or physico-mechanical methods such as electroporation and direct diffusion of DNA, are described by, for example, Wolff, J. A., et al., Science, 247,1465-1468, (1990); and Wolff, J. A. Nature, 352, 815-818, (1991). Such methods are well known in the art and readily adaptable for use with the compositions and methods described herein. In certain cases, the methods will be modified to specifically function with large DNA molecules. Further, these methods can be used to target certain neurodegenerative diseases or disorders and cell populations by using the targeting characteristics of the carrier.

Vectors can include various components including, but not limited to, an origin of replication, one or more marker or selectable genes (e.g. GFP, neo), promoters, enhancers, terminators, poly-adenylation sequences, repressors or activators. Such elements are provided in the vector so as to be operably linked to the coding region of the arginine-degrading enzyme-encoding nucleic acid, thereby facilitating expression in a host cell of interest. Cloning and expression vectors can contain an origin of replication which allows the vector to replicate in the host cells. Vectors can also include a selectable marker, e.g., to confer a resistance to a drug or compliment deficiencies in growth. Examples of drug resistance markers include, but are not limited to, ampicillin, tetracycline, neomycin or methotrexate. Examples of other marker genes can be the fluorescent polypeptides such one of the members of the fluorescent family of proteins, for example, GFP, YFP, BFP, RFP etc. These markers can be contained on the same vector as the gene of interest or can be on separate vectors and co-transfected with the vector containing the gene of interest.

The vector can contain a promoter that is suitable for expression of the arginine-degrading enzyme in mammalian cells, which promoter can be operably linked to provide for inducible or constitutive expression of an arginine-degrading enzyme polypeptide. Exemplary inducible promoters include, for example, the metallothionine promoter or an ecdysone-responsive promoter. Exemplary constitutive promoters include, for example, the viral promoters from cytomegalovirus (CMV), Rous Sarcoma virus (RSV), Simian virus 40 (SV40), avian sarcoma virus, the beta-actin promoter and the heat-shock promoters. The promoter can be chosen for its tissue specificity. Certain promoters only express in certain tissues, and when it is desirable to express the polypeptide of interest only in a selected tissue, one of these promoters can be used. The choice of promoter will be apparent to one of skill in the art for the desired host cell system.

The vector encoding an arginine-degrading enzyme can be a viral vector. Examples of viral vectors include retroviral vectors, such as: adenovirus, simian virus 40 (SV40), cytomegalovirus (CMV), Moloney murine leukemia virus (MoMuLv), Rous Sarcoma Virus (RSV), lentivirus, herpesvirus, poxvirus and vaccinia virus. A viral vector can be used to facilitate expression in a target cell, e.g., for production of arginine-degrading enzyme or for use in therapy (e.g., to deliver an arginine-degrading enzyme to a subject by expression from the vector). Where used for therapy, arginine-degrading enzyme-encoding vectors (e.g, viral vectors), can be administered directly to the patient via an appropriate route or can be administered using an ex vivo strategy using subject cells (autologous) or allogeneic cells, which are suitable for administration to the patient to be treated.

As used herein, plasmid or viral vectors are agents that transport the disclosed nucleic acids, such as a nucleic acid sequence capable of encoding one or more of the disclosed peptides into the cell without degradation and include a promoter yielding expression of the gene in the cells into which it is delivered. In some embodiments the nucleic acid sequences disclosed herein are derived from any viral families which share the properties of these viruses which make them suitable for use as vectors. Retroviruses include Murine Maloney Leukemia virus, MMLV, and retroviruses that express the desirable properties of MMLV as a vector. Retroviral vectors are able to carry a larger genetic payload, i.e., a transgene or marker gene, than other viral vectors, and for this reason are a commonly used vector. However, they are not as useful in non-proliferating cells. Adenovirus vectors are relatively stable and easy to work with, have high titers, and can be delivered in aerosol formulation, and can transfect non-dividing cells. Pox viral vectors are large and have several sites for inserting genes, they are thermostable and can be stored at room temperature. The viral vectors may be formulated in pharmaceutical compositions as those described above Retroviral vectors, in general, are described by Verma, I. M., Retroviral vectors for gene transfer. In Microbiology, Amer. Soc. for Microbiology, pp. 229-232, Washington, (1985), which is hereby incorporated by reference in its entirety. Examples of methods for using retroviral vectors for gene therapy are described in U.S. Pat. Nos. 4,868,116 and 4,980,286; PCT applications WO 90/02806 and WO 89/07136; and Mulligan, (Science 260:926-932 (1993)); the teachings of which are incorporated herein by reference in their entirety for their teaching of methods for using retroviral vectors for gene therapy.

Other useful systems include, for example, replicating and host-restricted non-replicating vaccinia virus vectors. In addition, the disclosed nucleic acid sequences can be delivered to a target cell in a non-nucleic acid based system. For example, the disclosed polynucleotides can be delivered through electroporation, or through lipofection, or through calcium phosphate precipitation. The delivery mechanism chosen will depend in part on the type of cell targeted and whether the delivery is occurring for example in vivo or in vitro.

Thus, the compositions can comprise, in addition to the disclosed expression vectors, lipids such as liposomes, such as cationic liposomes (e.g., DOTMA, DOPE, DC-cholesterol) or anionic liposomes. Liposomes can further comprise proteins to facilitate targeting a particular cell, if desired. Administration of a composition comprising a peptide and a cationic liposome can be administered to the blood, to a target organ, or inhaled into the respiratory tract to target cells of the respiratory tract. For example, a composition comprising a peptide or nucleic acid sequence described herein and a cationic liposome can be administered to a subjects lung cells. Regarding liposomes, see, e.g., Brigham et al. Am. J. Resp. Cell. Mol. Biol. 1:95-100 (1989); Feigner et al. Proc. Natl. Acad. Sci USA 84:7413-7417 (1987); U.S. Pat. No. 4,897,355. Furthermore, the compound can be administered as a component of a microcapsule that can be targeted to specific cell types, such as macrophages, or where the diffusion of the compound or delivery of the compound from the microcapsule is designed for a specific rate or dosage.

Host cells modified to provide for expression of a dominant negative SARM1 peptide disclosed herein are also contemplated. Such host cells can be modified to express an arginine-degrading enzyme polypeptide from either an episomal or genomically integrated nucleic acid. Such host cells can be produced by any suitable method, e.g., electroporation, transfection or transformation with a vector encoding an arginine-degrading enzyme polypeptide. Host cells can be selected according to a desired use (e.g., mammalian cell expression), and modified to provide for arginine-degrading enzyme expression according to methods well known in the art. Techniques for introducing the vectors into host cells and subsequent culture of the host cells are well known in the art.

Host cells (e.g., mammalian host cells) suitable for replication and expression of arginine-degrading enzyme containing vectors are provided, wherein the cells may be stably or transiently transfected and/or stably or transiently express an arginine-degrading enzyme. Such arginine-degrading enzyme-expressing mammalian cells find use in, for example, production of an arginine-degrading enzyme. Production of arginine-degrading enzyme in mammalian cells can provide for post-translational modifications of the arginine-degrading enzyme and/or to heterologous amino acids to which it may be fused (e.g., glycosylation, cleavage of signal peptide (if present)). In addition, mammalian cell lines can be selected for use in replicating, packaging and producing high titers of virus particles which contain an arginine-degrading enzyme of interest or nucleic acid-encoding an arginine-degrading enzyme. Such arginine-degrading enzyme containing viruses can then be used to provide for delivery of arginine-degrading enzyme-encoding nucleic acids and arginine-degrading enzyme polypeptides to a subject in need thereof.

Exemplary host cells include bacteria, yeast, mammalian cells (e.g., human cells or cell lines), insect cells, and the like. Examples of bacterial host cells include *E. coli* and other bacteria which can find use in cloning, manipulation and production of arginine-degrading enzyme nucleic acids or the production of arginine-degrading enzyme polypeptide. Examples of mammalian cells include, but are not limited to, Chinese hamster ovary (CHO) cells, HEK 293 cells, human cervical carcinoma cells (Hela), canine kidney cells (MDCK), human liver cells (HepG2), baby hamster kidney cells (BHK), and monkey kidney cells (CV1).

b) Components of the Composition

The present disclosure also provides pharmaceutical compositions. The pharmaceutical composition comprises one or more arginine-degrading enzymes or variant thereof, as an active ingredient, and at least one pharmaceutically acceptable excipient.

The pharmaceutically acceptable excipient may be a diluent, a binder, a filler, a buffering agent, a pH modifying agent, a disintegrant, a dispersant, a preservative, a lubricant, taste-masking agent, a flavoring agent, or a coloring agent. The amount and types of excipients utilized to form pharmaceutical compositions may be selected according to known principles of pharmaceutical science.

In each of the embodiments described herein, a composition of the invention may optionally comprise one or more additional drug or therapeutically active agent in addition to the one or more arginine-degrading enzymes or variant thereof. Thus, in addition to the therapies described herein, one may also provide to the subject other therapies known to be efficacious for treatment of the disease, disorder, or condition. In some embodiments, the additional drug or therapeutic agent maybe a small molecule, a polypeptide, a nucleic acid, a cell or cell lysate, a virus (e.g. gene therapy), an antibody or the like. In some embodiments, the administration of one or more arginine-degrading enzyme or derivatives thereof maybe administered before or after surgery. In some embodiments, the secondary agent is selected from a corticosteroid, a non-steroidal anti-inflammatory drug (NSAID), an intravenous immunoglobulin, a kinase inhibitor, a fusion or recombinant protein, a monoclonal antibody, or a combination thereof. In some embodiments, agents suitable for combination therapy include but are not limited to inhaled bronchodilators and inhaled steroids. In some embodiments, suitable combinational therapy incudes weight-loss medications. Non-limiting examples of weight loss medications include orlistat, lorcaserin, phentermine and topiramate, buproprion and naltrexone, and liraglutide.

Several well-established metabolic disease treatments as well as treatments for decreasing lipid levels ranging from non-pharmaceutical to pharmaceutical intervention are known in the art. Non-pharmaceutical interventions include, but are not limited to, dietary restriction, exercise, psychiatric treatment, and surgical treatments to reduce food consumption (e.g., bariatric surgery) or remove fat (e.g., liposuction). Present pharmacological interventions can induce a weight loss of between 5 to 15 kg. Appetite suppressants and energy expenditure or nutrient-modifying agents are the main focus of pharmacological intervention. Dexfenfluramine (Redux), sibutramine (Meridia), beta3-adrenergic agonists, sympathomimetic adrenergic agents (such as amphetamines (dextroamphetamine)), benzphetamine, phendimetrazine, mazindol, diethylpropion, phenylpropanolamine, serotonin (5-HT) reuptake inhibitors (such as sibutramine), and gastrointestinal lipases (such as orlistat) are examples of such pharmacological interventions. See also, Bays, (2004) Obesity Research 12(8):1197-1211, and Klonoff et al., J Diabetes Sci Technol. 2008 September; 2(5):913-8, the contents of each which are incorporated by reference in their entireties. However, if the medication is discontinued, renewed weight gain can ensue. Surgical treatments are comparatively successful, but are complicated, expensive, and have significant risks. Surgical treatments are reserved for patients with extreme obesity and/or with serious medical complications.

(i) Diluent

In one embodiment, the excipient may be a diluent. The diluent may be compressible (i.e., plastically deformable) or abrasively brittle. Non-limiting examples of suitable compressible diluents include microcrystalline cellulose (MCC), cellulose derivatives, cellulose powder, cellulose esters (i.e., acetate and butyrate mixed esters), ethyl cellulose, methyl cellulose, hydroxypropyl cellulose, hydroxypropyl methylcellulose, sodium carboxymethylcellulose, corn starch, phosphated corn starch, pregelatinized corn starch, rice starch, potato starch, tapioca starch, starch-lactose, starch-calcium carbonate, sodium starch glycolate, glucose, fructose, lactose, lactose monohydrate, sucrose, xylose, lactitol, mannitol, malitol, sorbitol, xylitol, maltodextrin, and trehalose. Non-limiting examples of suitable abrasively brittle diluents include dibasic calcium phosphate (anhydrous or dihydrate), calcium phosphate tribasic, calcium carbonate, and magnesium carbonate.

(ii) Binder

In another embodiment, the excipient may be a binder. Suitable binders include, but are not limited to, starches, pregelatinized starches, gelatin, polyvinylpyrrolidone, cellulose, methylcellulose, sodium carboxymethylcellulose, ethylcellulose, polyacrylamides, polyvinyloxoazolidone, polyvinylalcohols, $C_{12}$-$C_{18}$ fatty acid alcohol, polyethylene glycol, polyols, saccharides, oligosaccharides, polypeptides, oligopeptides, and combinations thereof.

(iii) Filler

In another embodiment, the excipient may be a filler. Suitable fillers include, but are not limited to, carbohydrates, inorganic compounds, and polyvinylpyrrolidone. By way of non-limiting example, the filler may be calcium sulfate, both di- and tri-basic, starch, calcium carbonate, magnesium carbonate, microcrystalline cellulose, dibasic calcium phosphate, magnesium carbonate, magnesium oxide, calcium silicate, talc, modified starches, lactose, sucrose, mannitol, or sorbitol.

(iv) Buffering Agent

In still another embodiment, the excipient may be a buffering agent. Representative examples of suitable buffering agents include, but are not limited to, phosphates, carbonates, citrates, tris buffers, and buffered saline salts (e.g., Tris buffered saline or phosphate buffered saline).

(v) pH Modifier

In various embodiments, the excipient may be a pH modifier. By way of non-limiting example, the pH modifying agent may be sodium carbonate, sodium bicarbonate, sodium citrate, citric acid, or phosphoric acid.

(vi) Disintegrant

In a further embodiment, the excipient may be a disintegrant. The disintegrant may be non-effervescent or effervescent. Suitable examples of non-effervescent disintegrants include, but are not limited to, starches such as corn starch, potato starch, pregelatinized and modified starches thereof, sweeteners, clays, such as bentonite, micro-crystalline cellulose, alginates, sodium starch glycolate, gums such as agar, guar, locust bean, karaya, pecitin, and tragacanth. Non-limiting examples of suitable effervescent disintegrants include sodium bicarbonate in combination with citric acid and sodium bicarbonate in combination with tartaric acid.

(vii) Dispersant

In yet another embodiment, the excipient may be a dispersant or dispersing enhancing agent. Suitable dispersants may include, but are not limited to, starch, alginic acid, polyvinylpyrrolidones, guar gum, kaolin, bentonite, purified wood cellulose, sodium starch glycolate, isoamorphous silicate, and microcrystalline cellulose.

(viii) Excipient

In another alternate embodiment, the excipient may be a preservative. Non-limiting examples of suitable preservatives include antioxidants, such as BHA, BHT, vitamin A, vitamin C, vitamin E, or retinyl palmitate, citric acid, sodium citrate; chelators such as EDTA or EGTA; and antimicrobials, such as parabens, chlorobutanol, or phenol.

(ix) Lubricant

In a further embodiment, the excipient may be a lubricant. Non-limiting examples of suitable lubricants include minerals such as talc or silica; and fats such as vegetable stearin, magnesium stearate, or stearic acid.

(x) Taste-Masking Agent

In yet another embodiment, the excipient may be a taste-masking agent. Taste-masking materials include cellulose ethers; polyethylene glycols; polyvinyl alcohol; polyvinyl alcohol and polyethylene glycol copolymers; monoglycerides or triglycerides; acrylic polymers; mixtures of acrylic polymers with cellulose ethers; cellulose acetate phthalate; and combinations thereof.

(xi) Flavoring Agent

In an alternate embodiment, the excipient may be a flavoring agent. Flavoring agents may be chosen from synthetic flavor oils and flavoring aromatics and/or natural oils, extracts from plants, leaves, flowers, fruits, and combinations thereof.

(xii) Coloring Agent

In still a further embodiment, the excipient may be a coloring agent. Suitable color additives include, but are not limited to, food, drug and cosmetic colors (FD&C), drug and cosmetic colors (D&C), or external drug and cosmetic colors (Ext. D&C).

The weight fraction of the excipient or combination of excipients in the composition may be about 99% or less, about 97% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the composition.

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject.

The term "formulation" refers to preparing a drug in a form suitable for administration to a subject, such as a human. Thus, a "formulation" can include pharmaceutically acceptable excipients, including diluents or carriers.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutical active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, parenteral, pulmonary, oral, topical, intradermal, intramuscular, intraperitoneal, intravenous, subcutaneous, intranasal, epidural, ophthalmic, buccal, and rectal. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic or other physical forces.

Controlled-release (or sustained-release) preparations may be formulated to extend the activity of the agent(s) and reduce dosage frequency. Controlled-release preparations can also be used to effect the time of onset of action or other characteristics, such as blood levels of the agent, and consequently affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

(d) Administration (i) Dosage Forms

The composition can be formulated into various dosage forms and administered by a number of different means that will deliver a therapeutically effective amount of the active ingredient. Such compositions can be administered orally (e.g. inhalation), parenterally, or topically in dosage unit formulations containing conventional nontoxic pharmaceutically acceptable carriers, adjuvants, and vehicles as desired. Topical administration may also involve the use of transdermal administration such as transdermal patches or iontophoresis devices. The term parenteral as used herein includes subcutaneous, intravenous, intramuscular, intra-articular, or intrasternal injection, or infusion techniques. Formulation of drugs is discussed in, for example, Gennaro, A. R., Remington's Pharmaceutical Sciences, Mack Publishing Co., Easton, Pa. (18th ed, 1995), and Liberman, H. A. and Lachman, L., Eds., Pharmaceutical Dosage Forms, Marcel Dekker Inc., New York, N.Y. (1980). In a specific embodiment, a composition may be a food supplement or a composition may be a cosmetic.

Solid dosage forms for oral administration include capsules, tablets, caplets, pills, powders, pellets, and granules. In such solid dosage forms, the active ingredient is ordinarily combined with one or more pharmaceutically acceptable excipients, examples of which are detailed above. Oral preparations may also be administered as aqueous suspensions, elixirs, or syrups. For these, the active ingredient may be combined with various sweetening or flavoring agents, coloring agents, and, if so desired, emulsifying and/or suspending agents, as well as diluents such as water, ethanol, glycerin, and combinations thereof. For administration by inhalation, the compounds are delivered in the form of an aerosol spray from pressured container or dispenser which contains a suitable propellant, e.g., a gas such as carbon dioxide, or a nebulizer.

For parenteral administration (including subcutaneous, intraocular, intradermal, intravenous, intramuscular, intra-articular and intraperitoneal), the preparation may be an aqueous or an oil-based solution. Aqueous solutions may include a sterile diluent such as water, saline solution, a pharmaceutically acceptable polyol such as glycerol, propylene glycol, or other synthetic solvents; an antibacterial and/or antifungal agent such as benzyl alcohol, methyl paraben, chlorobutanol, phenol, thimerosal, and the like; an antioxidant such as ascorbic acid or sodium bisulfite; a chelating agent such as etheylenediaminetetraacetic acid; a buffer such as acetate, citrate, or phosphate; and/or an agent for the adjustment of tonicity such as sodium chloride, dextrose, or a polyalcohol such as mannitol or sorbitol. The pH of the aqueous solution may be adjusted with acids or bases such as hydrochloric acid or sodium hydroxide. Oil-based solutions or suspensions may further comprise sesame, peanut, olive oil, or mineral oil. The compositions may be presented in unit-dose or multi-dose containers, for example sealed ampoules and vials, and may be stored in a freeze-dried (lyophilized) condition requiring only the addition of the sterile liquid carried, for example water for injections, immediately prior to use. Extemporaneous injection solutions and suspensions may be prepared from sterile powders, granules, and tablets.

For topical (e.g., transdermal or transmucosal) administration, penetrants appropriate to the barrier to be permeated are generally included in the preparation. Pharmaceutical compositions adapted for topical administration may be formulated as ointments, creams, suspensions, lotions, powders, solutions, pastes, gels, sprays, aerosols, or oils. In some embodiments, the pharmaceutical composition is applied as a topical ointment or cream. When formulated in an ointment, the active ingredient may be employed with either a paraffinic or a water-miscible ointment base. Alternatively, the active ingredient may be formulated in a cream with an oil-in-water cream base or a water-in-oil base. Pharmaceutical compositions adapted for topical administration to the eye include eye drops wherein the active ingredient is dissolved or suspended in a suitable carrier, especially an aqueous solvent. Pharmaceutical compositions adapted for topical administration in the mouth include lozenges, pastilles, and mouth washes. Transmucosal administration may be accomplished through the use of nasal sprays, aerosol sprays, tablets, or suppositories, and transdermal administration may be via ointments, salves, gels, patches, or creams as generally known in the art.

In certain embodiments, a composition comprising the one or more arginine-degrading enzymes or variant thereof, is encapsulated in a suitable vehicle to either aid in the delivery of the compound to target cells, to increase the stability of the composition, or to minimize potential toxicity of the composition. As will be appreciated by a skilled artisan, a variety of vehicles are suitable for delivering a composition of the present invention. Non-limiting examples of suitable structured fluid delivery systems may include nanoparticles, liposomes, microemulsions, micelles, dendrimers, and other phospholipid-containing systems. Methods of incorporating compositions into delivery vehicles are known in the art.

In one alternative embodiment, a liposome delivery vehicle may be utilized. Liposomes, depending upon the embodiment, are suitable for delivery of the one or more arginine-degrading enzymes or variant thereof, in view of their structural and chemical properties. Generally speaking, liposomes are spherical vesicles with a phospholipid bilayer membrane. The lipid bilayer of a liposome may fuse with other bilayers (e.g., the cell membrane), thus delivering the contents of the liposome to cells. In this manner, the composition comprising the one or more arginine-degrading enzymes or variant thereof may be selectively delivered to a cell by encapsulation in a liposome that fuses with the targeted cell's membrane.

Liposomes may be comprised of a variety of different types of phosolipids having varying hydrocarbon chain lengths. Phospholipids generally comprise two fatty acids linked through glycerol phosphate to one of a variety of polar groups. Suitable phospholids include phosphatidic acid (PA), phosphatidylserine (PS), phosphatidylinositol (PI), phosphatidylglycerol (PG), diphosphatidylglycerol (DPG), phosphatidylcholine (PC), and phosphatidylethanolamine (PE). The fatty acid chains comprising the phospholipids may range from about 6 to about 26 carbon atoms in length, and the lipid chains may be saturated or unsaturated. Suitable fatty acid chains include (common name presented in parentheses) n-dodecanoate (laurate), n-tretradecanoate (myristate), n-hexadecanoate (palmitate), n-octadecanoate (stearate), n-eicosanoate (arachidate), n-docosanoate (behenate), n-tetracosanoate (lignocerate), cis-9-hexadecenoate (palmitoleate), cis-9-octadecanoate (oleate), cis,cis-9,12-octadecandienoate (linoleate), all cis-9, 12, 15-octadecatrienoate (linolenate), and all cis-5,8,11,14-eicosatetraenoate (arachidonate). The two fatty acid chains of a phospholipid may be identical or different. Acceptable phospholipids include dioleoyl PS, dioleoyl PC, distearoyl PS, distearoyl PC, dimyristoyl PS, dimyristoyl PC, dipalmitoyl PG, stearoyl, oleoyl PS, palmitoyl, linolenyl PS, and the like.

The phospholipids may come from any natural source, and, as such, may comprise a mixture of phospholipids. For example, egg yolk is rich in PC, PG, and PE, soy beans contains PC, PE, PI, and PA, and animal brain or spinal cord is enriched in PS. Phospholipids may come from synthetic sources too. Mixtures of phospholipids having a varied ratio of individual phospholipids may be used. Mixtures of different phospholipids may result in liposome compositions having advantageous activity or stability of activity properties. The above mentioned phospholipids may be mixed, in optimal ratios with cationic lipids, such as N-(1-(2,3-dioleolyoxy)propyl)-N,N,N-trimethyl ammonium chloride, 1,1'-dioctadecyl-3,3,3',3'-tetramethylindocarbocyanine perchloarate, 3,3'-deheptyloxacarbocyanine iodide, 1,1'-dedodecyl-3,3,3',3'-tetramethylindocarbocyanine perchloarate, 1,1'-dioleyl-3, 3, 3',3'-tetramethylindo carbocyanine methanesulfonate, N-4-(delinoleylaminostyryl)-N-methylpyridinium iodide, or 1,1,-dilinoleyl-3,3,3',3'-tetramethylindocarbocyanine perchloarate.

Liposomes may optionally comprise sphingolipids, in which spingosine is the structural counterpart of glycerol and one of the one fatty acids of a phosphoglyceride, or cholesterol, a major component of animal cell membranes. Liposomes may optionally contain pegylated lipids, which are lipids covalently linked to polymers of polyethylene glycol (PEG). PEGs may range in size from about 500 to about 10,000 daltons.

Liposomes may further comprise a suitable solvent. The solvent may be an organic solvent or an inorganic solvent. Suitable solvents include, but are not limited to, dimethylsulfoxide (DMSO), methylpyrrolidone, N-methylpyrrolidone, acetonitrile, alcohols, dimethylformamide, tetrahydrofuran, or combinations thereof.

Liposomes carrying the one or more of a tricyclic antipsychotic, vasodilator, antibiotic/antiseptic, aryl piperazine or derivatives thereof, may be prepared by any known method of preparing liposomes for drug delivery, such as, for example, detailed in U.S. Pat. Nos. 4,241,046; 4,394,448; 4,529,561; 4,755,388; 4,828,837; 4,925,661; 4,954,345; 4,957,735; 5,043,164; 5,064,655; 5,077,211; and 5,264,618, the disclosures of which are hereby incorporated by reference in their entirety. For example, liposomes may be prepared by sonicating lipids in an aqueous solution, solvent injection, lipid hydration, reverse evaporation, or freeze drying by repeated freezing and thawing. In a preferred embodiment the liposomes are formed by sonication. The liposomes may be multilamellar, which have many layers like an onion, or unilamellar. The liposomes may be large or small. Continued high-shear sonication tends to form smaller unilamellar lipsomes.

As would be apparent to one of ordinary skill, all of the parameters that govern liposome formation may be varied. These parameters include, but are not limited to, temperature, pH, concentration of one or more of a proteotoxicity reducing agent or derivatives thereof, concentration and composition of lipid, concentration of multivalent cations, rate of mixing, presence of and concentration of solvent.

In another embodiment, a composition of the invention may be delivered to a cell as a microemulsion. Microemulsions are generally clear, thermodynamically stable solutions comprising an aqueous solution, a surfactant, and "oil." The "oil" in this case, is the supercritical fluid phase. The surfactant rests at the oil-water interface. Any of a variety of surfactants are suitable for use in microemulsion formulations including those described herein or otherwise known in the art. The aqueous microdomains suitable for use in the invention generally will have characteristic structural dimensions from about 5 nm to about 100 nm. Aggregates of this size are poor scatterers of visible light and hence, these solutions are optically clear. As will be appreciated by a skilled artisan, microemulsions can and will have a multitude of different microscopic structures including sphere, rod, or disc shaped aggregates. In one embodiment, the structure may be micelles, which are the simplest microemulsion structures that are generally spherical or cylindrical objects. Micelles are like drops of oil in water, and reverse micelles are like drops of water in oil. In an alternative embodiment, the microemulsion structure is the lamellae. It comprises consecutive layers of water and oil separated by layers of surfactant. The "oil" of microemulsions optimally comprises phospholipids. Any of the phospholipids detailed above for liposomes are suitable for embodiments directed to microemulsions. The one or more of a tricyclic antipsychotic, vasodilator, antibiotic/antiseptic, aryl piperazine or derivatives thereof may be encapsulated in a microemulsion by any method generally known in the art.

In yet another embodiment, one or more arginine-degrading enzymes or variant thereof, may be delivered in a dendritic macromolecule, or a dendrimer. Generally speaking, a dendrimer is a branched tree-like molecule, in which each branch is an interlinked chain of molecules that divides into two new branches (molecules) after a certain length. This branching continues until the branches (molecules) become so densely packed that the canopy forms a globe. Generally, the properties of dendrimers are determined by the functional groups at their surface. For example, hydrophilic end groups, such as carboxyl groups, would typically make a water-soluble dendrimer. Alternatively, phospholipids may be incorporated in the surface of a dendrimer to facilitate absorption across the skin. Any of the phospholipids detailed for use in liposome embodiments are suitable for use in dendrimer embodiments. Any method generally known in the art may be utilized to make dendrimers and to encapsulate compositions of the invention therein. For example, dendrimers may be produced by an iterative sequence of reaction steps, in which each additional iteration leads to a higher order dendrimer. Consequently, they have a regular, highly branched 3D structure, with nearly uniform size and shape. Furthermore, the final size of a dendrimer is typically controlled by the number of iterative steps used during synthesis. A variety of dendrimer sizes are suitable for use in the invention. Generally, the size of dendrimers may range from about 1 nm to about 100 nm.

Generally, a safe and effective amount of an arginine-degrading enzyme or variant thereof is, for example, that amount that would cause the desired therapeutic effect in a subject while minimizing undesired side effects. In various embodiments, an effective amount of an arginine-degrading enzyme or variant thereof described herein can substantially reduce arginine levels in a subject suffering from a metabolic disease or related disorder. In some embodiments, an effective amount is an amount capable of treating a metabolic disease or related disorder, such as, diabetes mellitus, NAFLD, obesity, and metabolic syndrome. In some embodiments, an effective amount is an amount capable of inducing thermogenesis and/or blocking hepatic steatosis. In some embodiments, an effective amount is an amount capable of improving energy homeostasis, decreasing fat mass, or increasing lean mass in a subject in need thereof. In some embodiments, an effective amount is an amount capable of improving weight loss, improving fat composition, preventing fasting hypothermia or increasing insulin sensitivity subject in need thereof. In some embodiments, an effective amount is an amount capable of protecting against hepatic and peripheral fat accumulation, protecting against hepatic inflammatory responses, or improving glucose intolerance in a subject in need thereof.

When used in the treatments described herein, a therapeutically effective amount of one or more an arginine-degrading enzyme or variant thereof can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to modulate a metabolic disease or related disorder.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, 4th ed., Lippincott Williams & Wilkins, ISBN 0781741475; Sharqel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or to a physician.

Administration of an arginine-degrading enzymes or variant thereof can occur as a single event or over a time course of treatment. For example, one or more of an arginine-degrading enzyme can be administered daily, weekly, bi-weekly, or monthly. For treatment of acute conditions, the time course of treatment will usually be at least several days. Certain conditions could extend treatment from several days to several weeks. For example, treatment could extend over one week, two weeks, or three weeks. For more chronic conditions, treatment could extend from several weeks to several months or even a year or more.

Treatment in accord with the methods described herein can be performed prior to, concurrent with, or after conventional treatment modalities for a metabolic disease or related disorder (e.g. diabetes mellitus, NAFLD, obesity, and metabolic syndrome).

The present disclosure encompasses pharmaceutical compositions comprising compounds as disclosed above, so as to facilitate administration and promote stability of the active agent. For example, a compound of this disclosure may be admixed with at least one pharmaceutically acceptable carrier or excipient resulting in a pharmaceutical composition which is capably and effectively administered (given) to a living subject, such as to a suitable subject (i.e. "a subject in need of treatment" or "a subject in need thereof"). For the purposes of the aspects and embodiments of the invention, the subject may be a human or any other animal.

(II) Methods

The present disclosure encompasses, in general, methods of treating a metabolic disease or related disorder. As used herein, a "metabolic disease" refers to any of the diseases or disorders that disrupt normal metabolism, the process of converting food to energy on a cellular level. Generally, metabolic diseases affect the ability of the cell to perform critical biochemical reactions that involve the processing or transport of proteins (amino acids), carbohydrates (sugars and starches), or lipids (fatty acids). Non-limiting examples of metabolic disease or related disorder include, but are not limited to, metabolic syndrome, fatty liver disease, diabetes, hyperphagia, overweight, obesity, obesity-associated insulin resistance, atherosclerosis, and associated symptoms or complications thereof. They also include such conditions as IDDM (insulin-dependent diabetes mellitus), NIDDM (non insulin-dependent diabetes mellitus), IGT (Impaired Glucose Tolerance), IFG (Impaired Fasting Glucose), leptin disorders, dyslipidemia, cardiovascular disease, Syndrome X (i.e., Metabolic Syndrome), hyperglycemia, elevated blood glucose level, and insulin resistance. "Prediabetic condition" or "prediabetic state" includes IGT and IFG.

Generally, the methods as described herein comprise administration of a therapeutically effective amount of an arginine deprivation agent so as to deplete arginine in a subject or cell. In some embodiments, the methods comprise administration of a therapeutically effective amount of an arginine deprivation agent so the substantially enhance energy homeostasis in a subject suffering from a metabolic disease or disorder. The inventors have surprisingly discovered depletion of arginine in a subject or cell is effective to, in part, improve energy homeostasis, decrease fat mass, increase lean mass, protect from insulin resistance, protect from glucose intolerance, protect from hepatic steatosis or protect from hepatic inflammation. These finding are in stark contrast to Liu, C. et al. Sci. Rep. 6, 20405 (2016) and Xiong, Y. et al., Autophagy. 2014; 10(12):2223-38 which demonstrate that Arg2 activation is potentially pathologic in contexts of high fat-diet-induced liver fat deposition and in atherosclerosis. Moreover, arginine-deficient diets induce liver fat deposition, suggesting that arginine-depletion is hepatotoxic.

In one aspect, the present disclosure encompasses a method of enhancing basal thermogenesis in a subject or cell. In another aspect, the present disclosure encompasses a method for reduction of or maintenance of the body weight in a subject. In still another aspect, the present disclosure encompasses a method for maintaining or improving insulin sensitivity in a cell or subject. In another aspect, the present disclosure encompasses a method for maintaining or improving glucose tolerance in subject or cell. In still yet another aspect, the present disclosure encompasses a method for maintaining or improving glucose tolerance in subject or cell. In another aspect, the present disclosure encompasses a method for treating or preventing hepatic steatosis in a subject or cell. In still another aspect, the present disclosure encompasses a method for reducing hepatic inflammation in subject or cell. In yet another aspect, the present disclosure encompasses a method for reducing or preventing hepatocyte fat accumulation. In still another aspect, the present disclosure encompasses a method for suppressing expression of the regulator of G-protein signaling (RGS) 16 in a cell or subject. In still yet another aspect, the present disclosure provides a composition comprising one or more of an arginine deprivation agent, for use in vitro, in vivo, in situ or ex vivo. As noted above, in general, the methods comprise administering a composition comprising a therapeutically effective amount of an arginine deprivation agent. Suitable compositions comprising an arginine deprivation agent are disclosed herein, for instance those described in Section I.

In one aspect, the present disclosure encompasses a method to treat obesity or obesity-related disorders, diseases, syndromes, and conditions comprising the administration of at least one compound of the present invention for the reduction of or maintenance of the body weight of an obese subject.

The term "obesity" refers to a condition in which there is an excess of body fat. The operational definition of obesity is often based on the Body Mass Index (BMI), which is calculated as body weight per height in meters squared (kg/m 2). An "obese subject" is an otherwise healthy subject with a Body Mass Index (BMI) greater than or equal to 30 kg/m2 or a subject having at least one co-morbidity with a BMI greater than or equal to 27 kg/m 2. A "subject at risk of obesity" is an otherwise healthy subject with a BMI of 25 kg/m 2 to less than 30 kg/m 2 or a subject having at least one co-morbidity with a BMI of 25 kg/m 2 to less than 27 kg/m 2.

The increased risks associated with obesity occur at a lower BMI in Asian populations (Barba, et al. The Lancet, 2004, 363, 157-162). In Asian countries, the available data do not indicate one clear BMI cut-off point for all populations for overweight or obesity individuals. In Japan, "obesity" refers to a condition whereby a subject with at least one obesity-induced or obesity-related co-morbidity, that requires weight reduction or that would be improved by weight reduction, has a BMI greater than or equal to 25 kg/m2. As another example in Asia-Pacific Island populations such as Indonesia and Singapore, a "subject at risk of obesity" is a subject with a BMI of greater than 23 kg/m 2 to less than 25 kg/m 2.

As used herein, the term "obesity" is meant to encompass all of the above definitions of obesity.

Obesity-induced or obesity-related co-morbidities include, but are not limited to, diabetes, impaired glucose tolerance, insulin resistance syndrome, dyslipidemia, hypertension, hyperuricacidemia, gout, coronary artery disease, myocardial infarction, angina pectoris, sleep apnea syndrome, Pickwickian syndrome, fatty liver; cerebral infarction, cerebral thrombosis, transient ischemic attack, orthopedic disorders, arthritis deformans, lumbodynia, emmeniopathy, and infertility. In particular, co-morbidities include: hypertension, hyperlipidemia, dyslipidemia, glucose intolerance, cardiovascular disease, sleep apnea, diabetes mellitus, and other obesity-related conditions.

In one aspect, the disclosure provides methods for reducing excessive fat from the liver of a subject. Liver fat can be measured using standard techniques in the art for example by ultrasound computerized tomography, magnetic resolution and those described by Mehta et al., World J Gastroenterol. 2008 Jun. 14; 14(22): 3476-3483, which is herein incorporated by reference in its entirety. In one aspect, the disclosure provides methods for treating or preventing liver dysfunction, characterized by fatty liver, inflammation and/or insulin resistance. Liver inflammation may be measure using methods described herein, for example, those disclosed in the following Examples. As described herein, systemic administration of an arginine-degrading enzyme or Hepatocyte-specific expression of an arginine-degrading enzyme is shown to attenuate TG accumulation and inflammatory gene markers interleukin 1β (Il-1β), interleukin 6 (Il-6), tumor necrosis factor α (Tnf-α), monocyte chemoattractant protein 1 (Mcp1; also known as Cc12), and CXC chemokine ligand 9 (Cxcl9) in wild-type primary hepatocyte cultures. Moreover, gene expression of insulin-responsive genes, Irs1, Igfbp1, and Ass1, were elevated in livers of subjects treated with composition of the disclosure. Attenuated steatosis was paralleled by decreased fatty acid synthetic genes and fatty acid uptake and export genes in livers of treated subjects. Together, these data suggest that present methods, in part, mitigate hepatocyte fat accumulation, inflammatory responses and insulin sensitivity.

In one embodiment, the present invention relates methods for treating and/or preventing diabetes mellitus and/or conditions related thereto (e.g. diabetic complications). A diabetic subject within the meaning of this disclosure may include subjects who have not previously been treated with an antidiabetic drug (drug-naïve subjects). Thus, in an embodiment, the therapies described herein may be used in naïve subjects. In another embodiment, diabetic subjects within the meaning of this disclosure may include subjects with advanced or late stage type 2 diabetes mellitus (including subjects with failure to conventional antidiabetic therapy), such as e.g. subjects with inadequate glycemic control on one, two or more conventional oral and/or non-oral antidiabetic drugs as defined herein, such as e.g. patients with insufficient glycemic control despite (mono-)therapy with metformin, a thiazolidinedione (particularly pioglitazone), a sulphonylurea, a glinide, GLP-1 or GLP-1 analogue, insulin or insulin analogue, or an α-glucosidase inhibitor, or despite dual combination therapy with metformin/sulphonylurea, metformin/thiazolidinedione (particularly pioglitazone), sulphonylurea/α-glucosidase inhibitor, pioglitazone/sulphonylurea, metformin/insulin, pioglitazone/insulin or sulphonylurea/insulin. Thus, in an embodiment, the therapies described herein may be used in subjects experienced with therapy, e.g. with conventional oral and/or non-oral antidiabetic mono- or dual or triple combination medication as mentioned herein. A further embodiment of diabetic subjects within the meaning of this invention refers to type 2 diabetes patients with or at risk of developing renal complications, such as diabetic nephropathy (including chronic and progressive renal insufficiency, albuminuria, proteinuria, fluid retention in the body (edema) and/or hypertension). In a further embodiment, subjects within the present disclsoure may include type 1 diabetes, LADA or, particularly, type 2 diabetes subjects, with or without obesity or overweight.

The present invention further relates to at least one of the following methods: preventing, slowing the progression of, delaying or treating a metabolic disorder or disease, such as e.g. type 1 diabetes mellitus, type 2 diabetes mellitus, impaired glucose tolerance (IGT), impaired fasting blood glucose (IFG), hyperglycemia, postprandial hyperglycemia, postabsorptive hyperglycemia, overweight, obesity, dyslipidemia, hyperlipidemia, hypercholesterolemia, hypertension, atherosclerosis, endothelial dysfunction, osteoporosis, chronic systemic inflammation, non alcoholic fatty liver disease (NAFLD), retinopathy, neuropathy, nephropathy, polycystic ovarian syndrome, and/or metabolic syndrome; improving and/or maintaining glycemic control and/or for reducing of fasting plasma glucose, of postprandial plasma glucose, of postabsorptive plasma glucose and/or of glycosylated hemoglobin HbA1c; preventing, slowing, delaying or reversing progression from pre-diabetes, impaired glucose tolerance (IGT), impaired fasting blood glucose (IFG), insulin resistance and/or from metabolic syndrome to type 2 diabetes mellitus; preventing, reducing the risk of, slowing the progression of, delaying or treating of complications of diabetes mellitus such as micro- and macrovascular diseases, such as nephropathy, micro- or macroalbuminuria, proteinuria, retinopathy, cataracts, neuropathy, learning or memory impairment, neurodegenerative or cognitive disorders, cardio- or cerebrovascular diseases, tissue ischaemia, diabetic foot or ulcus, atherosclerosis, hypertension, endothelial dysfunction, myocardial infarction, acute coronary syndrome, unstable angina pectoris, stable angina pectoris, peripheral arterial occlusive disease, cardiomyopathy, heart failure, heart rhythm disorders, vascular restenosis, and/or stroke; reducing body weight and/or body fat and/or liver fat and/or intra-myocellular fat or preventing an increase in body weight and/or body fat and/or liver fat and/or intra-myocellular fat or facilitating a reduction in body weight and/or body fat and/or liver fat and/or intra-myocellular fat; preventing, slowing, delaying or treating the degeneration of pancreatic beta cells and/or the decline of the functionality of pancreatic beta cells and/or for improving, preserving and/or restoring the functionality of pancreatic beta cells and/or stimulating and/or restoring or protecting the functionality of pancreatic insulin secretion; preventing, slowing, delaying or treating nonalcoholic fatty liver disease (NAFLD) including hepatic steatosis, non-alcoholic steatohepatitis (NASH) and/or liver fibrosis (such as e.g. preventing, slowing the progression, delaying, attenuating, treating or reversing hepatic steatosis, (hepatic) inflammation and/or an abnormal accumulation of liver fat); preventing, slowing the progression of, delaying or treating type 2 diabetes with failure to conventional antidiabetic mono- or combination therapy; achieving a reduction in the dose of conventional antidiabetic medication required for adequate therapeutic effect; reducing the risk for adverse effects associated with conventional antidiabetic medication (e.g. hypoglycemia or weight gain); and/or maintaining and/or improving the insulin sensitivity and/or for treating or preventing hyperinsulinemia and/or insulin resistance; in a subject in need thereof said method comprising administration of a arginine deprivation agent as defined herein.

Methods described herein are generally performed on a subject in need thereof. A subject may be a rodent, a human, a livestock animal, a companion animal, or a zoological animal. In one embodiment, the subject may be a rodent, e.g. a mouse, a rat, a guinea pig, etc. In another embodiment, the subject may be a livestock animal. Non-limiting examples of suitable livestock animals may include pigs, cows, horses, goats, sheep, llamas and alpacas. In still another embodiment, the subject may be a companion animal. Non-limiting examples of companion animals may include pets such as dogs, cats, rabbits, and birds. In yet another embodiment, the subject may be a zoological animal. As used herein, a "zoological animal" refers to an animal that may be found in a zoo. Such animals may include non-human primates, large cats, wolves, and bears. In a preferred embodiment, the subject is a human. In some embodiments, the subject is already suspected to have a metabolic disease. In other embodiments, the subject is being treated for a metabolic disease, before being treated according to the methods of the invention. In other embodiments, the subject is not being treated for a metabolic disease, before being treated according to the methods of the invention. In some embodiments, efficacy measurements are made relative to an untreated subject. In other embodiments, efficacy measurements are made relative to the same subject prior to or during treatment of the subject.

(III) Kits

Also provided are kits. Such kits can include an agent or composition described herein and, in certain embodiments, instructions for administration. Such kits can facilitate performance of the methods described herein. When supplied as a kit, the different components of the composition can be packaged in separate containers and admixed immediately before use. Components include, but are not limited to compositions and pharmaceutical formulations comprising one or more arginine-degrading enzymes, as described herein. Such packaging of the components separately can, if desired, be presented in a pack or dispenser device which may contain one or more unit dosage forms containing the composition. The pack may, for example, comprise metal or plastic foil such as a blister pack. Such packaging of the components separately can also, in certain instances, permit long-term storage without losing activity of the components.

Kits may also include reagents in separate containers such as, for example, sterile water or saline to be added to a lyophilized active component packaged separately. For example, sealed glass ampules may contain a lyophilized component and in a separate ampule, sterile water, sterile saline or sterile each of which has been packaged under a neutral non-reacting gas, such as nitrogen. Ampules may consist of any suitable material, such as glass, organic polymers, such as polycarbonate, polystyrene, ceramic, metal or any other material typically employed to hold reagents. Other examples of suitable containers include bottles that may be fabricated from similar substances as ampules, and envelopes that may consist of foil-lined interiors, such as aluminum or an alloy. Other containers include test tubes, vials, flasks, bottles, syringes, and the like. Containers may have a sterile access port, such as a bottle having a stopper that can be pierced by a hypodermic injection needle. Other containers may have two compartments that are separated by a readily removable membrane that upon removal permits the components to mix. Removable membranes may be glass, plastic, rubber, and the like.

In certain embodiments, kits can be supplied with instructional materials. Instructions may be printed on paper or other substrate, and/or may be supplied as an electronic-readable medium, such as a floppy disc, mini-CD-ROM, CD-ROM, DVD-ROM, Zip disc, videotape, audio tape, and the like. Detailed instructions may not be physically associated with the kit; instead, a user may be directed to an Internet web site specified by the manufacturer or distributor of the kit.

Compositions and methods described herein utilizing molecular biology protocols can be according to a variety of standard techniques known to the art (see, e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754; Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Definitions

When introducing elements of the present disclosure or the preferred aspects(s) thereof, the articles "a," "an," "the," and "said" are intended to mean that there are one or more of the elements. The terms "comprising," "including," and "having" are intended to be inclusive and mean that there may be additional elements other than the listed elements.

As used herein, the following definitions shall apply unless otherwise indicated. For purposes of this invention, the chemical elements are identified in accordance with the Periodic Table of the Elements, CAS version, and the Handbook of Chemistry and Physics, 75$^{th}$ Ed. 1994. Additionally, general principles of organic chemistry are described in "Organic Chemistry," Thomas Sorrell, University Science Books, Sausalito: 1999, and "March's Advanced Organic Chemistry," 5$^{th}$ Ed., Smith, M. B. and March, J., eds. John Wiley & Sons, New York: 2001, the entire contents of which are hereby incorporated by reference.

The term "mmol", as used herein, is intended to mean millimole. The term "equiv", as used herein, is intended to mean equivalent. The term "mL", as used herein, is intended to mean milliliter. The term "g", as used herein, is intended to mean gram. The term "kg", as used herein, is intended to mean kilogram. The term "µg", as used herein, is intended to mean micrograms. The term "h", as used herein, is intended to mean hour. The term "min", as used herein, is intended to mean minute. The term "M", as used herein, is intended to mean molar. The term "µL", as used herein, is intended to mean microliter. The term "µM", as used herein, is intended to mean micromolar. The term "nM", as used herein, is intended to mean nanomolar. The term "N", as used herein, is intended to mean normal. The term "amu", as used herein, is intended to mean atomic mass unit. The term "° C.", as used herein, is intended to mean degree Celsius. The term "wt/wt", as used herein, is intended to mean weight/weight. The term "v/v", as used herein, is intended to mean volume/volume. The term "MS", as used herein, is intended to mean mass spectroscopy. The term "HPLC", as used herein, is intended to mean high performance liquid chromatograph. The term "RT", as used herein, is intended to mean room temperature. The term "e.g.", as used herein, is intended to mean example. The term "N/A", as used herein, is intended to mean not tested.

As used herein, the expression "pharmaceutically acceptable salt" refers to pharmaceutically acceptable organic or inorganic salts of a compound of the invention. Preferred salts include, but are not limited, to sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, or pamoate (i.e., 1,1'-methylene-bis-(2-hydroxy-3-naphthoate)) salts. A pharmaceutically acceptable salt may involve the inclusion of another molecule such as an acetate ion, a succinate ion or other counterion. The counterion may be any organic or inorganic moiety that stabilizes the charge on the parent compound. Furthermore, a pharmaceutically acceptable salt may have more than one charged atom in its structure. Instances where multiple charged atoms are part of the pharmaceutically acceptable salt can have multiple counterions. Hence, a pharmaceutically acceptable salt can have one or more charged atoms and/or one or more counterion. As used herein, the expression "pharmaceutically acceptable solvate" refers to an association of one or more solvent molecules and a compound of the invention. Examples of solvents that form pharmaceutically acceptable solvates include, but are not limited to, water, isopropanol, ethanol, methanol, DMSO, ethyl acetate, acetic acid, and ethanolamine. As used herein, the expression "pharmaceutically acceptable hydrate" refers to a compound of the invention, or a salt thereof, that further includes a stoichiometric or non-stoichiometric amount of water bound by non-covalent intermolecular forces.

The terms "heterologous DNA sequence", "exogenous DNA segment" or "heterologous nucleic acid," as used herein, each refer to a sequence that originates from a source foreign to the particular host cell or, if from the same source, is modified from its original form. Thus, a heterologous gene in a host cell includes a gene that is endogenous to the particular host cell but has been modified through, for example, the use of DNA shuffling. The terms also include non-naturally occurring multiple copies of a naturally occurring DNA sequence. Thus, the terms refer to a DNA segment that is foreign or heterologous to the cell, or homologous to the cell but in a position within the host cell nucleic acid in which the element is not ordinarily found. Exogenous DNA segments are expressed to yield exogenous polypeptides. A "homologous" DNA sequence is a DNA sequence that is naturally associated with a host cell into which it is introduced.

Expression vector, expression construct, plasmid, or recombinant DNA construct is generally understood to refer to a nucleic acid that has been generated via human intervention, including by recombinant means or direct chemical synthesis, with a series of specified nucleic acid elements that permit transcription or translation of a particular nucleic acid in, for example, a host cell. The expression vector can be part of a plasmid, virus, or nucleic acid fragment. Typically, the expression vector can include a nucleic acid to be transcribed operably linked to a promoter.

A "promoter" is generally understood as a nucleic acid control sequence that directs transcription of a nucleic acid. An inducible promoter is generally understood as a promoter that mediates transcription of an operably linked gene in response to a particular stimulus. A promoter can include necessary nucleic acid sequences near the start site of transcription, such as, in the case of a polymerase II type promoter, a TATA element. A promoter can optionally include distal enhancer or repressor elements, which can be located as much as several thousand base pairs from the start site of transcription.

A "transcribable nucleic acid molecule" as used herein refers to any nucleic acid molecule capable of being transcribed into a RNA molecule. Methods are known for introducing constructs into a cell in such a manner that the transcribable nucleic acid molecule is transcribed into a functional mRNA molecule that is translated and therefore expressed as a protein product. Constructs may also be constructed to be capable of expressing antisense RNA molecules, in order to inhibit translation of a specific RNA molecule of interest. For the practice of the present disclosure, conventional compositions and methods for preparing and using constructs and host cells are well known to one skilled in the art (see e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754).

The "transcription start site" or "initiation site" is the position surrounding the first nucleotide that is part of the transcribed sequence, which is also defined as position +1. With respect to this site all other sequences of the gene and its controlling regions can be numbered. Downstream sequences (i.e., further protein encoding sequences in the 3' direction) can be denominated positive, while upstream sequences (mostly of the controlling regions in the 5' direction) are denominated negative.

A nucleic acid sequence or amino acid sequence (e.g., DNA, RNA, a genetic sequence, polynucleotide, oligonucleotide, primer, protein, polypeptide, peptide) can have about 80%; about 81%; about 82%; about 83%; about 84%; about 85%; about 86%; about 87%; about 88%; about 89%; about 90%; about 91%; about 92%; about 93%; about 94%; about 95%; about 96%; about 97%; about 98%; or about 99% sequence identity to a reference sequence or a naturally occurring sequence or contain at least one substitution modification to the reference sequence or naturally occurring sequence. Recitation of each of these discrete values is understood to include ranges between each value.

A nucleic acid sequence or an amino acid sequence can be operably linked to a heterologous promoter.

"Operably-linked" or "functionally linked" refers preferably to the association of nucleic acid sequences on a single nucleic acid fragment so that the function of one is affected by the other. For example, a regulatory DNA sequence is said to be "operably linked to" or "associated with" a DNA sequence that codes for an RNA or a polypeptide if the two sequences are situated such that the regulatory DNA sequence affects expression of the coding DNA sequence (i.e., that the coding sequence or functional RNA is under the transcriptional control of the promoter). Coding sequences can be operably-linked to regulatory sequences in sense or antisense orientation. The two nucleic acid molecules may be part of a single contiguous nucleic acid molecule and may be adjacent. For example, a promoter is operably linked to a gene of interest if the promoter regulates or mediates transcription of the gene of interest in a cell.

A "construct" is generally understood as any recombinant nucleic acid molecule such as a plasmid, cosmid, virus, autonomously replicating nucleic acid molecule, phage, or linear or circular single-stranded or double-stranded DNA or RNA nucleic acid molecule, derived from any source, capable of genomic integration or autonomous replication, comprising a nucleic acid molecule where one or more nucleic acid molecule has been operably linked.

A constructs of the present disclosure can contain a promoter operably linked to a transcribable nucleic acid molecule operably linked to a 3' transcription termination nucleic acid molecule. In addition, constructs can include but are not limited to additional regulatory nucleic acid molecules from, e.g., the 3'-untranslated region (3' UTR). Constructs can include but are not limited to the 5' untranslated regions (5' UTR) of an mRNA nucleic acid molecule which can play an important role in translation initiation and can also be a genetic component in an expression construct. These additional upstream and downstream regulatory nucleic acid molecules may be derived from a source that is native or heterologous with respect to the other elements present on the promoter construct.

The term "transformation" refers to the transfer of a nucleic acid fragment into the genome of a host cell, resulting in genetically stable inheritance. Host cells containing the transformed nucleic acid fragments are referred to as "transgenic" cells, and organisms comprising transgenic cells are referred to as "transgenic organisms".

"Transformed," "transgenic," and "recombinant" refer to a host cell or organism such as a bacterium, cyanobacterium, animal or a plant into which a heterologous nucleic acid molecule has been introduced. The nucleic acid molecule can be stably integrated into the genome as generally known in the art and disclosed (Sambrook 1989; Innis 1995; Gelfand 1995; Innis & Gelfand 1999). Known methods of PCR include, but are not limited to, methods using paired primers, nested primers, single specific primers, degenerate primers, gene-specific primers, vector-specific primers, partially mismatched primers, and the like. The term "untransformed" refers to normal cells that have not been through the transformation process.

"Wild-type" refers to a virus or organism found in nature without any known mutation.

Design, generation, and testing of the variant nucleotides, and their encoded polypeptides, having the above required percent identities and retaining a required activity of the expressed protein is within the skill of the art. For example, directed evolution and rapid isolation of mutants can be according to methods described in references including, but not limited to, Link et al. (2007) Nature Reviews 5(9), 680-688; Sanger et al. (1991) Gene 97(1), 119-123; Ghadessy et al. (2001) Proc Natl Acad Sci USA 98(8) 4552-4557. Thus, one skilled in the art could generate a large number of nucleotide and/or polypeptide variants having, for example, at least 95-99% identity to the reference sequence described herein and screen such for desired phenotypes according to methods routine in the art.

Nucleotide and/or amino acid sequence identity percent (%) is understood as the percentage of nucleotide or amino acid residues that are identical with nucleotide or amino acid residues in a candidate sequence in comparison to a reference sequence when the two sequences are aligned. To determine percent identity, sequences are aligned and if necessary, gaps are introduced to achieve the maximum percent sequence identity. Sequence alignment procedures to determine percent identity are well known to those of skill in the art. Often publicly available computer software such as BLAST, BLAST2, ALIGN2 or Megalign (DNASTAR) software is used to align sequences. Those skilled in the art can determine appropriate parameters for measuring alignment, including any algorithms needed to achieve maximal alignment over the full-length of the sequences being compared. When sequences are aligned, the percent sequence identity of a given sequence A to, with, or against a given sequence B (which can alternatively be phrased as a given sequence A that has or comprises a certain percent sequence identity to, with, or against a given sequence B) can be calculated as: percent sequence identity=X/Y100, where X is the number of residues scored as identical matches by the sequence alignment program's or algorithm's alignment of A and B and Y is the total number of residues in B. If the length of sequence A is not equal to the length of sequence B, the percent sequence identity of A to B will not equal the percent sequence identity of B to A.

Generally, conservative substitutions can be made at any position so long as the required activity is retained. So-called conservative exchanges can be carried out in which the amino acid which is replaced has a similar property as the original amino acid, for example the exchange of Glu by Asp, Gln by Asn, Val by lie, Leu by lie, and Ser by Thr. For example, amino acids with similar properties can be Aliphatic amino acids (e.g., Glycine, Alanine, Valine, Leucine, Isoleucine); Hydroxyl or sulfur/selenium-containing amino acids (e.g., Serine, Cysteine, Selenocysteine, Threonine, Methionine); Cyclic amino acids (e.g., Proline); Aromatic amino acids (e.g., Phenylalanine, Tyrosine, Tryptophan); Basic amino acids (e.g., Histidine, Lysine, Arginine); or Acidic and their Amide (e.g., Aspartate, Glutamate, Asparagine, Glutamine). Deletion is the replacement of an amino acid by a direct bond. Positions for deletions include the termini of a polypeptide and linkages between individual protein domains. Insertions are introductions of amino acids into the polypeptide chain, a direct bond formally being replaced by one or more amino acids. Amino acid sequence can be modulated with the help of art-known computer simulation programs that can produce a polypeptide with, for example, improved activity or altered regulation. On the basis of this artificially generated polypeptide sequences, a corresponding nucleic acid molecule coding for such a modulated polypeptide can be synthesized in-vitro using the specific codon-usage of the desired host cell.

"Highly stringent hybridization conditions" are defined as hybridization at 65° C. in a 6×SSC buffer (i.e., 0.9 M sodium chloride and 0.09 M sodium citrate). Given these conditions, a determination can be made as to whether a given set of sequences will hybridize by calculating the melting temperature (Tm) of a DNA duplex between the two sequences. If a particular duplex has a melting temperature lower than 65° C. in the salt conditions of a 6×SSC, then the two sequences will not hybridize. On the other hand, if the melting temperature is above 65 OC in the same salt conditions, then the sequences will hybridize. In general, the melting temperature for any hybridized DNA:DNA sequence can be determined using the following formula: Tm=81.5° C. +16.6(log 10[Na+])+0.41 (fraction G/C content) −0.63(% formamide) −(600/l). Furthermore, the Tm of a DNA:DNA hybrid is decreased by 1-1.5° C. for every 1% decrease in nucleotide identity (see e.g., Sambrook and Russel, 2006).

Host cells can be transformed using a variety of standard techniques known to the art (see, e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754). Such techniques include, but are not limited to, viral infection, calcium phosphate transfection, liposome-mediated transfection, microprojectile-mediated delivery, receptor-mediated uptake, cell fusion, electroporation, and the like. The transfected cells can be selected and propagated to provide recombinant host cells that comprise the expression vector stably integrated in the host cell genome.

Exemplary nucleic acids which may be introduced to a host cell include, for example, DNA sequences or genes from another species, or even genes or sequences which originate with or are present in the same species, but are incorporated into recipient cells by genetic engineering methods. The term "exogenous" is also intended to refer to genes that are not normally present in the cell being transformed, or perhaps simply not present in the form, structure, etc., as found in the transforming DNA segment or gene, or genes which are normally present and that one desires to express in a manner that differs from the natural expression pattern, e.g., to over-express. Thus, the term "exogenous" gene or DNA is intended to refer to any gene or DNA segment that is introduced into a recipient cell, regardless of whether a similar gene may already be present in such a cell. The type of DNA included in the exogenous DNA can include DNA which is already present in the cell, DNA from another individual of the same type of organism, DNA from a different organism, or a DNA generated externally, such as a DNA sequence containing an antisense message of a gene, or a DNA sequence encoding a synthetic or modified version of a gene.

Host strains developed according to the approaches described herein can be evaluated by a number of means known in the art (see e.g., Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Methods of down-regulation or silencing genes are known in the art. For example, expressed protein activity can be down-regulated or eliminated using antisense oligonucleotides, protein aptamers, nucleotide aptamers, and RNA interference (RNAi) (e.g., small interfering RNAs (siRNA), short hairpin RNA (shRNA), and micro RNAs (miRNA) (see e.g., Fanning and Symonds (2006) Handb Exp Pharmacol. 173, 289-303G, describing hammerhead ribozymes and small hairpin RNA; Helene, C., et al. (1992) Ann. N.Y. Acad. Sci. 660, 27-36; Maher (1992) Bioassays 14(12): 807-15, describing targeting deoxyribonucleotide sequences; Lee et al. (2006) Curr Opin Chem Biol. 10, 1-8, describing aptamers; Reynolds et al. (2004) Nature Biotechnology 22(3), 326-330, describing RNAi; Pushparaj and Melendez (2006) Clinical and Experimental Pharmacology and Physiology 33(5-6); 504-510, describing RNAi; Dillon et al. (2005) Annual Review of Physiology 67, 147-173, describing RNAi; Dykxhoorn and Lieberman (2005) Annual Review of Medicine 56, 401-423, describing RNAi). RNAi molecules are commercially available from a variety of sources (e.g., Ambion, TX; Sigma Aldrich, MO; Invitrogen). Several siRNA molecule design programs using a variety of algorithms are known to the art (see e.g., Cenix algorithm, Ambion; BLOCK-iT™ RNAi Designer, Invitrogen; siRNA Whitehead Institute Design Tools, Bioinofrmatics & Research Computing). Traits influential in defining optimal siRNA sequences include G/C content at the termini of the siRNAs, Tm of specific internal domains of the siRNA, siRNA length, position of the target sequence within the CDS (coding region), and nucleotide content of the 3' overhangs.

Specific embodiments disclosed herein may be further limited in the claims using "consisting of" or "consisting essentially of" language, rather than "comprising". When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

As various changes could be made in the above-described materials and methods without departing from the scope of the invention, it is intended that all matter contained in the above description and in the examples given below, shall be interpreted as illustrative and not in a limiting sense.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Hepatic Arginase 2 (Arg2) is Sufficient to Convey the Therapeutic Metabolic Effects of Fasting Caloric restriction and intermittent fasting are emerging therapeutic strategies against obesity, insulin resistance and their complications. However, the effectors that drive this response are not completely defined. Here the inventors identify arginase 2 (Arg2) as a fasting-induced hepatocyte factor that protects against hepatic and peripheral fat accumulation, hepatic inflammatory responses, and insulin and glucose intolerance in obese murine models. Arg2 is upregulated in fasting conditions and upon treatment with the hepatocyte glucose transporter inhibitor trehalose. Hepatocyte-specific Arg2 overexpression enhances basal thermogenesis, and protects from weight gain, insulin resistance, glucose intolerance, hepatic steatosis and hepatic inflammation in diabetic mouse models. Arg2 suppresses expression of the regulator of G-protein signalling (RGS) 16, and genetic RGS16 reconstitution reverses the effects of Arg2 overexpression. The following example shows that hepatocyte Arg2 is a critical effector of the hepatic glucose fasting response and defines a therapeutic target to mitigate the complications of metabolic diseases and related disorders.

Obesigenic cardiometabolic disease arises from a constellation of environmental, genetic and meta- and epigenetic factors[1]. Clinically, intensive lifestyle management remains the primary means of treating obesity and its comorbidities, including insulin resistance, non-alcoholic fatty liver disease (NAFLD), and thermic depression. Intensive lifestyle management encompasses a wide range of interventions, such as increased locomotion, selective macronutrient elimination (e.g., ketogenic diets), intermittent fasting (IF), and caloric restriction (CR)[2]. Although lifestyle measures effectively treat obesity, insulin resistance and NAFLD[2,3,4,5,6,7,8], caloric restriction, fasting and extreme dietary alterations are often unsustainable, unpalatable, and are in some cases associated with clinical complications[9,10,11].

At the nexus of portal and systemic circulations, the hepatocyte coordinates peripheral responses to changes in nutrient flux. During physiological fasting, the hepatocyte provides glucose and ketones as fuel for fasting peripheral organs. In addition, hepatocyte-derived endocrine signals, such as fibroblast growth factor 21 (FGF21), enhance peripheral insulin sensitivity and promote basal thermogenesis. These adaptations ostensibly maintain thermic equilibrium during prolonged fasting and hibernation, and maximize post-fasting nutrient absorption[12,13,14,15,16]. The physiological fasting response is itself induced by several key transcriptional regulators that are also activated during fasting: peroxisome proliferator activated receptor α (PPARα), PPARγ coactivator 1α (PGC1α), SIRT1[17-18], and transcription factor EB (TFEB)[19,20,21,22,23]. However, surprisingly little is known regarding hepatocyte-intrinsic factors that regulate hepatic and extrahepatic responses to fasting.

Previous work by the inventors demonstrated that hepatic glucose transport blockade is sufficient to confer or augment the adaptive metabolic changes associated with generalized caloric restriction and intermittent fasting[24,25,26,27,28,29]. Germline deletion of the hepatic glucose transporter (GLUT) 8 increased hepatocyte fatty acid oxidation and decreased fructose-induced de novo lipogenesis in isolated hepatocytes[25]. In vivo, targeted GLUT8 disruption increased basal thermogenesis[25,27,28,] protected from diet-induced NAFLD and insulin resistance, and augmented canonical hepatic fasting responses (e.g., PPARα and FGF21[25,27,28]). Similarly, pharmacological hepatic GLUT inhibition by the GLUT inhibitor, trehalose, activated hepatocyte fasting responses—autophagic flux and FGF21 secretion—that was dependent on hepatocyte TFEB[24,30,31]. The hepatic response to pharmacological hepatic GLUT inhibition is to activate thermogenesis, and reduce hepatic steatosis and insulin resistance[24,26,30,32]. The full mechanisms driving the hepatocyte glucose fasting response and the utility of these responses against cardiometabolic disease, however, are only now being elucidated.

Here, the inventors identify the arginine metabolizing enzyme, arginase 2 (Arg2) as a hepatocyte glucose fasting-induced factor that is sufficient to convey the adaptive hepatic and peripheral metabolic changes induced during CR and IF. Hepatocyte Arg2 mRNA and protein expression is induced during acute and prolonged fasting, and after treatment with the hepatic GLUT inhibitor, trehalose. Hepatocyte-specific Arg2 overexpression increases basal thermogenesis, enhances insulin sensitivity, and decreases hepatic steatosis and inflammation in genetic and diet-induced models of diabetes and NAFLD. Unbiased transcriptomic analysis identifies the regulator of G-protein-coupled receptor signaling (RGS) 16 to be among the most highly suppressed hepatic genes in Arg2-overexpressing db/db diabetic mice. Moreover, hepatocyte-specific genetic RGS16 reconstitution in the context of Arg2 overexpression reverses the hepatic and peripheral therapeutic effects of Arg2 overexpression. Thus, Arg2 represents an effector of the hepatocyte-intrinsic fasting response that modulates hepatic and extrahepatic metabolic homeostasis, and that the trehalose class of disaccharide GLUT inhibitors activates this pathway. More broadly, this example identifies a seminal link between hepatic Arg2 and G-protein signaling in the pathogenesis of metabolic disease.

Arg2 is Induced During Fasting and Pseudo-Fasting

Figure 1B:
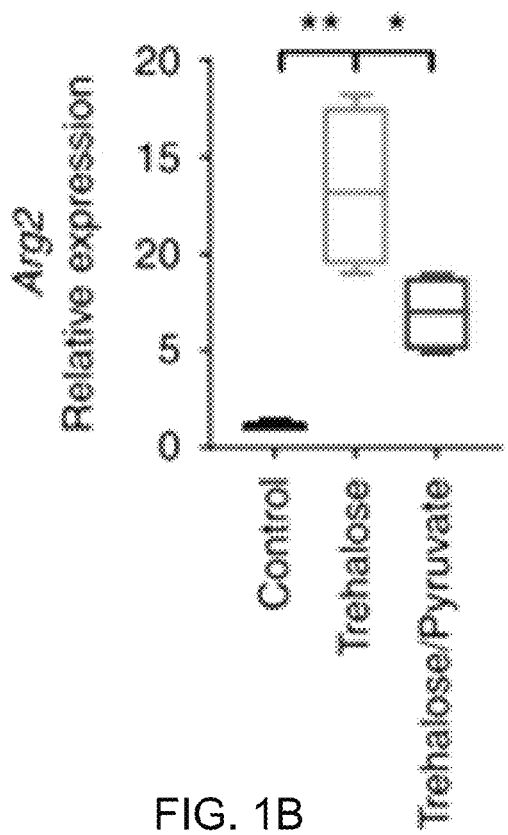
Figure 1C:
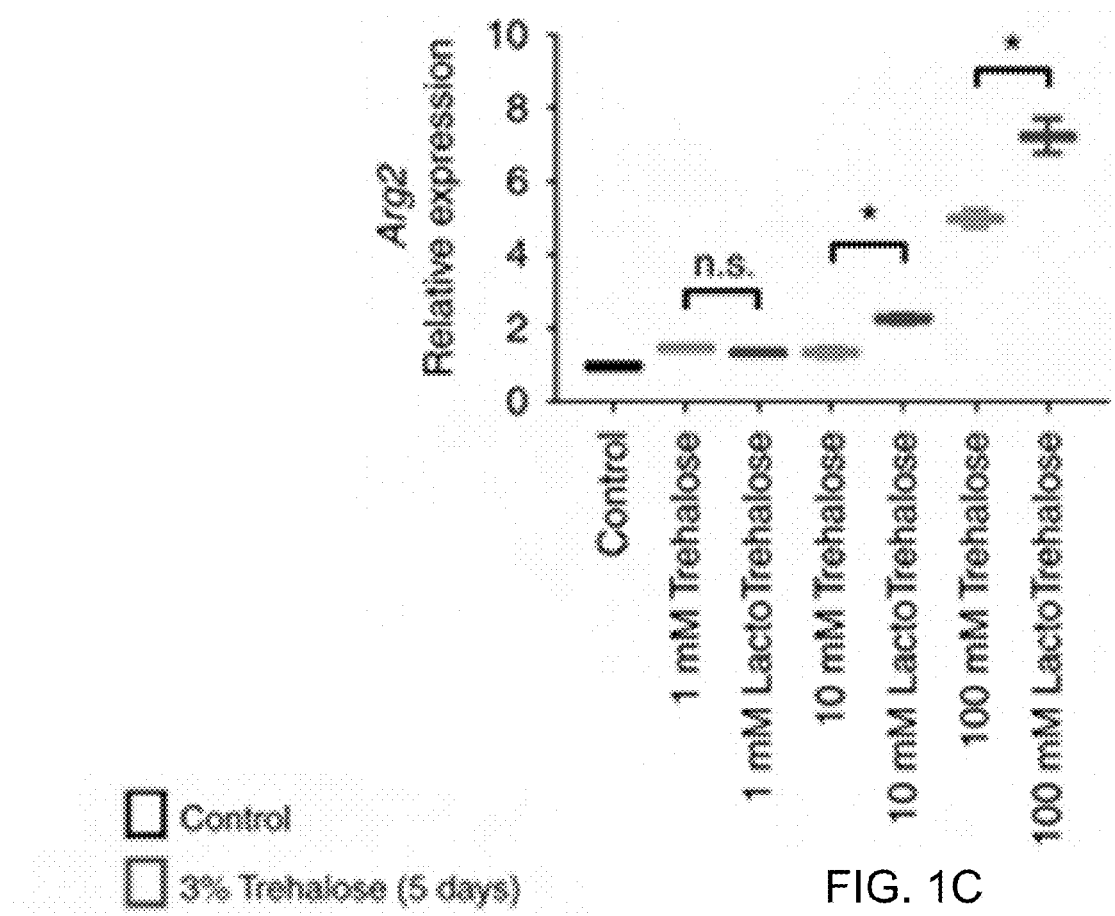
Figure 1D:
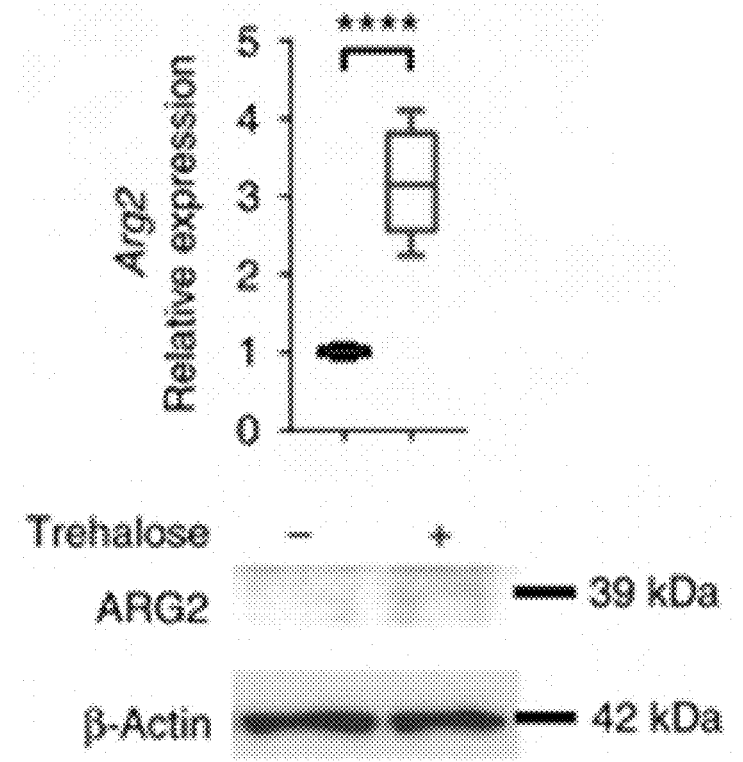
Figure 1E:
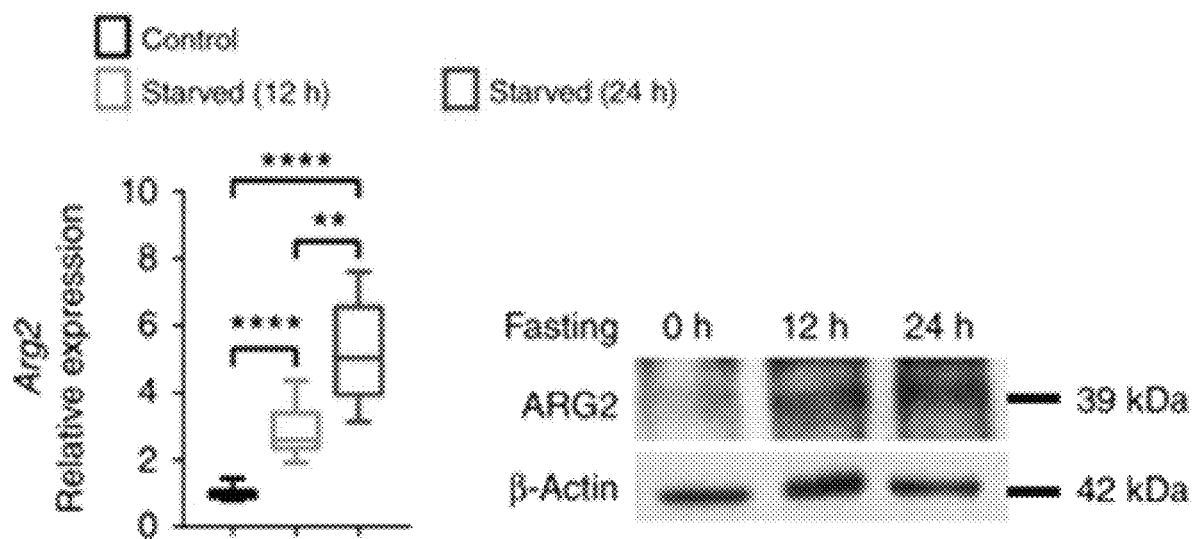
Figure 1F:
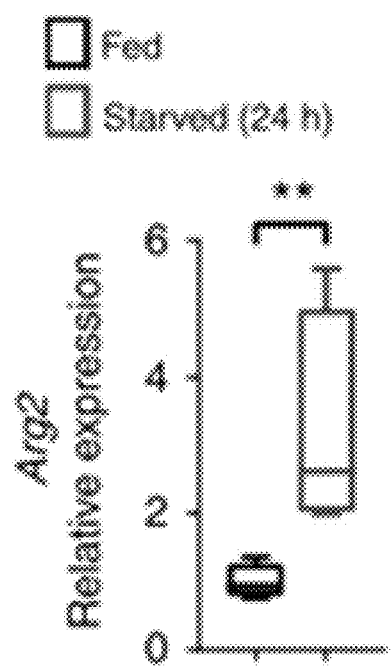

Previous work demonstrated that glucose transporter inhibition by the hepatic GLUT inhibitor, trehalose, enhances peripheral thermogenesis, and mitigates hepatic steatosis by inducing hepatocyte fasting-like pathways[24,26,29]. RNA-seq analysis of trehalose-treated primary hepatocytes identified hepatocyte arginase 2 (Arg2) to be among the most highly upregulated genes relative to untreated hepatocytes. Confirmation of these data by quantitative real-time RT-PCR (qPCR) and immunoblot analysis, demonstrating rapid, dose-dependent, cell autonomous Arg2 induction within 24 h post trehalose (1 mM, 10 mM, and 100 mM) treatment (FIG. 1A). This Arg2 response was energy deficit-dependent, as indicated by pre-treating cells with pyruvate as an energy substrate to bypass the GLUTs targeted by 100 mM trehalose. Pyruvate significantly reduced the trehalose-induced Arg2 response to trehalose (FIG. 1B). Because trehalose catabolism by host (brush border, hepatocyte, or renal) or microbiotic trehalases can theoretically reduce the bioavailability of orally administered trehalose therapy, the potency of native trehalose with that of a trehalase-resistant analog, lactotrehalose was compared[32,33,34,] to induce Arg2 expression in vitro (FIG. 1C). Lactotrehalose-induced Arg2 expression indeed was significantly enhanced at 10 mM and 100 mM when compared with native trehalose at equivalent doses (FIG. 1C). Trehalose similarly induced Arg2 mRNA and protein in livers from mice fed 3% trehalose water (5 days) ad libitum in vivo (FIG. 1D). The similarities between trehalose-induced pseudo-fasting responses in the liver and physiological macronutrient withdrawal prompted us to quantify the Arg2 response in livers from mice fasting up to 24 h. qPCR and immunoblot analysis identified Arg2 to be activated during physiological fasting (FIG. 1E). Arg2 upregulation during fasting is cell-intrinsic, as determined by subjecting isolated primary murine hepatocytes to serum and glucose deprivation (24 h), after which Arg2 mRNA expression was significantly upregulated (FIG. 1F).

Figure 1G:
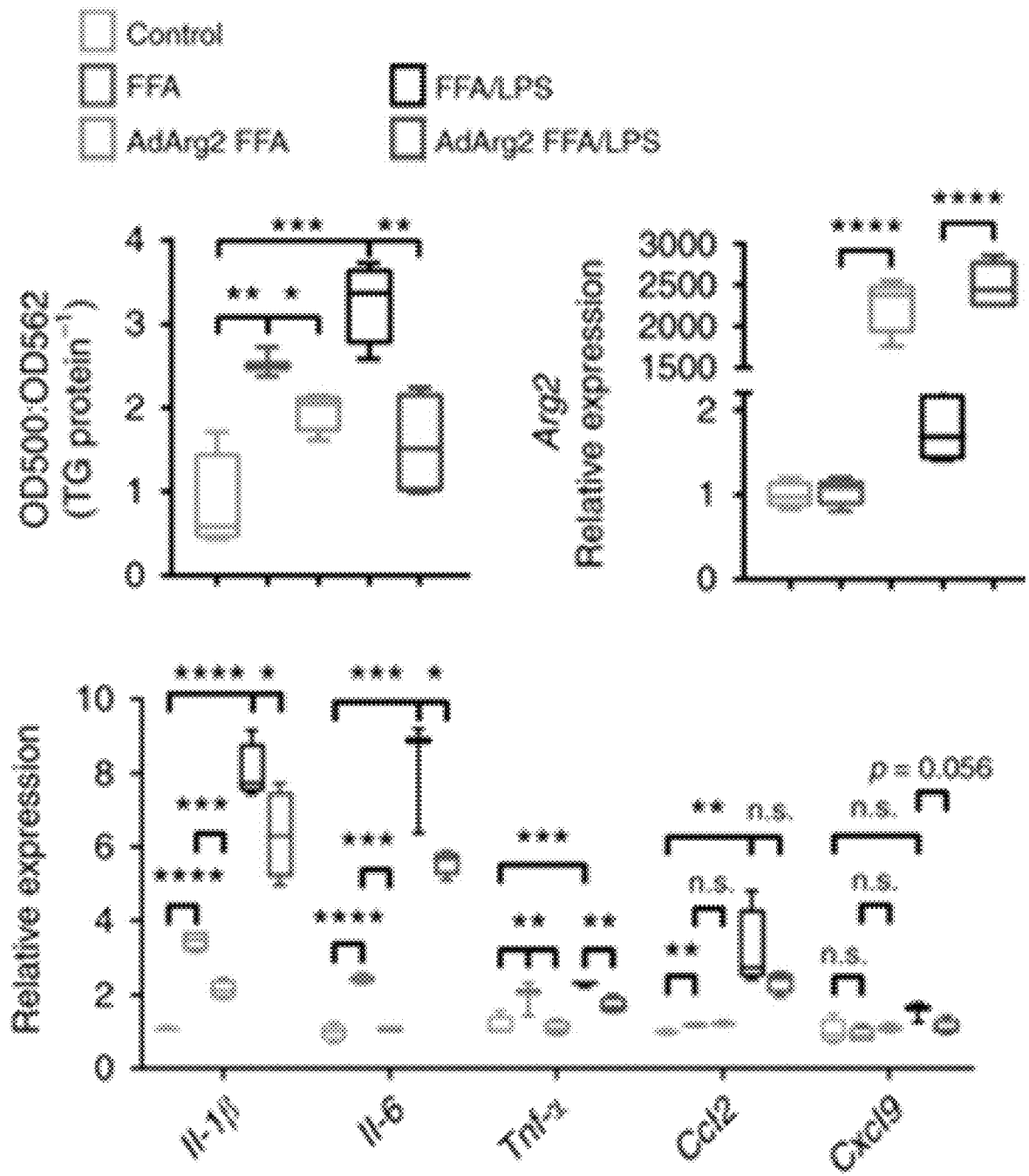
Figure 1H:
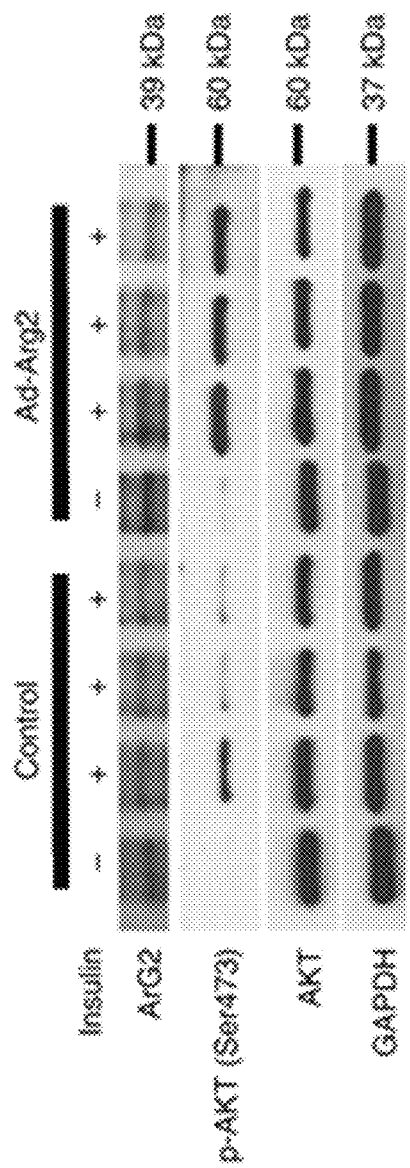

Hepatocyte glucose transport blockade attenuates insulin resistance and hepatic steatosis in multiple obese models[24,25,27,28,29]. To test the hypothesis that hepatocyte Arg2 activation downstream of the fasting response is sufficient to drive these therapeutic effects, we examined the cell-intrinsic consequences of forced Arg2 overexpression on hepatocyte triglyceride accumulation, inflammatory cytokine and chemokine activation, and insulin signal transduction. BSA-conjugated fatty acid treatment (FFA) both without and with 1 nM lipopolysaccharide (LPS) induced TG accumulation and inflammatory gene markers interleukin 1β(II-1β), interleukin 6 (II-6), tumor necrosis factor α (Tnf-α), monocyte chemoattractant protein 1 (Mcp1; also known as Ccl2), and CXC chemokine ligand 9 (Cxcl9) in wild-type primary hepatocyte cultures (FIG. 1G). In each condition, fat accumulation and cytokine/chemokine expression was significantly attenuated by Arg2 overexpression (FIG. 1G). In parallel, the expression of functional protein by quantifying urea production in vitro was verified, which revealed an eightfold increase in urea production upon Arg2 overexpression (not shown). To define the effect of Arg2 overexpression on hepatocyte insulin sensitivity in vitro, primary hepatocytes were transfected with p3-galactosidase or Arg2, serum-deprived overnight, then stimulated with 10 nM recombinant insulin. Arg2-overexpressing cultures exhibited enhanced insulin-induced AKT phosphorylation (FIG. 1H). Together, these data suggested that Arg2 overexpression cell autonomously mitigates hepatocyte fat accumulation, LPS-stimulated inflammatory responses and insulin sensitivity through the AKT pathway.

Figure 1I:
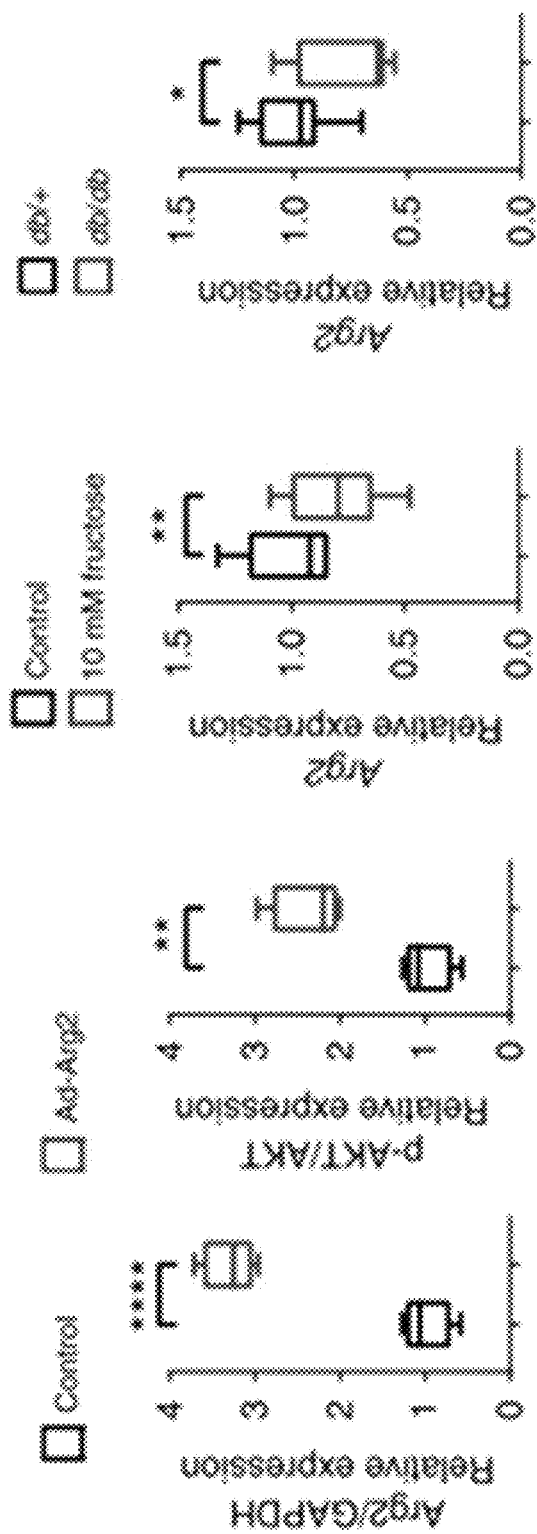

To define whether suppression of Arg2 correlates with metabolic disease, we compared hepatocyte Arg2 expression in fructose-treated and untreated primary hepatocyte cultures, and in LepR heterozygous (db/+) mice with LepR-deficient (db/db) diabetic mice, and in mice fed with a high-fat, high-sucrose diet (HFHS, 14 weeks). This revealed significantly reduced Arg2 expression in db/db mice and in response to fructose treatment (FIG. 1I). Therefore, Arg2 is induced during fasting and is reduced in states of nutritional excess.

Liver Arg2 Blocks Hepatic Steatosis and Insulin Resistance

Figure 2A:
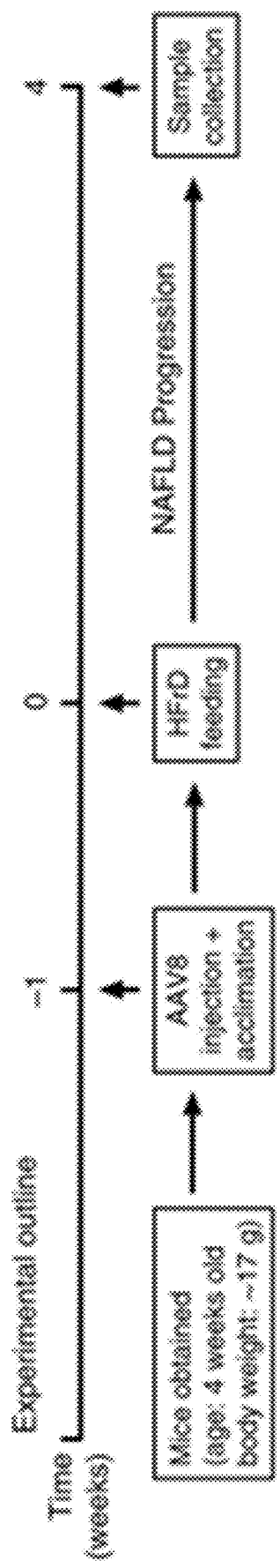
Figure 2B:
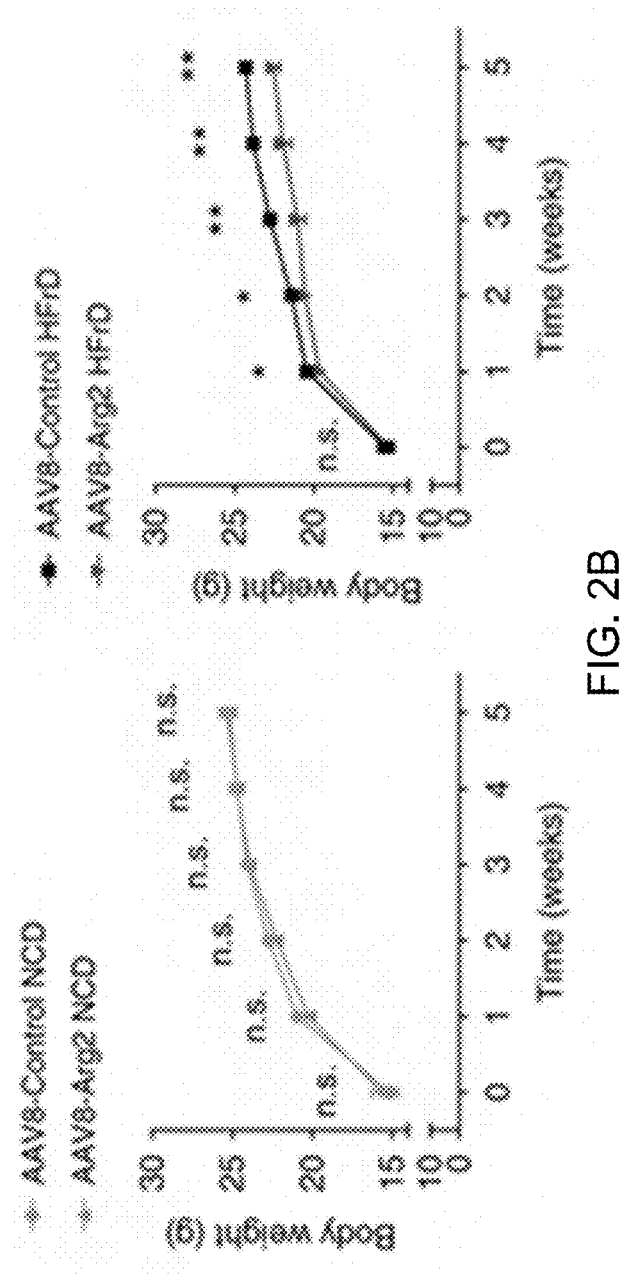
Figure 2C:
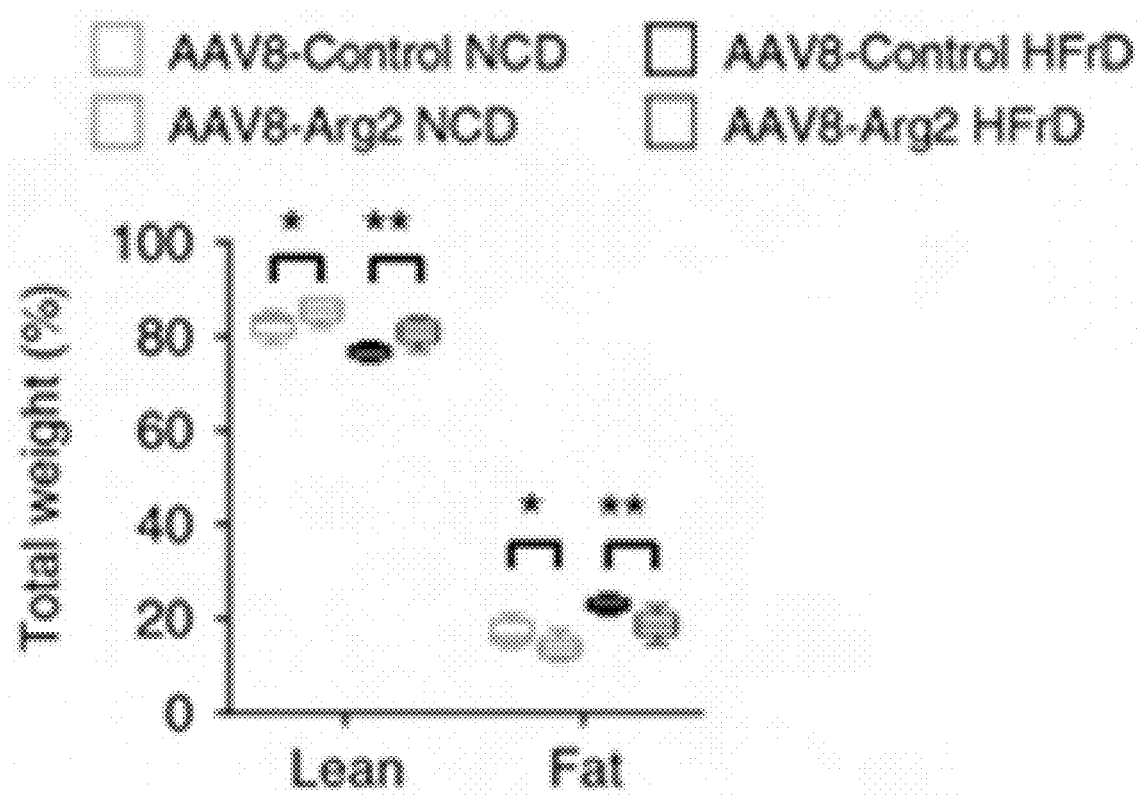
Figure 2D:
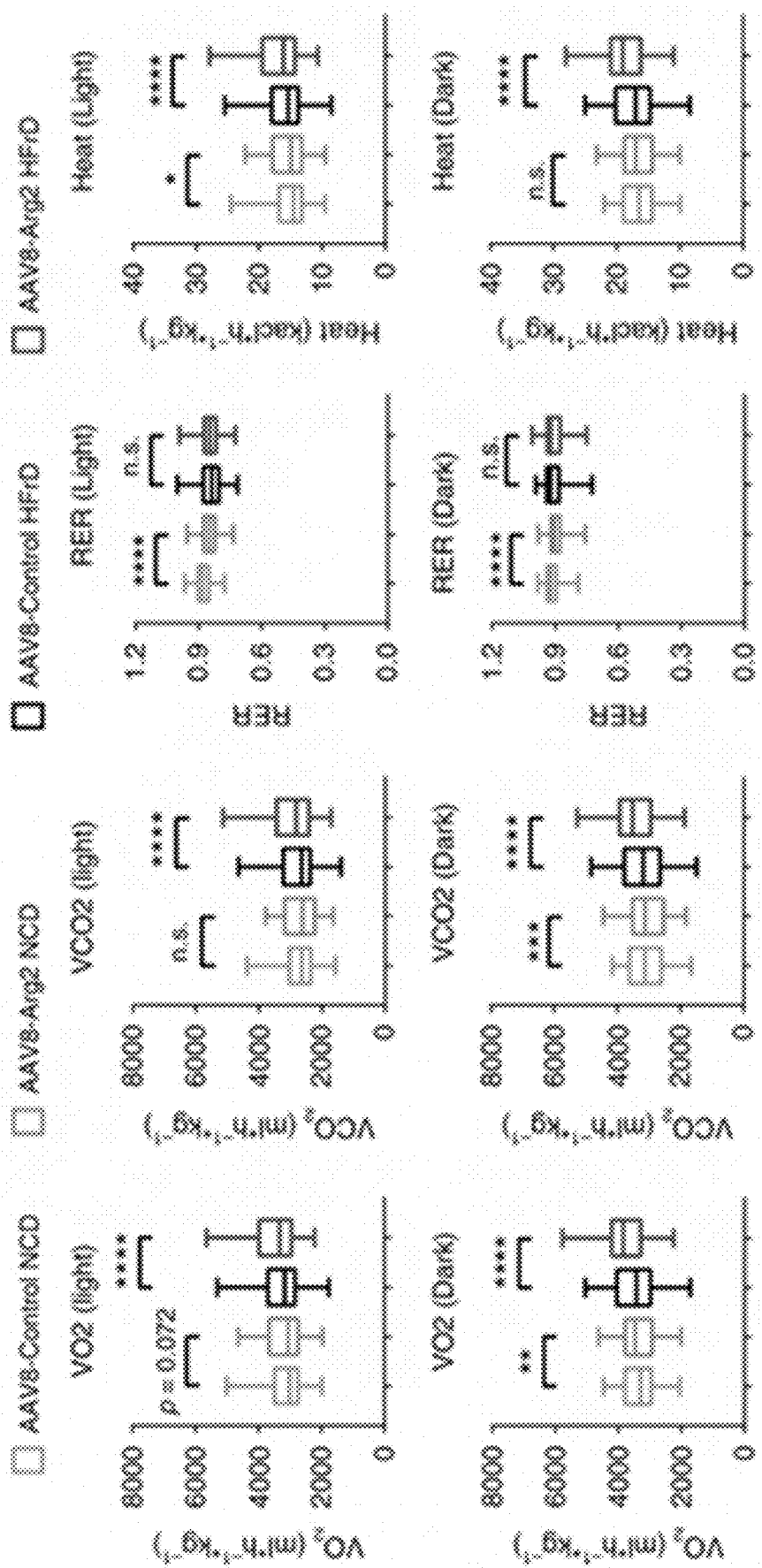
Figure 11A:
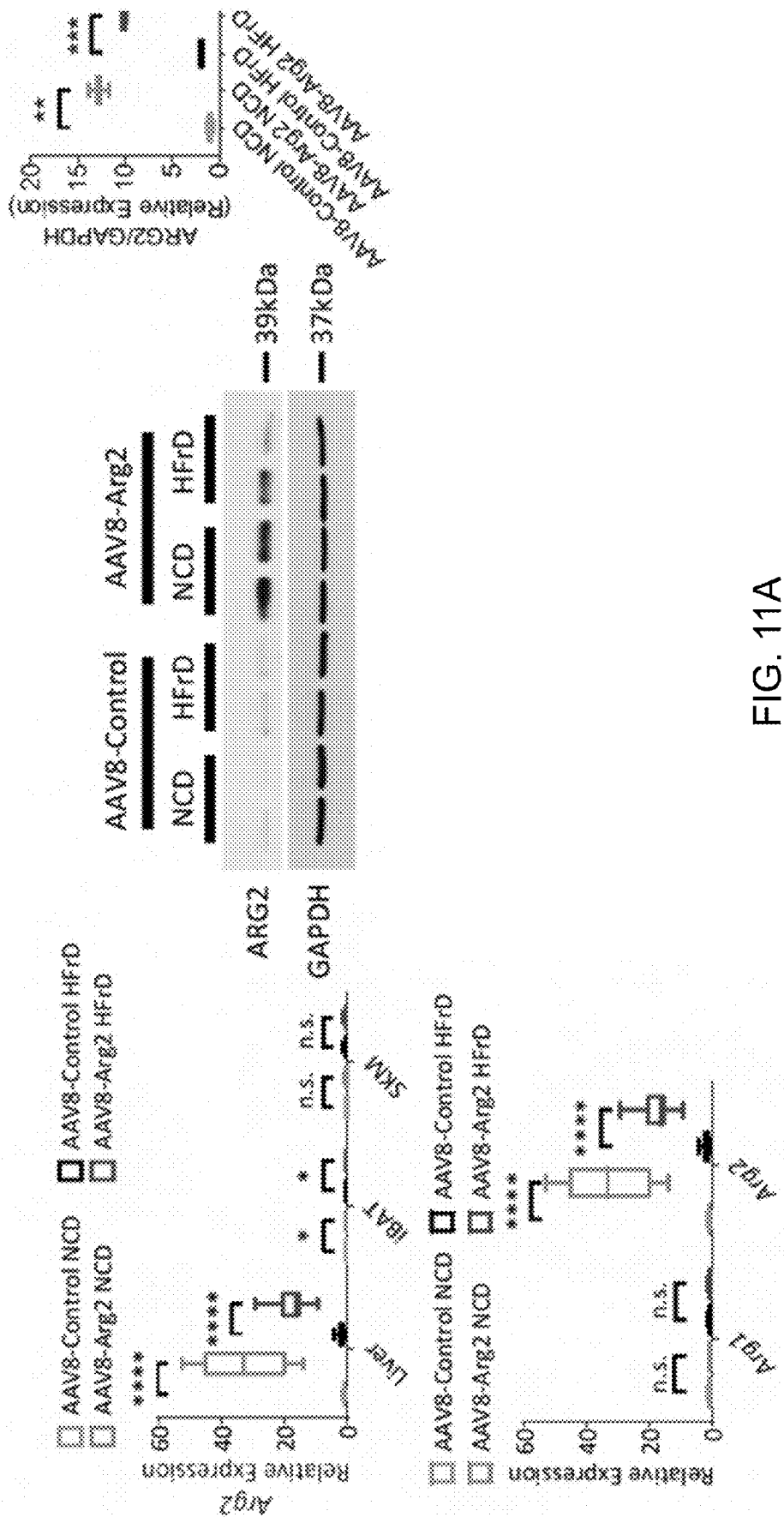
Figure 11B:
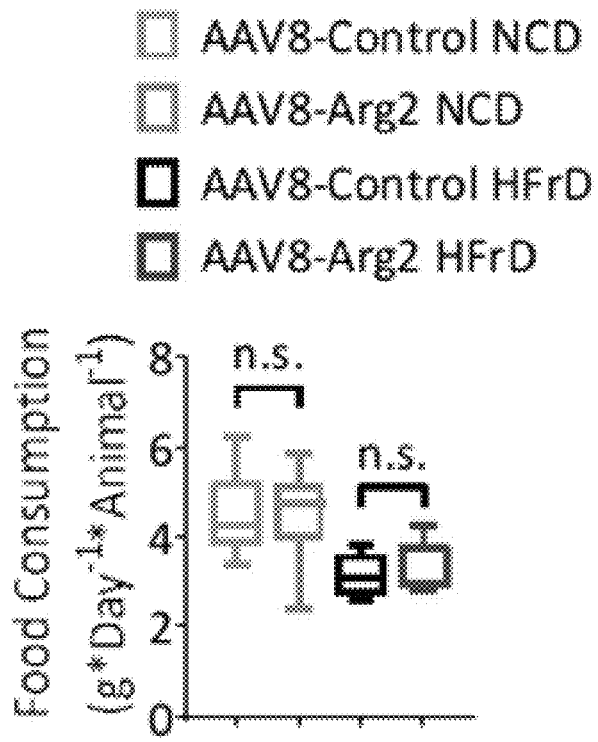
Figure 11C:
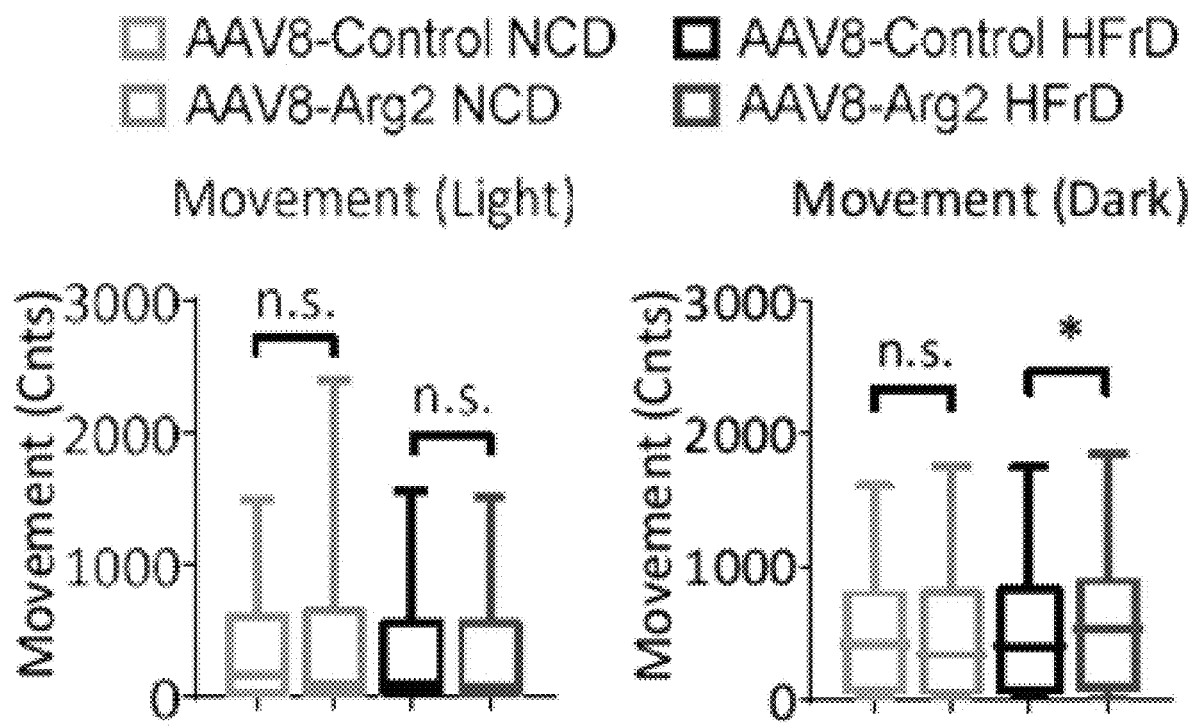

Forced Arg2 expression in vitro reduced steatosis and enhanced insulin signaling. In vivo, hepatocyte-specific Arg2 overexpression was achieved by delivering adeno-associated virus 8 by tail-vein injection in mice (hereafter, AAV8-Arg2 mice). We fed these mice either a normal chow diet (NCD) or a 5-week high-fructose diet (HFrD, experimental design in FIG. 2A) to test whether forced Arg2 expression in vivo also enhances insulin signaling and reduces hepatic steatosis. We first demonstrated restricted hepatic overexpression of the Arg2 construct by qPCR and western blot analysis, without upregulation in skeletal muscle or brown adipose tissue (FIG. 11A). Importantly, we did not observe changes in hepatic Arg1 mRNA expression in hepatic Arg2-overexpressing mice (FIG. 11A). Hepatic Arg2 overexpression significantly increased lean mass and reduced fat mass in NCD and HFrD-fed mice (FIG. 2B, 2C). Moreover, Arg2 attenuated HFrD-induced weight gain without altering food intake (FIG. 11B). Accordingly, indirect calorimetry revealed enhanced basal thermogenesis and oxygen and carbon dioxide exchange in AAV8-Arg2 versus HFrD-fed AAV8-controls (FIG. 2D), without altering light- or dark-cycle movement (FIG. 11C).

Figure 2E:
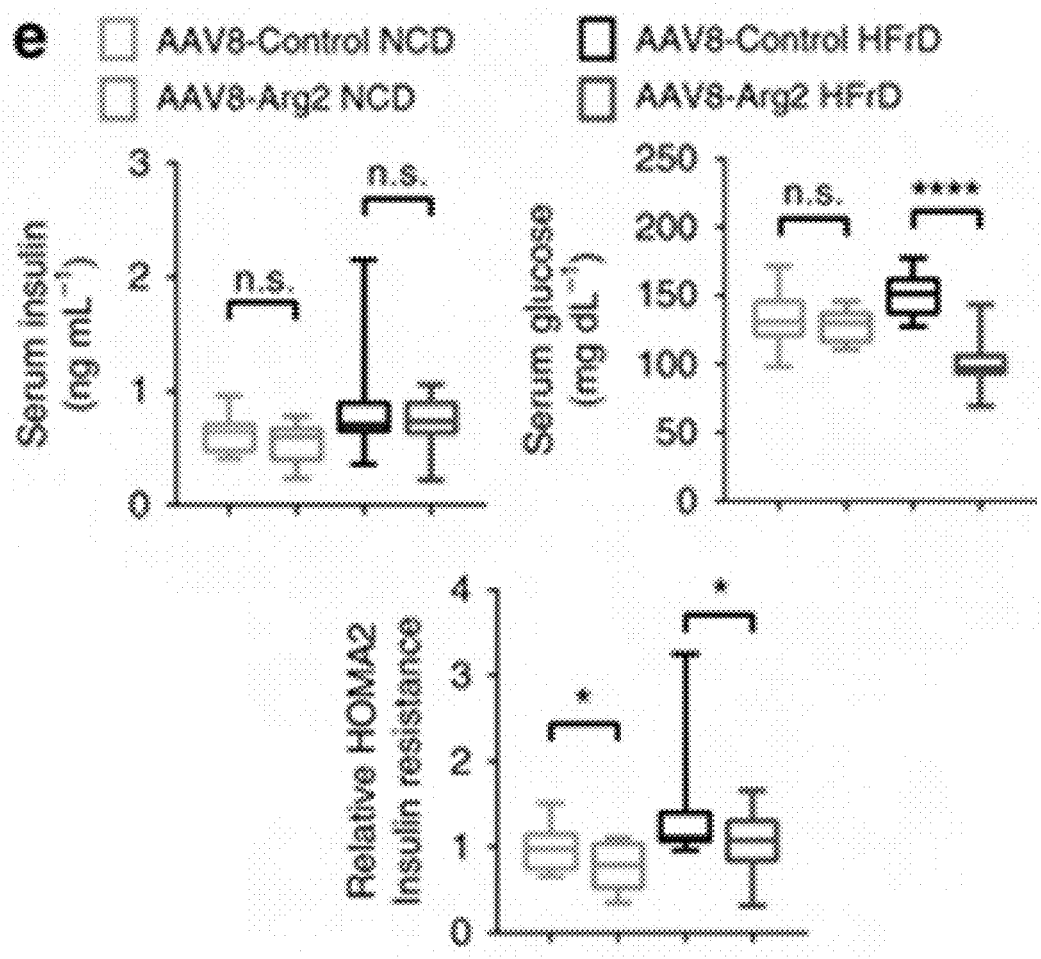

The generalized fasting response induces peripheral lipolysis to generate substrate for liver fatty acid oxidation and ketogenesis. Analogously, hepatic Arg2 overexpression increased serum-free fatty acid (FFA) in AAV8-Arg2 HFrD mice with no significant changes in serum triglyceride (TG), total cholesterol, and LDL-C (FIG. 11D). AAV8-Arg2 mice exhibited lower serum insulin and glucose concentrations in both NCD-fed and HFrD-fed group which resulted in lower HOMA of insulin resistance (HOMA-IR) (FIG. 2E). Glucose tolerance test (GTT) and insulin tolerance testing (ITT) confirmed improved glucose tolerance and insulin sensitivity secondary to hepatic Arg2 overexpression in HFrD-fed mice (FIG. 2F), without effects on glucose or insulin tolerance in NCD-fed mice (FIG. 11E). With regard to insulin-responsive gene activation, Arg2 significantly increased expression of insulin receptor substrate 1 (Irs1), insulin-like growth factor binding protein 1 (Igfbp1), and argininosuccinate synthase 1 (Ass1). With regard to genes involved in de novo lipogenesis, only monoacylglycerol O-acyltransferase 1 (Mogat1) (FIG. 2G) was reduced in AAV8-Arg2 mice.

Figure 3A:
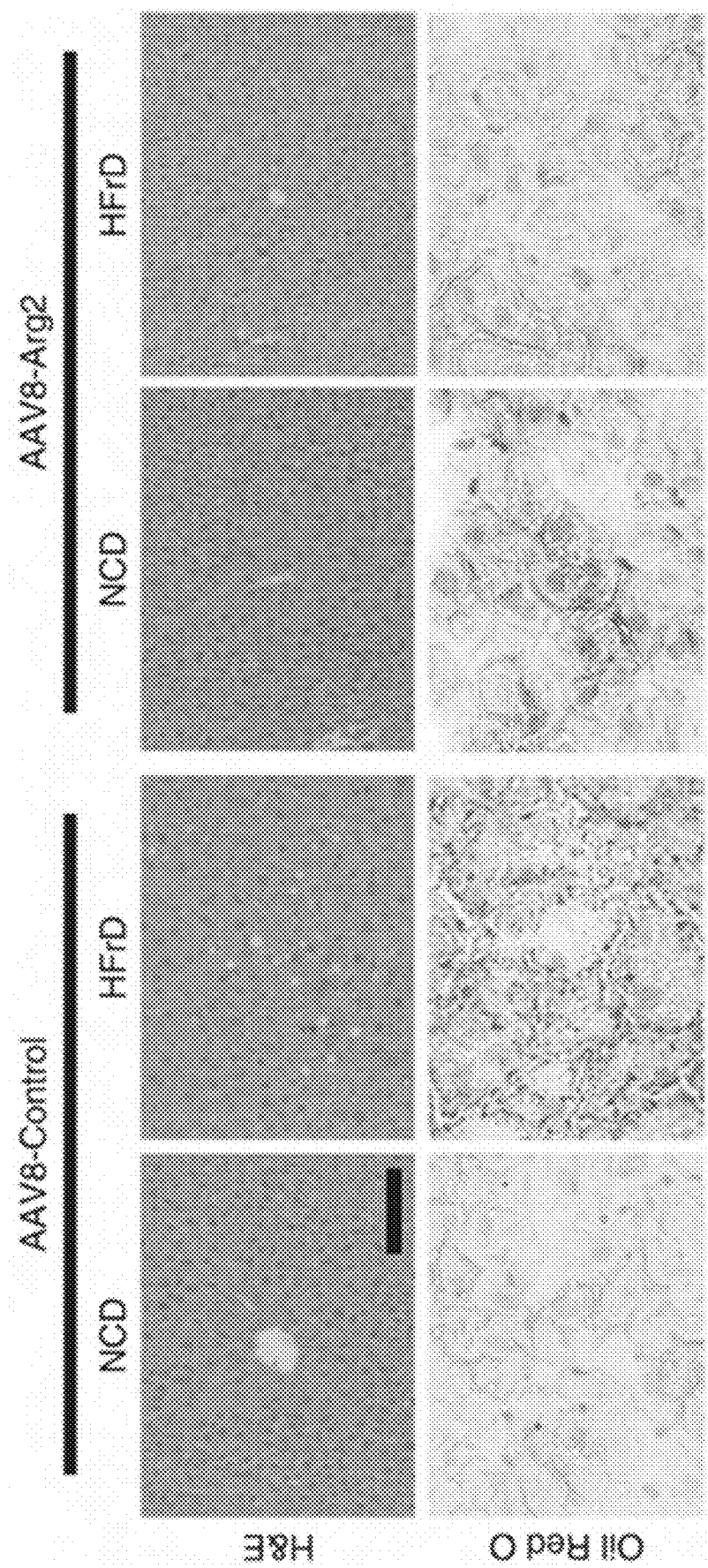
FIG. 3A-FIG. 3C depict Hepatic Arg2 protects against hepatic steatosis and inflammation.
Figure 3B:
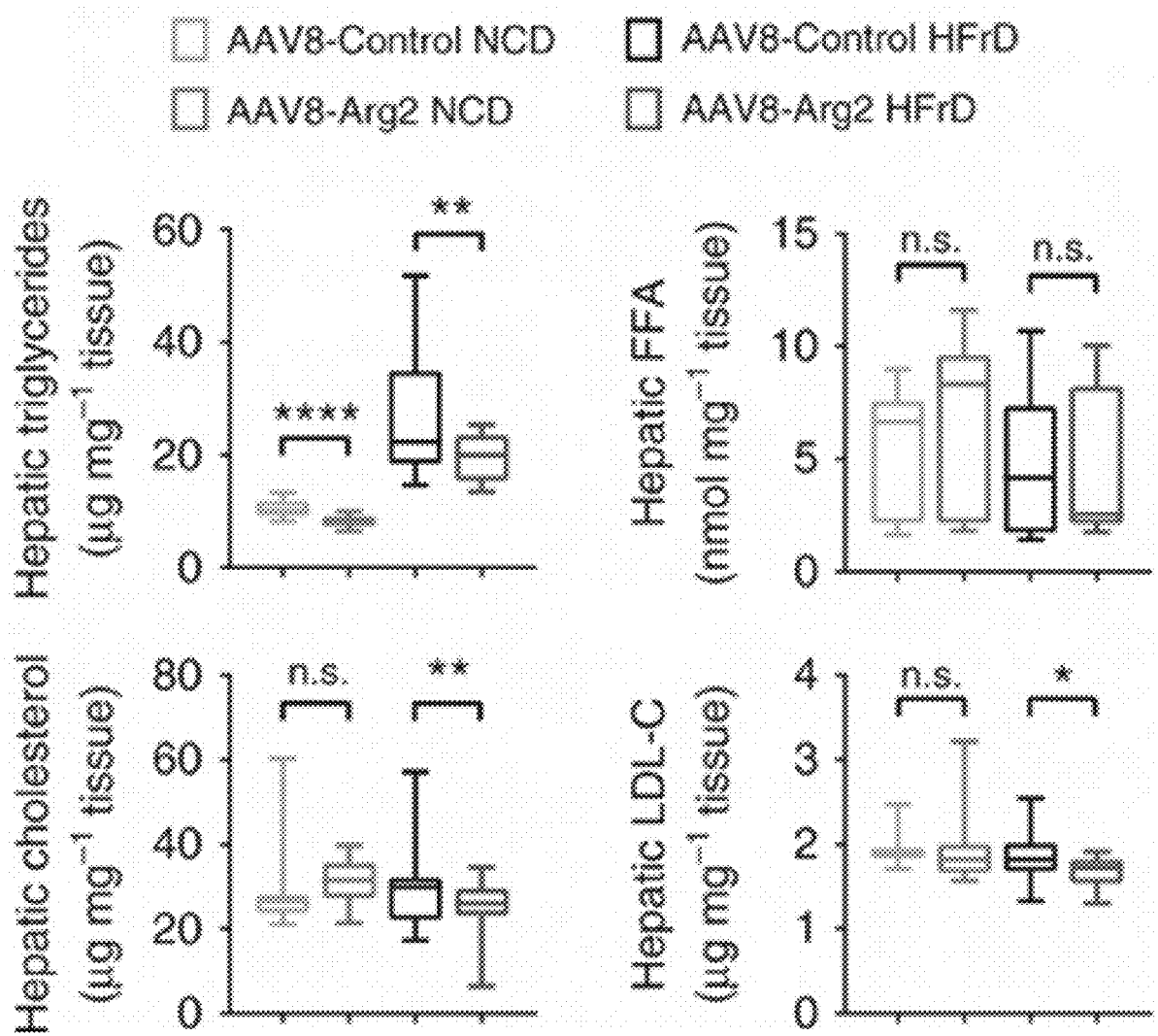
Figure 3C:
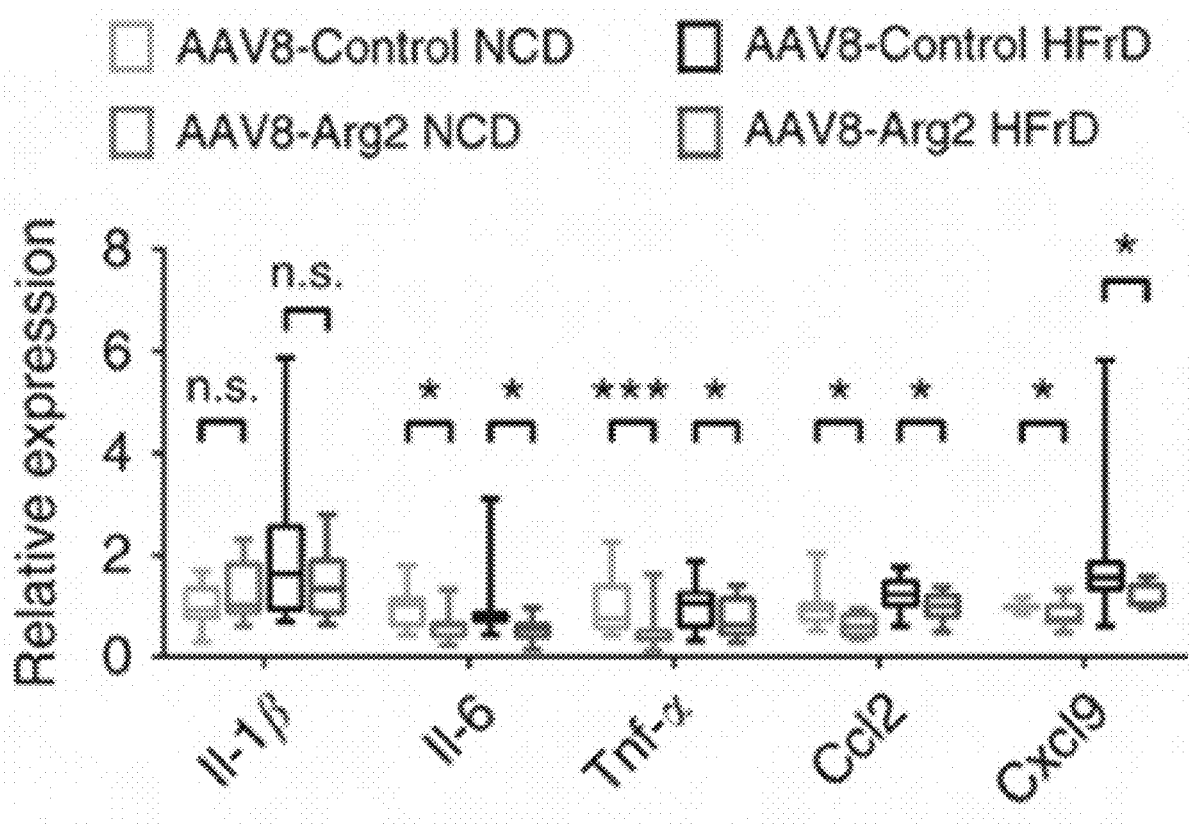
Figure 11F:
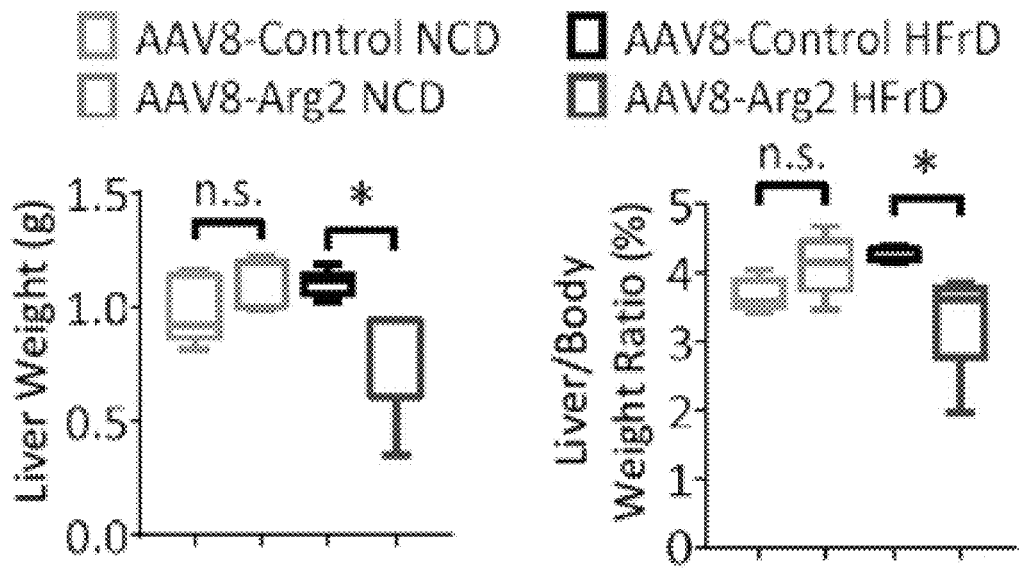
Figure 11G:
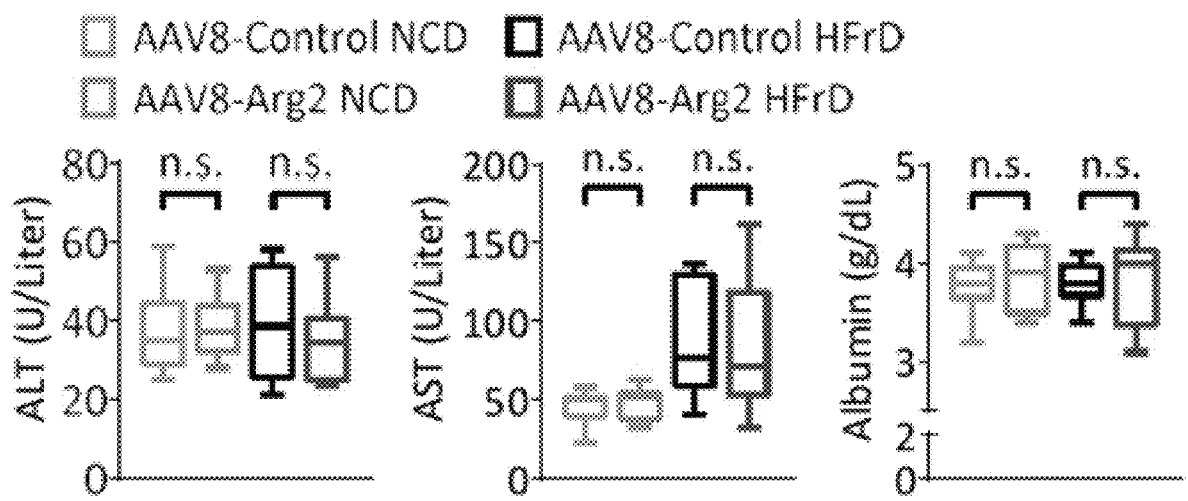
Figure 11H:
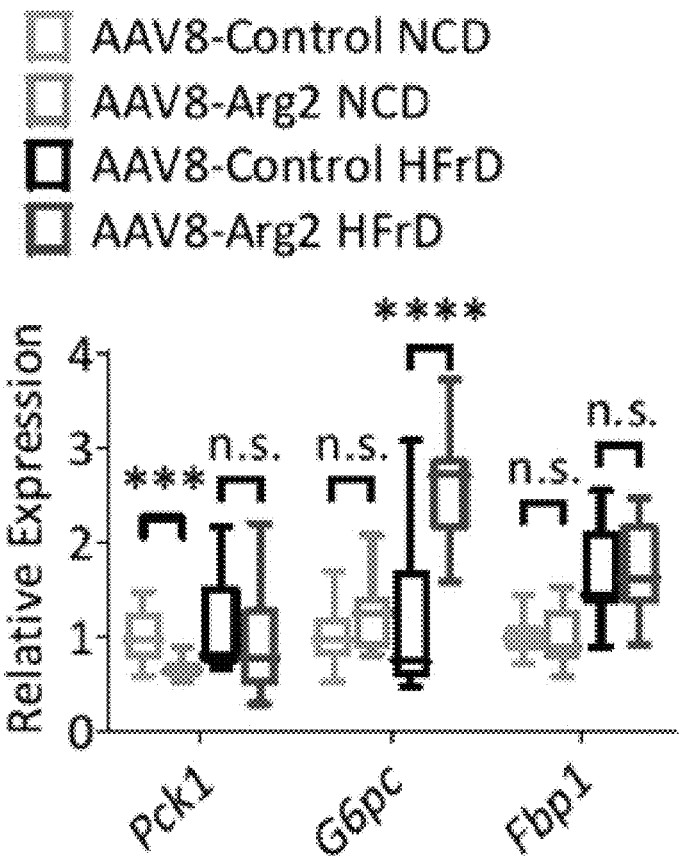
Figure 11I:
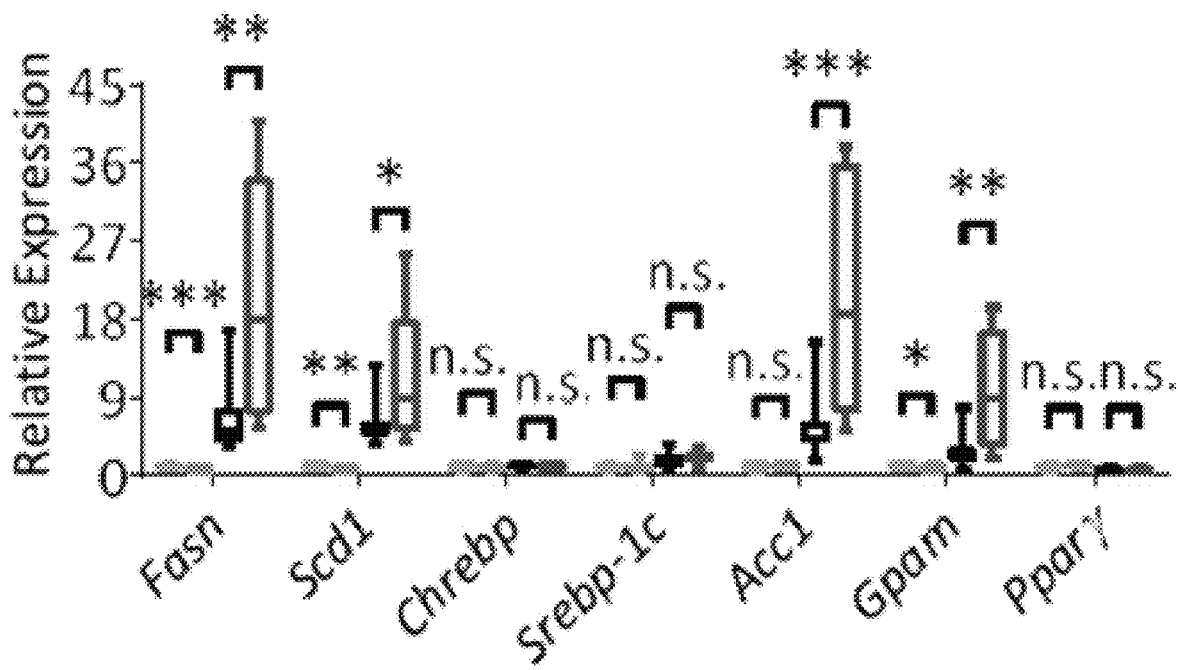
Figure 11J:
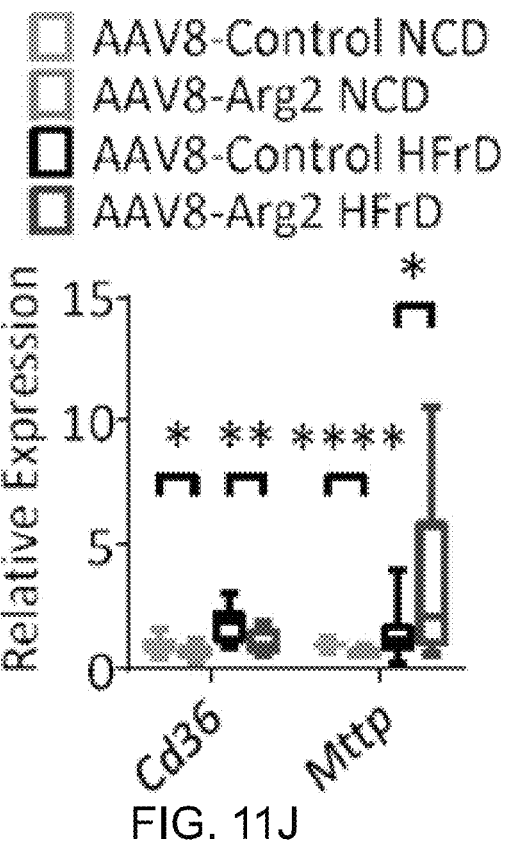
Figure 11K:
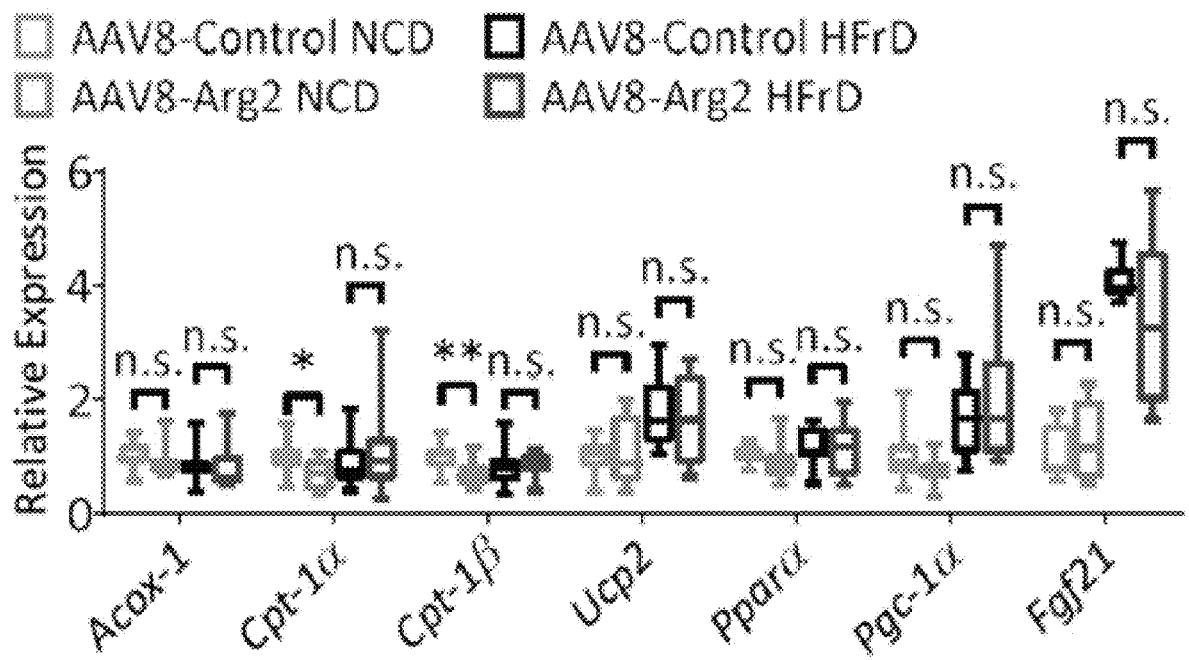

Hepatic analysis revealed lower liver weight and liver weight-to-body-weight ratios in HFrD-fed AAV8-Arg2 mice when compared with HFrD-fed AAV8-Controls, whereas no changes were detected between NCD-fed AAV8-Arg2 and AAV8-control groups (FIG. 11F). Histological analysis of livers from control and AAV8-Arg2 mice by H&E and Oil Red O staining demonstrated that Arg2 attenuated HFrD-induced hepatic lipid accumulation (FIG. 3A). These findings were confirmed by significantly reduced quantitative intrahepatic triglycerides, cholesterol and low-density lipoprotein cholesterol without changes in hepatic free fatty acids (FFA) (FIG. 3B). Although no observed changes in serum ALT, AST or albumin in any group (FIG. 11G), hepatic inflammatory gene expression (e.g., Il-1β, Il-6, Tnfα, Ccl2, Cxcl9) was significantly lower in the livers of AAV8-Arg2 mice when compared with AAV8-Controls in response to HFrD (FIG. 3C). Analysis of major metabolic pathways yielded no consistent changes in de novo lipogenic genes, import export (Cd36/FAT, Mttp), or fatty acid oxidation (Acox1, Cpt1α, Cpt1β, Ucp2, Pparα, Pgc1α, Fgf21) in HFrD-fed AAV8-Arg2 mice relative to littermate AAV8-Controls (FIG. 11H-J).

Hepatic Arg2 Enhances Thermogenesis in db/db Diabetic Mice

Figure 4D:
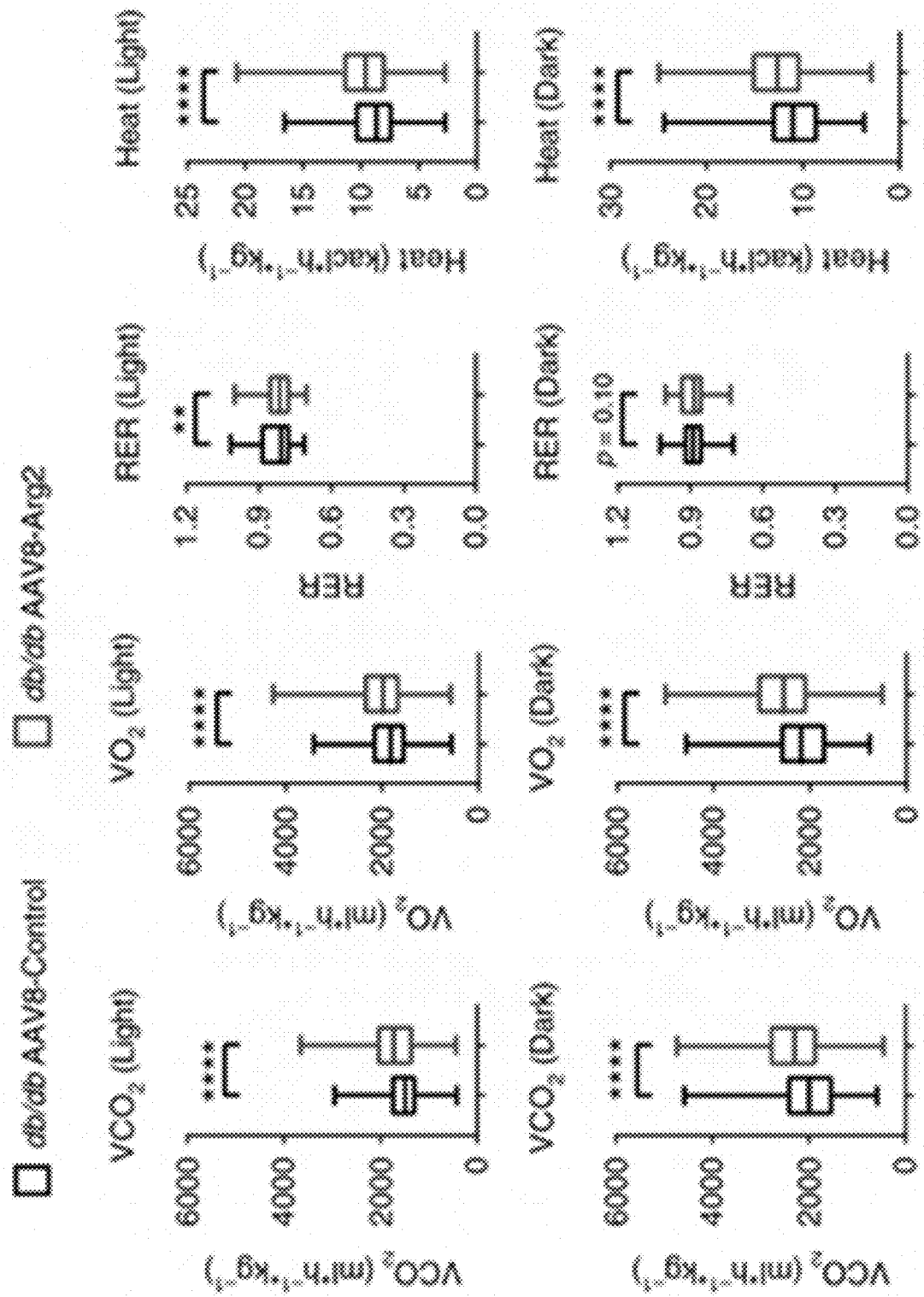
Figure 4E:
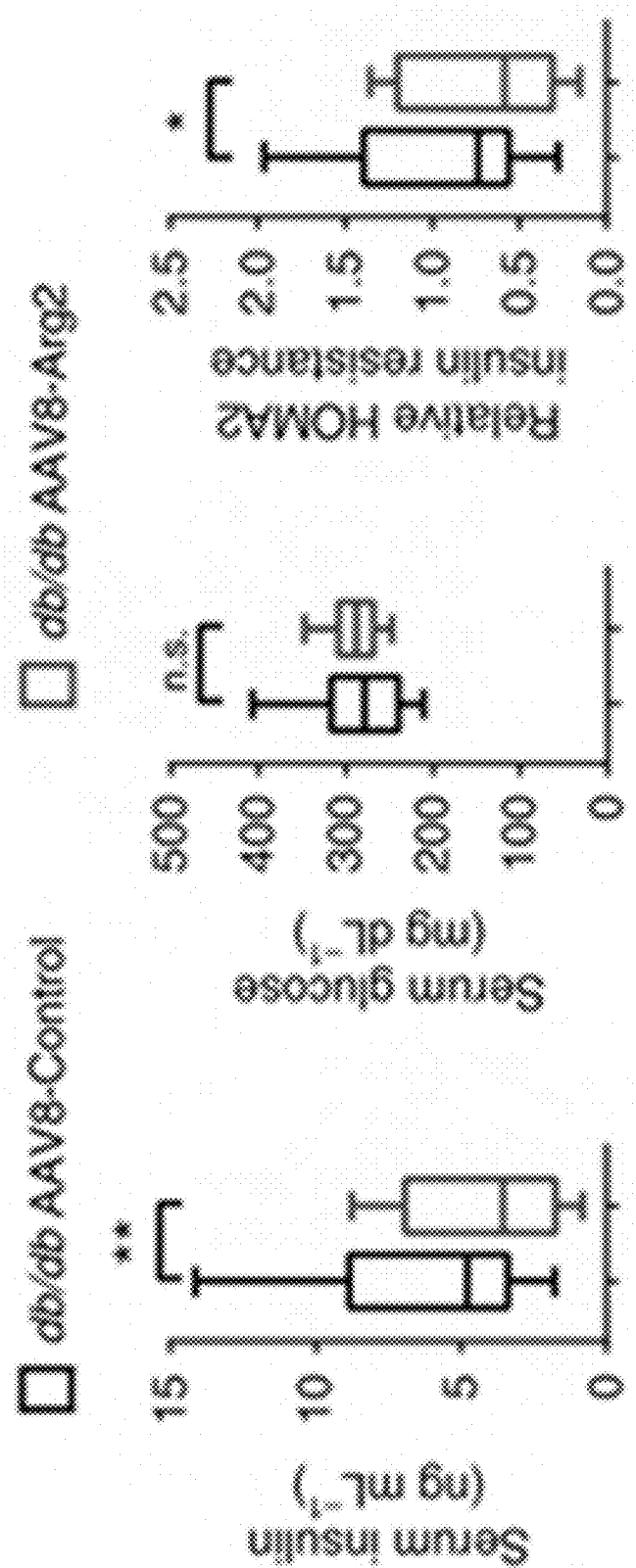
Figure 4H:
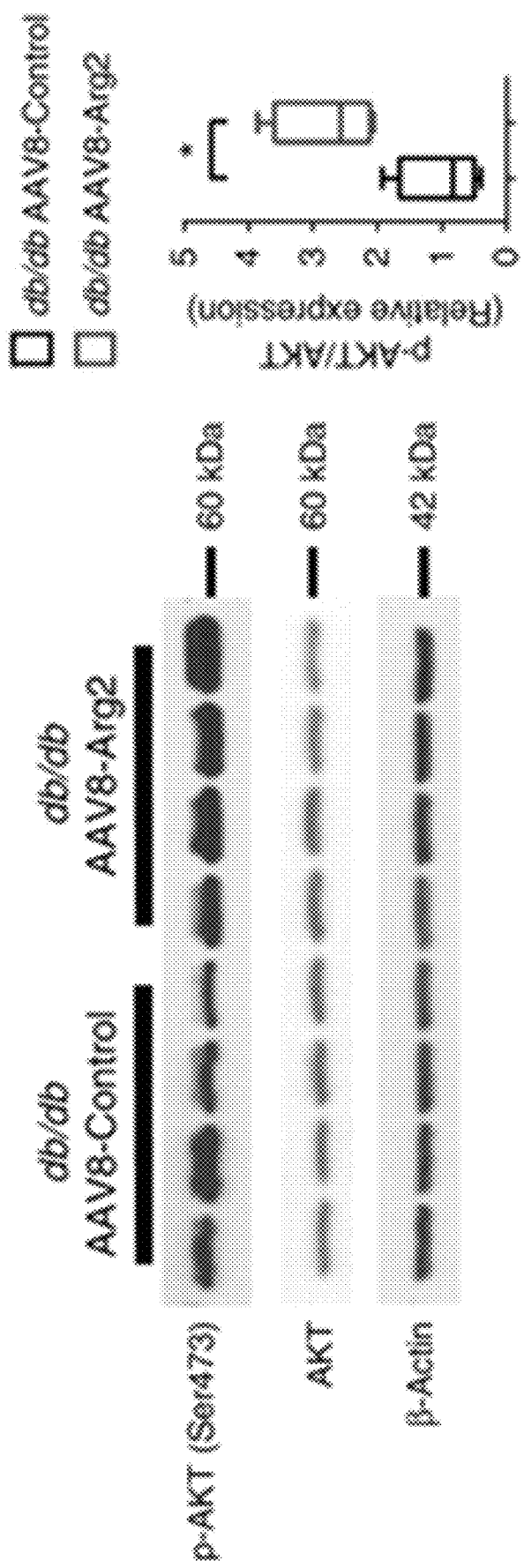
Figure 12A:
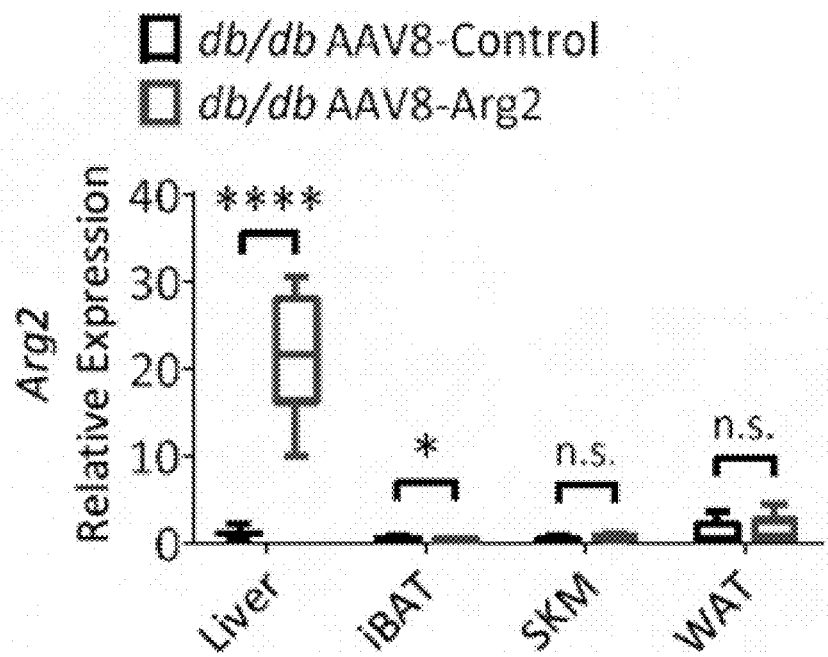
FIG. 12A-FIG. 12H depict improved energy metabolism in db/db mice overexpressing hepatocyte Arg2.
Figure 12B:
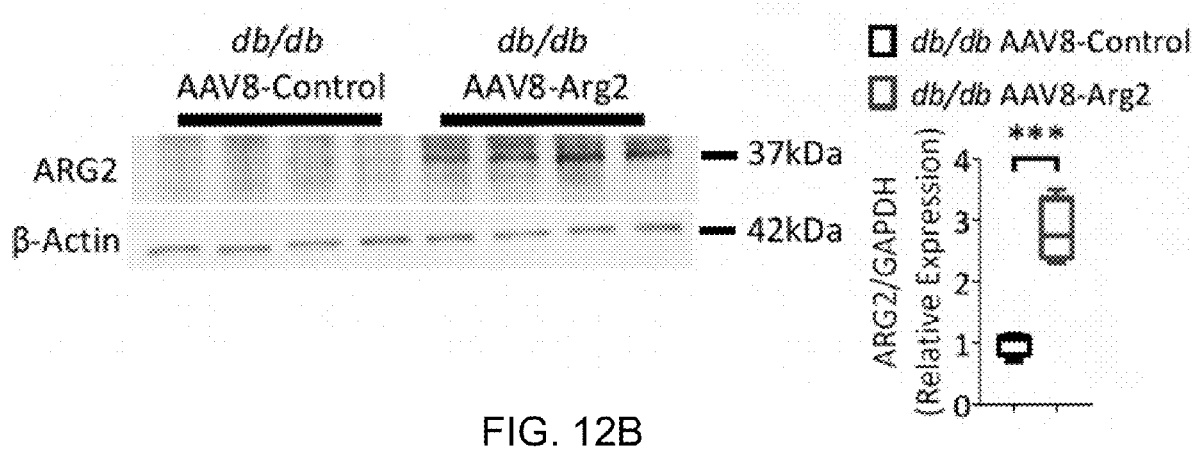
Figure 12C:
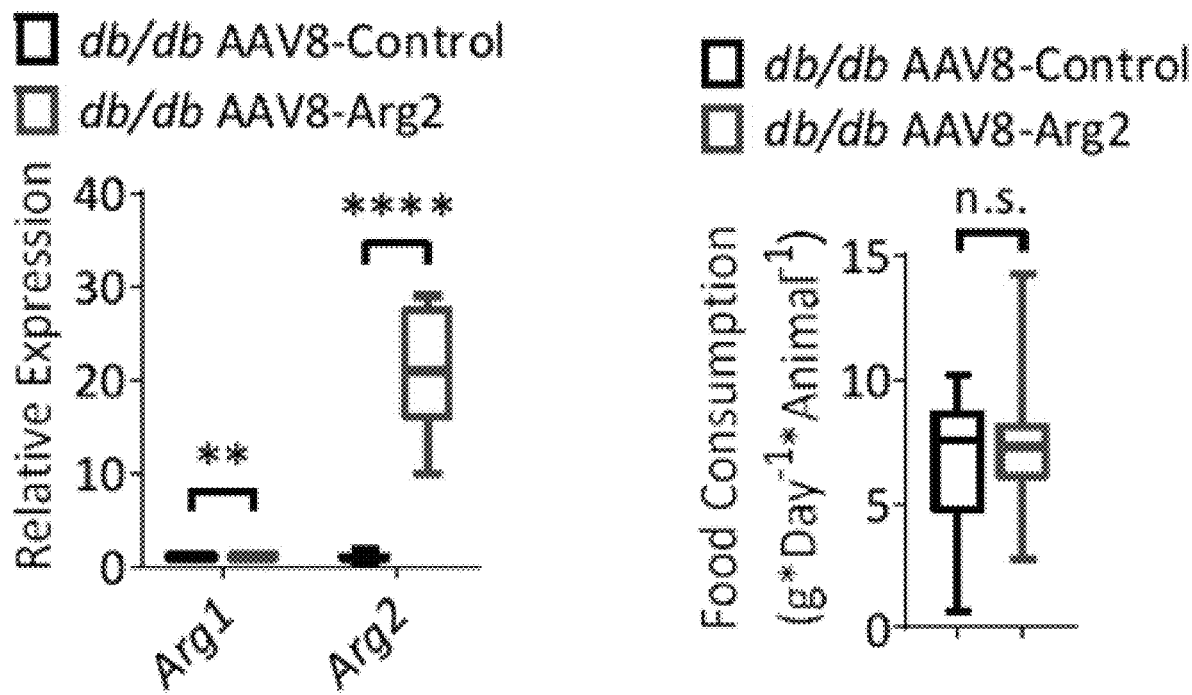
Figure 12D:
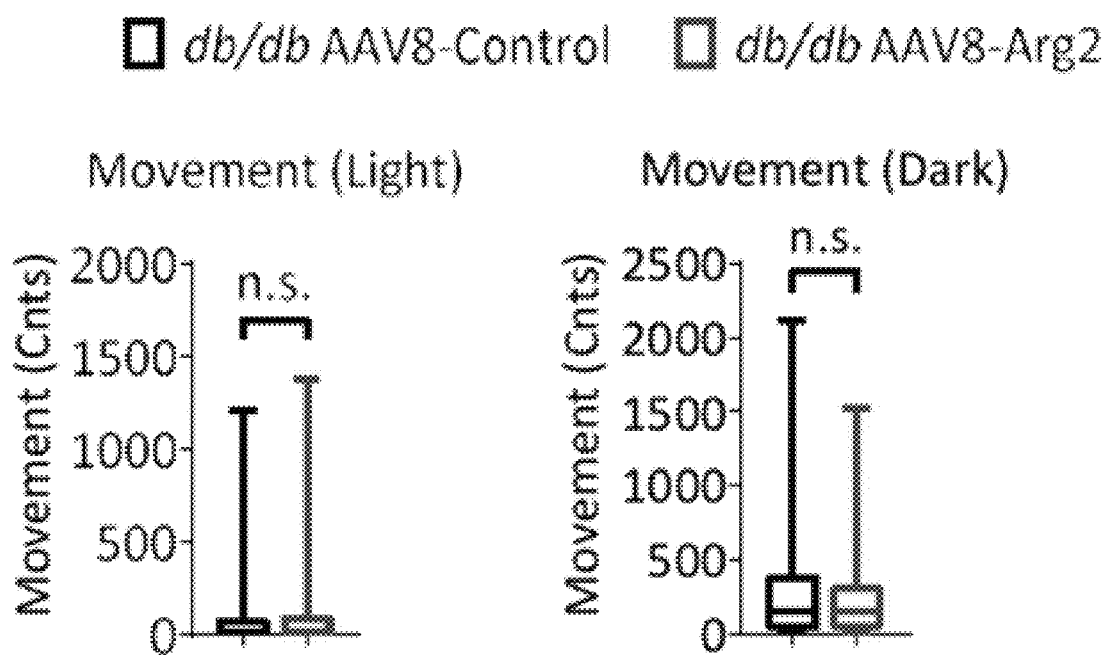
Figure 12E:
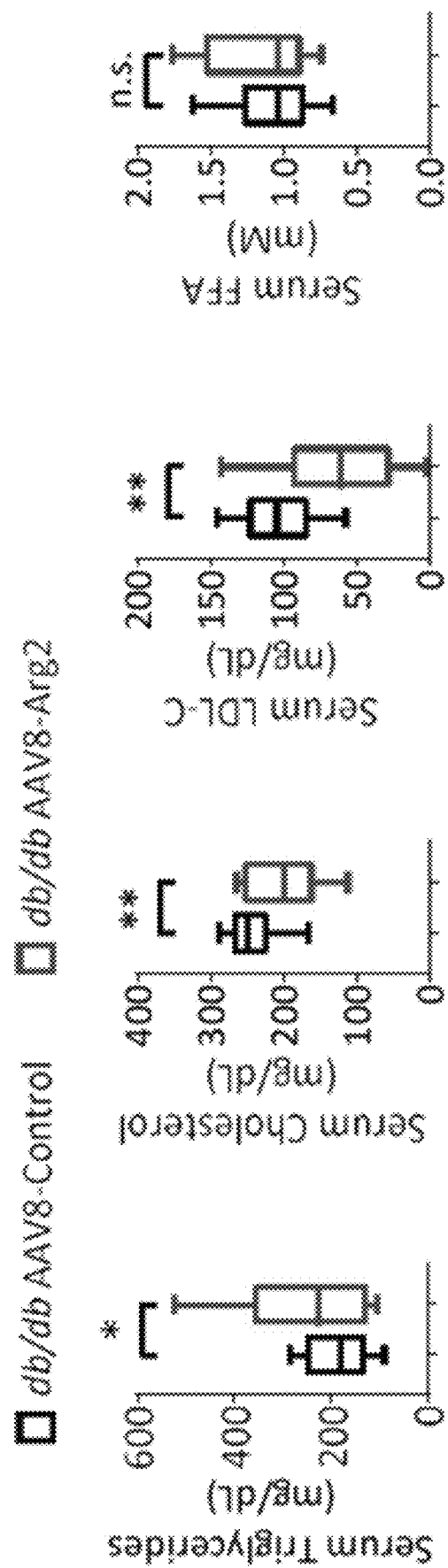
Figure 12F:
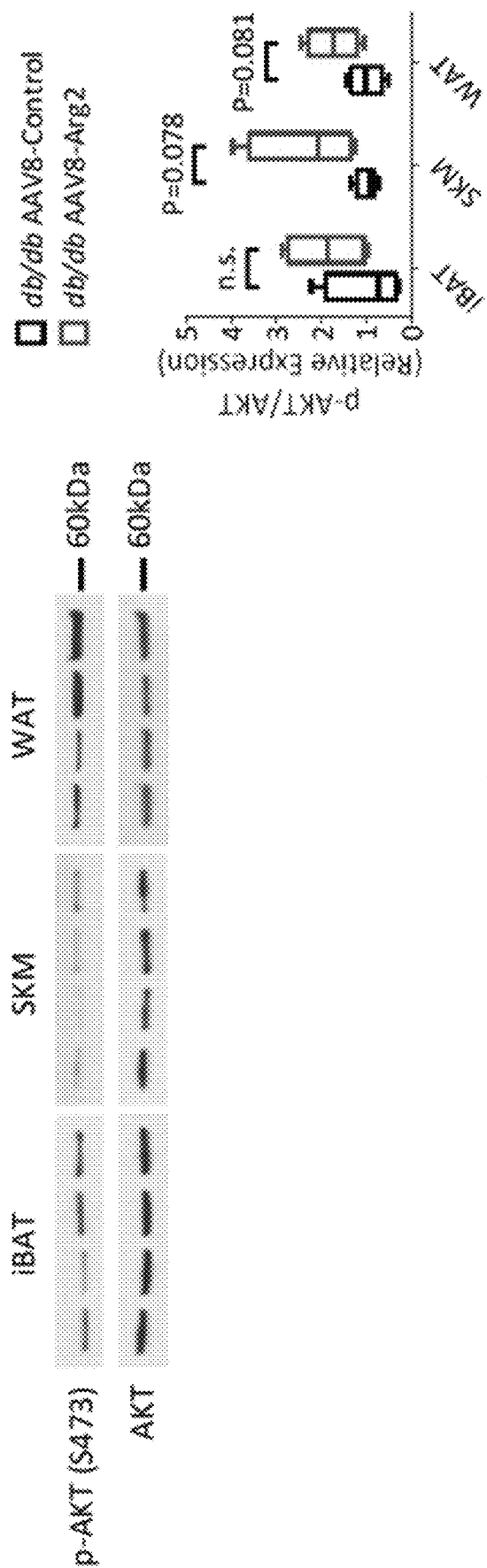

To address the generalizability of the protective effects of hepatic Arg2, we explored the effects of Arg2 expression in a genetic model of obesity, leptin receptor-deficient (db/db) diabetic mice (FIG. 4A). qPCR and immunoblot analysis confirmed restricted Arg2 overexpression in liver without Arg2 overexpression in visceral white adipose, brown adipose or skeletal muscle tissue (FIG. 12A, 12B). Hepatic Arg1 mRNA was increased by 10% uniquely in this genetically obese model (but not in the HFrD model), whereas hepatic Arg2 increased greater than 20-fold in db/db AAV8-Arg2 mice (FIG. 12A). Hepatic Arg2 overexpression attenuated body weight gain in db/db AAV8-Arg2 mice compared with the db/db AAV8-Control mice (FIG. 4B) without changes in total food intake or locomotion (FIG. 12C, 12D). Accordingly, db/db Arg2 mice had greater lean mass and lower fat mass (FIG. 4C), which corresponded with significantly higher $VO_2$, $VCO_2$, and energy expenditure in db/db AAV8-Arg2 mice versus db/db AAV8-Arg2 control mice. We did not observe changes in food consumption or movement (FIG. 4D, and FIG. 12C, 12D). Hepatic Arg2 overexpression also increased circulating TG, decreased total cholesterol and LDL-C, but it did not change FFA (FIG. 12E). Analysis of insulin and glucose homeostasis revealed that serum insulin and homeostatic model assessment of insulin resistance (HOMA2-IR) were significantly decreased in db/db AAV8-Arg2 mice (FIG. 4E). Similarly, AAV8-Arg2-treated db/db mice exhibited significantly improved insulin tolerance testing (ITT) and trends toward improved glucose tolerance when compared with AAV8-Control injected db/db littermates (FIG. 4F). Consistent with these physiological findings, gene expression of insulin-responsive genes, Irs1, Igfbp1, and Ass1, were elevated in livers of db/db AAV8-Arg2 mice versus AA8-Controls (FIG. 4G). db/db AAV8-Arg2 mice exhibited significantly enhanced hepatic AKT phosphorylation relative to db/db AAV8-Control littermates (FIG. 4H). Similarly, analysis of iBAT, skeletal muscle and visceral adipose tissues each revealed trends toward increased AKT phosphorylation in db/db AAV8-Arg2 mice relative to db/db AAV8-Control littermates (FIG. 12F).

Hepatic Arg2 Mitigates Hepatic Steatosis in db/db Mice

Figure 5A:
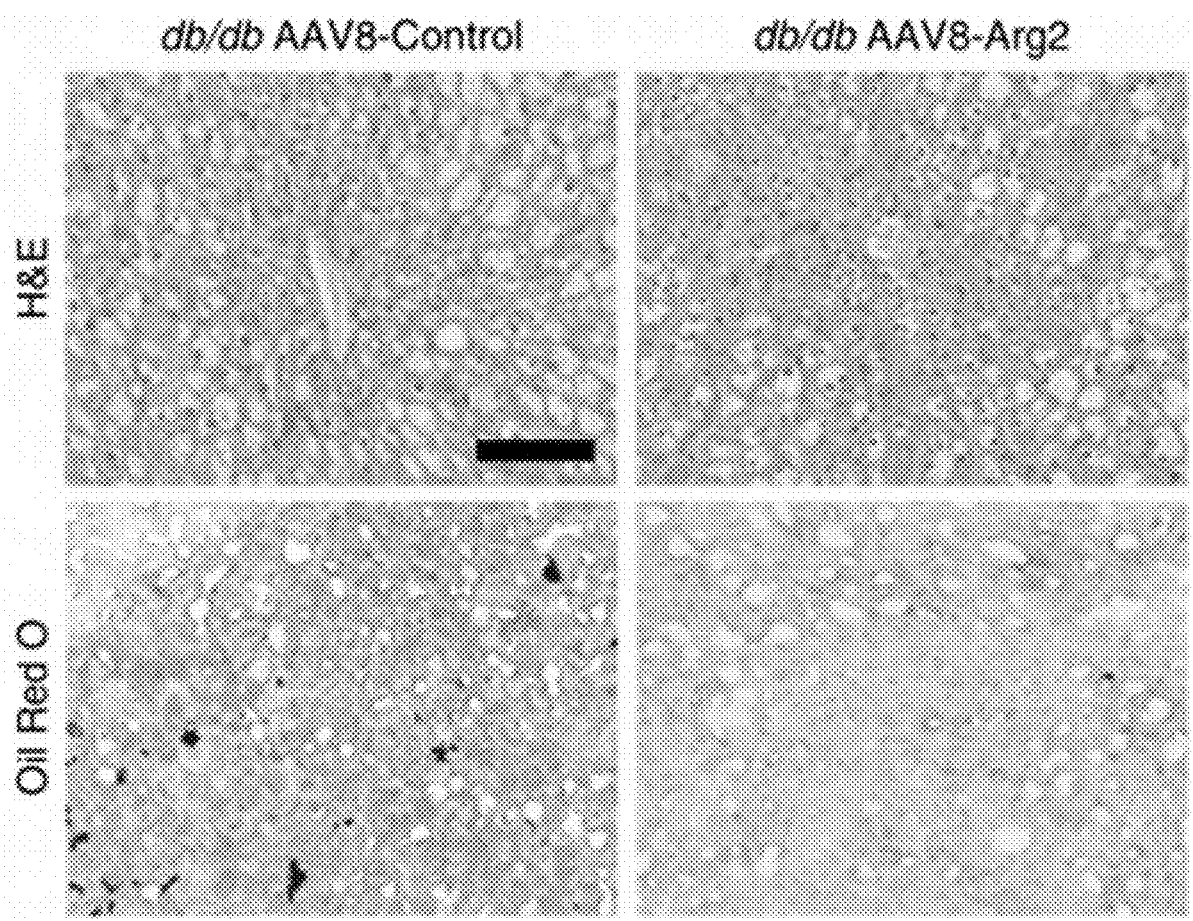
FIG. 5A-FIG. 5F depict Hepatic Arg2 attenuates hepatic steatosis and inflammation in db/db mice.
Figure 5B:
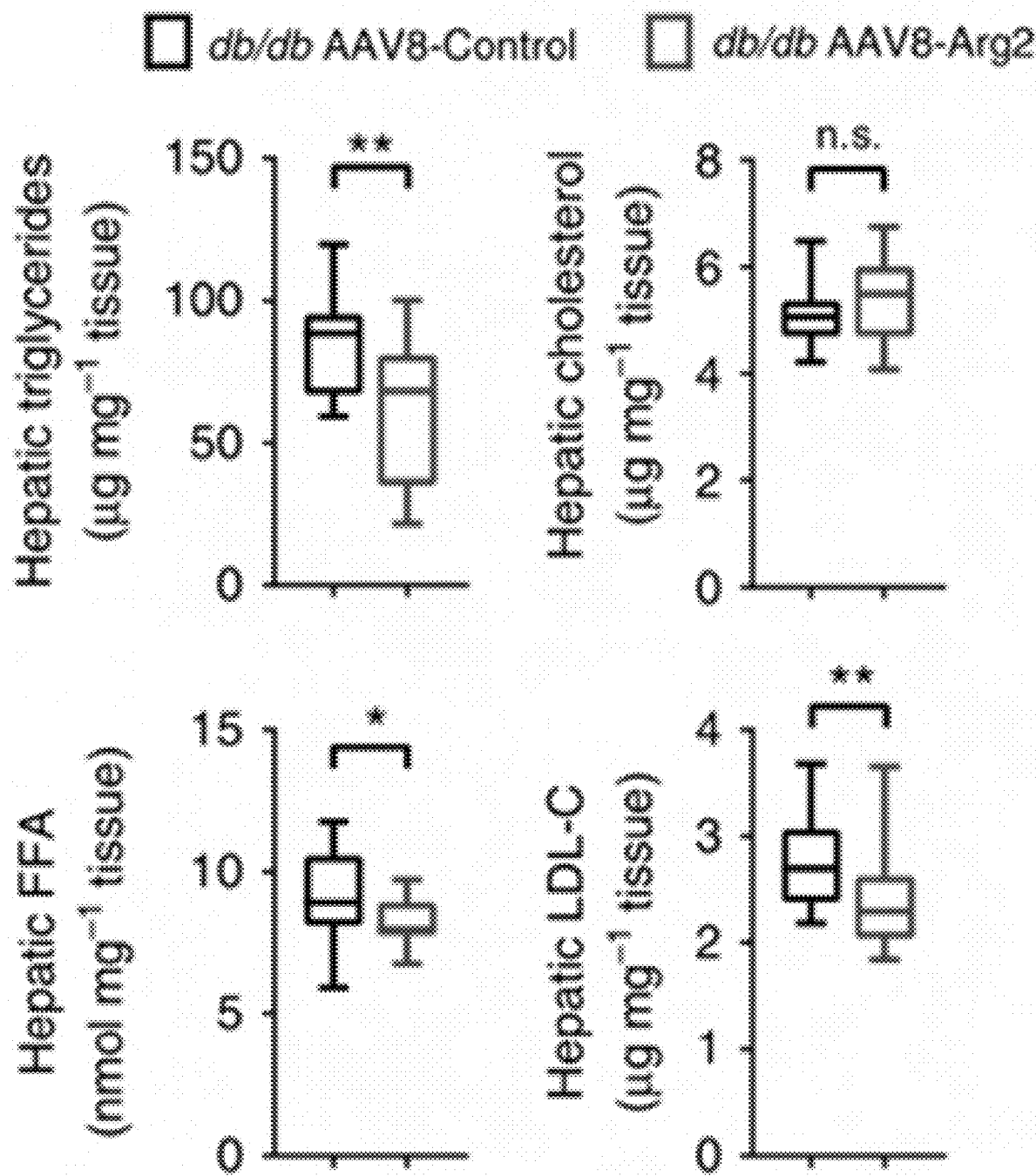
Figure 5C:
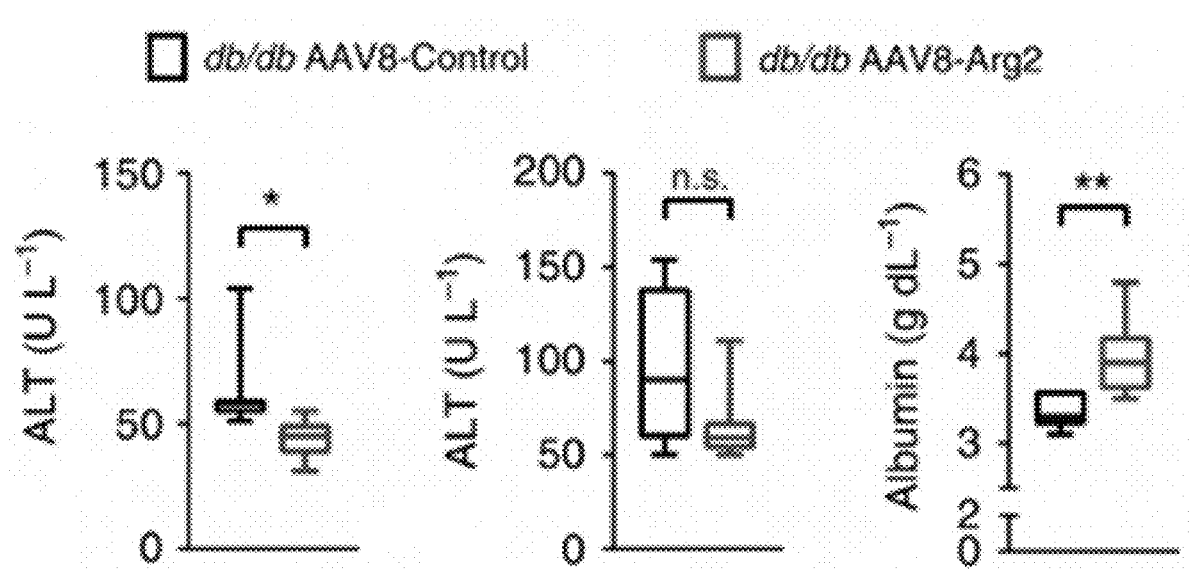
Figure 5D:
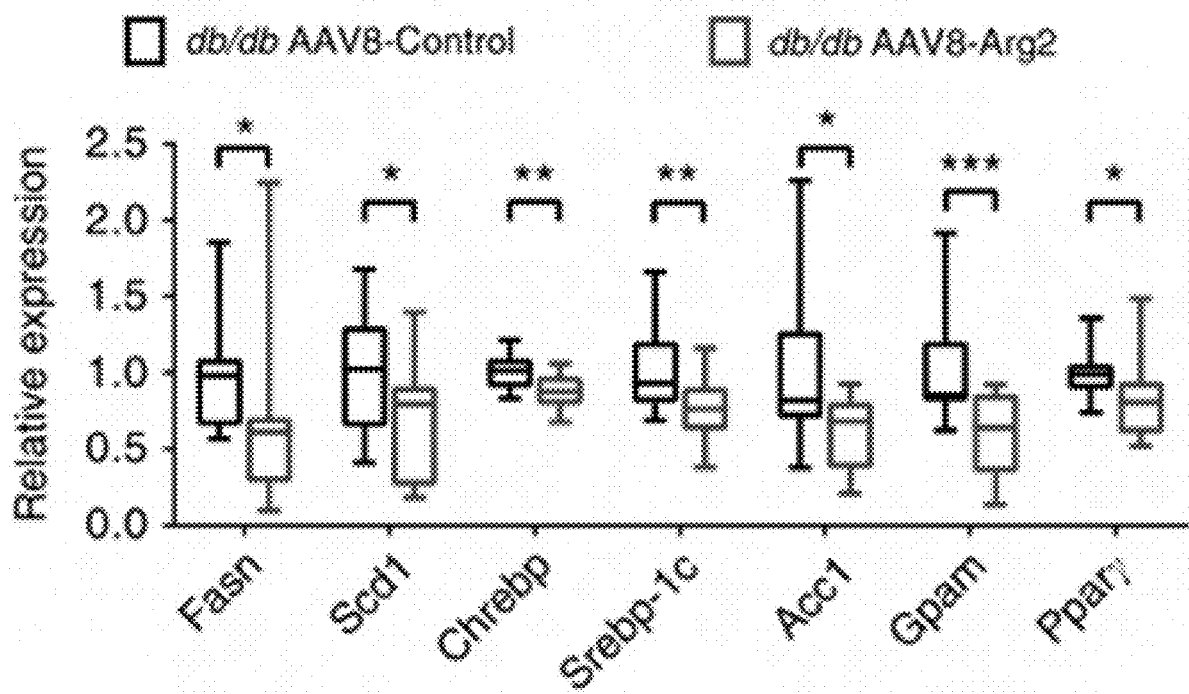
Figure 5E:
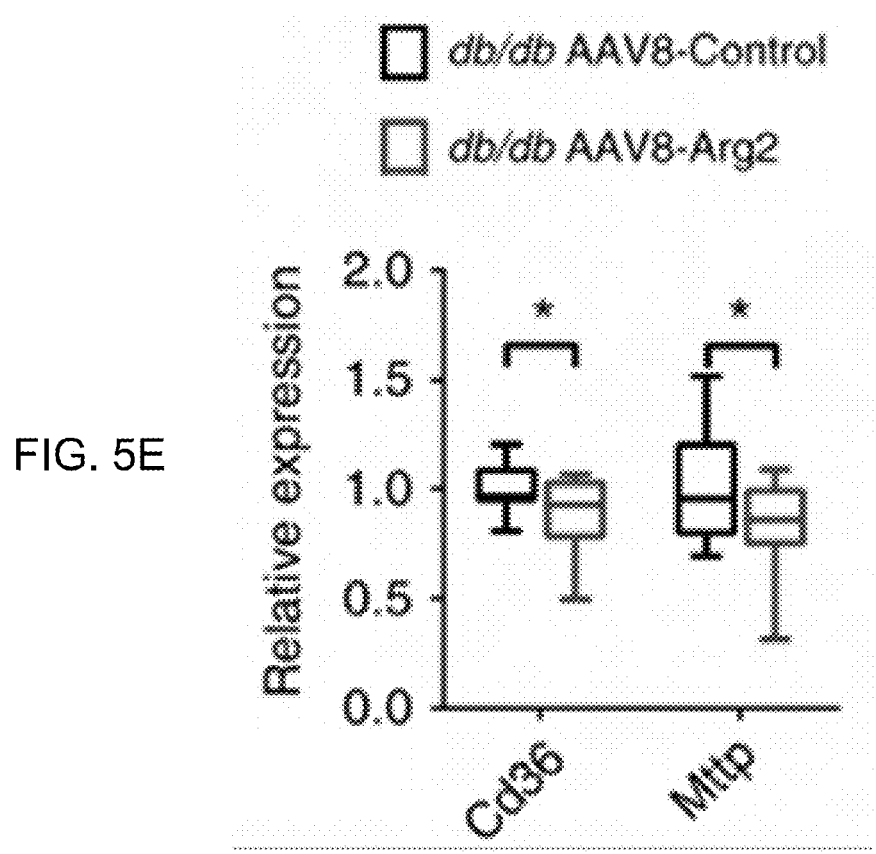
Figure 5F:
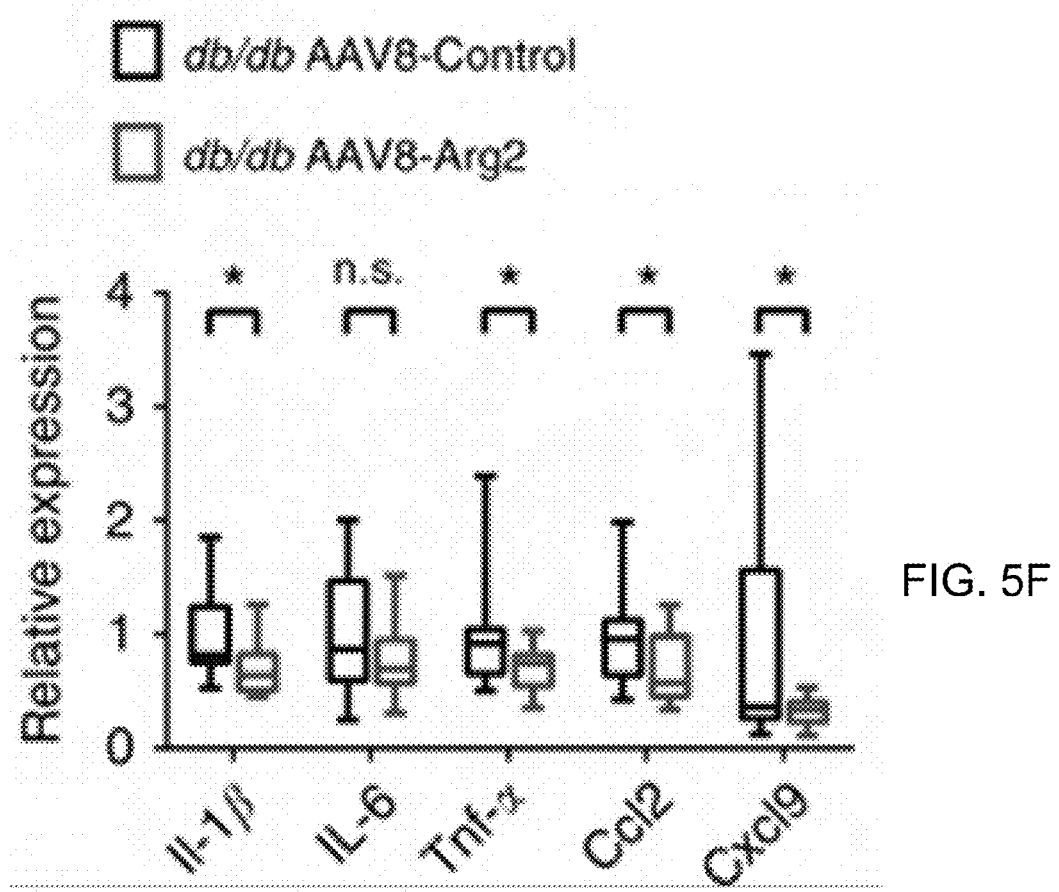
Figure 12G:
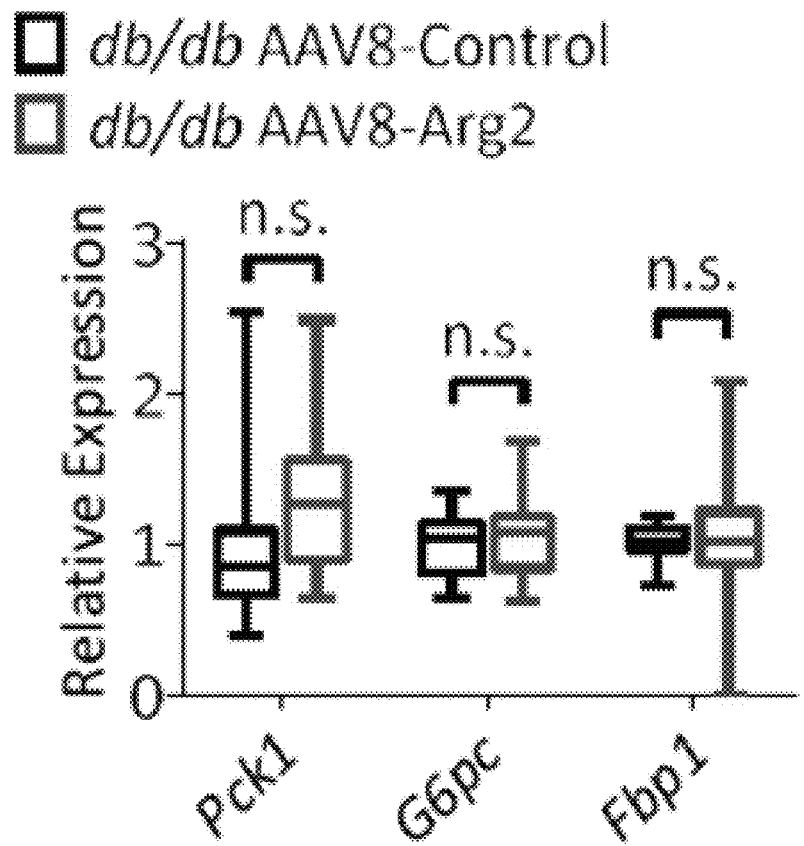
Figure 12H:
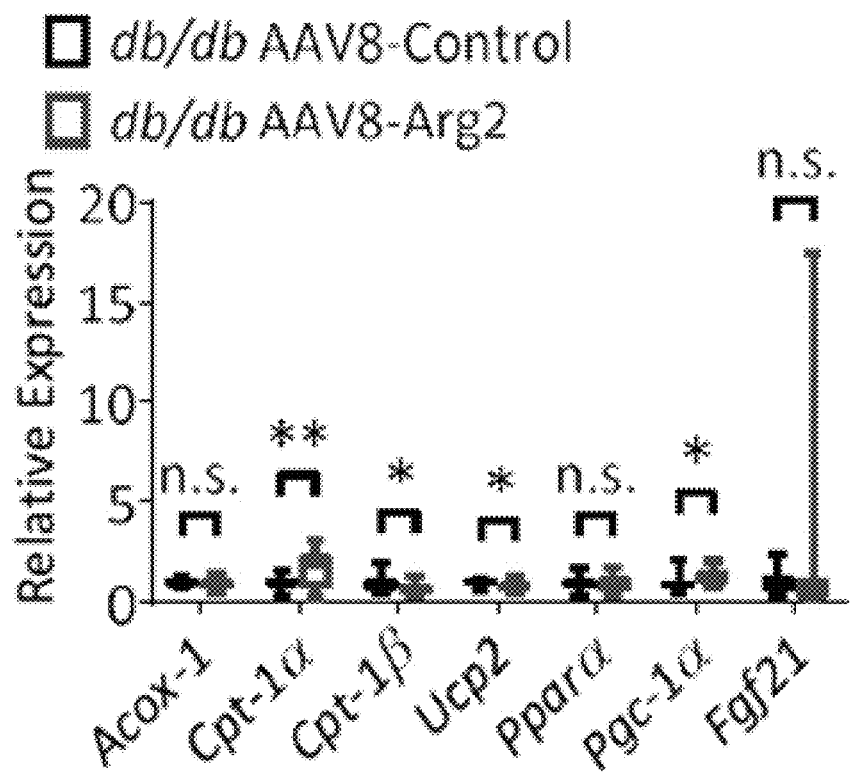

The role of Arg2 in mediating the major hallmarks of hepatic steatosis and inflammation were examined. Similar to the observations made in HFrD-fed AAV8-Arg2 mice, hepatic Arg2 overexpression decreased hepatic TG, FFA, and LDL-C content, without significantly altering total hepatic cholesterol in db/db AAV8-Arg2 mice (FIG. 5A). Histological analysis of H&E and Oil Red O staining confirmed reduced lipid accumulation in db/db AAV8-Arg2 mice when compared with AAV8-control littermates (FIG. 5B). Biochemically, we observed lower serum ALT and trends toward lower AST with elevated serum albumin concentration in db/db AAV8-Arg2 mice relative to those db/db AAV8-Control mice (FIG. 5C). Attenuated steatosis in db/db AAV8-Arg2 mice was paralleled by decreased fatty acid synthetic genes (FIG. 5D), and fatty acid uptake and export genes (FIG. 5E). However, no consistent changes in gluconeogenic or fatty acid oxidation gene programs were observed (FIG. 12G). Arg2 overexpression also attenuated the hepatic inflammatory gene expression response, as assessed by qPCR analysis of Il-1β, Il-6, Tnf-α, Ccl2, and Cxcl9 in db/db mice as compared with their littermate controls at 10 weeks of age (FIG. 5F). Moreover, in hepatic tissue extracts and in serum, only hepatic alanine was significantly altered in db/db AAV8-Arg2 mice versus db/db AAV8-Control mice after multiple comparison correction, as quantified by targeted metabolomic analysis (Table 1). Surprisingly, no significant steady-state changes in urea cycle intermediaries or in arginine itself were defined in serum or hepatic extracts from db/db AAV8-Control and db/db AAV8-Arg2 mice.

TABLE 1

Targeted metabolomic analysis of hepatic extract amino acid and urea cycle intermediaries from db/db AAV8-Control and AAV8-Arg2 mice. Data are shown as mean peak height:internal standard ratio (n = 8 mice per group).

| | LIVER | | | | SERUM | | | |
|---|---|---|---|---|---|---|---|---|
| Amino Acid | db/db AAV8-Control | db/db AAV8-Arg2 | P Value | Corrected P Value | db/db AAV8-Control | db/db AAV8-Arg2 | P Value | Corrected P Value |
| Asp | 0.2551 ± 0.013 | 0.3207 ± 0.0396 | 0.138 | — | 0.139 ± 0.01052 | 0.1795 ± 0.01458 * | 0.039 | —0.8274 |
| Ala | 0.8551 ± 0.0415 | 1.131 ± 0.0589 ** | 0.002 | 0.0378* | 0.1801 ± 0.007167 | 0.2444 ± 0.04159 | 0.127 | — |

TABLE 1-continued

Targeted metabolomic analysis of hepatic extract amino acid and urea cycle intermediaries from db/db AAV8-Control and AAV8-Arg2 mice. Data are shown as mean peak height:internal standard ratio (n = 8 mice per group).

| Amino Acid | LIVER | | | | SERUM | | | |
|---|---|---|---|---|---|---|---|---|
| | db/db AAV8-Control | db/db AAV8-Arg2 | P Value | Corrected P Value | db/db AAV8-Control | db/db AAV8-Arg2 | P Value | Corrected P Value |
| Asn | 0.163 ± 0.00566 | 0.36 ± 0.005645 | 0.711 | — | 0.0411 ± 0.002152 | 0.07538 ± 0.02286 | 0.133 | — |
| Gly | 0.03908 ± 0.002461 | 0.0761 ± 0.0158 * | 0.041 | —0.8526 | 0.007464 ± 0.001199 | 0.0092 ± 0.00258 | 0.536 | — |
| Gln | 0.7092 ± 0.05288 | 0.5686 ± 0.07607 | 0.151 | — | 0.5735 ± 0.03747 | 0.6194 ± 0.05859 | 0.510 | — |
| Pro | 45.69 ± 1.139 | 50.35 ± 1.756 * | 0.043 | —0.9051 | 24.66 ± 2.073 | 34.87 ± 6.82 | 0.153 | — |
| Cit | 0.3072 ± 0.001812 | 0.3784 ± 0.03314 | 0.094 | — | 2.688 ± 0.1269 | 2.885 ± 0.241 | 0.466 | — |
| His | 1.43 ± 0.0562 | 1.574 ± 0.06756 | 0.125 | — | 0.494 ± 0.01149 | 0.5876 ± 0.08059 | 0.240 | — |
| Arg | 0.0729 ± 0.00416 | 0.1839 ± 0.0370 * | 0.013 | —0.2686 | 0.0740 ± 0.0096 | 0.1547 ± 0.0412 | 0.063 | — |
| Orn | 0.311 ± 0.00939 | 0.3329 ± 0.0182 | 0.308 | — | 1.323 ± 0.05483 | 1.22 ± 0.1443 | 0.496 | — |
| Lys | 3.222 ± 0.127 | 3.439 ± 0.2011 | 0.377 | — | 2.561 ± 0.09872 | 2.588 ± 0.2243 | 0.913 | — |
| Trp | 0.1406 ± 0.00505 | 0.1383 ± 0.0044 | 0.735 | — | 0.7338 ± 0.04838 | 0.681 ± 0.01231 | 0.340 | — |
| Phe | 5.068 ± 0.1972 | 5.022 ± 0.1748 | 0.865 | — | 3.178 ± 0.1261 | 3.6 ± 0.335 | 0.237 | — |
| Tyr | 3.72 ± 0.1239 | 3.496 ± 0.1963 | 0.348 | — | 2.603 ± 0.1608 | 3.285 ± 0.3652 | 0.113 | — |
| Leu | 2.589 ± 0.1132 | 2.7 ± 0.1158 | 0.500 | — | 2.139 ± 0.1887 | 2.432 ± 0.2701 | 0.380 | — |
| Ile | 1.832 ± 0.0623 | 2.053 ± 0.1144 | 0.112 | — | 2.362 ± 0.2032 | 2.931 ± 0.3141 | 0.143 | — |
| Met | 1.725 ± 0.09599 | 1.898 ± 0.1032 | 0.239 | — | 1.516 ± 0.162 | 2.038 ± 0.2976 | 0.134 | — |
| Val | 1.551 ± 0.04573 | 1.843 ± 0.1468 | 0.079 | — | 2.279 ± 0.1719 | 2.742 ± 0.2977 | 0.188 | — |
| Glu | 1.373 ± 0.09428 | 1.768 ± 0.2292 | 0.135 | — | 0.4315 ± 0.0388 | 0.4327 ± 0.0703 | 0.988 | — |
| Thr | 1.611 ± 0.05668 | 1.498 ± 0.0756 | 0.251 | — | 1.142 ± 0.038 | 1.218 ± 0.09126 | 0.431 | — |
| Ser | 1.632 ± 0.06994 | 1.725 ± 0.0734 | 0.370 | — | 0.7294 ± 0.0304 | 0.9478 ± 0.1761 | 0.214 | — |

* $P < 0.05$.

Higher Cholesterol and Insulin in Arg2ASO db/db Mice

Figure 6C:
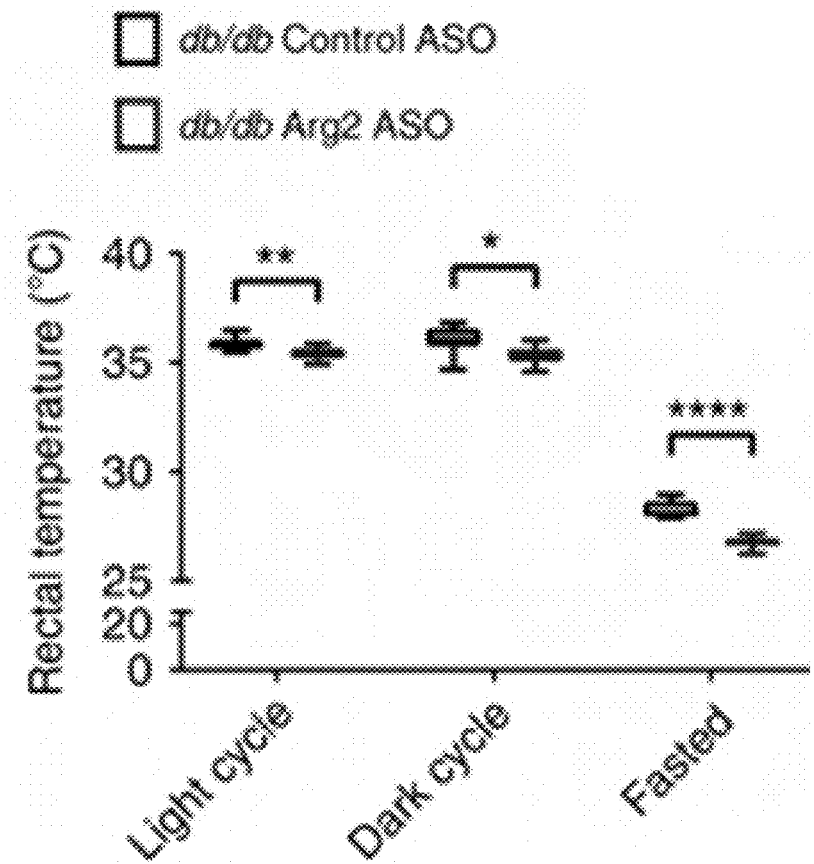
Figure 13A:
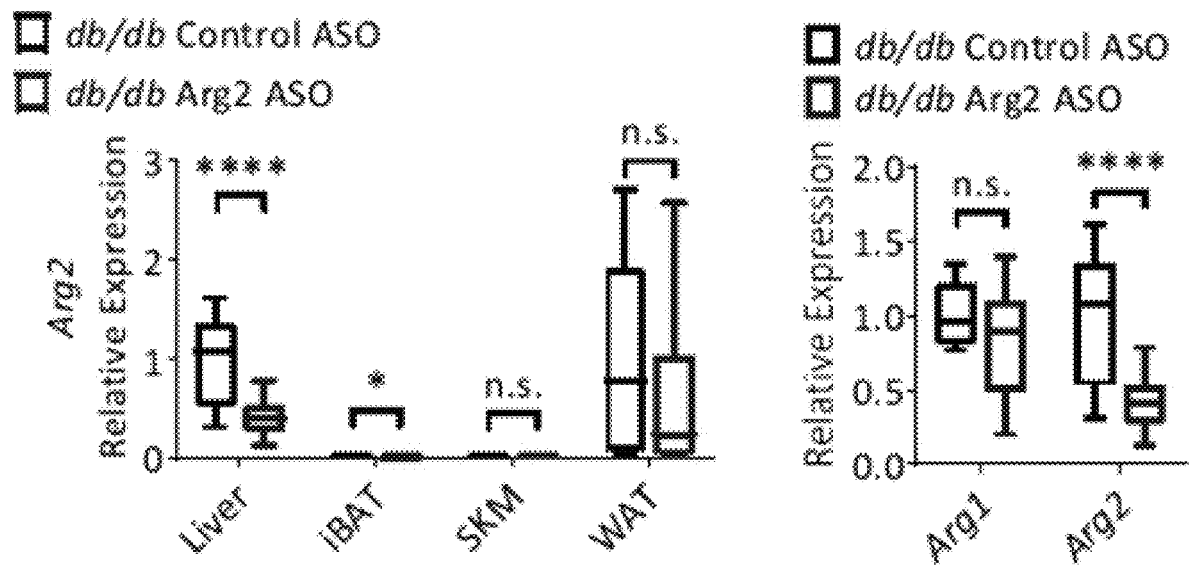
FIG. 13A-FIG. 13D depict impaired energy metabolism in db/db mice treated with Arg2 ASO.
Figure 13B:
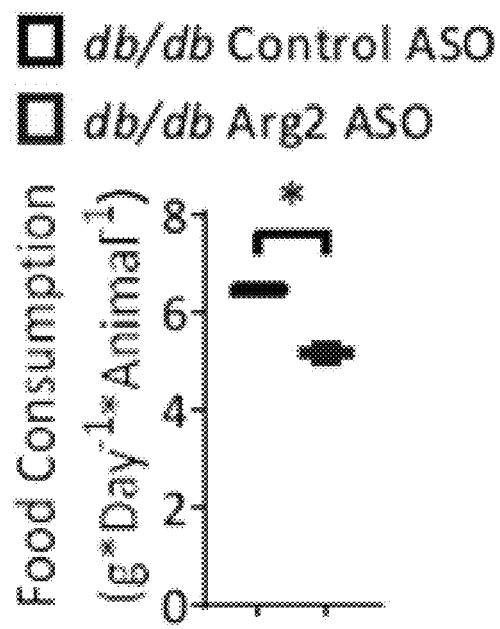

Hepatic Arg2 overexpression protected mice from diet- and genetically-induced insulin resistance, adiposity and hepatic steatosis and inflammation. To examine the consequences of liver-selective Arg2 deficiency, db/db mice were treated with either scrambled or Arg2-directed antisense oligonucleotides, followed by metabolic assessment (FIG. 6A). This resulted in significant hepatic Arg2 mRNA knockdown without knockdown in iBAT, SKM or WAT (FIG. 13A) or in kidney (not shown). There were no hepatic changes in Arg1 mRNA expression (FIG. 13A). Endpoint total body weight, total fat mass, and fat percentage did not significantly change (FIG. 6B), although food consumption was slightly lower in liver Arg2-deficient mice (FIG. 3B), and core temperature was lower in db/db Arg2 ASO-treated mice when compared with db/db Control ASO-treated mice (FIG. 6C).

Figure 6D:
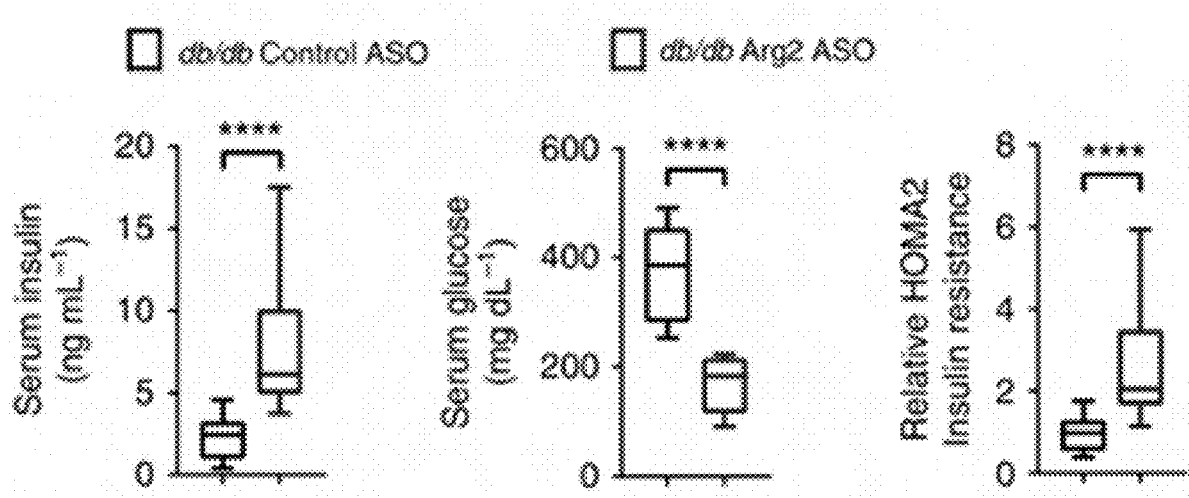
Figure 6E:
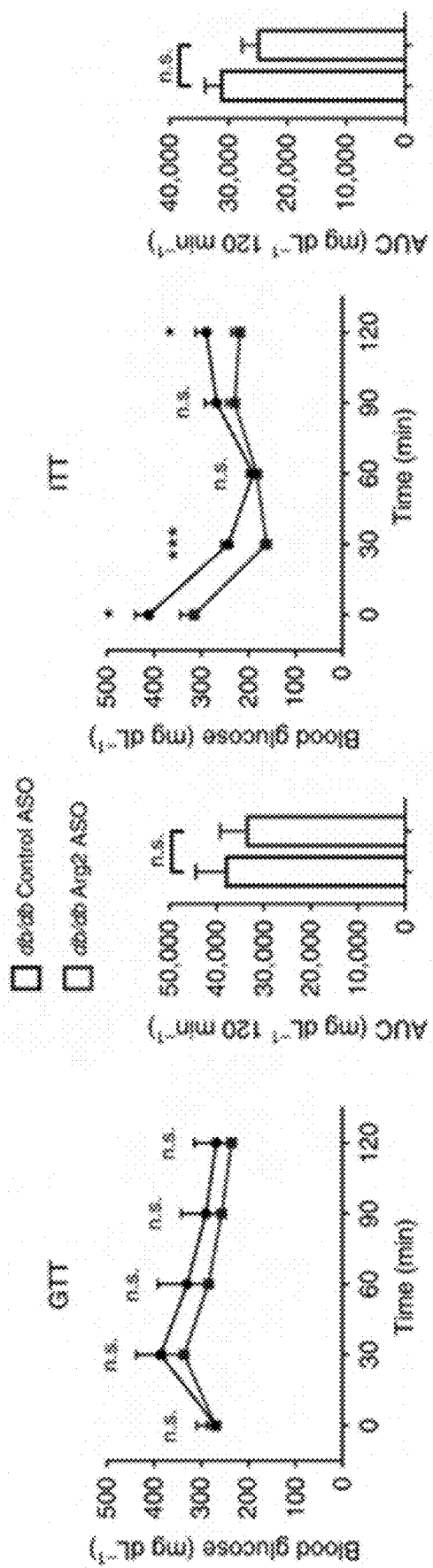
Figure 13C:
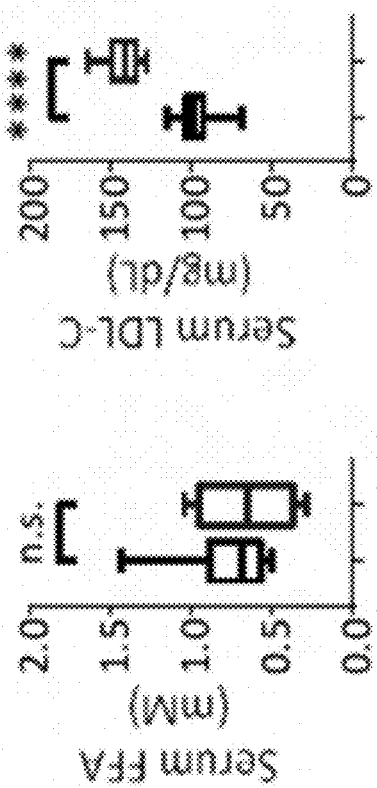
Figure 13C:
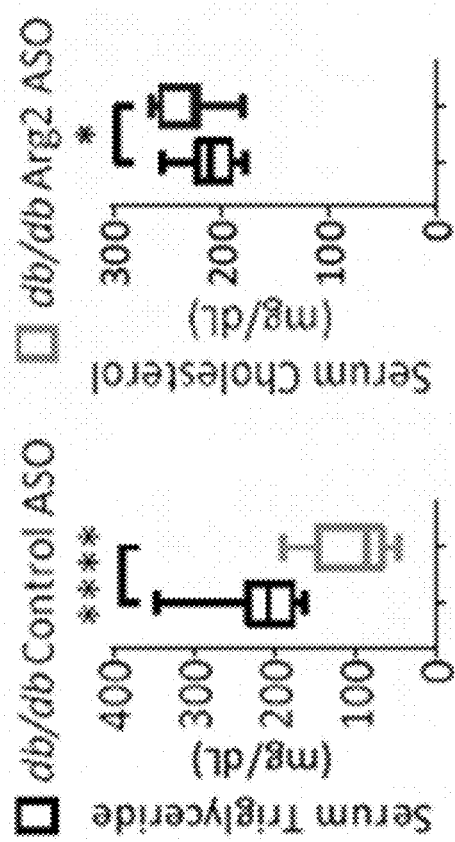
Figure 13D:
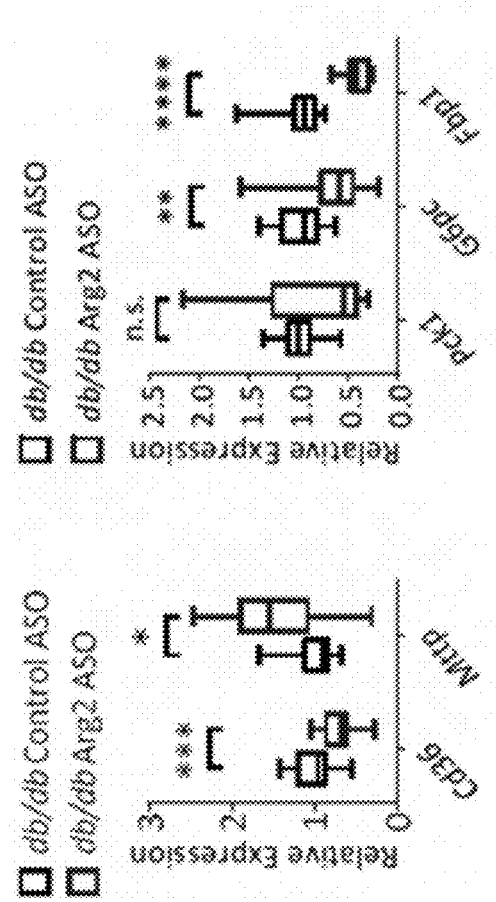

Quantifying serum parameters in db/db Arg2 ASO-treated mice revealed lower serum triglycerides and glucose, but elevated total cholesterol and LDL cholesterol as well as elevated insulin and calculated HOMA2 in db/db Arg2 ASO-treated mice when compared with db/db Control ASO-treated mice (FIG. 60, and FIG. 13C), although fasting glucose was lower in Arg2 ASO mice, in concordance with lower gluconeogenic gene (G6pc and Fbp1) expression (FIG. 6D, and FIG. 13D). Total areas under the insulin- and glucose tolerance testing curves were unchanged in db/db Control versus Arg2 ASO-treated mice (FIG. 6E).

Liver Steatosis and Inflammation after Liver Arg2 Knockdown

Figure 7A:
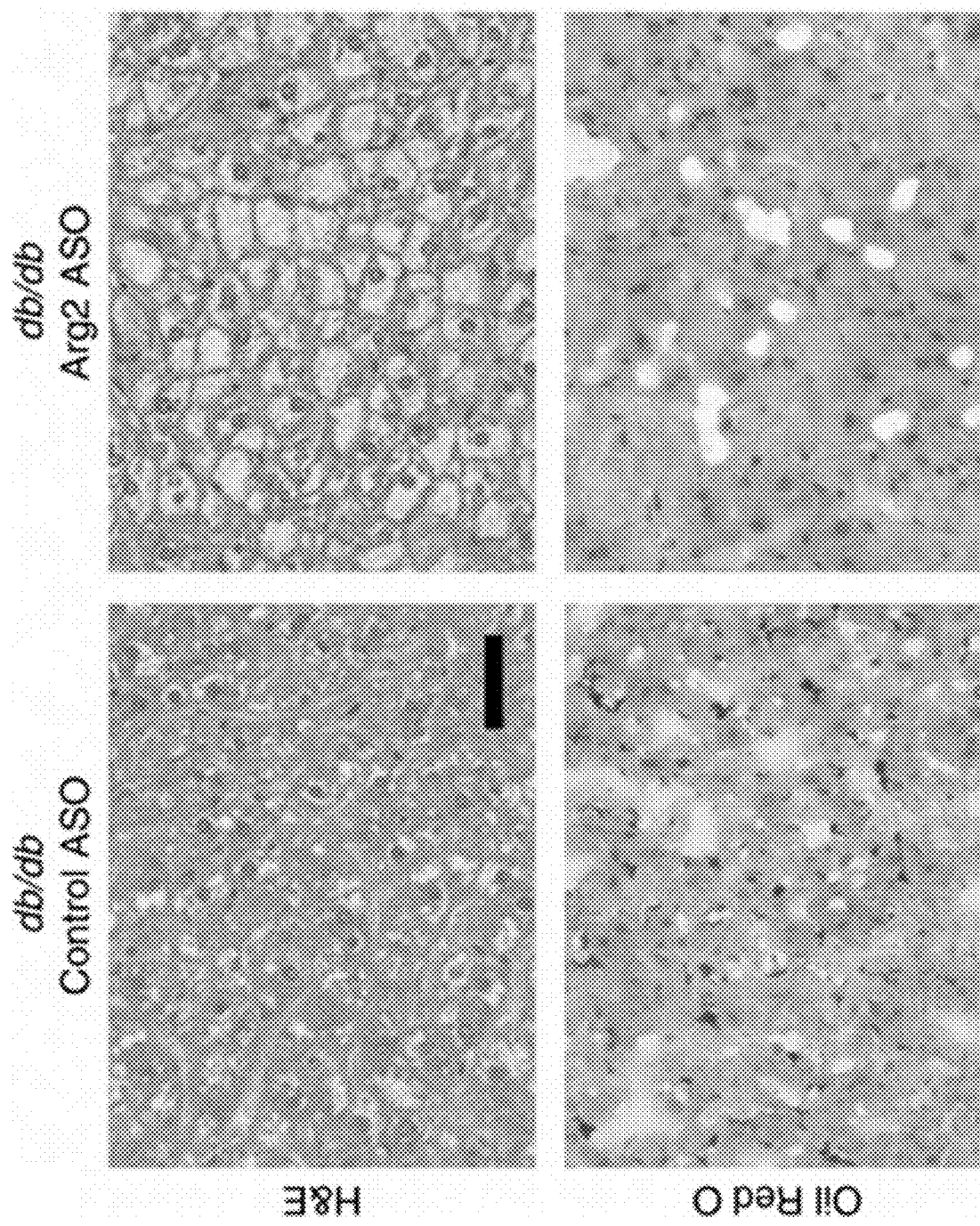
FIG. 7A-FIG. 7E depict hepatic Arg2 deficiency exacerbates hepatic steatosis and inflammation in db/db mice.
Figure 7B:
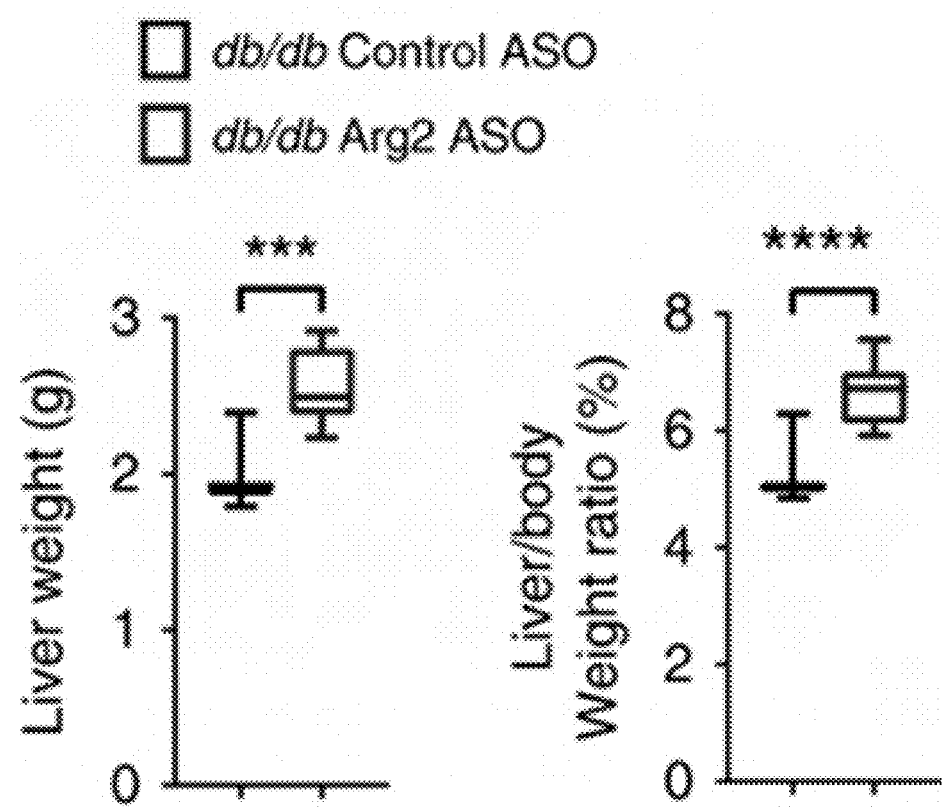
Figure 7C:
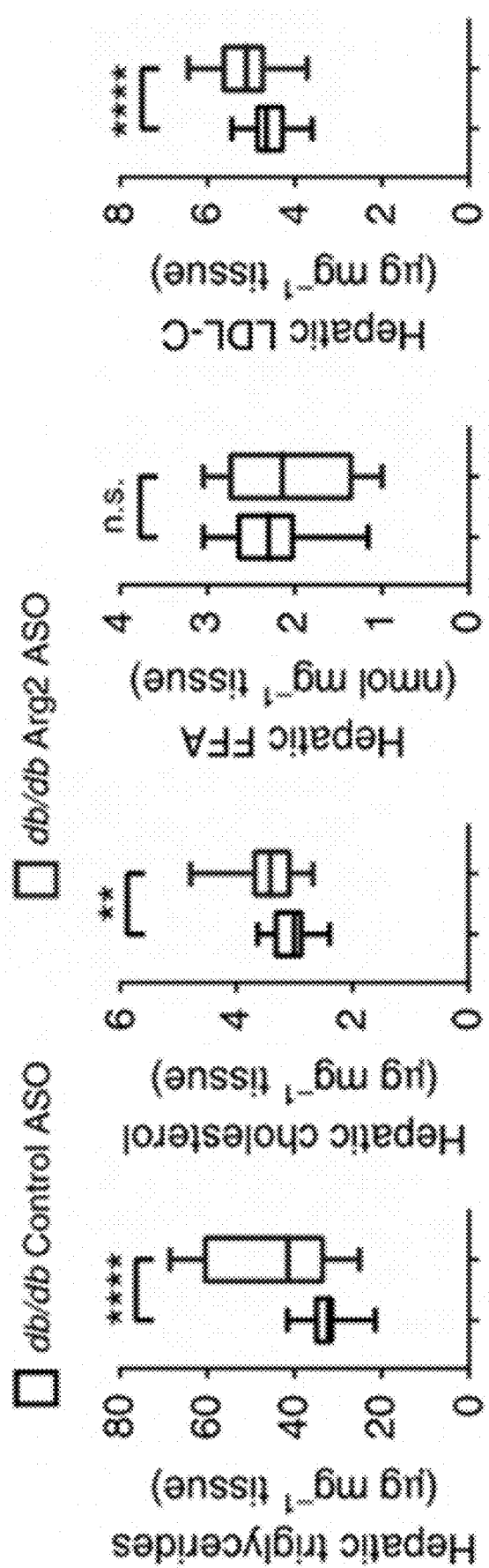
Figure 7D:
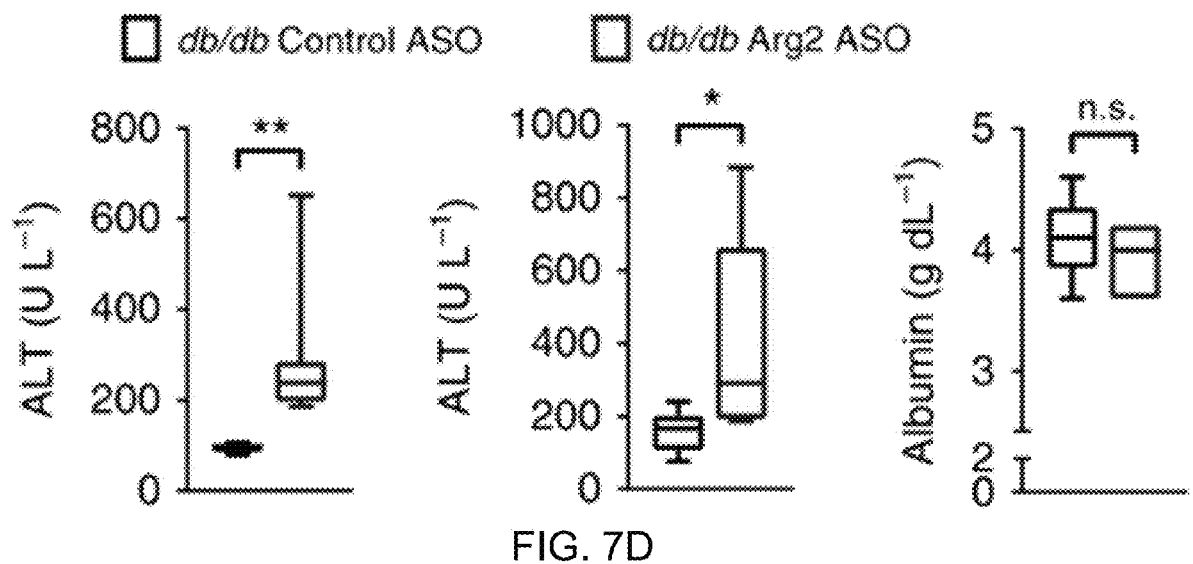
Figure 7E:
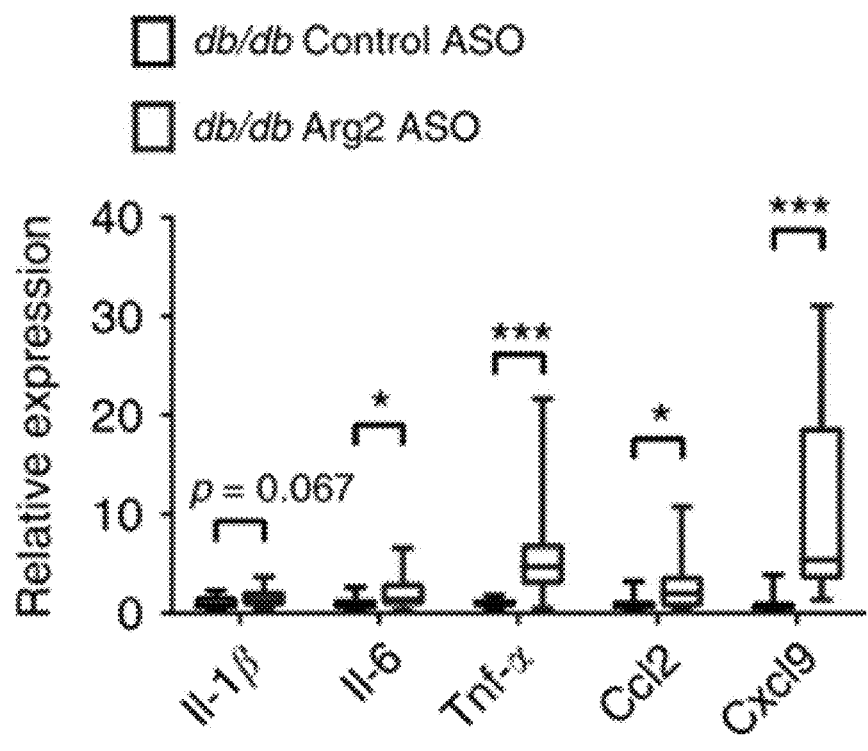

Next the hepatic effects of liver Arg2 deficiency in db/db mice were examined. Total liver weight and liver weight-to-body weight ratios were elevated in liver Arg2-deficient mice (FIG. 7A). Concomitantly, liver Arg2-deficient db/db mice exhibited increased neutral lipid accumulation, as determined by routine histological and Oil Red O analyses (FIG. 7B). Accordingly, hepatic triglycerides, total cholesterol and LDL-C and serum ALT and AST were all increased (FIG. 7C), without alterations in hepatic synthetic function in liver Arg2-deficient mice versus db/db controls (FIG. 7D). Hepatic inflammatory marker gene expression of Il-6, Tnf-α, Ccl2, and Cxcl9 was increased in hepatic Arg2-deficient db/db mice versus db/db controls (FIG. 7E). Whereas gluconeogenic gene expression in Arg2-deficient db/db livers (FIG. 13D), genes involved in de novo lipogenesis: Scd1, Gpam, and Pparγ were elevated in Arg2-deficient db/db livers when compared with db/db controls.

Transcriptomics Reveal Inverse Arg2-Rgs16 Regulation

Figure 8A:
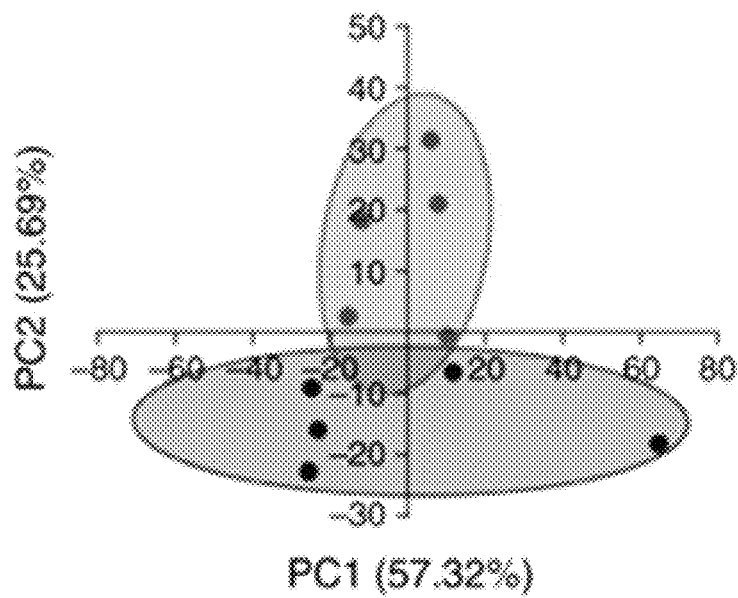
FIG. 8A-FIG. 8G depict inverse Arg2-RGS16 regulatory relationship is identified by unbiased transcriptomics.
Figure 8B:
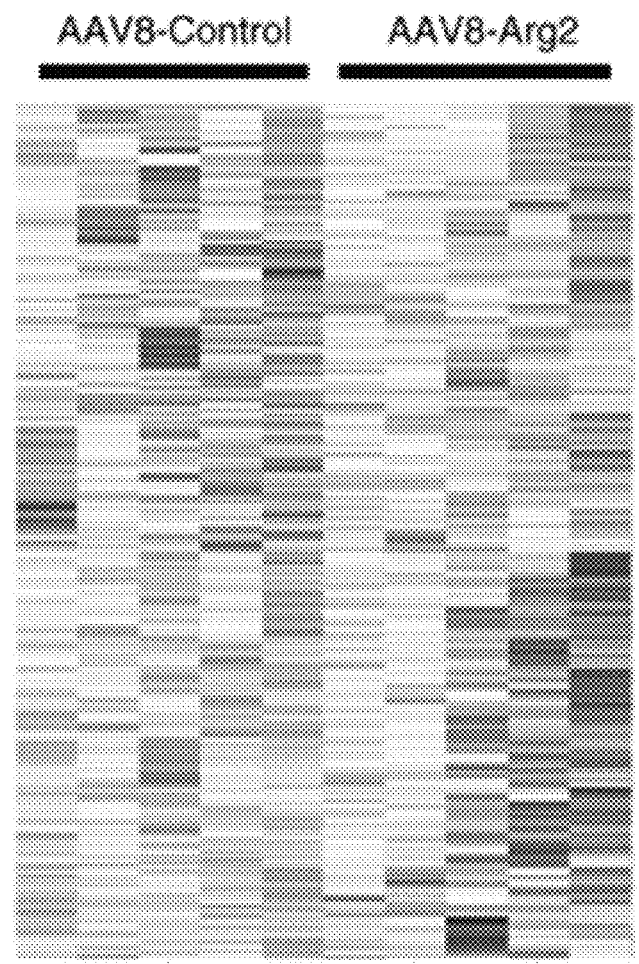
Figure 8C:
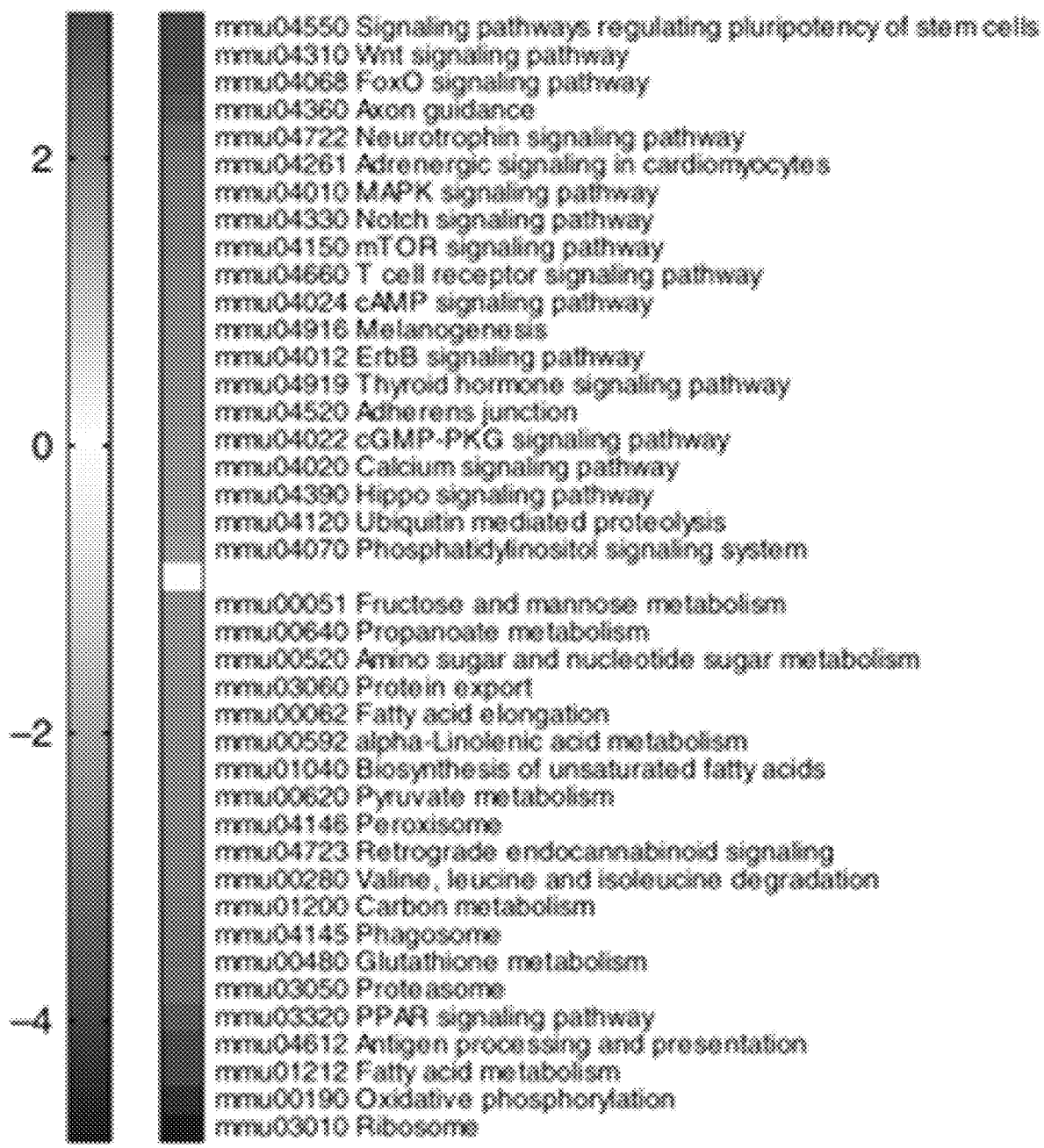
Figure 8D:
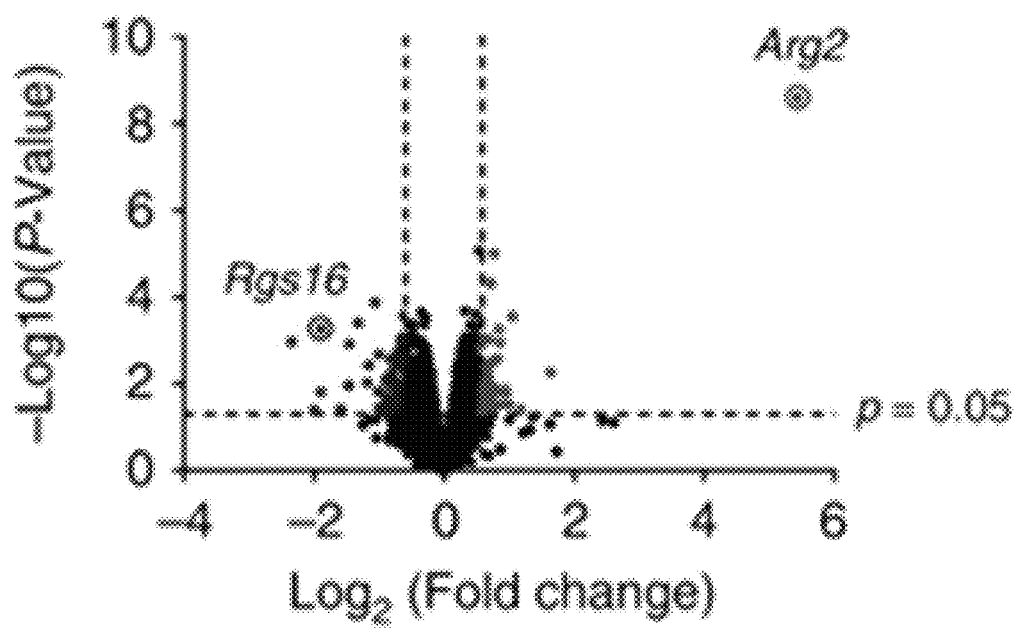
Figure 8E:
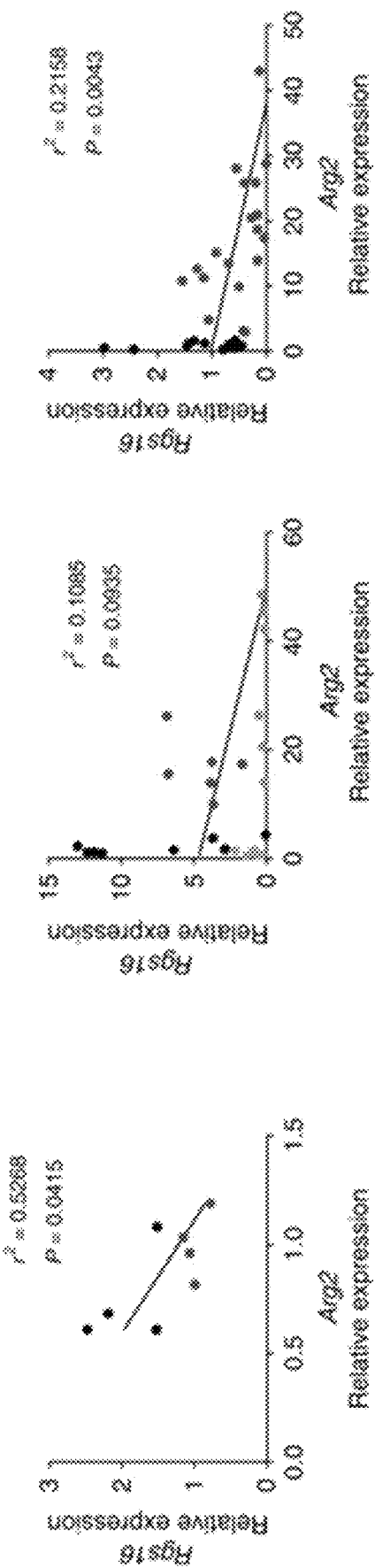

To explore potential mechanisms by which hepatic Arg2 overexpression improves hepatic lipid homeostasis, inflammation and insulin sensitivity, we examined unbiased transcriptional profiling by RNA-seq to analyze transcriptomic changes in the livers of db/db AAV8-Arg2 mice and AAV8-Control mice. Principal component analyses revealed distinct gene clusters between db/db and db/db AAV8-Arg2 groups (FIG. 8A). This was corroborated by unsupervised gene-level clustering revealing distinctive patterns of significantly upregulated and downregulated genes when comparing db/db AAV8-Arg2 and db/db AAV8-Control mice (FIG. 8B). Kyoto Encyclopedia of Genes and Genomes (KEGG) pathway enrichment analysis of differentially expressed genes revealed enhanced phosphatidylinositol signaling, mTOR and FOXO signaling, consistent with enhanced hepatic insulin signaling. Conversely, consistent with fasting-state cellular physiology, significant downregulation of fructose, mannose, amino acid and nucleotide sugar metabolism, fatty acid elongation and biosynthesis, and carbon/pyruvate metabolism (FIG. 8C). Volcano plot analysis confirmed upregulation of Arg2 gene expression in db/db AAV8-Arg2 mice, and identified the hepatocyte regulator of G-protein signaling 16 (RGS16) as among the most highly suppressed genes in db/db AAV8-Arg2 mice (FIG. 8D). In light of the described pathogenic role of RGS16 in hepatic steatosis[35], we further interrogated whether Arg2 and RGS16 anti-correlate in multiple models of metabolic disease. In db/+mice, in wild-type mice overexpressing Arg2 and in db/db AAV8-Arg2 mice, we observed an inverse relationship between Arg2 and Rgs16 expression (FIG. 8E).

Figure 8F:
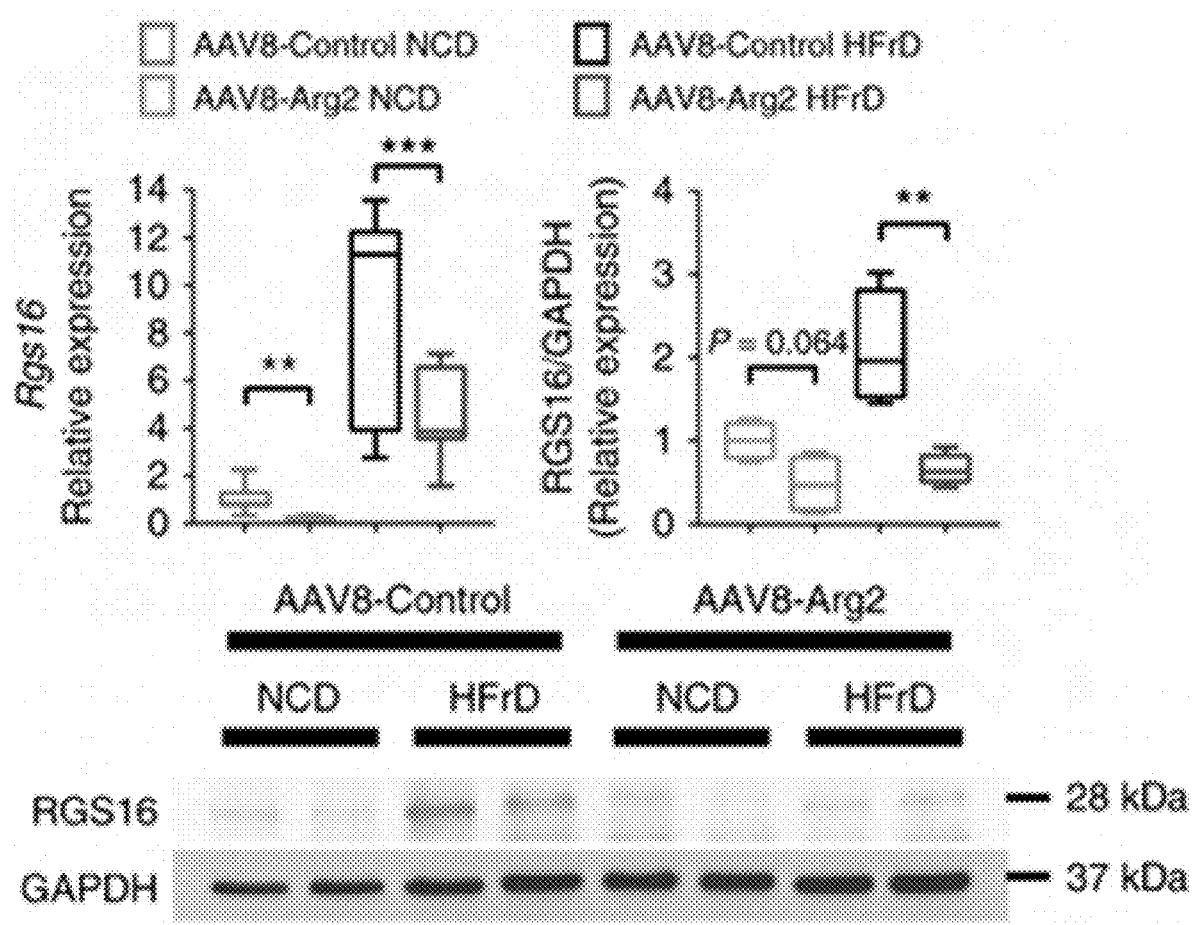
Figure 8G:
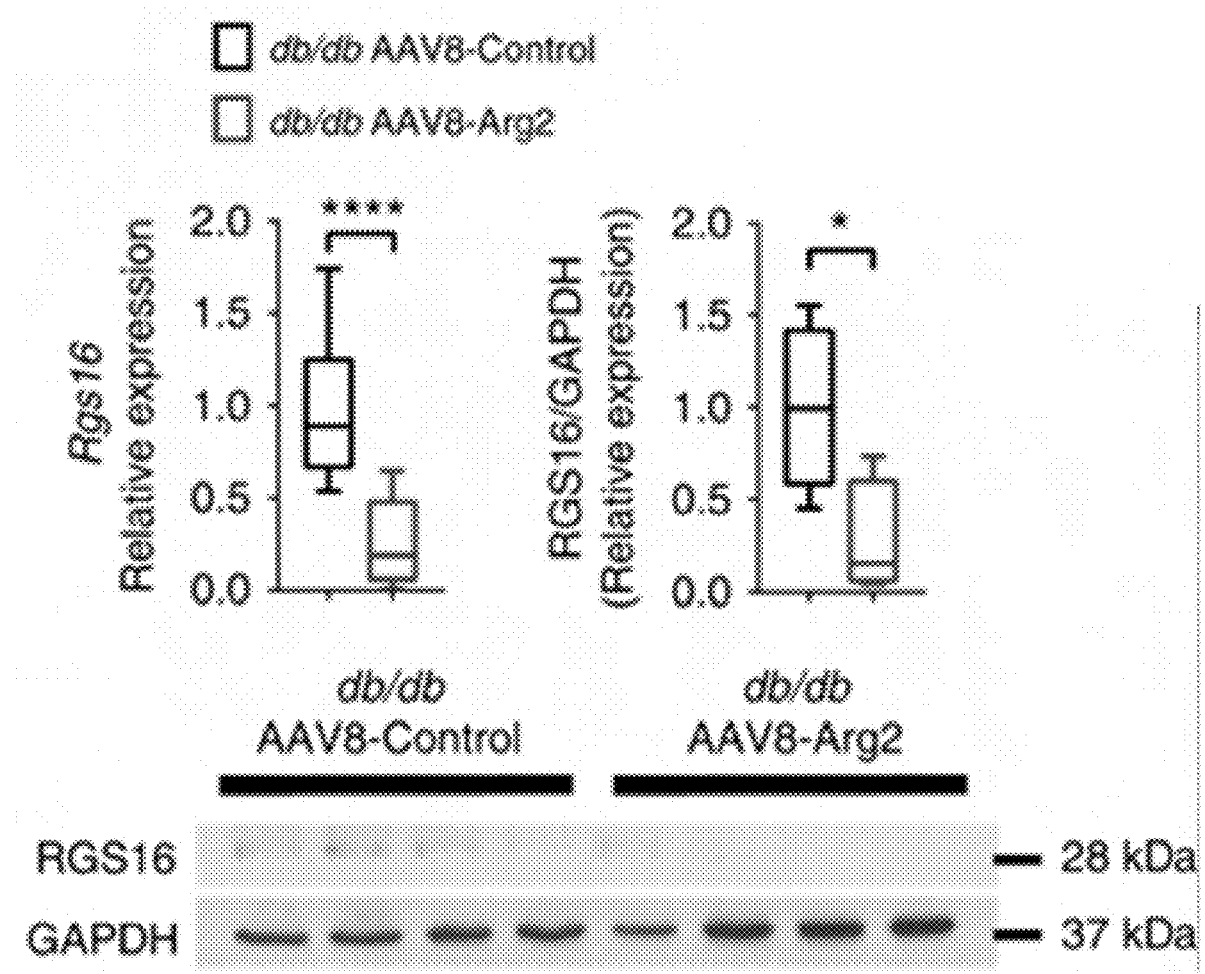
Figure 14:
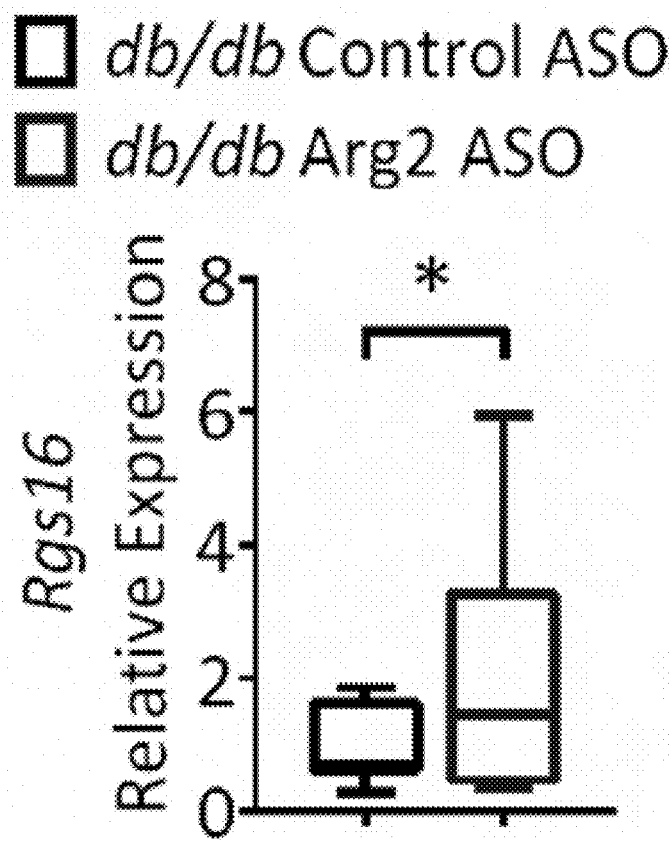
FIG. 14 shows RGS16 mRNA expression in livers from db/db Control and Arg2 ASO mice. (n=8 mice per group). For boxes represent the interquartile range and whiskers show the full range of values. *, P<0.05 vs. control, by twotailed Student's t-test.

Moreover, hepatic Rgs16 mRNA and protein levels were significantly suppressed by direct Arg2 expression in the livers of chow and HFrD-fed and db/db AAV8-Arg2 mice (FIG. 8F, 8G), whereas hepatic Arg2-deficient mice exhibited upregulated hepatic Rgs16 mRNA (FIG. 14). Together, the data identify an inverse relationship between hepatic Rgs16 and Arg2.

Hepatic Rgs16 Reconstitution Reverses Hepatic Arg2 Effects

Figure 9A:
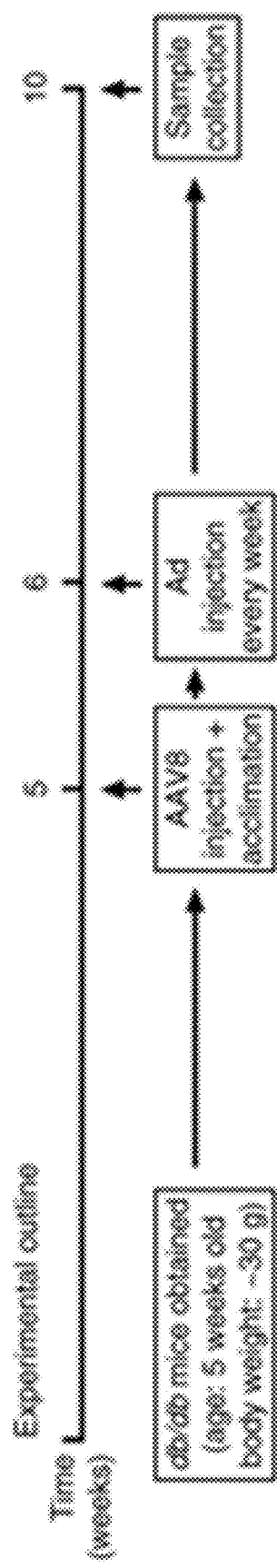
FIG. 9A-FIG. 9G depict hepatic RGS16 reconstitution reverses Arg2-mediated improvements in peripheral fat accumulation and glucose homeostasis.
Figure 9C:
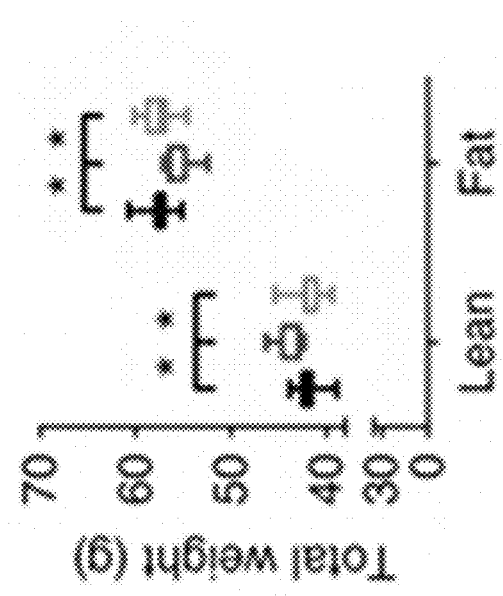
Figure 9B:
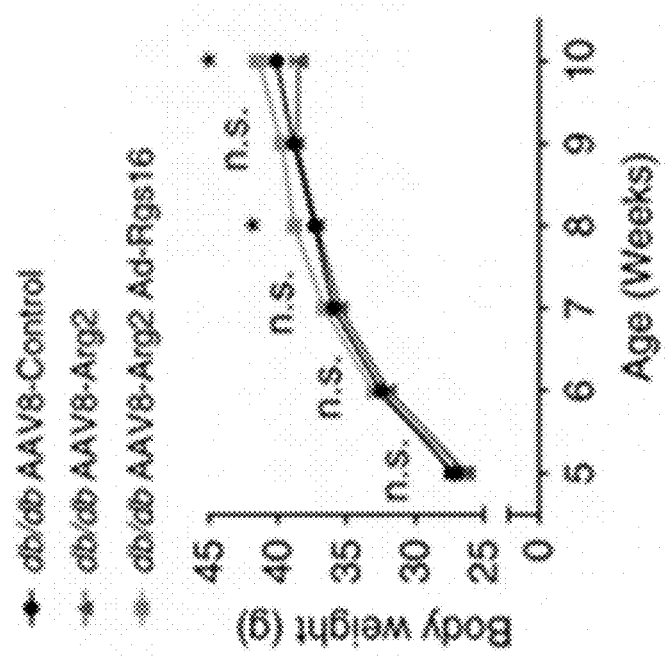
Figure 9D:
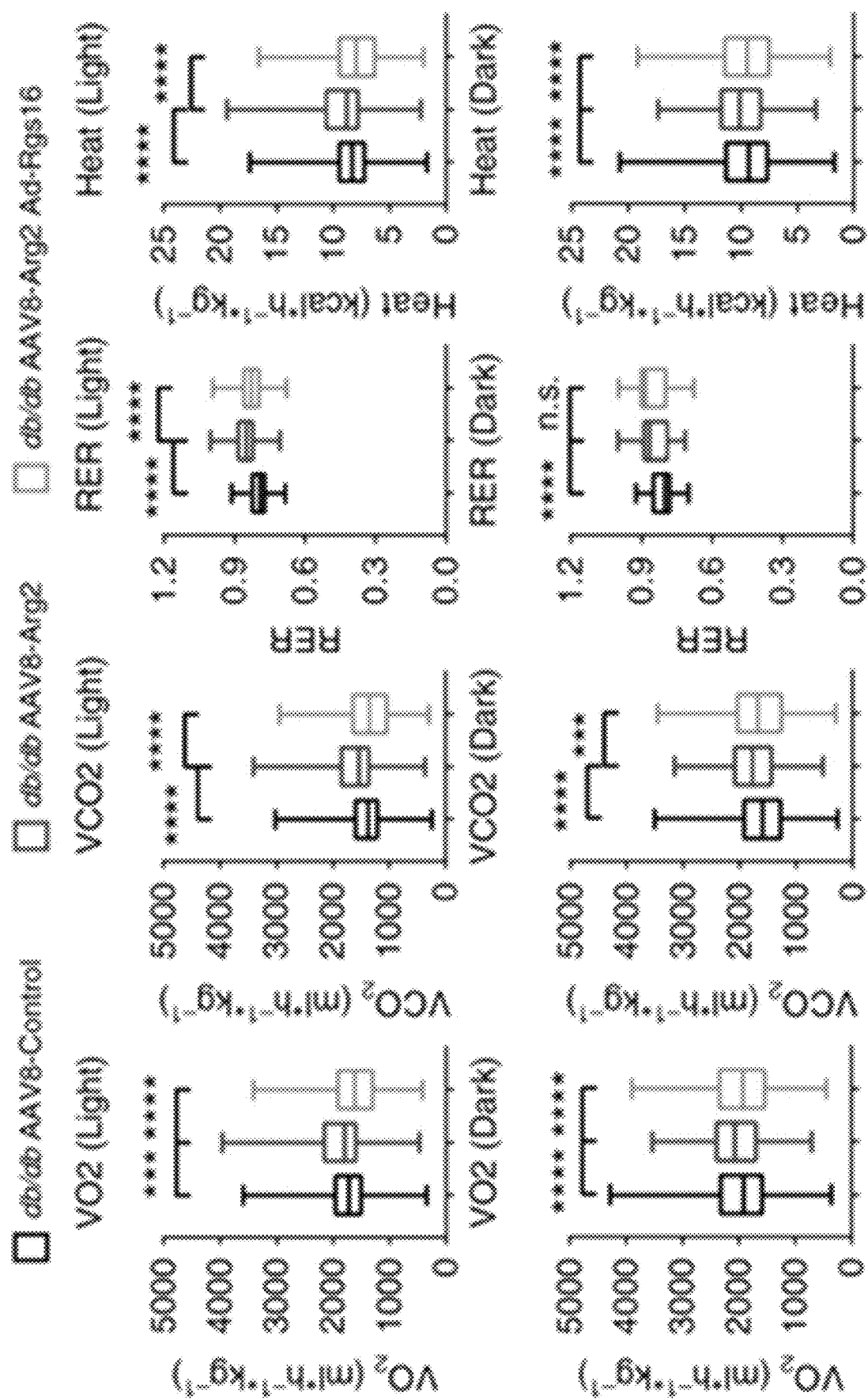
Figure 9E:
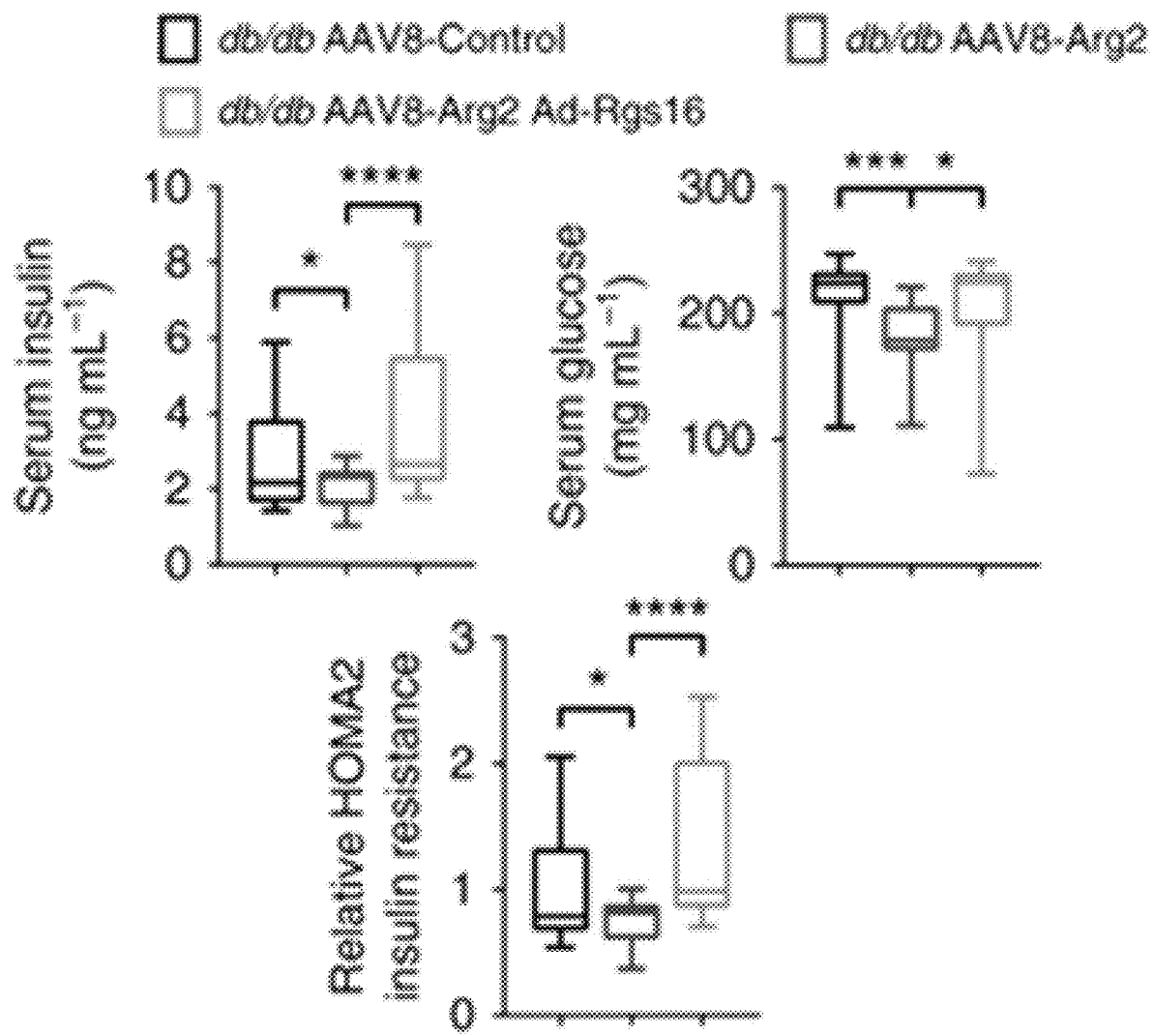
Figure 9F:
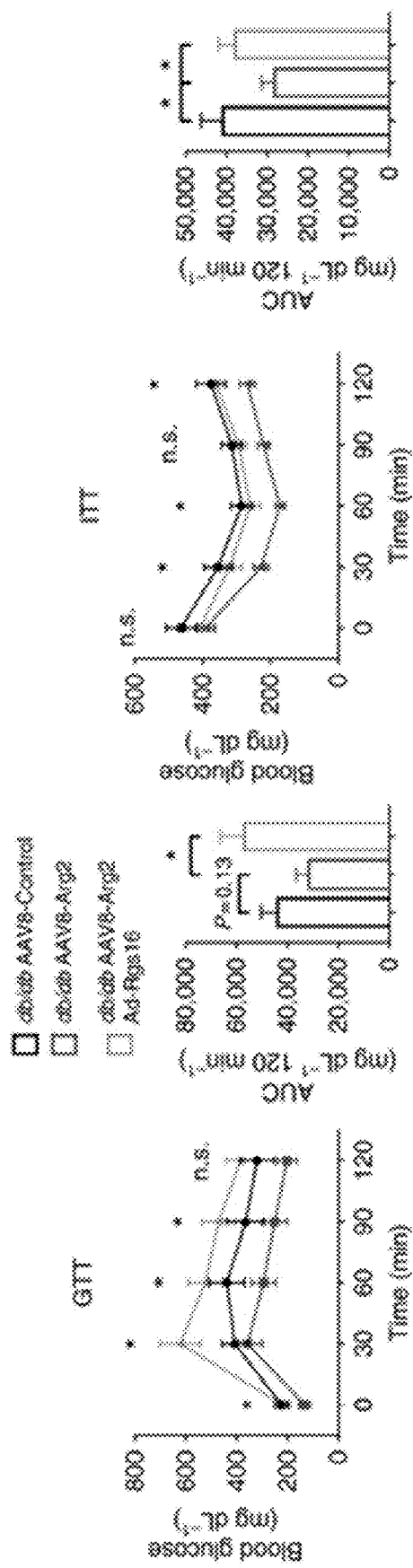
Figure 9G:
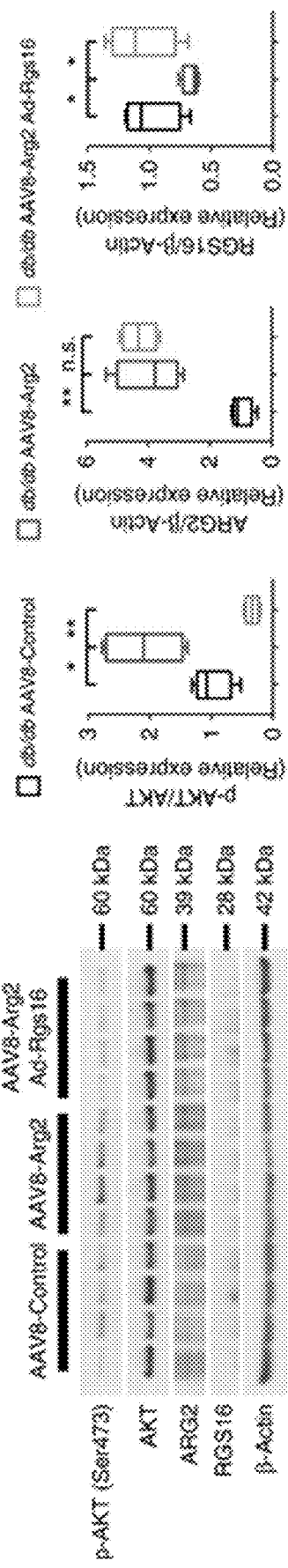
Figure 15A:
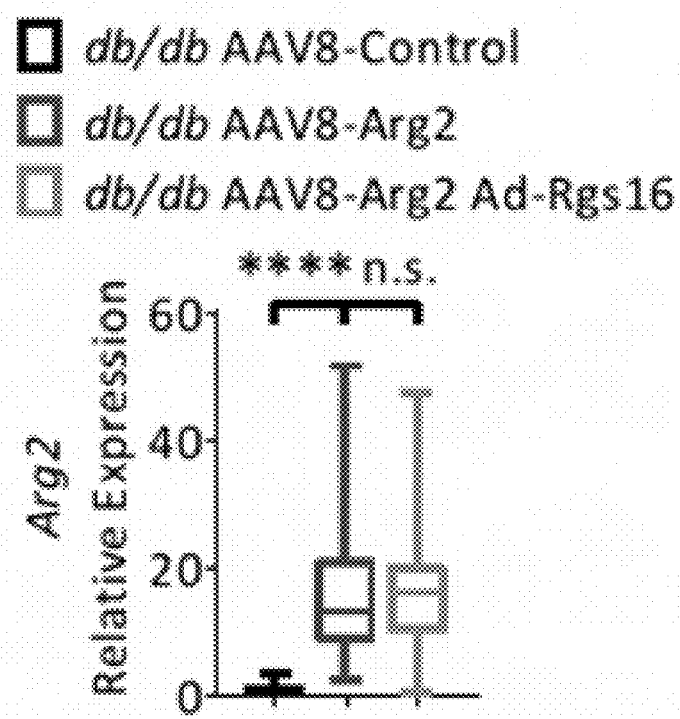
FIG. 15A-FIG. 15F depict Hepatic RGS16 reconstitution impairs energy metabolism in Arg2 overexpressing mice.
Figure 15B:
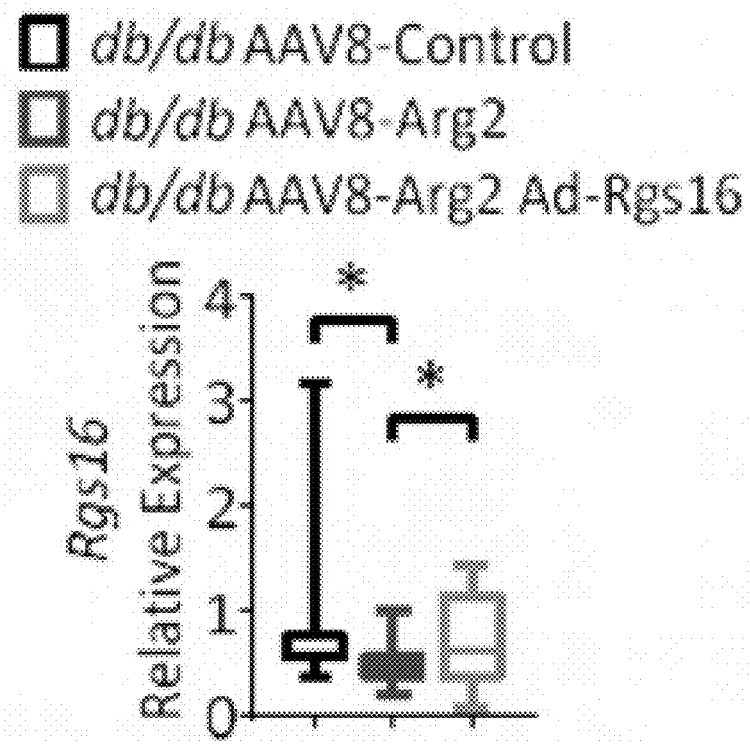
Figure 15C:
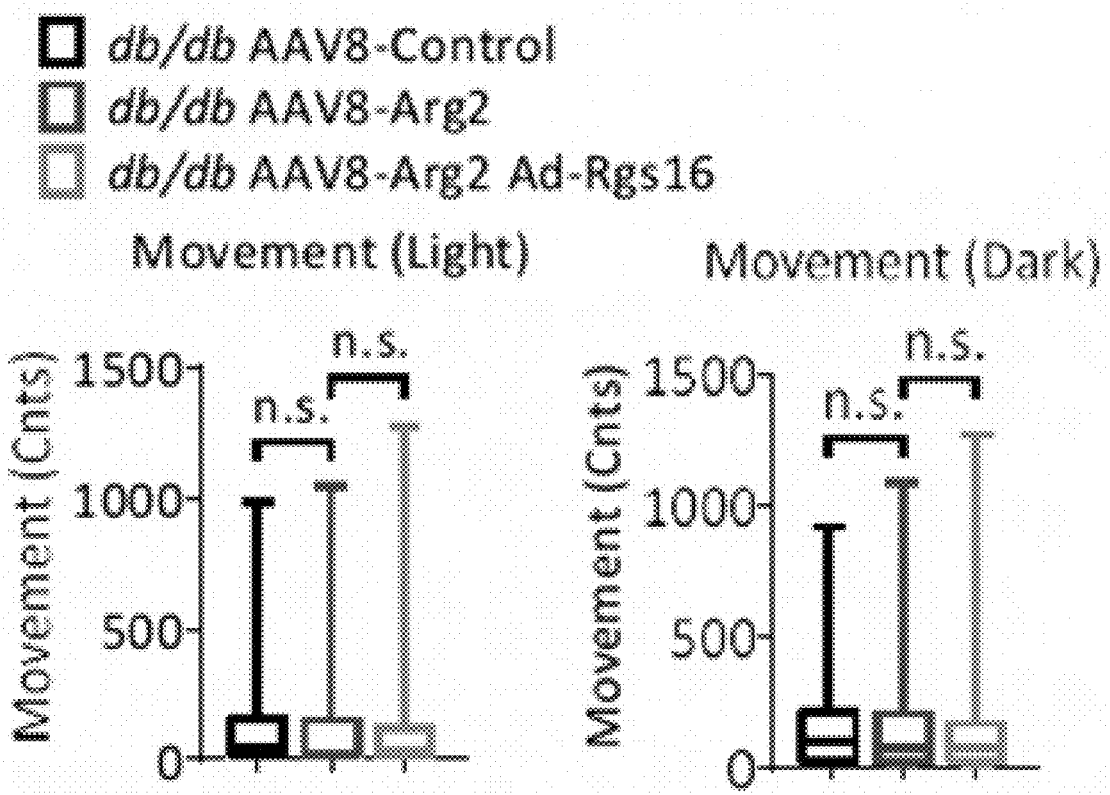
Figure 15D:
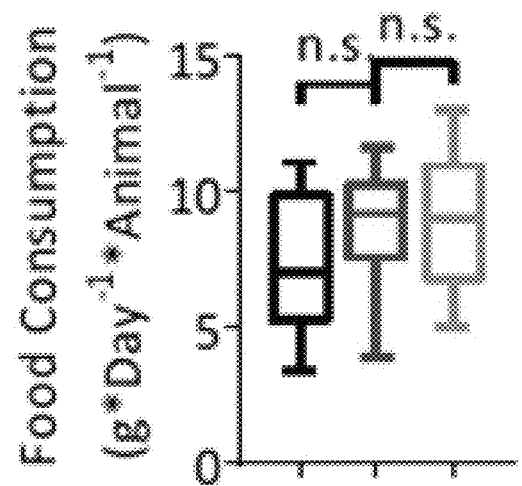
Figure 15E:
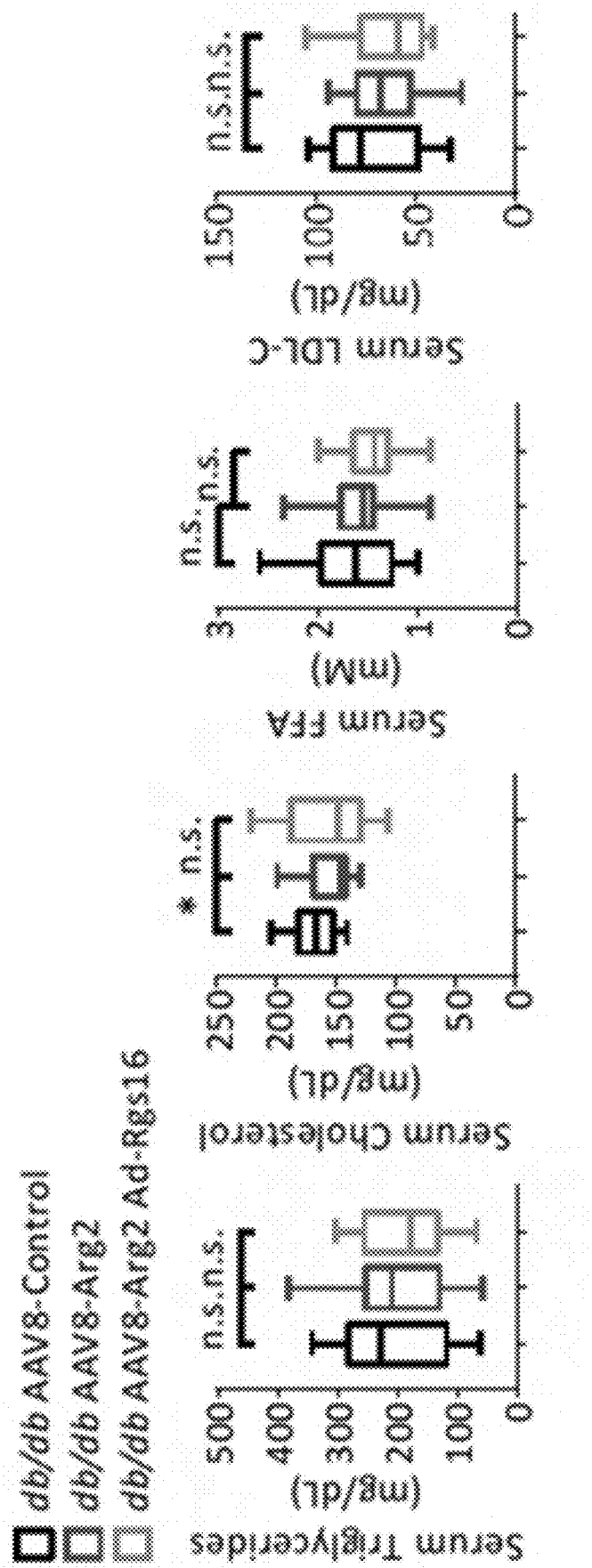

Next, the hypothesis that genetic reconstitution of hepatic RGS16 in the context of Arg2 overexpression would reverse the improvements in hepatic steatosis, inflammation and insulin and glucose intolerance observed in Arg2-treated db/db mice was examined. To that end, db/db AAV8-Control and AAV8-Arg2 mice were treated with adenovirus encoding GFP (Ad-Control) or RGS16 (Ad-Rgs16, Experimental outline, FIG. 9A). Arg2 overexpression was confirmed, Rgs16 suppression and mild Rgs16 reconstitution in response to our AAV8 and adenoviral manipulation (FIG. 15A, 15B). In db/db mice, Arg2 overexpression attenuated weight gain, increased fat mass and decreased lean mass, although we noted the weight bifurcation occurred later in the adenovirus-treated cohorts (FIG. 9B) than in the control cohorts (FIG. 4B). Nevertheless, these changes were reversed by RGS16 reconstitution. in db/db AAV8-Arg2 mice when compared with Ad-Control-treated mice (FIG. 9B, 9C). db/db AAV8-Arg2 mice again exhibited enhanced energy expenditure and oxygen consumption by indirect calorimetry when compared with db/db AAV8-control mice without altering locomotion or food consumption (FIG. 9D, and FIG. 15C, 15D). However, RGS16 reconstitution reversed the energetic enhancements in db/db AAV8-Arg2 mice (FIG. 9D). Accordingly, Rgs16 reconstitution substantially exacerbated insulin resistance in db/db mice as defined by serum insulin, glucose, and HOMA2-IR (FIG. 9E). This was further confirmed by glucose and insulin tolerance testing (FIG. 9F). Hepatic insulin sensitivity, as quantified by insulin-stimulated AKT phosphorylation, was impaired by Rgs16 expression in the liver (FIG. 9G) when compared with db/db AAV8-Arg2 mice treated with Ad-Control.

Figure 10A:
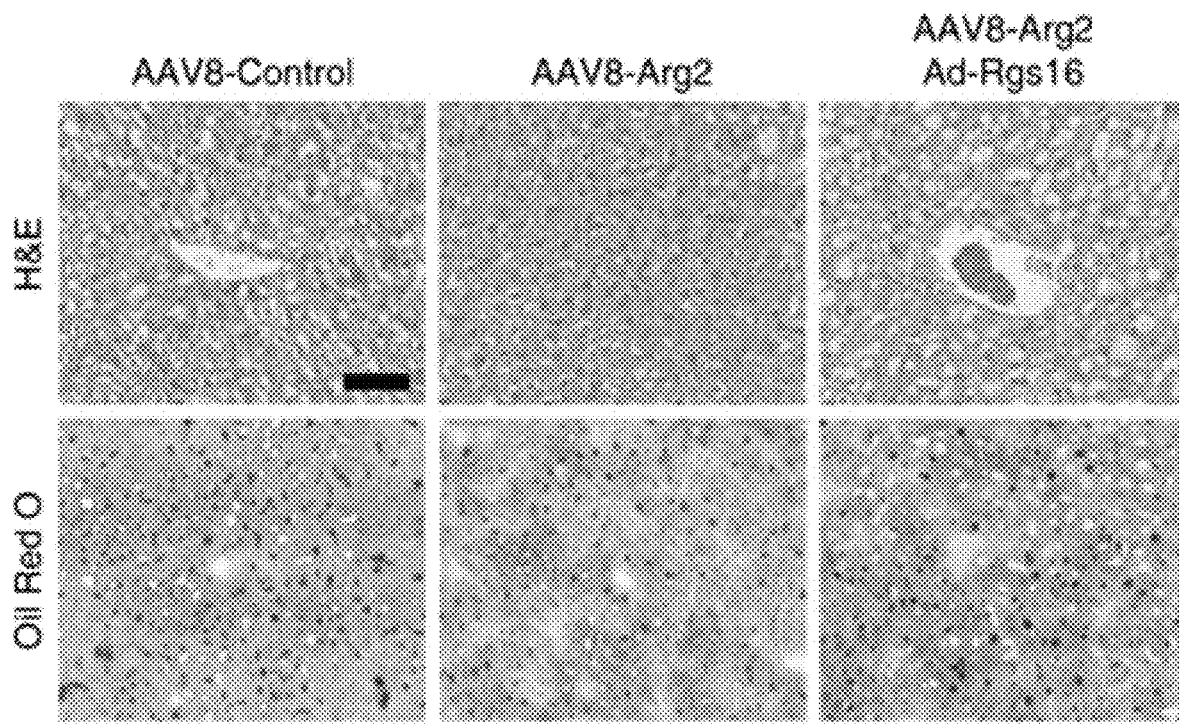
Figure 10B:
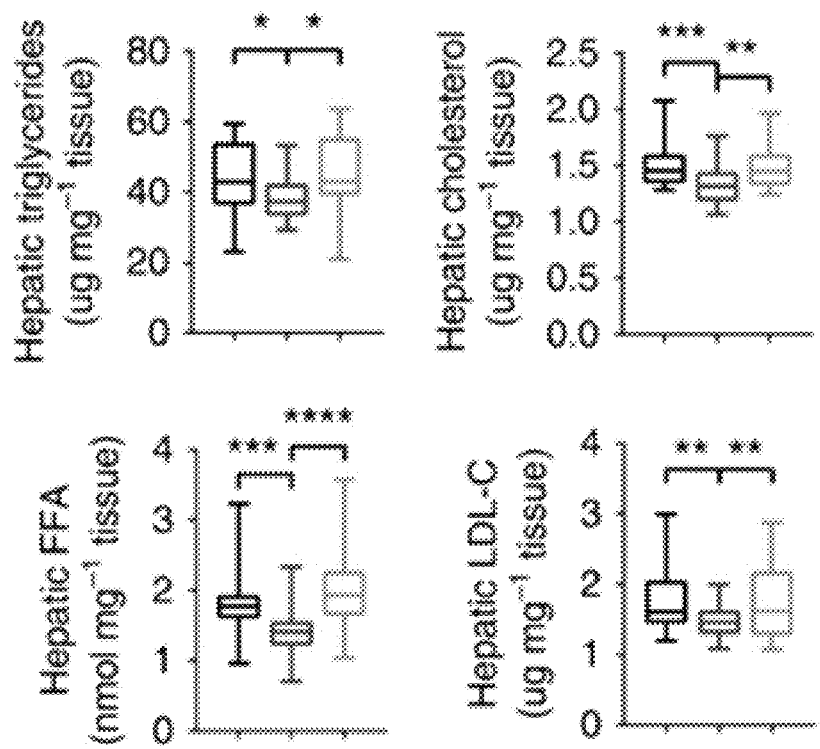
Figure 15F:
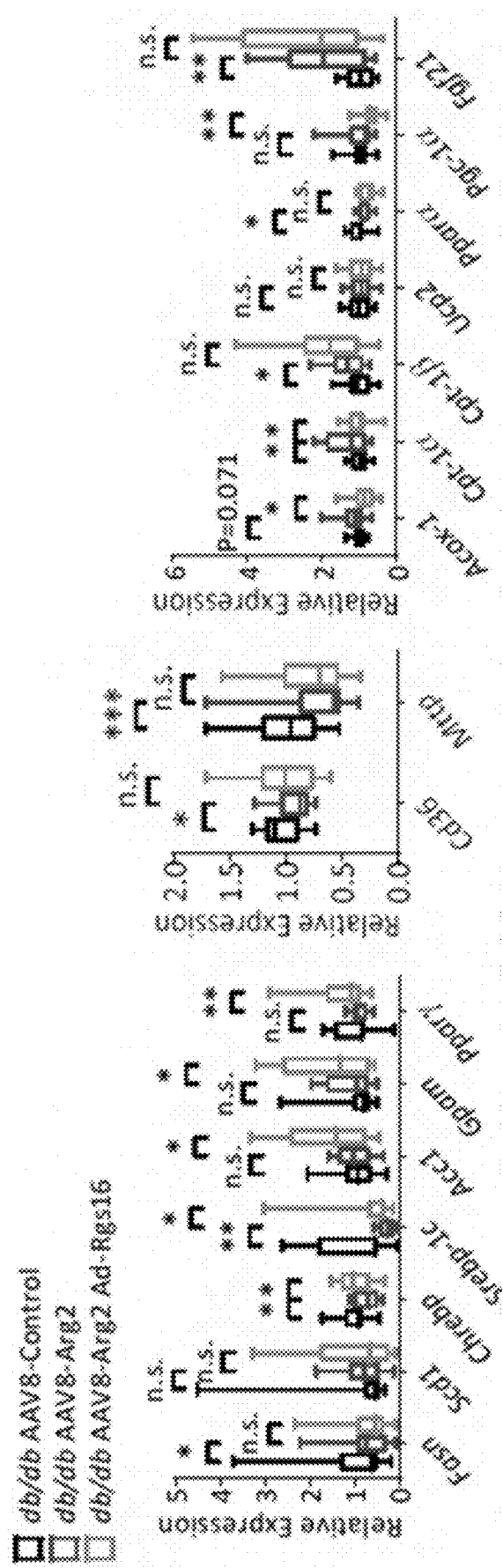
Figure 16A:
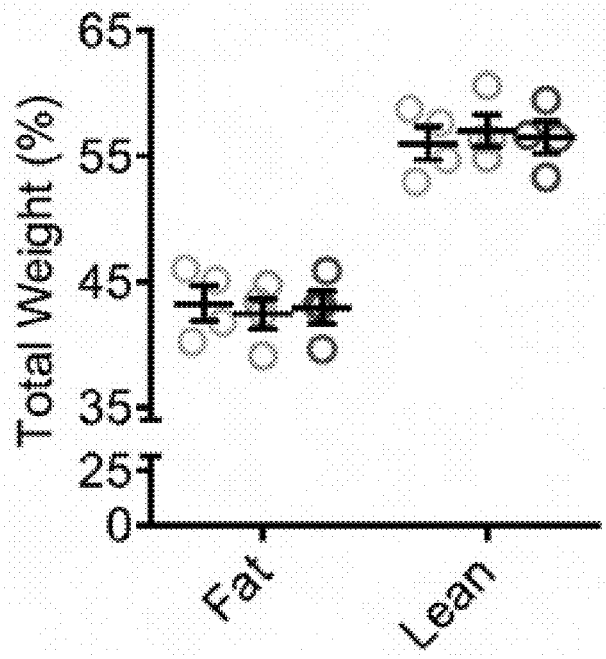
FIG. 16A-FIG. 16F depict the body composition of db/db mice administered with ADI-PEG.
Figure 16B:
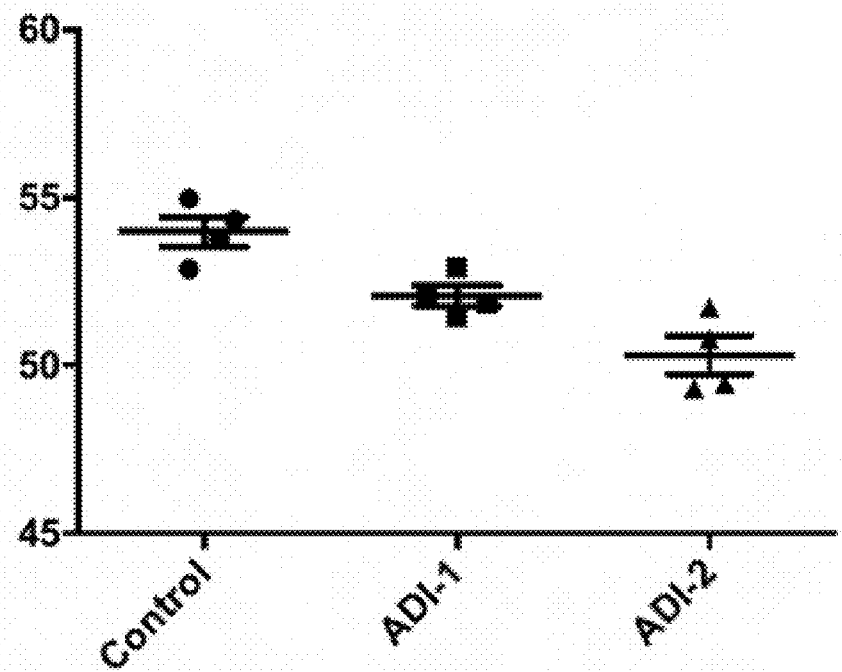
Figure 16C:
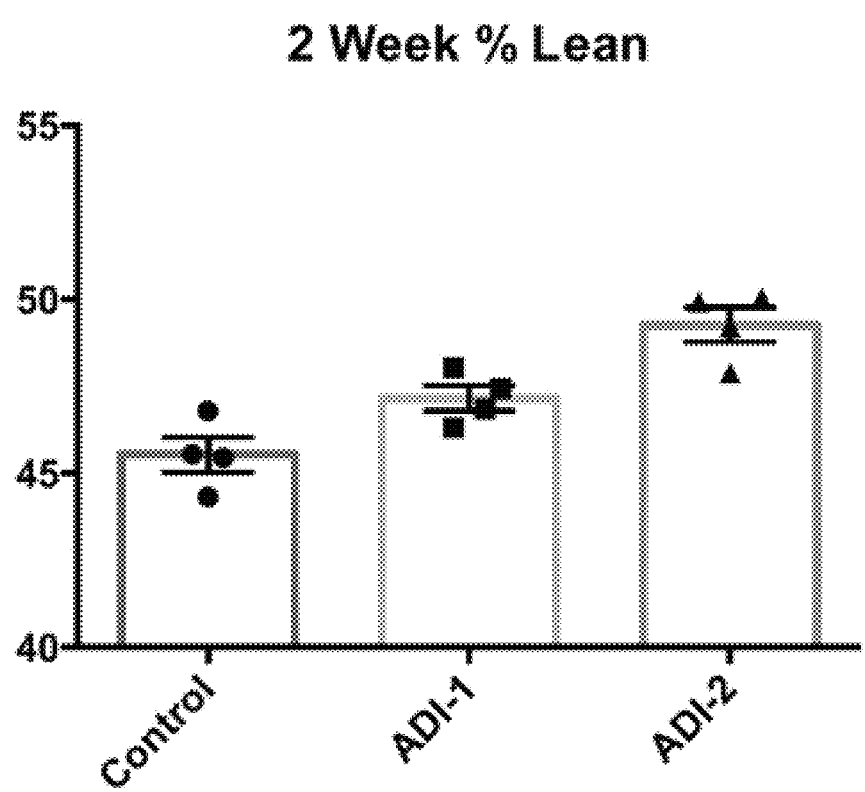
Figure 16D:
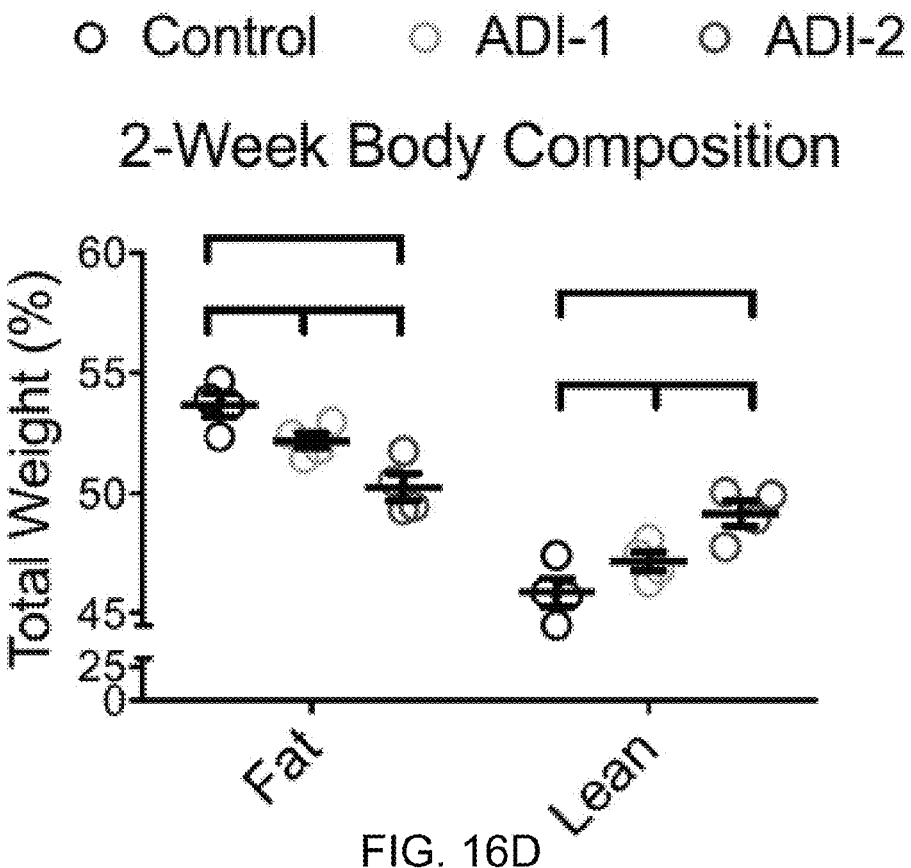
Figure 16E:
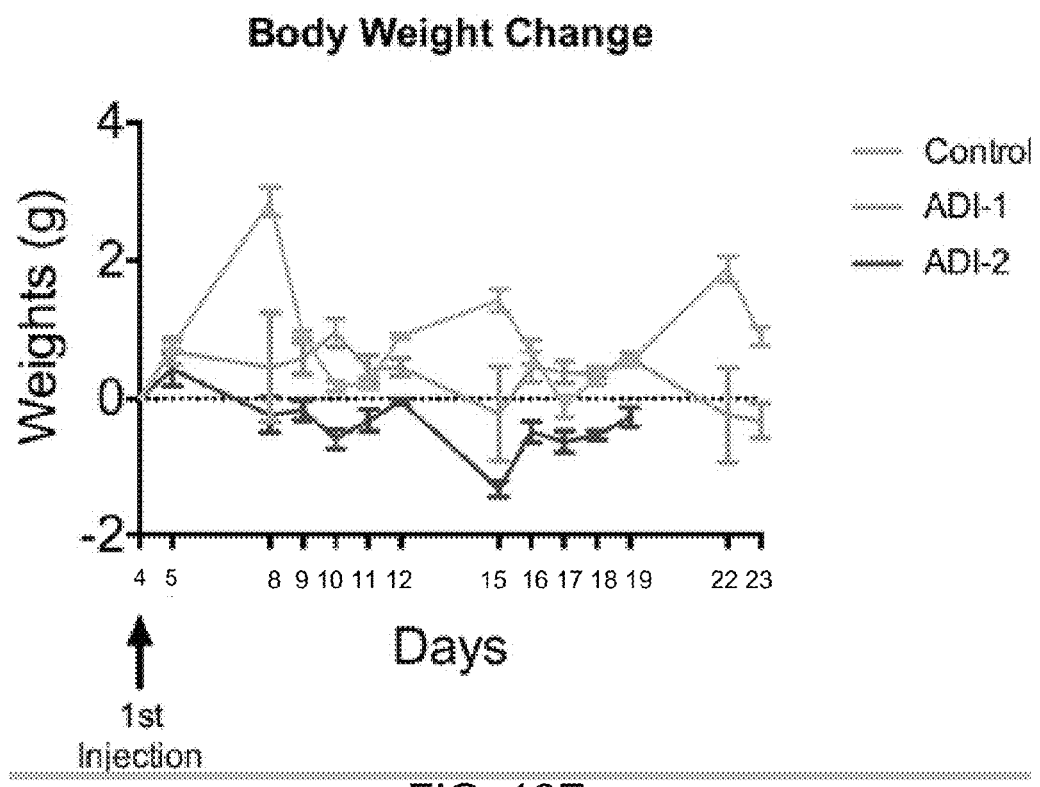
Figure 16F:
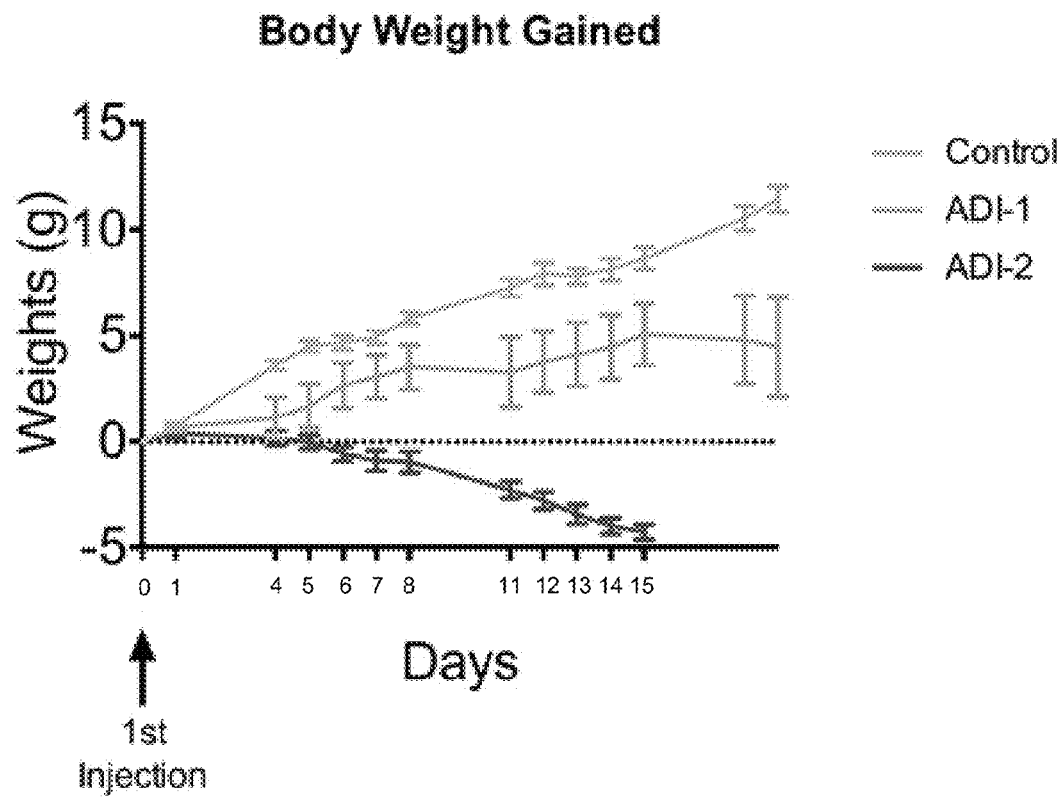
Figure 17A:
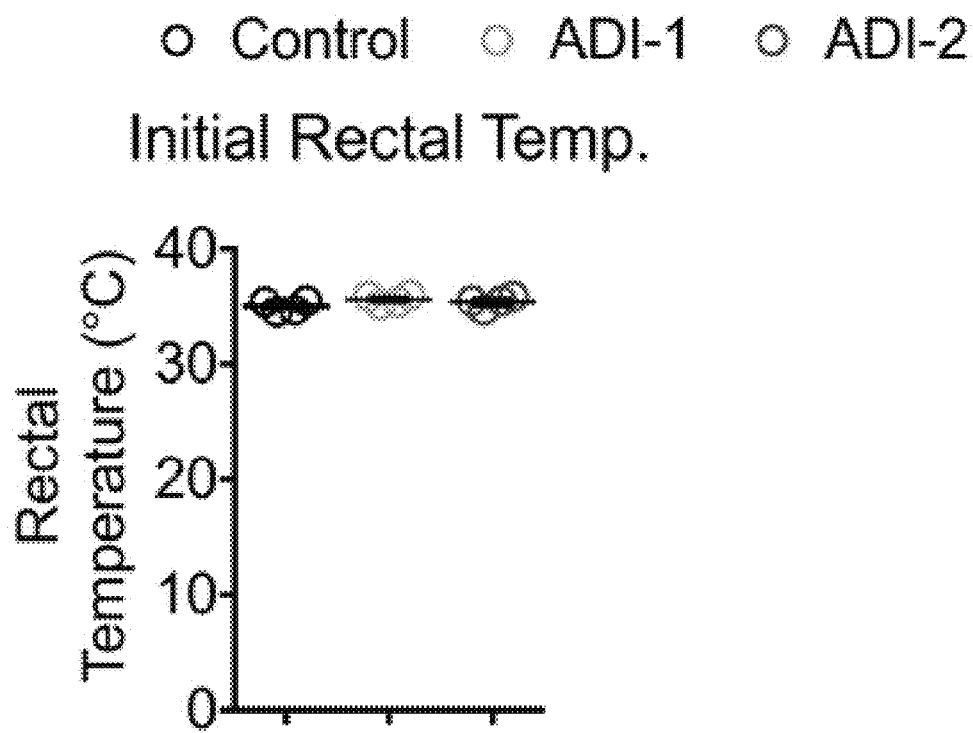
FIG. 17A-FIG. 17D depict the core temperature of ADI-PEG treated mice.
Figure 17B:
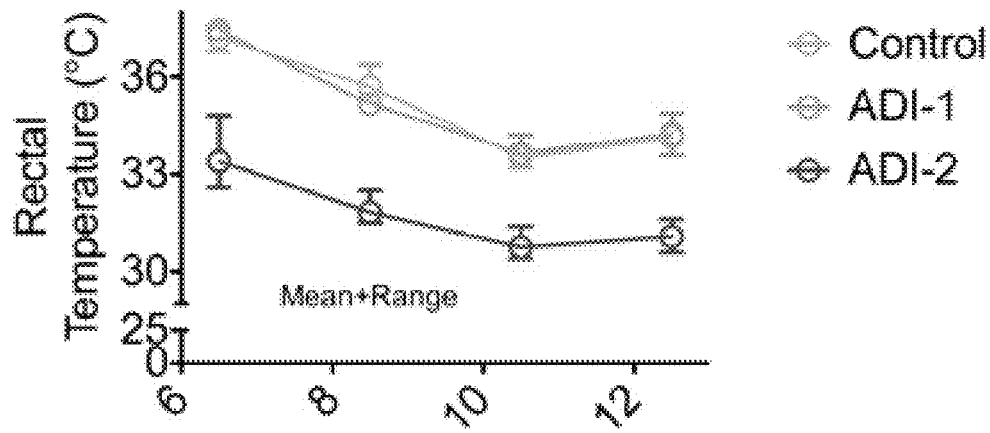
Figure 17C:
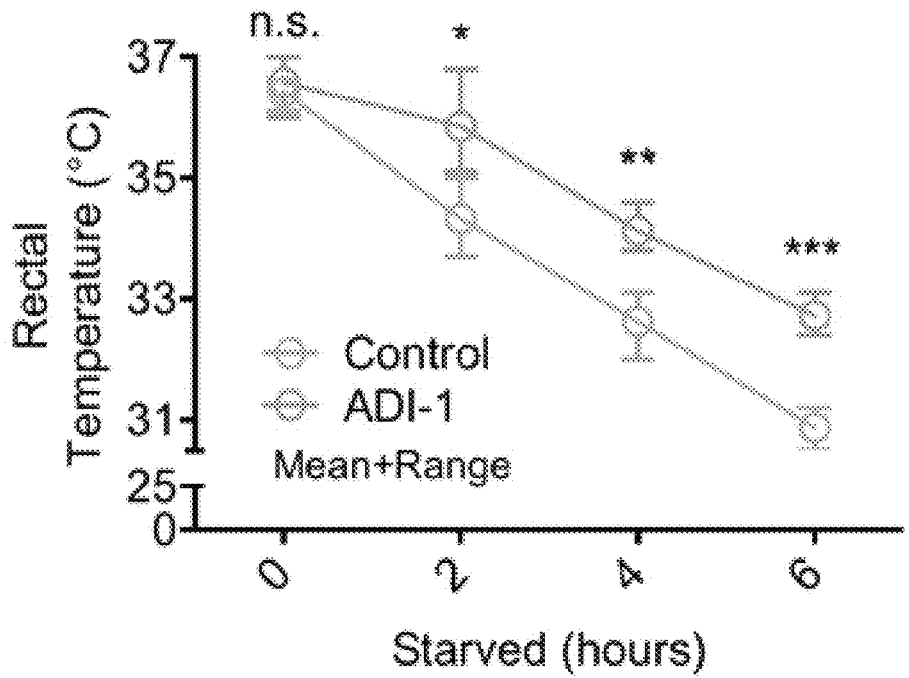
Figure 17D:
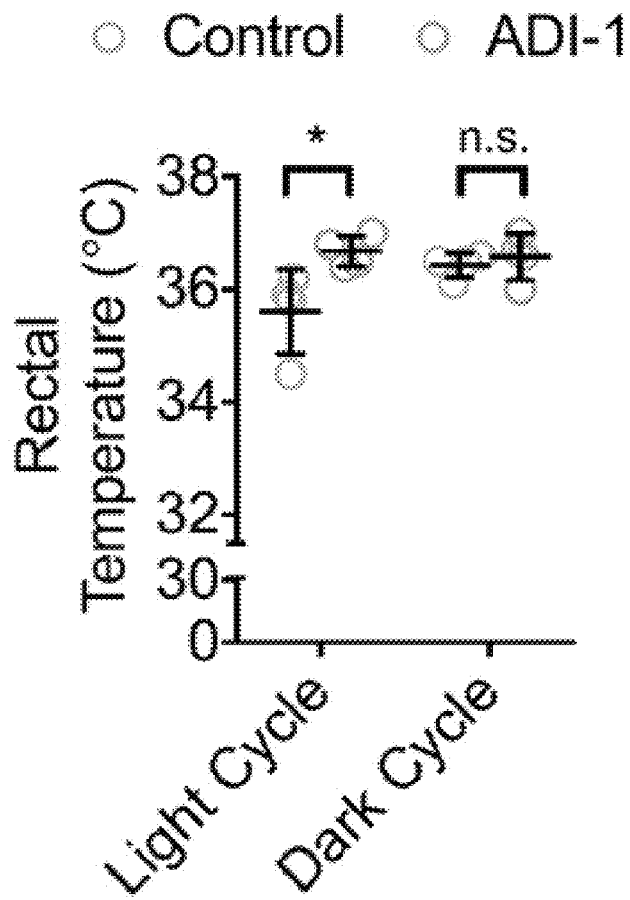
Figure 18A:
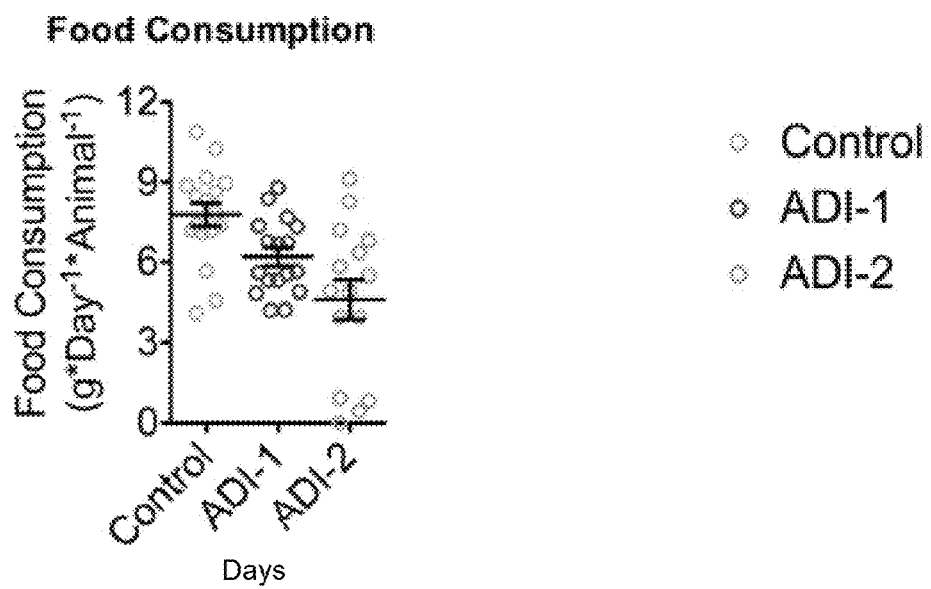
FIG. 18A-FIG. 18D depict the food consumption and survival for ADI-PEG mice.
Figure 18B:
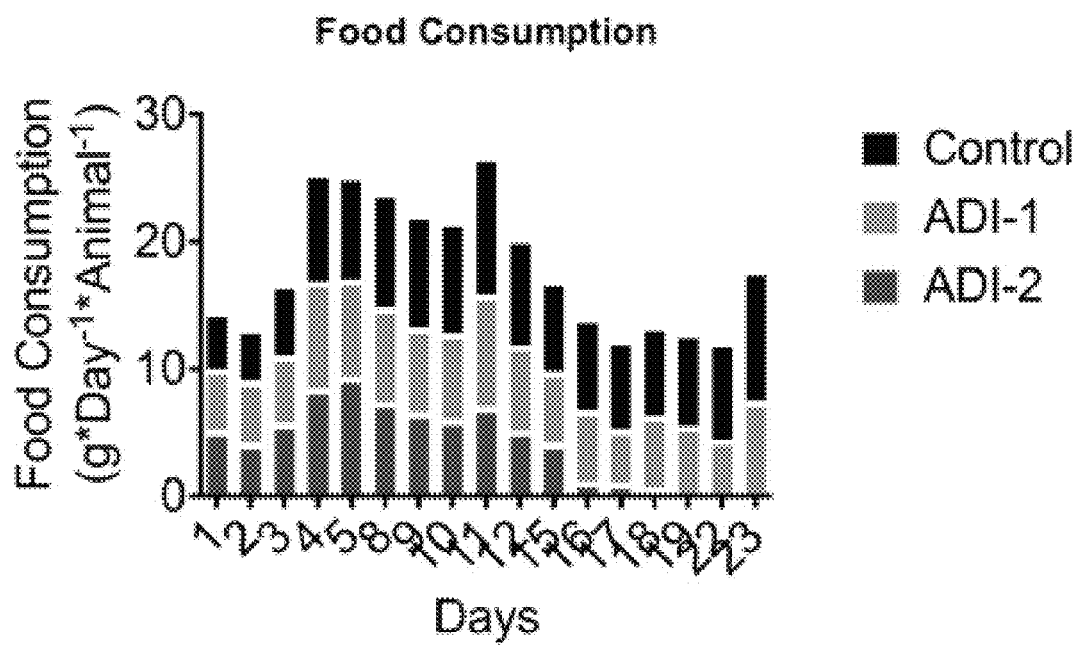
Figure 18C:
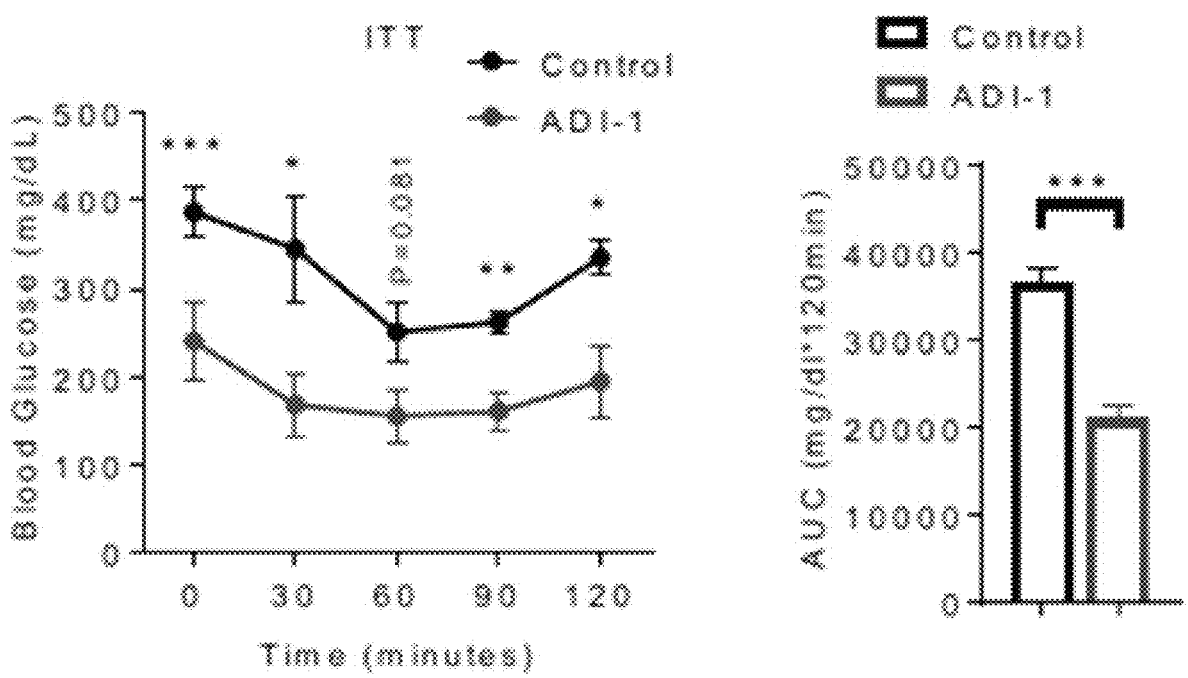
Figure 18D:
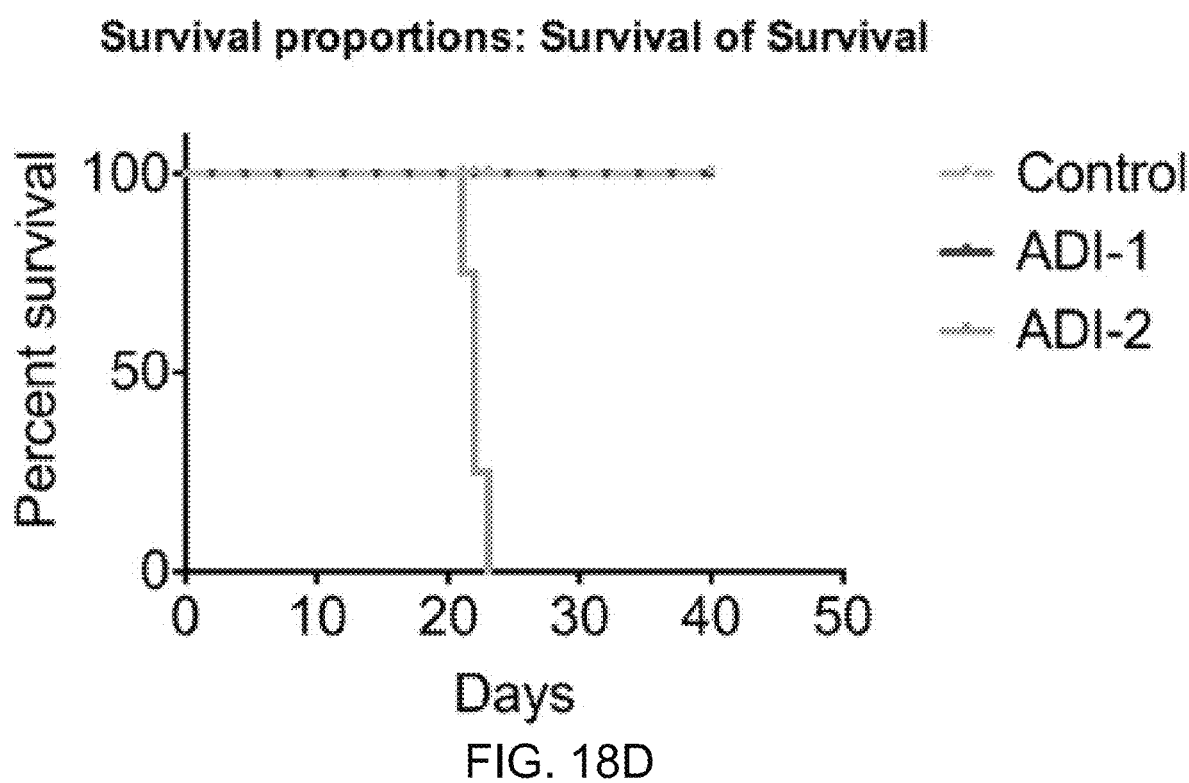

In the liver, Arg2 decreased hepatic TG, cholesterol, FFA, and LDL-C in db/db Arg2 mice, and these effects were significantly reversed upon Rgs16 reconstitution in db/db AAV8-Arg2 mice (FIG. 10A) with no significant changes detected in serum TG, cholesterol, FFA and LDL-C (FIG. 5E). Histological analysis by H&E and Oil Red O demonstrated that Arg2 overexpression reduced hepatic lipid accumulation, which was reversed in db/db mice also expressing AdRGS16 (FIG. 10B). Similarly, serum ALT, AST as well as hepatic inflammatory marker expression in db/db mice were each significantly elevated in db/db AAV8-Arg2 mice expressing Ad-Rgs16 as compared with db/db AAV8-Arg2 Ad-Control littermates (FIG. 10C, 10D). Rgs16 overexpression reversed Arg2 effects on Igfbp1 expression, and RGS16 overexpression generally increased genes involved in de novo lipogenesis in liver, including Chrebp, Acc1, Gpam, and Pparγ (FIG. 10E). However, the expression of mRNAs encoding beta oxidation and fatty acid uptake and export were largely unchanged by hepatic Arg2 overexpression or Rgs16 reconstitution (FIG. 15F).

Arginases are ancient, highly conserved enzymes[36,37,] the purpose of which is long considered to be conversion of L-arginine to urea and ornithine[36,37,38,39,40,41,42,43]. More recently, these enzymes have been implicated in the biosynthesis of polyamines, and in proline, glutamate, creatine, and agmatine biosynthesis as well[38,40,42,44]. The two vertebrate arginases, type I and type II evolved separately from an early gene duplication event[36], which ultimately manifests as both distinct and overlapping enzymatic functions, which yet remain to be fully appreciated[42]. Here it is demonstrated that Arg2 is more profoundly induced during fasting in liver versus Arg1. This opens the possibility now that the arginases regulate fasting biology in the liver. Although the total abundance of Arg1 is much greater than that of Arg2 in the basal setting[42], the data here suggest that Arg1 and Arg2 are in fact differentially regulated during fasting, and may thus serve divergent functions as part of the physiological fasting response.

The fasting response enhances hepatic and extrahepatic energy homeostasis, and yet the intermediaries that dictate these effects remain poorly understood. Here, it is shown that hepatocyte arginase 2 is upregulated during fasting, and after trehalose and trehalose analog treatment. Furthermore, Arg2 overexpression per se attenuates insulin resistance, hepatic steatosis and inflammation in high-fructose-fed and genetically obese models. Arg2 is therefore a tractable target that can be used to leverage the therapeutic hepatic fasting response. Although it must be noted that some of the individual metabolic improvements observed upon AAV8-Arg2 expression were modest. For example, we observed 20-25% improvements in glucose and insulin tolerance in HFrD-fed AAV8-Arg2 and db/db×AAV8-Arg2 mice. However, it should also be noted that the magnitude of changes in glucose and insulin tolerance here mirrors that observed in humans subjected to short-term intermittent fasting or caloric restriction, which results in 11-30% improvements in HOMA-IR, and 11-40% improvement in fasting plasma insulin levels[7]. Indeed even high-intensity, supervised diet and exercise training regimens over a 4-month period produced even more modest improvements in glucose tolerance, and only for the highest-intensity intervention groups[45].

The observation that hepatic Arg2 activation is therapeutic originated from prior observations that hepatic fasting signals (e.g., TFEB, PPARα) mediated the therapeutic effects of genetic or pharmacological glucose transport blockade[27,29]. However, the observation that hepatic glucose uptake is impaired in diabetic patients[46] may raise an apparent paradox, in light of the intrinsic therapeutic effect of hepatic glucose transport blockade. At least two key differences between the fasted liver and the diabetic liver resolve this apparent paradox. First, insulin stimulates hepatic glucose uptake by twofold over the fasting state[47]. In diabetic patients, insulin-stimulated glucose uptake is impaired (by 17.4% in the Iozzo study[46]) but this degree of blunted fed-state glucose uptake would not be expected to mimic a true hepatocyte fasting response. Second, basal hepatic glucose uptake should remain elevated through hepatic facilitative transporters GLUT1, GLUT2, and GLUT8. This is because basal hyperglycemia in the diabetic patient provides a glucose concentration gradient that drives these facilitative transporters even in the absence of insulin-stimulated glucose transport. This rise in basal hepatic glucose uptake would be expected to further impede the hepatocyte fasting response. Thus, although insulin-stimulated glucose uptake is relatively impaired in the insulin-resistant state, the above data suggest that pharmacological hepatic GLUT blockade or targeted hepatic Arg2 activation can drive the therapeutic hepatic glucose response in diet-induced and genetic models of obesity and insulin resistance.

Taken further in context, Arg2 appears to serve tissue-specific, and context-dependent functions in energy homeostasis. These context-dependent functions underscore the importance of leveraging hepatocyte fasting responses over less targeted approaches to metabolic therapy. Endothelial Arg2 overexpression surprisingly impaired endothelial cell autophagy and AMPK signaling[48], and macrophage Arg2 appears to have pro-inflammatory functions[49,50,51], whereas germline Arg2 deletion effects are not yet clear[49,52]. The clinical implications of these data should thus be underscored, especially in view of recent momentum to inhibit arginases in the setting of cardiovascular and other disease[53]. The liver-deficient Arg2 model suggests that blocking Arg2 without sufficient specificity may have negative metabolic consequences, particularly if hepatic Arg2 is inadvertently targeted. Here, we utilized a targeted, hepatocyte-specific overexpression approach to demonstrate further adaptive metabolic effects of hepatic Arg2 overexpression. Mechanistically, our genetic complementation data indicate that Arg2 cell autonomously enhances hepatic insulin signaling in vitro and in vivo and reduces hepatic fat accumulation via Rgs16 suppression. The data give rise to the hypothesis that Rgs16 suppresses hepatocyte-protective G-protein-coupled receptor signaling events.

RGS16 was previously identified as the only one of 21 RGS genes that was regulated by circadian rhythms in the murine suprachiasmatic nucleus and liver[54,55]. Hepatic Rgs16 was subsequently determined to suppress hepatic fat oxidation by upregulating the carbohydrate response element binding protein[35]. Because the net physiological response to fasting in the liver is to upregulate fat oxidation, the proposed Rgs16 function is to exert negative feedback on Gi/Gq-mediated fat oxidation[35,54]. This negative feedback appropriately moderates the prolonged fasting response (e.g., during hibernation). In overfed contexts, in which excess caloric and fat dissipation is an appropriate full-time compensation, RGS16 function becomes maladaptive. The maladaptive nature of this regulation is supported by comparing Arg2 expression in db/db vs db/+mice, HFrD-fed vs Chow-fed mice and in primary hepatocyte cultures treated with or without 10 mM fructose. In each of these overfed contexts, Arg2 expression was suppressed. The data here demonstrats that Arg2 acts upstream of Rgs16 to suppress its induction may reflect a molecular bypass in this negative feedback loop. Clinically, this Arg2-regulated bypass route may be exploited to treat NAFLD and insulin resistance.

In summary, this example identifies hepatic Arg2 suppression of Rgs16 as a metabolic regulatory axis during fasting. Moreover, we identify pharmacologic fasting mimetics-trehalose and lactotrehalose-which activate this axis analogous to physiological fasting. Therefore, the hepatic intermediaries that mediate the generalized macronutrient fasting response can be directly leveraged to treat cardiometabolic disease.

Methods

Cell Lines

AML12 cells (CRL-2254) were purchased directly from the American Type Culture Collection (ATCC) and propagated and maintained precisely per manufacturer specification. Primary hepatocyte cell isolation, culture and treatment Primary murine hepatocytes obtained from WT mice were isolated[24,25,31] and cultured and maintained in regular DMEM growth media (Sigma, #D5796) containing 10% FBS. For in vitro starvation experiments, "starved" media contained 1 g/L glucose and 0:5% FBS was used. Cultures were lysed in Trizol and subjected to downstream analysis. In vitro genetic knockdown was achieved via siRNA transfection using Lipofectamine 3000 from Invitrogen (L3000015). Trehalose was obtained from Sigma Aldrich (St. Louis, MO) and was >97% purity by HPLC. Three percent trehalose water (w/v) fed ad libitum was used in all in vivo experiments.

In Vitro Insulin Signaling

AML12 cells were seeded in 6-well plates. Cells were infected with adenoviruses, Ad-GFP, or Ad-Arg2, for 24 h in regular DMEM HAM/F12 growth media and starved in serum-free DMEM HAM/F12 media for 16 h before being treated with either serum-free media or serum-free media with insulin (10 nM) for 10 min.

Animal Studies

All animal protocols were approved by the Washington University School of Medicine Animal Studies Committee. Male C57B/6J mice and db/db mice were purchased directly from the Jackson Laboratory (Bar Harbor, ME) and housed a 12-h alternating light-dark, temperature-controlled, specific pathogen-free barrier facility prior to and throughout experimentation. All animals received humane care and procedures were performed in accordance with the approved guidelines by the Animal Studies Committee at Washington University School of Medicine. All animal studies were performed in accordance with the criteria and ethical regulations outlined by the Institutional Animal Care and Use Committee (IACUC).

Quantitative Real-Time RT-PCR (qRT-PCR)

Total RNA was prepared by homogenizing snap-frozen livers or cultured hepatocytes in Trizol reagent (Invitrogen #15596026) according to the manufacturer's protocol. cDNA was prepared using Qiagen Quantitect reverse transcriptase kit (Qiagen #205310). Real-time qPCR was performed with Step-One Plus Real-Time PCR System (Applied Biosystems) using SYBR Green master Mix Reagent (Applied Biosystems) and specific primer pairs. Relative gene expression was calculated by a comparative method using values normalized to the expression of an internal control gene.

Immunoblotting

Tissues were homogenized in RIPA buffer supplemented with protease and phosphatase inhibitors (Thermo Scientific). After homogenization, lysate was centrifuged at 18,000×g for 15 min at 4° C., and the supernatant was recovered. Protein concentration was determined by BCA Assay Kit (Thermo Scientific) and was adjusted to 2 mg/mL. Samples for western blotting were prepared by adding Laemmli buffer at a ratio of 1:1 and heating at 95° C. for 5 min. The prepared samples were subjected to 10% or 13% SDS-PAGE, followed by electrical transfer onto a nitrocellulose membrane using the Trans-Blot Turbo system (Bio-Rad). After blocking the membrane with 5% milk in TBST, the membrane was incubated in primary antibody at 4° C. overnight. The blot was developed after secondary antibody incubation using Pierce ECL Western Blotting Substrate (Thermo Scientific). Blots were developed according to the manufacturer's instructions. Protein expression levels were quantified with Image Lab software and normalized to the levels of β-actin or GAPDH.

Antibodies

Antibodies against phosphor-IRS1 (Ser636/639) (no. 2388), IRS1 (no. 2382), phosphor-AKT (Ser473) (no. 9271), AKT (no. 9272), GAPDH (no. 5174), and R-actin (no. 3700) were purchased from Cell Signaling Technology (CST) (Beverly, MA, USA). Anti-Arg2 antibody was purchased from Santa Cruz Biotechnology (no. Ab154422). Antibody against RGS16 (no. NBP2-01584) was purchased from Novus Biologicals, LLC (no. Ab203071) (Littleton, CO, USA). The dilution ratio for all primary antibodies was 1:1000. The secondary antibodies used in this study were peroxidase-conjugated anti-rabbit IgG (A7074) and anti-mouse IgG (A7076) purchased from CST, in which were used at a 1:5000 dilution.

Histological Analysis

Formalin-fixed paraffin-embedded liver sections were stained by H&E via the Washington University Digestive Diseases Research Core Center. OCT-embedded frozen liver sections were stained by Oil Red O according to standard protocols flowered by microscopic examination. Three liver sections were examined and evaluated for each animal. For Oil red O staining, ice-cold methanol-fixed frozen sections from mice were stained according to described protocols[24,25,31].

Lactotrehalose synthesis and purification was carried out using chemoenzymatic synthesis and purification methods we described56. Reactions were performed in 50 mM HEPES buffer (pH 7.4) containing 10 mM galactose, 40 mM UDP-glucose, 20 mM MgCl2, and 9.8 µM TreT at 70° C. We confirmed 98-99% purity by 1H-NMR (not shown). We confirmed 98-99% purity by 1H-NMR prior to experiments.

AAV8- and Adenovirus-Mediated Overexpression

Serotype 8 AAV (AAV8) was administered via tail vein as we previously reported29. All viral vectors (RGS16, Arg2, shTFEB) were obtained directly from Vector Biolabs Inc (Philadelphia, PA).

Antisense Oligonucleotides

We obtained validated Arg2-specific antisense oligonucleotides from IONIS Pharmaceuticals (Carlsbad, CA). Mice were treated precisely as we previously reported[27,32], prior to in vivo and post-mortem assays.

Insulin and Glucose Tolerance Testing

For insulin tolerance tests (ITT), mice were injected with 0.75 IU per kg body weight of insulin (Humalog, Eli Lilly) intraperitoneally after 4 h of fasting on Aspen bedding. For glucose tolerance tests (GTT), mice were injected with 2 g per kg body weight of glucose intraperitoneally after fasting for 4 h on aspen bedding. db/db mice were injected with 1 g per kg body weight of glucose intraperitoneally after fasting for 16 h on aspen bedding. Blood samples were measured at different time points with a glucometer (Arkray USA, Inc., Minneapolis, MN, USA).

Clinical Chemistry Measurements and Hepatic Lipid Analyses

For all other serum analyses, submandibular blood collection was performed immediately prior to sacrifice and serum was separated. Insulin ELISA (Millipore #EZRMI-13K), triglycerides (Thermo Fisher Scientific #TR22421), cholesterol (Thermo Fisher Scientific #TR13421), and free fatty acids (Wako Diagnostics #999-34691, #995-34791, #991-34891, #993-35191) quantification were performed using commercially available reagents according to manufacturer's directions. Albumin levels were quantified using an AMS LIASYS Chemistry Analyzer.

Hepatic lipids were extracted from ~100 mg hepatic tissue homogenized in 2:1 chloroform:methanol. In total, 0.25-0.5% of each extract was evaporated overnight prior to biochemical quantification of triglycerides, LDL-C, cholesterol, and free fatty acids using reagents described above, precisely according to manufacturer's directions.

Body Composition Analysis

Body composition analysis was carried out in unanesthetized mice using an EchoMRI 3-1 device (Echo Medical Systems) via the Washington University Diabetic Mouse Models Phenotyping Core Facility.

Indirect Calorimetry and Food Intake Measurement

All measurements were performed in a PhenoMaster System (TSE systems) via the Washington University Diabetic Mouse Models Phenotyping Core Facility, which allowed metabolic performance measurement and activity monitoring by an infrared light=beam frame. Mice were placed at room temperature (22-24° C.) in separate chambers of the PhenoMaster open-circuit calorimetry. Mice were allowed to acclimatize in the chambers for 4 h. Food and water were provided ad libitum in the appropriate devices. The parameters of indirect calorimetry (VO2, VCO2, respiratory exchange ratio (RER), heat and movement) were measured for at least 24 h for a minimum of one light cycle (6:01 am to 6:00 µm) and one dark cycle (6:01 µm to 6:00 am). Presented data are average values obtained in these recordings.

RNA-seq

RNA-seq was performed by the Washington University Genome Technology Access Center (GTAC). Library preparation was performed with 10 µg of total RNA with a Bioanalyzer RIN score greater than 8.0. Ribosomal RNA was removed by poly-A selection using Oligo-dT beads (mRNA Direct kit, Life Technologies). mRNA was then fragmented in buffer containing 40 mM Tris acetate pH.8.2, 100 mM potassium acetate and 30 mM magnesium acetate and heating to 94° C. for 150 s. mRNA was reverse transcribed to yield cNDA using SuperScript III RT enzyme (Life Technologies, per manufacturer's instructions) and random hexamers. A second strand reaction was performed to yield ds-cDNA. cDNA was blunt ended, had an A base added to the 3' ends, and then had Illumina sequencing adapters ligated to the ends. Ligated fragments were then amplified for 12 cycles using primers incorporating unique index tags. Fragments were sequenced on an Illumina HiSeq-3000 using single reads extending 50 bases.

RNA-seq reads were aligned to the Ensembl release 76 top-level assembly with STAR version 2.0.4b. Gene counts were derived from the number of uniquely aligned unambiguous reads by Subread:featureCount version 1.4.5. Transcript counts were produced by Sailfish version 0.6.3. Sequencing performance was assessed for total number of aligned reads, total number of uniquely aligned reads, genes and transcripts detected, ribosomal fraction known junction saturation and read distribution over known gene models with RSeQC version 2.3.

To enhance the biological interpretation of the large set of transcripts, grouping of genes/transcripts based on functional similarity was achieved using the R/Bioconductor packages GAGE and Pathview. GAGE and Pathview were also used to generate pathway maps on known signaling and metabolism pathways curated by KEGG.

Targeted Metabolomics

We performed targeted metabolomics as reported with minor modifications57. Briefly, the liver samples were homogenized in water (4 mL/g liver). The amino acids in 20 µL of mouse serum or liver homogenate were extracted with protein precipitation in the presence of internal standards (13C6,15N-Ile, d3-Leu, d8-Lys, d8-Phe, d8-Trp, d4-Tyr, d8-Val, d7-Pro, 13C4-Thr, d3-Met, d2-Gly, d3,15N2-Asn, d4-Cit, d3-Asp, 13C5-Gln, 13C6-His, d3-Glu, d4-Ala, d3-Ser, 13C5-Orn, and 13C6-Arg). Quality control (QC) samples for livers and sera were prepared from pooled partial study samples and injected every five study samples to monitor intra-batch precision. Only the lipid species with CV % <15% for QC injections are reported. The lie, Leu, Lys, Phe, Trp, Tyr, Val, Pro, Thr, Met, Gly, Asn, Cit, Asp, Gln, His, Glu, Ala, Ser, Orn, and Arg were analyzed on 4000 QTRAP mass spectrometer coupled with a Prominence LC-20AD HPLC system. Data processing was conducted with Analyst 1.5.1 (Applied Biosystems).

Statistical Analyses

Data were analyzed using GraphPad Prism version 6.0 (RRID:SCR_015807). $p<0.05$ was defined as statistically significant. Data shown are as mean±SEM. In box-whisker plots: middle bar represents the dataset median; boxes represent 25 and 75 percentile lines; whiskers represent maximum and minimum values in the dataset. In dot plots: the line represents the data mean. Unpaired two-tailed homoscedastic T-tests with Bonferroni post hoc correction for multiple comparisons were used for all analyses unless otherwise noted in the figure legends. Two-way ANOVA was also used for analyses with two independent variables.

REFERENCES

1. Gonzelez-Muniesa, P. et al. Obesity. Nat. Rev. Dis. Primers 3, 17034 (2017).
2. Longo, V. D. & Mattson, M. P. Fasting: molecular mechanisms and clinical applications. Cell Metab. 19, 181-192 (2014).
3. Martin, B., Mattson, M. P. & Maudsley, S. Caloric restriction and intermittent fasting: two potential diets for successful brain aging. Ageing Res. Rev. 5, 332-353 (2006).
4. Ahmet, I., Wan, R., Mattson, M. P., Lakatta, E. G. & Talan, M. Cardioprotection by intermittent fasting in rats. Circulation 112, 3115-3121 (2005).
5. MATTSON, M. & Wan, R. Beneficial effects of intermittent fasting and caloric restriction on the cardiovascular and cerebrovascular systems. J. Nutr. Biochem. 16, 129-137 (2005).
6. Patterson, R. E. et al. Intermittent fasting and human metabolic health. J. Acad. Nutr. Diet. 115, 1203-1212 (2018).
7. Barnosky, A. R., Hoddy, K. K., Unterman, T. G. & Varady, K. A. Intermittent fasting vs daily calorie restriction for type 2 diabetes prevention: a review of human findings. Transl. Res. 164, 302-311 (2014).
8. Chung, H. et al. Time-restricted feeding improves insulin resistance and hepatic steatosis in a mouse model of postmenopausal obesity. Metabolism 65, 1743-1754 (2018).
9. Kosinski, C. & Jornayvaz, F. R. Effects of ketogenic diets on cardiovascular risk factors: evidence from animal and human studies. Nutrients 9, 1-16 (2017).
10. Kang, H. C., Chung, D. E., Kim, D. W. & Kim, H. D. Early- and late-onset complications of the ketogenic diet for intractable epilepsy. Epilepsia 45, 1116-1123 (2004).
11. Steriade, C., Andrade, D. M., Faghfoury, H., Tarnopolsky, M. A. & Tai, P. Mitochondrial encephalopathy with lactic acidosis and stroke-like episodes (MELAS) may respond to adjunctive ketogenic diet. Pediatr. Neurol. 50, 498-502 (2014).
12. Potthoff, M. J., Kliewer, S. A. & Mangelsdorf, D. J. Endocrine fibroblast growth factors 15/19 and 21: From feast to famine. Genes Dev. 26, 312-324 (2012).
13. Potthoff, M. J. FGF21 and metabolic disease in 2016: a new frontier in FGF21 biology. Nat. Rev. Endocrinol. 13, 74-76 (2016).
14. Potthoff, M. J. & Finck, B. N. Head over hepatocytes for FGF21. Diabetes 63, 4013-4015 (2014).
15. Alemsn, G. et al. Increase in FGF21 stimulates browning markers in white adipose tissue in rats fed a low protein high carbohydrate diet during acute cold exposure. FASEB. J. 31(652), 12-652.12 (2017).
16. Gaich, G. et al. The effects of LY2405319, an FGF21 Analog, in obese human subjects with type 2 diabetes. Cell Metab. 18, 333-340 (2013).
17. Colak, Y. et al. SIRT1 as a potential therapeutic target for treatment of nonalcoholic fatty liver disease. Med. Sci. Monit. 17, HY5-Y9 (2011).
18. Bordone, L. et al. SIRT1 transgenic mice show phenotypes resembling calorie restriction. Aging Cell 6, 759-767 (2007).
19. Badman, M. K. et al. Hepatic fibroblast growth factor 21 is regulated by PPARα and is a key mediator of hepatic lipid metabolism in ketotic states. Cell Metab. 5, 426-437 (2007).
20. Inagaki, T. et al. Endocrine regulation of the fasting response by PPARα-mediated induction of fibroblast growth factor 21. Cell Metab. 5, 415-425 (2007).
21. Nakamura, M. T., Yudell, B. E. & Loor, J. J. Regulation of energy metabolism by long-chain fatty acids. Prog. Lipid. Res. 53, 124-144 (2014).
22. Pastore, N. et al. TFE3 regulates whole-body energy metabolism in cooperation with TFEB. EMBO Mol. Med. 9, 605-621 (2017).
23. Markan, K. R. et al. Circulating FGF21 is liver derived and enhances glucose uptake during refeeding and overfeeding. Diabetes 63, 4057-4063 (2014).
24. DeBosch, B. J. et al. Trehalose inhibits solute carrier 2A (SLC2A) proteins to induce autophagy and prevent hepatic steatosis. Sci. Signal. 9, ra21-ra21 (2016).
25. DeBosch, B. J., Chen, Z., Saben, J. L., Finck, B. N. & Moley, K. H. Glucose transporter 8 (GLUT8) mediates fructose-induced de Novo lipogenesis and macrosteatosis. J. Biol. Chem. 289, 10989-10998 (2014).
26. Mardones, P., Rubinsztein, D. C. & Hetz, C. Mystery solved: trehalose kickstarts autophagy by blocking glucose transport. Sci. Signal. 9, fs2 L P-fs2 L2 (2016).
27. Mayer, A. L. et al. Enhanced hepatic PPARα activity links GLUT8 deficiency to augmented peripheral fasting responses in male mice. Endocrinology 159, 2110-2126 (2018).
28. DeBosch, B. J., Chen, Z., Finck, B. N., Chi, M. & Moley, K. H. Glucose transporter-8 (GLUT8) mediates glucose intolerance and dyslipidemia in high-fructose diet-fed male mice. Mol. Endocrinol. 27, 1887-1896 (2013).
29. Zhang, Y. et al. Transcription factor E B (TFEB)-dependent induction of thermogenesis by the hepatocyte solute carrier 2A (SLC2A) inhibitor, trehalose. Autophagy. 0, 1 (2018).
30. Zhang, Y. et al. TFEB-dependent induction of thermogenesis by the hepatocyte SLC2A inhibitor trehalose. Autophagy. 14, 1959-1975 (2018).
31. Mayer, A. L. et al. SLC2A8 (GLUT8) is a mammalian trehalose transporter required for trehalose-induced autophagy. Sci. Rep. 6, 38586 (2016).
32. Higgins, C. B. et al. Hepatocyte ALOXE3 is induced during adaptive fasting and enhances insulin sensitivity by activating hepatic PPARγ. JCI Insight 3 https://doi.org/10.1172/jci.insight.120794 (2018).
33. Walmagh, M., Zhao, R. & Desmet, T. Trehalose analogues: latest insights in properties and biocatalytic production. Int. J. Mol. Sci. 16, 13729-13745 (2015).
34. O'Neill, M. K., Piligian, B. F., Olson, C. D., Woodruff, P. J. & Swarts, B. M. Tailoring trehalose for biomedical and biotechnological applications. Pure Appl. Chem. 89, 1223-1249 (2017).
35. Pashkov, V. et al. Regulator of G protein signaling (Rgs16) inhibits hepatic fatty acid oxidation in a carbohydrate response element-binding protein (ChREBP)-dependent manner. J. Biol. Chem. 286, 15116-15125 (2011).
36. Perozich, J., Hempel, J., Morris Jr, S. M. Roles of conserved residues in the arginase family. Biochim. Biophys. Acta. 1382, 23-37 (1998).
37. Morris, S. M., Bhamidipati, D. & Kepka-Lenhart, D. Human type II arginase: sequence analysis and tissue-specific expression. Gene 193, 157-161 (1997).
38. Caldwell, R. B., Toque, H. A., Narayanan, S. P. & Caldwell, R. W. Arginase: an old enzyme with new tricks. Trends Pharmacol. Sci. 36, 395-405 (2015).
39. Caldwell, R. W., Rodriguez, P. C., Toque, H. A., Narayanan, S. P. & Caldwell, R. B. Arginase: a multifaceted enzyme important in health and disease. Physiol. Rev. 98, 641-665 (2018).
40. Morris, S. M. Jr Enzymes of arginine metabolism. J. Nutr. 134, 2743S-2747S (2004).
41. Morris, S. M. Jr Arginine metabolism revisited. J. Nutr. 146, 2579S-2586S (2016).
42. Cederbaum, S. D. et al. Arginases I and II: do their functions overlap?Mol. Genet. Metab. 81, 38-44 (2004).
43. Crombez, E. A. & Cederbaum, S. D. Hyperargininemia due to liver arginase deficiency. Mol. Genet. Metab. 84, 243-251 (2005).
44. Morris, S. M. Arginine metabolism: boundaries of our knowledge. J. Nutr. 137, 1602S-1609S (2007).
45. McAuley, K. A. et al. Intensive lifestyle changes are necessary to improve insulin sensitivity. Diabetes. Care 25, 445 L P-445452 (2002).
46. Iozzo, P. et al. Insulin-mediated hepatic glucose uptake is impaired in type 2 Diabetes: evidence for a relationship with glycemic control. J. Clin. Endocrinol. Metab. 88, 2055-2060 (2003).
47. Honka, M.-J. et al. Insulin-stimulated glucose uptake in skeletal muscle, adipose tissue and liver: a positron emission tomography study. Eur. J. Endocrinol. 178, 523-531 (2018).
48. Xiong, Y. et al. regulation of MTOR and PRKAA/AMPK signaling in advance datherosclerosis ARG2 impairs endothelial autophagy through regulation of MTOR and PRKAA/AMPK signaling in advanced atherosclerosis, 8627 https://doi.org/10.4161/15548627.2014.981789 (2014).
49. Liu, C. et al. Targeting arginase-II protects mice from high-fat-diet-induced hepatic steatosis through suppression of macrophage inflammation. Sci. Rep. 6, 20405 (2016).
50. Ming, X.-F. et al. Arginase II promotes macrophage inflammatory responses through mitochondrial reactive oxygen species, contributing to insulin resistance and atherogenesis. Am. Heart J. 1, e000992-e000992 (2012).
51. Yang, Z. & Ming, X. F. Functions of arginase isoforms in macrophage inflammatory responses: Impact on cardiovascular diseases and metabolic disorders. Front. Immunol. 5, 1-10 (2014).
52. Navarro, L. A. et al. Arginase 2 deficiency results in spontaneous steatohepatitis: a novel link between innate immune activation and hepatic de novo lipogenesis. J. Hepatol. 62, 412-420 (2015).
53. Pernow, J. & Jung, C. Arginase as a potential target in the treatment of cardiovascular disease: Reversal of arginine steal?Cardiovasc. Res. 98, 334-343 (2013).
54. Huang, J. et al. Feeding and fasting controls liver expression of a regulator of G protein signaling (Rgs16) in periportal hepatocytes. Comp. Hepatol. 5, 1-11 (2006).
55. Masri, S. et al. Partitioning circadian transcription by SIRT6 leads to segregated control of cellular metabolism. Cell 158, 659-672 (2014).
56. Bassily, R. W., E I-Sokkary, R. I., Silwanis, B. A., Nematalla, A. S. & Nashed, M. A. An improved synthesis of 4-azido-4-deoxy- and 4-amino-4-deoxy-$\alpha$, $\alpha$-trehalose and their epimers. Carbohydr. Res. 239, 197-207 (1993).
57. Prinsen, H. C. M. T. et al. Rapid quantification of underivatized amino acids in plasma by hydrophilic interaction liquid chromatography (HILIC) coupled with tandem mass-spectrometry. J. Inherit. Metab. Dis. 39, 651-660 (2016).

Example 2—ADI-PEG Administration db/db mice were injected with vehicle or ADI-PEG 20 at 5 IU per week or 10 IU per week.

SUMMARY 1) high-dose mice lost significant weight and perished at about 2.5 wk treatment.
2) 5 IU/week mice look/act/groom/move normally and had minimal weight change.
3) ADI-PEG-treated mice maintain core body temp during fasting (e.g. are relatively hyperthermic) during fasting vs vehicle-treated.
4) Low- and high-dose ADI-PEG reduce body fat composition and increase lean mass.
5) High-dose ADI-PEG decreases food consumption.
6) 5 IU/week ADI-PEG treatment profoundly improves insulin tolerance testing.

Conclusions:

ADI-PEG is effective at improving weight loss, fat composition, preventing fasting hypothermia and increasing insulin sensitivity. We tested the hypothesis that ADI-PEG would recapitulated AAV-Arg2-mediated effects on core temperature, body weight, and insulin tolerance we enrolled ~8 wk-old male C57B/6J mice obtained directly from the Jackson Laboratory (Bar Harbor, ME). Mouse body weights and food consumption were at baseline and daily thereafter. Body composition was quantified by echoMRI 3-1 scanner (Echo Medical Systems, Houston, TX) at baseline and at endpoint analysis. Mice were housed in a temperature controlled specific pathogen-free barrier facility with controlled 12-hour light-dark cycles. Ad libitum access to food and sterile autoclaved water was provided unless immediately before fasting experiments. Control mice were treated with once weekly vehicle injections intraperitoneally. ADI-1 group mice were treated with 5 U/mouse/week IP ADI-PEG 20. ADI-2 groups mice were treated with 5 U/mouse twice weekly IP ADI-PEG 20. Rectal temperature was measured at baseline and during fasting every 2-4 hr using a inserted 1.5 cm into the anal verge prior to recording.

We performed insulin tolerance testing after ~10 days treatment by vehicle or ADI-PEG 20. This was done by fasting animals 4 hr prior to testing. Mice were then injected with 75 U/kg Humalog insulin (Eli Lilly, Indianapolis, IN), and blood glucoses were measured every 15-30' for a 2 hr period after injection by hand-held glucometer (One Touch Ultra 2 glucometer, Lifescan, Milpitas, CA). Data were analyzed by GraphPad 7.0 Software analysis package. $P<0.05$ by two-tailed T-testing was considered to be a significant difference between control and ADI-PEG treated groups.

What is claimed is:

1. A method for treating a metabolic disease selected from the group consisting of hepatic steatosis, hepatic inflammation, insulin resistance, and adiposity in a human subject in need thereof comprising administering to the subject a composition comprising a therapeutically effective amount of an Adeno-associated virus serotype 8 (AAV8) vector comprising a nucleic acid sequence encoding an arginase II.

2. The method of claim 1, wherein the AAV8 vector has a genome comprising open reading frames that encode the arginase II.

3. The method of claim 2, wherein nucleic acid sequence encodinq the arginase II, is operably linked to a liver-specific promoter.

4. The method of claim 1, wherein the nucleic acid sequence encoding arginase II encodes a polypeptide comprising the sequence set forth in SEQ ID NO: 2.

5. The method of claim 4, wherein the arginase II is further modified by coupling with proteins or peptides, wherein one or more proteins or peptides are directly or indirectly linked to the arginase II.

6. The method of claim 5, wherein the one or more proteins or peptides is selected from the group consisting of thyroxine-binding protein, transthyretin, a1-acid glycoprotein, transferrin, fibrinogen, immunoglobulin, Ig Fc, albumin, and fragments thereof.

7. The method of claim 4, wherein the arginase II is further modified by covalent attachment with polyethylene glycol (PEG).

8. The method of claim 7, wherein the PEG has a total weight average molecular weight of 1,000 to 50,000 daltons; from 3,000 to 40,000 daltons; from 5,000 to 30,000 daltons; from 8,000 to 30,000 daltons; from 11,000 to 30,000 daltons; from 12,000 to 28,000 daltons; from 16,000 to 24,000 daltons; from 18,000 to 22,000 daltons; or from 19,000 to 21,000 daltons.

9. The method of claim 8, wherein the PEG has a total weight average molecular weight of 20,000 daltons.

10. The method of claim 7, wherein the PEG is a branched or straight chain.

11. The method of claim 1, wherein the subject has decreased fat mass relative to the subject prior to administration of the arginine II.

* * * * *